(12) United States Patent
Yamamoto

(10) Patent No.: US 11,134,184 B2
(45) Date of Patent: Sep. 28, 2021

(54) CAMERA MODULE, METHOD OF PRODUCING THE SAME, AND ELECTRONIC DEVICE

(71) Applicant: SONY SEMICONDUCTOR SOLUTIONS CORPORATION, Kanagawa (JP)

(72) Inventor: Atsushi Yamamoto, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 16/477,984

(22) PCT Filed: Jan. 16, 2018

(86) PCT No.: PCT/JP2018/000935
§ 371 (c)(1),
(2) Date: Jul. 15, 2019

(87) PCT Pub. No.: WO2018/139254
PCT Pub. Date: Aug. 2, 2018

(65) Prior Publication Data
US 2019/0373147 A1 Dec. 5, 2019

(30) Foreign Application Priority Data
Jan. 26, 2017 (JP) .............................. JP2017-011992

(51) Int. Cl.
*H04N 5/225* (2006.01)
*G02B 3/00* (2006.01)
*G02B 13/00* (2006.01)

(52) U.S. Cl.
CPC ......... *H04N 5/2254* (2013.01); *G02B 3/0062* (2013.01); *G02B 13/0085* (2013.01); *G02B 3/0012* (2013.01); *H04N 5/2257* (2013.01)

(58) Field of Classification Search
CPC .. H04N 5/2254; H04N 5/2257; G02B 3/0062; G02B 13/0085; G02B 3/0012
See application file for complete search history.

(56) References Cited

U.S. PATENT DOCUMENTS

| 8,000,041 B1 | 8/2011 | Lin et al. |
| 9,083,873 B1 | 7/2015 | Lewkow |

(Continued)

FOREIGN PATENT DOCUMENTS

| CN | 102411185 | 4/2012 |
| CN | 105611134 | 5/2016 |

(Continued)

OTHER PUBLICATIONS

Official Action (with English translation) for Chinese Patent Application No. 201860007279.2, dated Dec. 7, 2020, 26 pages.

(Continued)

*Primary Examiner* — Lin Ye
*Assistant Examiner* — John H Morehead, III
(74) *Attorney, Agent, or Firm* — Sheridan Ross P.C.

(57) ABSTRACT

Provided is a camera module including: a laminated lens structure in which substrates with lenses, each of which has a lens disposed inside a through-hole formed in the substrate, are bonded by direct bonding and laminated, the laminated lens structure including a plurality of optical units each of which has a plurality of the lenses laminated in an optical axis direction; and at least one of a light absorbing film and a blocking plate provided between the adjacent optical units.

19 Claims, 88 Drawing Sheets

(56) References Cited

U.S. PATENT DOCUMENTS

| | | | |
|---|---|---|---|
| 2008/0007623 A1* | 1/2008 | Lee | H04N 5/2257 |
| | | | 348/207.99 |
| 2010/0271705 A1* | 10/2010 | Hung | G02B 13/001 |
| | | | 359/601 |
| 2011/0080487 A1 | 4/2011 | Venkataraman et al. | |
| 2011/0149143 A1* | 6/2011 | Tsujino | G02B 7/021 |
| | | | 348/374 |
| 2012/0105400 A1* | 5/2012 | Mathew | H04N 5/2257 |
| | | | 345/207 |
| 2012/0274811 A1 | 11/2012 | Bakin | |
| 2013/0037975 A1 | 2/2013 | Thallner et al. | |
| 2013/0301140 A1* | 11/2013 | Matsuno | B29D 11/00278 |
| | | | 359/619 |
| 2014/0125849 A1* | 5/2014 | Heimgartner | B29D 11/00307 |
| | | | 348/276 |
| 2014/0211009 A1* | 7/2014 | Fursich | G02B 13/04 |
| | | | 348/148 |
| 2014/0306308 A1 | 10/2014 | Wu et al. | |
| 2014/0347509 A1 | 11/2014 | Venkataraman et al. | |
| 2014/0354773 A1 | 12/2014 | Venkataraman et al. | |
| 2014/0354843 A1 | 12/2014 | Venkataraman et al. | |
| 2014/0354853 A1 | 12/2014 | Venkataraman et al. | |
| 2014/0354854 A1 | 12/2014 | Venkataraman et al. | |
| 2014/0355870 A1 | 12/2014 | Venkataraman et al. | |
| 2015/0036046 A1 | 2/2015 | Rudmann et al. | |
| 2015/0200221 A1* | 7/2015 | Heimgartner | H01L 27/14685 |
| | | | 257/432 |
| 2015/0234151 A1 | 8/2015 | Venkataraman et al. | |
| 2015/0325613 A1 | 11/2015 | Rudmann et al. | |
| 2016/0124197 A1* | 5/2016 | Chern | G02B 13/0085 |
| | | | 348/294 |
| 2016/0252734 A1* | 9/2016 | Rossi | H01L 27/14685 |
| | | | 348/340 |
| 2016/0269650 A1 | 9/2016 | Venkataraman et al. | |
| 2017/0108699 A1* | 4/2017 | Perez Calero | G02B 27/123 |
| 2017/0244874 A1* | 8/2017 | Wang | H01L 27/14618 |
| 2017/0244878 A1* | 8/2017 | Wang | A01B 1/00 |
| 2017/0353634 A1* | 12/2017 | Kim | H04N 5/2254 |
| 2018/0048830 A1 | 2/2018 | Venkataraman et al. | |

FOREIGN PATENT DOCUMENTS

| | | |
|---|---|---|
| JP | 2009-251366 | 10/2009 |
| JP | 2009-279790 | 12/2009 |
| JP | 2013-525828 | 6/2013 |
| JP | 2013-174784 | 9/2013 |
| JP | 2015-152921 | 8/2015 |
| KR | 10-2011-0022287 | 3/2011 |
| WO | WO 2014/108566 | 7/2014 |
| WO | WO 2014/126092 | 8/2014 |
| WO | WO 2016/185902 | 11/2016 |

OTHER PUBLICATIONS

Official Action (no English translation available) for Japanese Patent Application No. 2017011992, dated Jan. 5, 2021, 2 pages.
International Search Report and Written Opinion prepared by the European Patent Office dated Mar. 20, 2018, for International Application No. PCT/JP2018/000935.

* cited by examiner

CAMERA MODULE, METHOD OF PRODUCING THE SAME, AND ELECTRONIC DEVICE

CROSS REFERENCE TO RELATED APPLICATIONS

This application is a national stage application under 35 U.S.C. 371 and claims the benefit of PCT Application No. PCT/JP2018/000935 having an international filing date of 16 Jan. 2018, which designated the United States, which PCT application claimed the benefit of Japanese Priority Patent Application No. 2017-011992 filed on 26 Jan. 2017, the disclosures of each of which are incorporated herein by reference.

TECHNICAL FIELD

The present technology relates to a camera module, a method of producing the same, and an electronic device, and particularly, to a camera module capable of preventing stray light between adjacent optical units, a method of producing the same, and an electronic device.

BACKGROUND ART

In a wafer level lens process in which a plurality of lenses are arranged in a planar direction of a wafer substrate, there is high demand for shape accuracy and position accuracy when the lenses are formed. In particular, a process of laminating wafer substrates to produce a laminated lens structure is extremely difficult and lamination of three or more layers on a mass production level has not been realized.

Various technologies have been devised and proposed for the wafer level lens process so far. For example, in PTL 1, a method in which, when a lens is formed by filling a lens material in a through-hole formed in a substrate, the lens material serves as an adhesive, and thus wafer substrates are laminated is proposed.

CITATION LIST

Patent Literature

PTL 1: JP 2009-279790A

SUMMARY OF INVENTION

Technical Problem

When a compound eye camera module is manufactured using a wafer level lens process, it is necessary to pay attention to stray light between adjacent lenses.

The present technology has been made in view of the above circumstances, and can prevent stray light between adjacent lenses.

Solution to Problem

According to an embodiment of the present technology, a camera module including a stacked lens substrate having a first through-hole and a second through-hole adjacent to the first through-hole is provided. The camera module may include first optical unit including one or more lenses located in the first through-hole, a second optical unit including one or more lenses located in the second through-hole, a first light-receiving unit located at a side of and corresponding to the first optical unit, and a second light-receiving unit located at a side of and corresponding to the second optical unit. A groove portion may be disposed between at least a portion of the first optical unit and at least a portion of the second optical unit in the stacked lens substrates. The camera module may include at least one of a light-absorbing film or a blocking plate provided between the first light-receiving unit and the second light-receiving unit.

According to an embodiment of the present technology, a method of producing a camera module is provided. The method may include forming a stacked lens structure having a first through-hole and a second through-hole adjacent to the first through-hole, forming a first optical unit including one or more lenses within the first through-hole, forming a second optical unit including one or more lenses within the second through-hole, and providing a first light-receiving unit at a first side of and corresponding to the first optical unit. The method may further include providing a second light-receiving unit at the first side of and corresponding to the second optical unit, forming a groove portion between at least a portion of the first optical unit and at least a portion of the second optical unit in the stacked lens structure, and providing at least one of a light-absorbing film or a blocking plate between the first light-receiving unit and the second light-receiving unit.

According to an embodiment of the present technology, an electronic apparatus is provided. The electronic apparatus may include a camera module including a stacked lens substrate having a first through-hole and a second through-hole adjacent to the first through-hole. The camera module may also include a first optical unit including one or more lenses located in the first through-hole, a second optical unit including one or more lenses located in the second through-hole, and a first light-receiving unit located at a side of and corresponding to the first optical unit. The camera module may also include a second light-receiving unit located at a side of and corresponding to the second optical unit, a groove portion disposed between at least a portion of the first optical unit and at least a portion of the second optical unit in the stacked lens substrates, and at least one of a light-absorbing film or a blocking plate provided between the first light-receiving unit and the second light-receiving unit. The electronic apparatus may further include an actuator configured to move the stacked lens substrate in an optical axis direction.

Note that the effects described here are not necessarily limited, and any effect that is desired to be described in the present disclosure may be exhibited.

DESCRIPTION OF EMBODIMENTS

Figure 1:
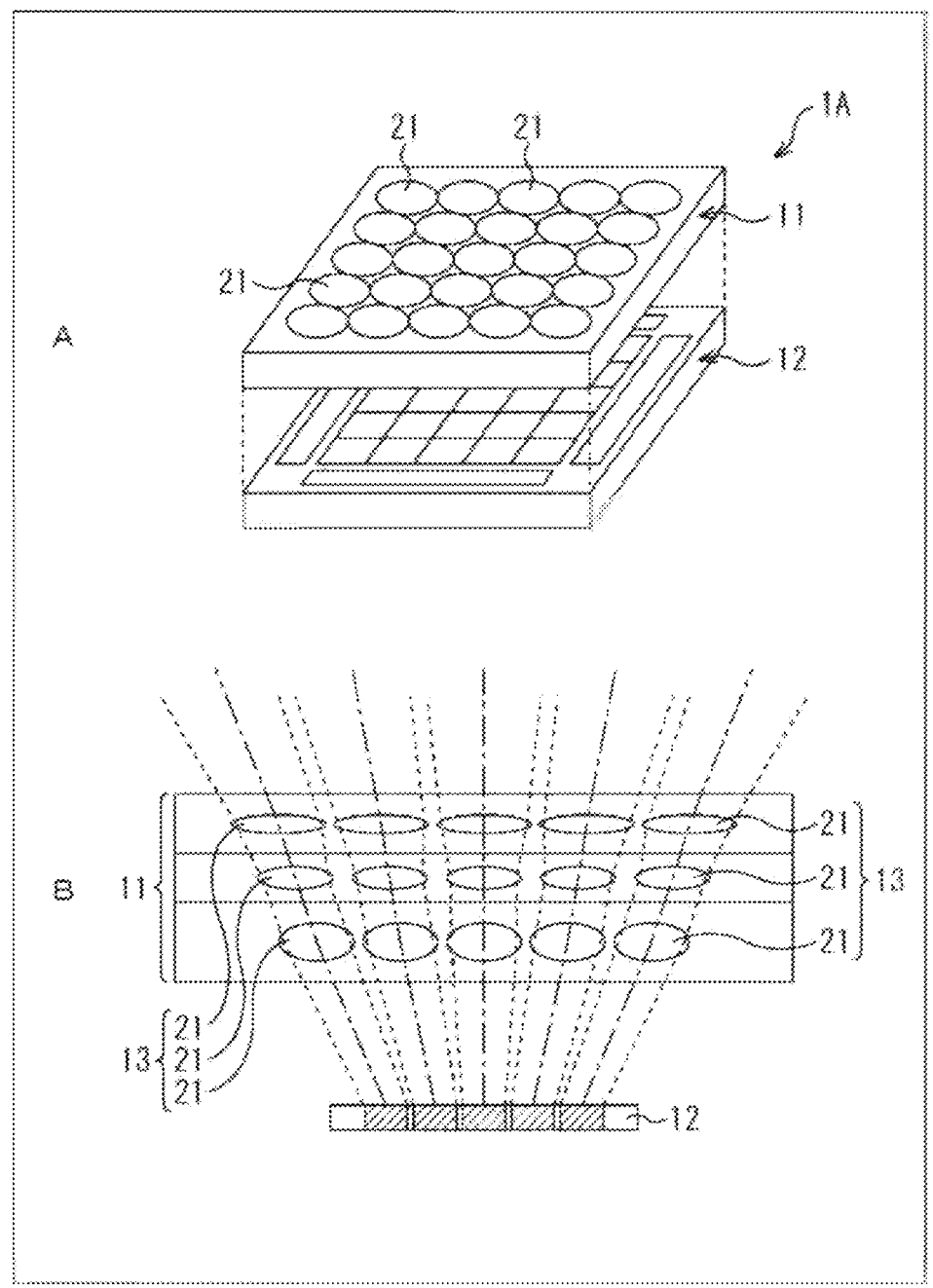
FIG. 1 is a diagram showing a first embodiment of a camera module using a laminated lens structure to which the present technology is applied.

Embodiments for implementing the present technology (hereinafter referred to as embodiments) will be described below. Here, the description will be provided in the following order.

1. First embodiment of camera module
2. Second embodiment of camera module
3. Third embodiment of camera module
4. Fourth embodiment of camera module
5. Fifth embodiment of camera module
6. Detailed configuration of camera module of fourth embodiment
7. Sixth embodiment of camera module
8. Seventh embodiment of camera module
9. Detailed configuration of substrate with lenses
10. Method of producing substrate with lenses
11. Bonding substrates with lenses
12. Eighth and ninth embodiments of camera module
13. Tenth embodiment of camera module
14. 11th embodiment of camera module
15. Effects of present structure compared to other structures
16. Various modified examples
17. Structure of pixel array and diaphragm plate of light receiving element and application description
18. 12th embodiment of camera module
19. Example of application to electronic device
20. Application example to in-vivo information acquisition system
21. Application Example to Endoscopic Surgical Operation System
22. Application example to mobile object 1. First Embodiment of Camera Module FIG. 1 is a diagram showing a first embodiment of a camera module using a laminated lens structure to which the present technology is applied.

A of FIG. 1 is a schematic diagram showing a configuration of a camera module 1A as the first embodiment of a camera module 1. B of FIG. 1 is a schematic cross-sectional view of the camera module 1A.

The camera module 1A includes a laminated lens structure 11 and a light receiving element 12. The laminated lens structure 11 includes a total of 25 optical units 13 including five each of the optical units that are arranged vertically and horizontally. The optical unit 13 includes a plurality of lenses 21 in one optical axis direction. The camera module 1A is a compound eye camera module including the plurality of optical units 13.

As shown in B of FIG. 1, the plurality of optical units 13 included in the camera module 1A are disposed such that optical axes spread toward the outside of the module. Thus, it is possible to capture a wide angle image.

Here, in B of FIG. 1, for simplicity, the laminated lens structure 11 is a structure in which only three layers of the lenses 21 are laminated, but it should be noted that more lenses 21 may be laminated.

The camera module 1A in FIG. 1 can create one wide angle image by combining a plurality of images captured through the plurality of optical units 13. In order to combine a plurality of images, high accuracy is necessary for forming and disposing the optical units 13 configured to capture images. In addition, in particular, since the optical unit 13 on the wide angle side has a small angle of light incident on the lens 21, high accuracy is necessary for a positional relation and disposition of the lenses 21 in the optical unit 13.

Figure 2:
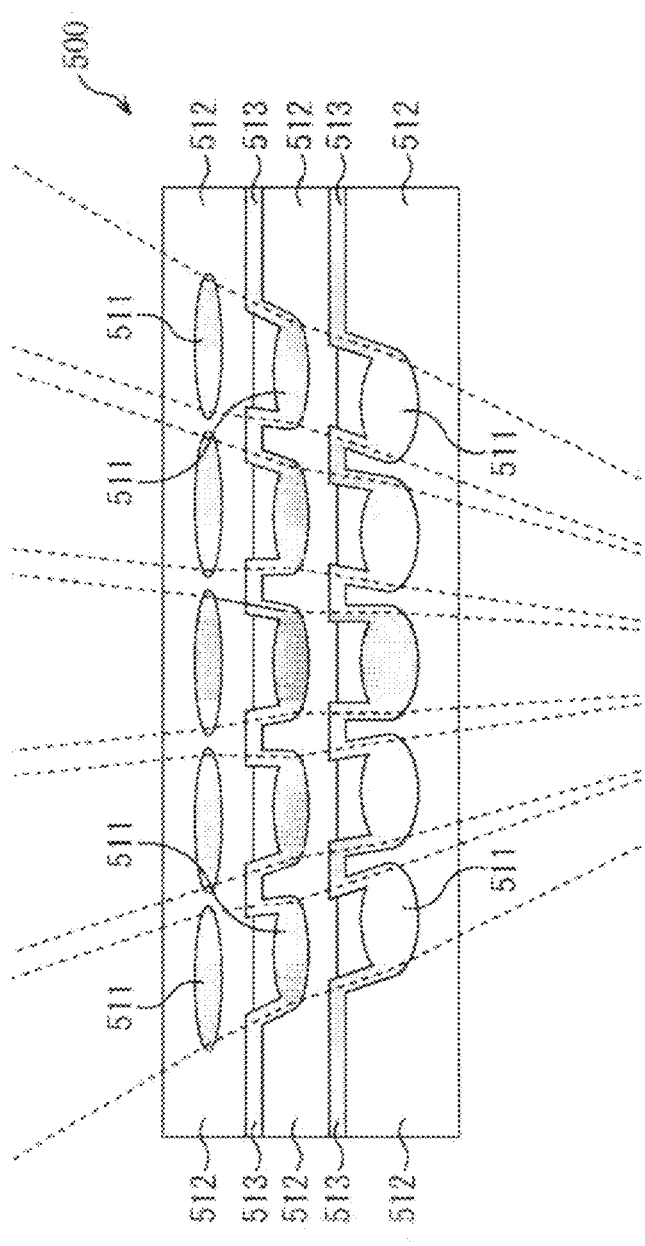
FIG. 2 is a cross-sectional structure diagram of a laminated lens structure disclosed in PTL 1.

FIG. 2 is a cross-sectional structure diagram of a laminated lens structure using a fixation technology using a resin disclosed in PTL 1.

In a laminated lens structure 500 shown in FIG. 2, as a method of fixing substrates 512 including lenses 511, a resin 513 is used. The resin 513 is an energy curable resin such as a UV curable resin.

Before the substrates 512 are adhered to each other, a layer of the resin 513 is formed on the entire surface of the substrate 512. Then, the substrates 512 are adhered to each other and further the resin 513 is cured. Thus, the adhered substrates 512 are fixed.

However, when the resin 513 is cured, the resin 513 is cured and contracted. In the structure shown in FIG. 2, since the layer of the resin 513 is formed on the entire substrate 512 and then the resin 513 is cured, a displacement amount of the resin 513 is large.

In addition, even after the laminated lens structure 500 formed by adhering the substrates 512 is divided into individual units and a camera module is formed by combining an image sensor, in the laminated lens structure 500 included in the camera module, the resin 513 is provided throughout the space between the substrates 512 including the lenses 511 as shown in FIG. 2. Therefore, when the camera module is mounted in a case of a camera and actually used, there is a concern of the resin between substrates of the laminated lens structure 500 thermally expanding due to a temperature rise caused by heat generation from a device.

Figure 3:
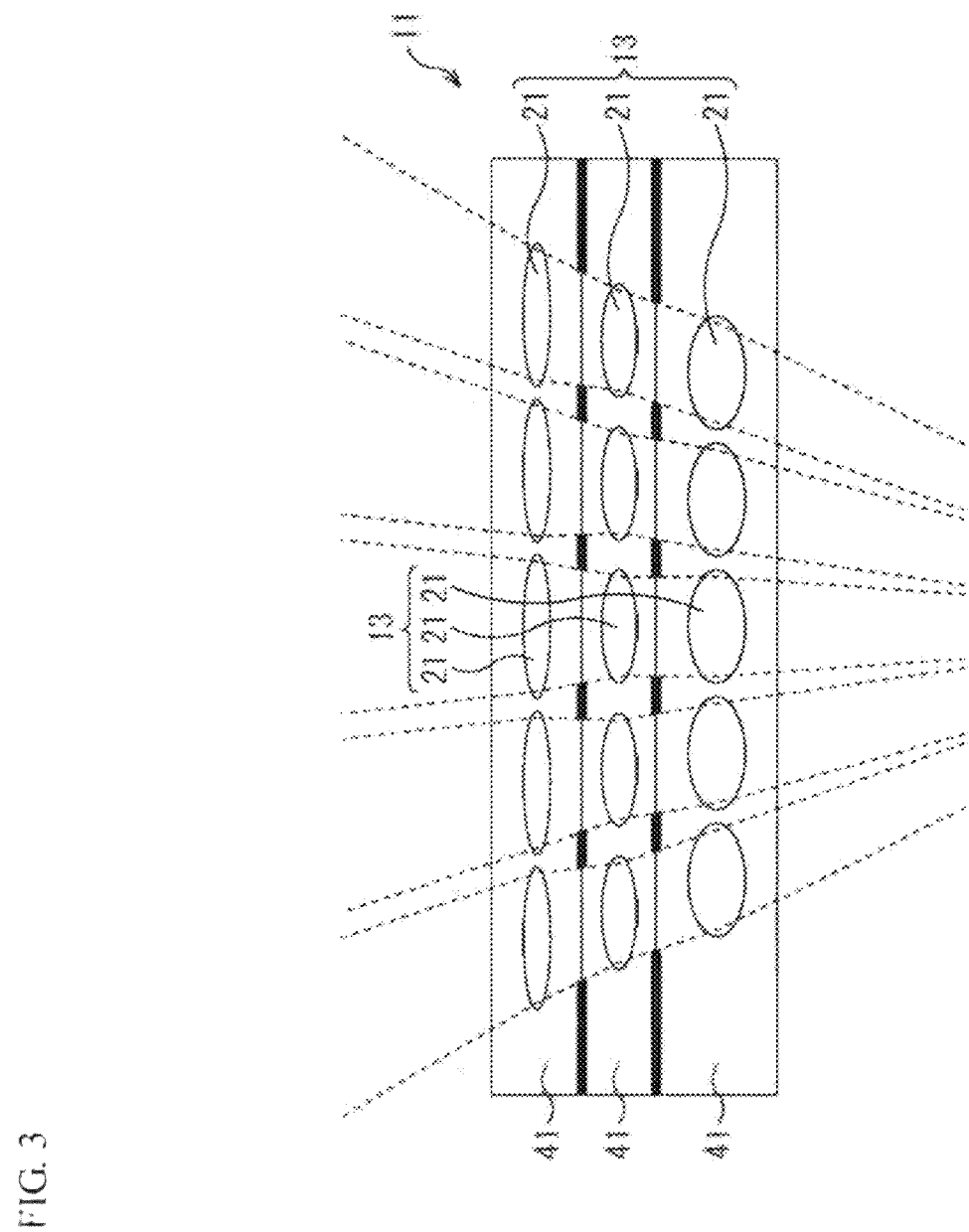
FIG. 3 is a cross-sectional structure diagram of the laminated lens structure of the camera module in FIG. 1.

FIG. 3 is a cross-sectional structure diagram showing only the laminated lens structure 11 of the camera module 1A in FIG. 1.

The laminated lens structure 11 of the camera module 1A is also formed by laminating a plurality of substrates with lenses 41 including the lenses 21.

In the laminated lens structure 11 of the camera module 1A, as a method of fixing the substrates with lenses 41 including the lenses 21, a fixation method that is completely different from those shown in the laminated lens structure 500 in FIG. 2 and other related art documents is used.

Figure 4:
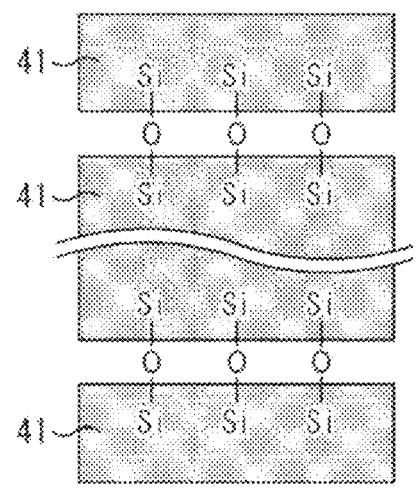
FIG. 4 is a diagram describing direct bonding of substrates with lenses.

That is, two substrates with lenses 41 to be laminated are directly bonded by a covalent bond between a surface layer including an oxide or a nitride formed on one substrate surface and a surface layer including an oxide or a nitride formed on the other substrate surface. As a specific example, as shown in FIG. 4, on surfaces of the two substrates with lenses 41 to be laminated, a silicon oxide film or a silicon nitride film is formed as a surface layer, and a hydroxyl group is bonded thereto. Then, the two substrates with lenses 41 are adhered to each other and heated, dehydrated and condensed. As a result, a silicon-oxygen covalent bond is formed between surface layers of the two substrates with lenses 41. Accordingly, the two substrates with lenses 41 are directly bonded. Here, as a result of condensation, elements included in two surface layers may directly form a covalent bond.

In this specification, as described above, fixing the two substrates with lenses 41 through an inorganic substance layer disposed between the two substrates with lenses 41, fixing the two substrates with lenses 41 by chemically bonding inorganic substance layers disposed on surfaces of the two substrates with lenses 41, fixing the two substrates with lenses 41 by forming a dehydration condensation bond between inorganic substance layers disposed on surfaces of the two substrates with lenses 41, fixing the two substrates with lenses 41 by forming a covalent bond through oxygen between inorganic substance layers disposed on surfaces of the two substrates with lenses 41 or forming a covalent bond between elements included in inorganic substance layers, or fixing the two substrates with lenses 41 by forming a silicon-oxygen covalent bond or a silicon-silicon covalent bond between silicon oxide layers or silicon nitride layers disposed on surfaces of the two substrates with lenses 41 is called direct bonding.

In order to perform such adhering and dehydration condensation by increasing a temperature, in the present embodiment, a substrate used in the field of production of a semiconductor device or a flat display device is used, a lens is formed in a substrate state, adhering and dehydration condensation are performed by increasing a temperature in a substrate state, and bonding is performed by a covalent bond in a substrate state. A structure in which inorganic substance layers formed on surfaces of the two substrates with lenses 41 are bonded by a covalent bond provides a function or effect of preventing deformation due to curing contraction of the resin 513 throughout the entire substrate and deformation due to thermal expansion of the resin 513 during actual use, which are concerns with the technology that is disclosed in PTL 1 and described with FIG. 2.

Figure 5:
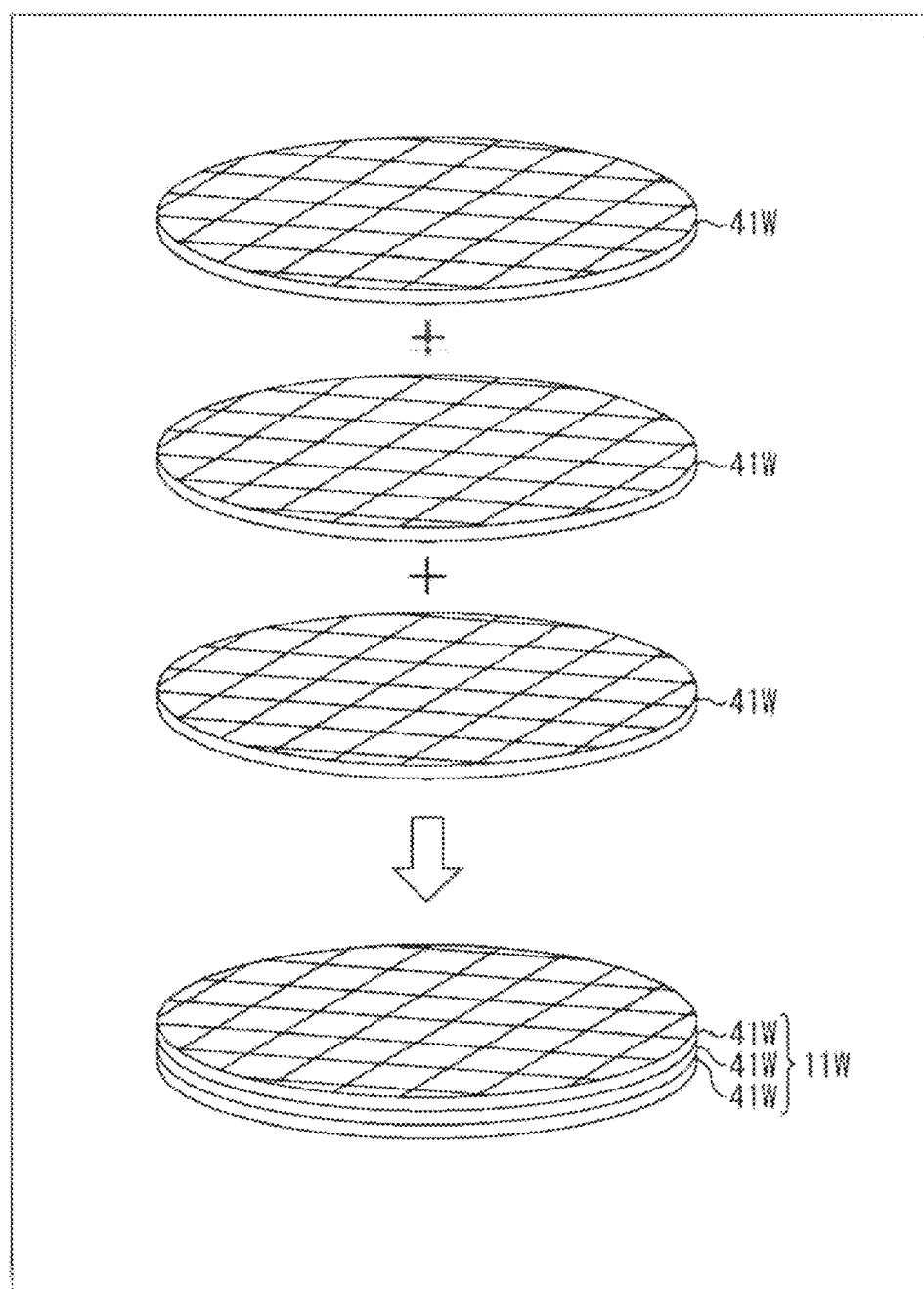
FIG. 5 is a diagram showing a process of forming the camera module in FIG. 1.
Figure 6:
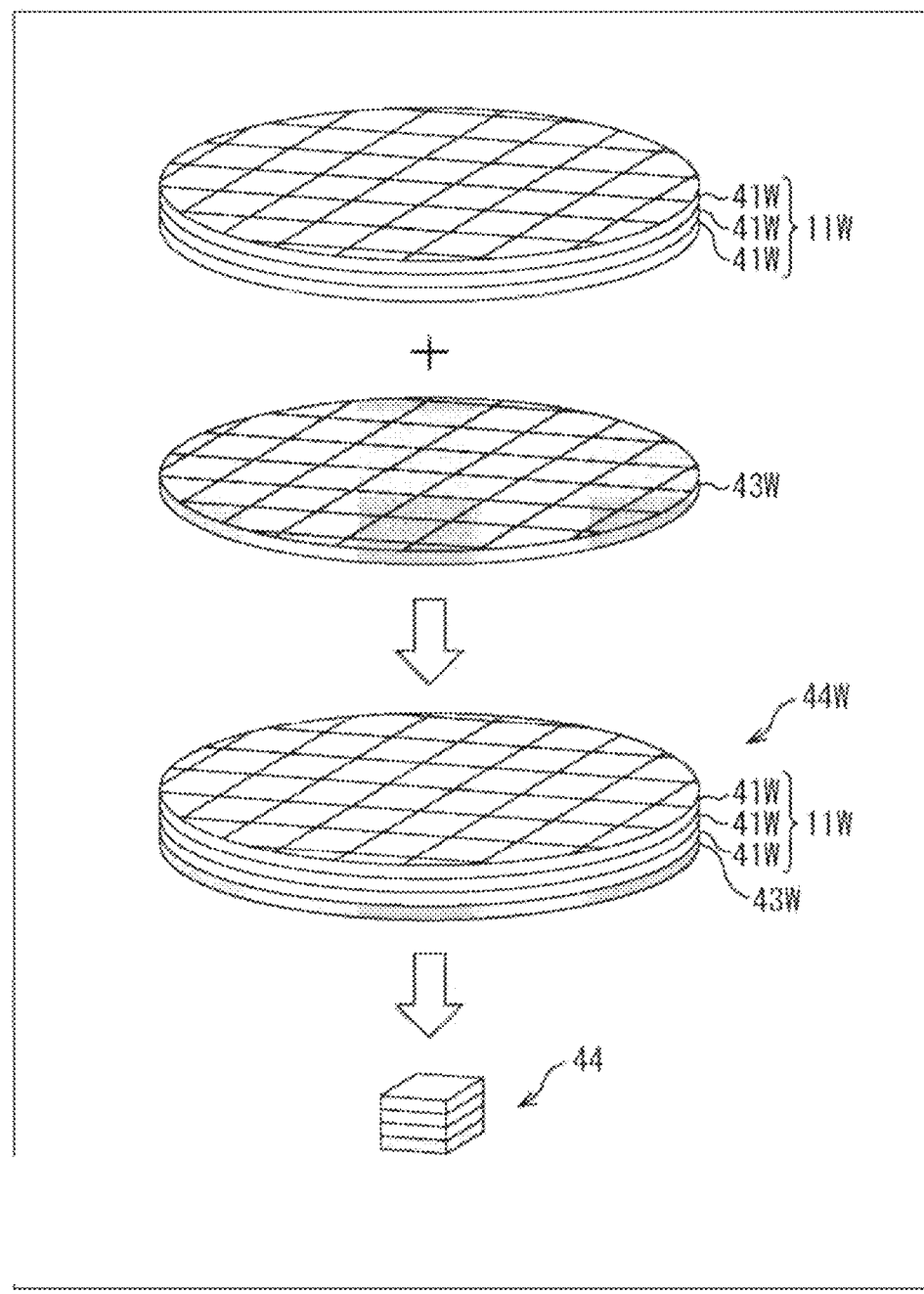
FIG. 6 is a diagram showing a process of forming the camera module in FIG. 1.

FIG. 5 and FIG. 6 are diagrams showing a process of forming the camera module 1A in FIG. 1 in which the laminated lens structure 11 and the light receiving element 12 are combined.

First, as shown in FIG. 5, a plurality of substrates with lenses 41W in which a plurality of lenses 21 (not shown) are formed in a planar direction are prepared and laminated. Accordingly, a laminated lens structure 11W in a substrate state in which a plurality of substrates with lenses 41W in a substrate state are laminated is obtained.

Next, as shown in FIG. 6, a sensor substrate 43W in a substrate state in which a plurality of light receiving elements 12 are formed in a planar direction is manufactured and prepared separately from the laminated lens structure 11W in a substrate state shown in FIG. 5.

Then, when the sensor substrate 43W in a substrate state and the laminated lens structure 11W in a substrate state are laminated and an external terminal is attached to each module of the adhered substrates, a camera module 44W in a substrate state is obtained.

Finally, the camera module 44W in a substrate state is divided into module units or chip units. When the divided camera modules 44 are enclosed in a case (not shown) that is separately prepared, the final camera module 44 is obtained.

Here, in this specification and drawings, for example, a component to which "W" is added to a number such as the substrate with lenses 41W indicates that the component is in a substrate state (wafer state). When "W" is not added such as the substrate with lenses 41, this indicates a state in which a component is divided into module units or chip units. In addition, this rule similarly applies to the sensor substrate 43W and the camera module 44W.

Figure 7:
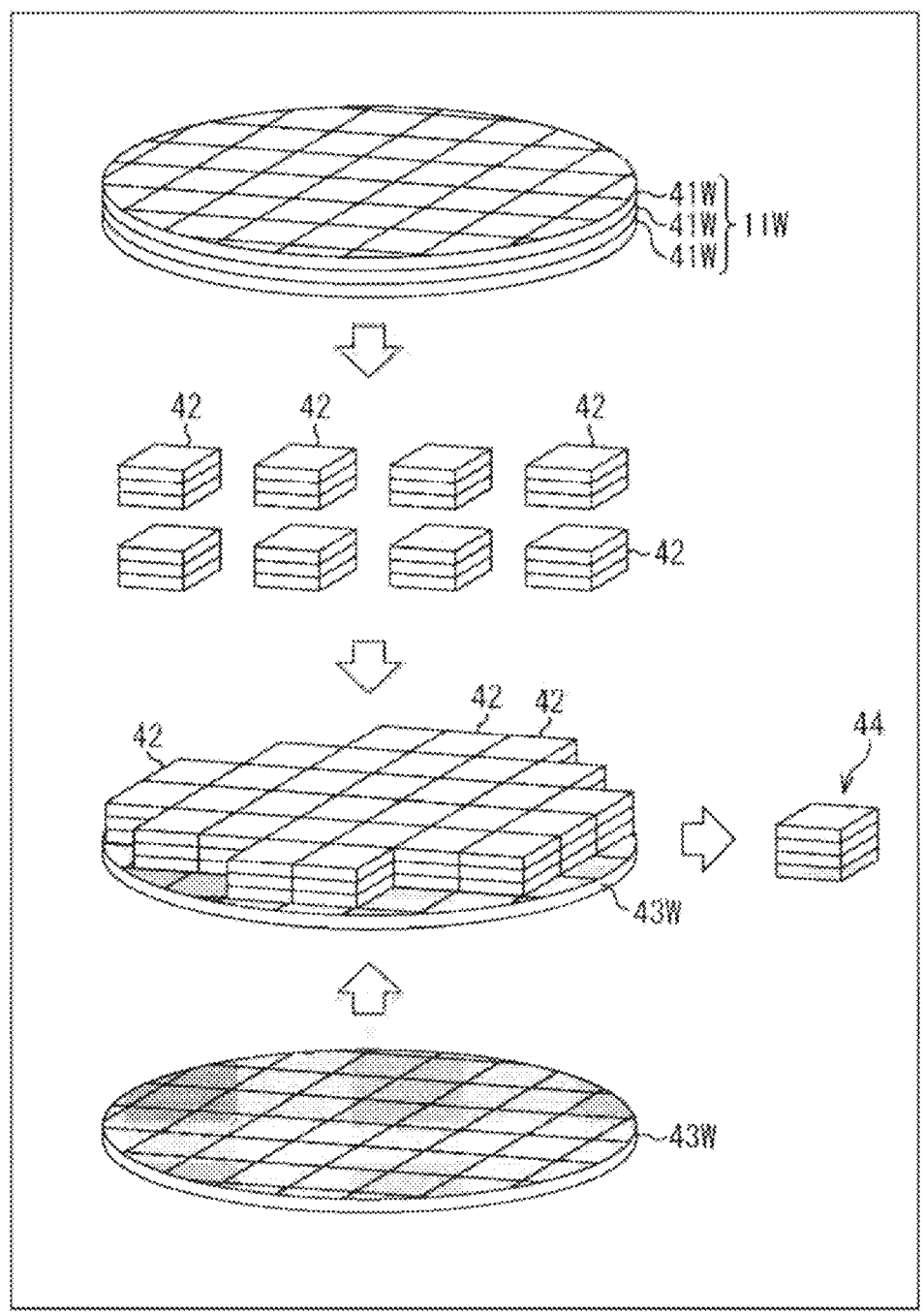
FIG. 7 is a diagram showing another process of forming the camera module in FIG. 1.

FIG. 7 is a diagram showing another process of forming the camera module 1A in FIG. 1 in which the laminated lens structure 11 and the light receiving element 12 are combined.

First, in the same manner as in the above-described process, the laminated lens structure 11W in a substrate state in which a plurality of substrates with lenses 41W in a substrate state are laminated is produced.

Next, the laminated lens structure 11W in a substrate state is divided into individual units.

In addition, the sensor substrate 43W in a substrate state is manufactured and prepared separately from the laminated lens structure 11W in a substrate state.

Then, the divided laminated lens structures 11 are mounted one by one on the light receiving elements 12 of the sensor substrate 43W in a substrate state.

Finally, the sensor substrate 43W in a substrate state in which the divided laminated lens structures 11 are mounted is divided into module units or chip units. When the laminated lens structure 11 is mounted and the divided sensor substrates 43 are enclosed in a case (not shown) that is separately prepared, and an external terminal is additionally attached, the final camera module 44 is obtained.

Further, as an example of another process of forming the camera module 1A in FIG. 1 in which the laminated lens structure 11 and the light receiving element 12 are combined, the sensor substrate 43W in a substrate state shown in FIG. 7 is divided into individual units, the divided laminated lens structures 11 are mounted in the individual light receiving elements 12 obtained as a result, and the divided camera modules 44 may be obtained.

Figure 8:
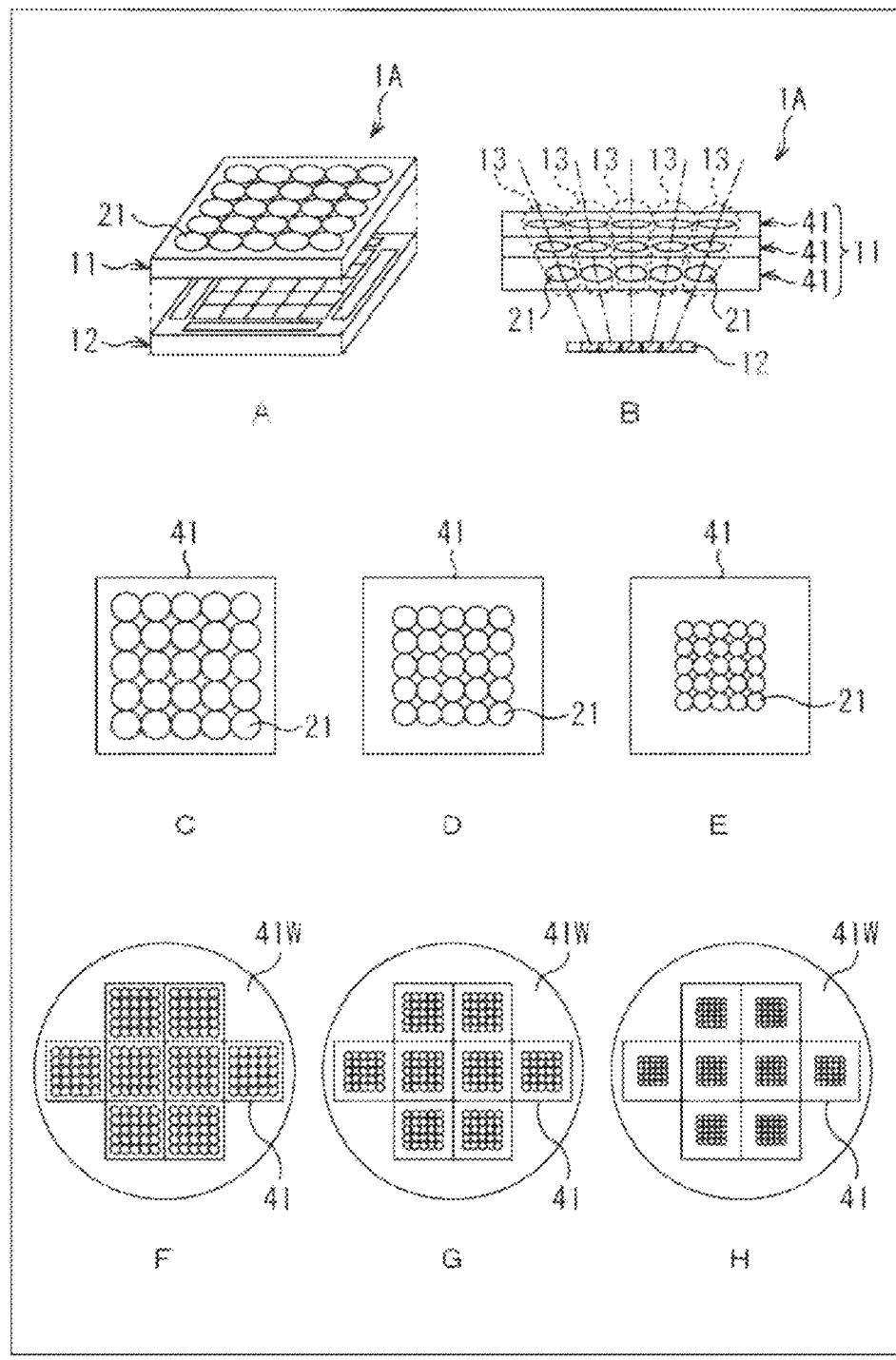
FIG. 8 is a diagram describing a configuration of a substrate with lenses.

FIG. 8 is a diagram describing a configuration of the substrate with lenses 41 in the camera module 1A.

A of FIG. 8 is a schematic diagram showing a configuration of the camera module 1A similar to that of A of FIG. 1.

B of FIG. 8 is a schematic cross-sectional view of the camera module 1A similar to that of B of FIG. 1.

As shown in B of FIG. 8, the camera module 1A is a compound eye camera module in which a plurality of lenses 21 are formed in combination and a plurality of optical units 13 each having one optical axis are provided. The laminated lens structure 11 includes a total of 25 optical units 13 including five each of the optical units that are arranged vertically and horizontally.

In the camera module 1A, the plurality of optical units 13 are disposed such that optical axes spread toward the outside of the module. Thus, it is possible to capture a wide angle image. In B of FIG. 8, for simplicity, the laminated lens structure 11 is a structure in which only three layers of the substrates with lenses 41 are laminated, but it should be noted that more substrates with lenses 41 may be laminated.

C to E of FIG. 8 are diagrams showing planar shapes of the substrates with lenses 41 of three layers constituting the laminated lens structure 11.

C of FIG. 8 is a plan view of the substrate with lenses 41 of the uppermost layer among three layers. D of FIG. 8 is a plan view of the substrate with lenses 41 of the intermediate layer. D of FIG. 8 is a plan view of the substrate with lenses 41 of the lowermost layer. Since the camera module 1 is a compound eye wide angle camera module, the diameter of the lens 21 becomes larger and a pitch between lenses becomes broader when it approaches the upper layer.

F to H of FIG. 8 are plan views of the substrate with lenses 41W in a substrate state for obtaining the substrate with lenses 41 shown in C to E of FIG. 8.

The substrate with lenses 41W shown in F of FIG. 8 shows a substrate state corresponding to the substrate with lenses 41 in C of FIG. 8. The substrate with lenses 41W shown in G of FIG. 8 shows a substrate state corresponding to the substrate with lenses 41 in D of FIG. 8. The substrate with lenses 41W shown in H of FIG. 8 shows a substrate state corresponding to the substrate with lenses 41 in E of FIG. 8.

The substrates with lenses 41W in a substrate state shown in F to H of FIG. 8 have a configuration in which eight camera modules 1A shown in A of FIG. 8 are obtained for each substrate.

It is understood that, between the substrates with lenses 41W in F to H of FIG. 8, a pitch between lenses in the substrate with lenses 41 in module units is different from that of the substrate with lenses 41W of the upper layer and the substrate with lenses 41W of the lower layer, and on the other hand, in the substrates with lenses 41W, a pitch at which the substrates with lenses 41 in module units are disposed is constant from the substrate with lenses 41W of the upper layer to the substrate with lenses 41W of the lower layer.

2. Second Embodiment of Camera Module

Figure 9:
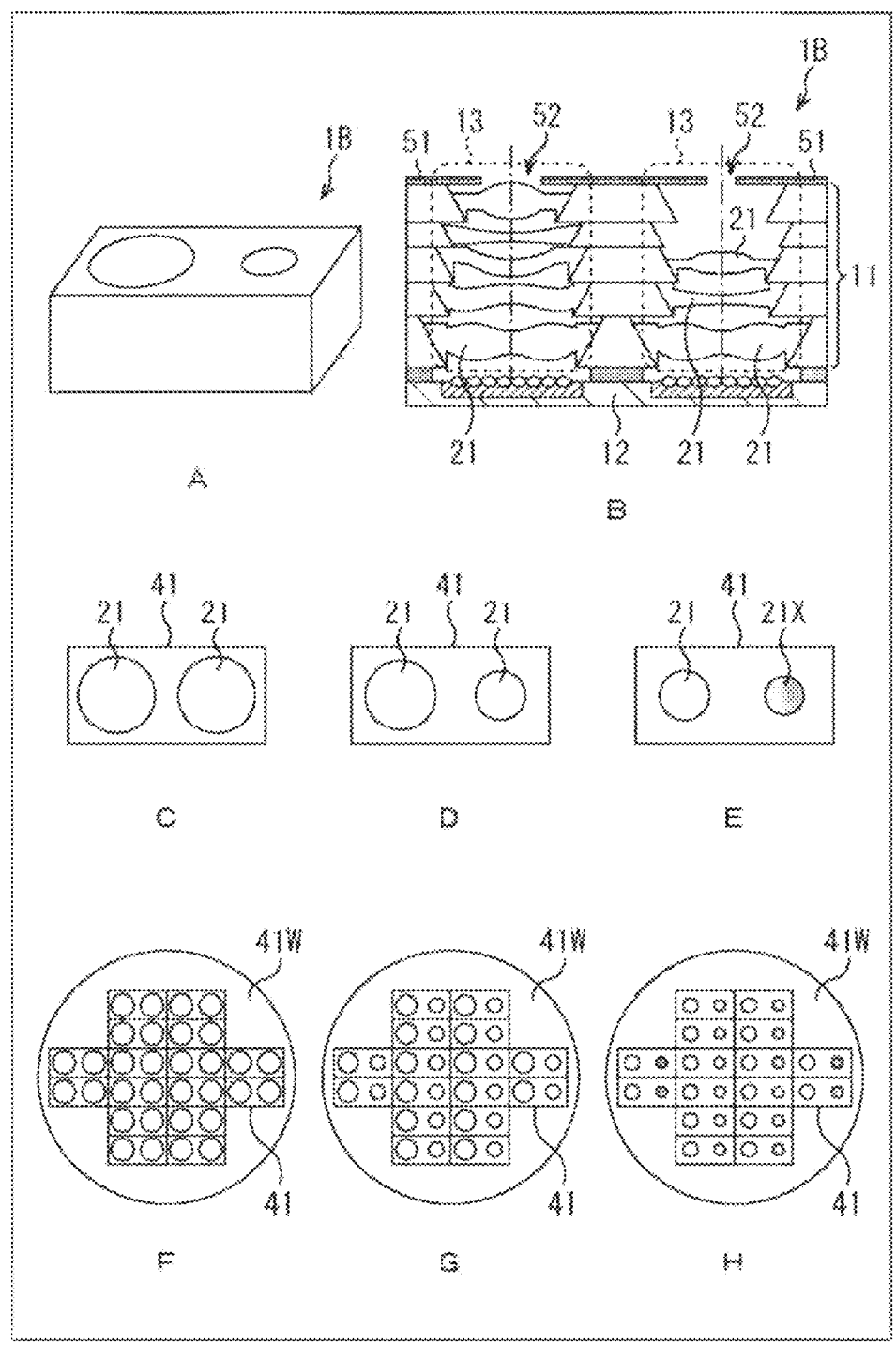
FIG. 9 is a diagram showing a second embodiment of a camera module using a laminated lens structure to which the present technology is applied.

FIG. 9 is a diagram showing a second embodiment of a camera module using a laminated lens structure to which the present technology is applied.

A of FIG. 9 is a schematic diagram showing an appearance of a camera module 1B as a second embodiment of the camera module 1. B of FIG. 9 is a schematic cross-sectional view of the camera module 1B.

The camera module 1B includes two optical units 13. The two optical units 13 include a diaphragm plate 51 on the uppermost layer of the laminated lens structure 11. An opening 52 is provided in the diaphragm plate 51.

While the camera module 1B includes two optical units 13, optical parameters of the two optical units 13 are different. That is, the camera module 1B includes two types of optical units 13 having different optical performances. The two types of optical units 13 can include, for example, the optical unit 13 having a short focal length for imaging a near view and the optical unit 13 having a long focal length for imaging a distant view.

In the camera module 1B, since optical parameters of the two optical units 13 are different, for example, as shown in B of FIG. 9, the numbers of lenses 21 of the two optical units 13 are different. In addition, the lenses 21 of the same layer of the laminated lens structure 11 including the two optical units 13 can have a configuration in which any one of a diameter, a thickness, a surface shape, a volume, and a distance to an adjacent lens is different. Thus, for the planar shape of the lens 21 in the camera module 1B, for example, the two optical units 13 may include the lenses 21 having the same diameter as shown in C of FIG. 9 and may include the lenses 21 having different shapes as shown in D of FIG. 9, or may have a structure in which one optical unit is a cavity 21X without the lens 21 as shown in E of FIG. 9.

F to H of FIG. 9 are plan views of the substrate with lenses 41W in a substrate state for obtaining the substrate with lenses 41 shown in C to E of FIG. 9.

The substrate with lenses 41W shown in F of FIG. 9 shows a substrate state corresponding to the substrate with lenses 41 in C of FIG. 9. The substrate with lenses 41W shown in G of FIG. 9 shows a substrate state corresponding to the substrate with lenses 41 in D of FIG. 9. The substrate with lenses 41W shown in H of FIG. 9 shows a substrate state corresponding to the substrate with lenses 41 in E of FIG. 9.

The substrates with lenses 41W in a substrate state shown in F to H of FIG. 9 have a configuration in which 16 camera modules 1B shown in A of FIG. 9 are obtained for each substrate.

As shown in F to H of FIG. 9, in order to form the camera module 1B, lenses having the same shape can be formed on the entire substrate surface of the substrate with lenses 41W in a substrate state, lenses having different shapes can be formed, or a lens can be formed or not.

3. Third Embodiment of Camera Module

Figure 10:
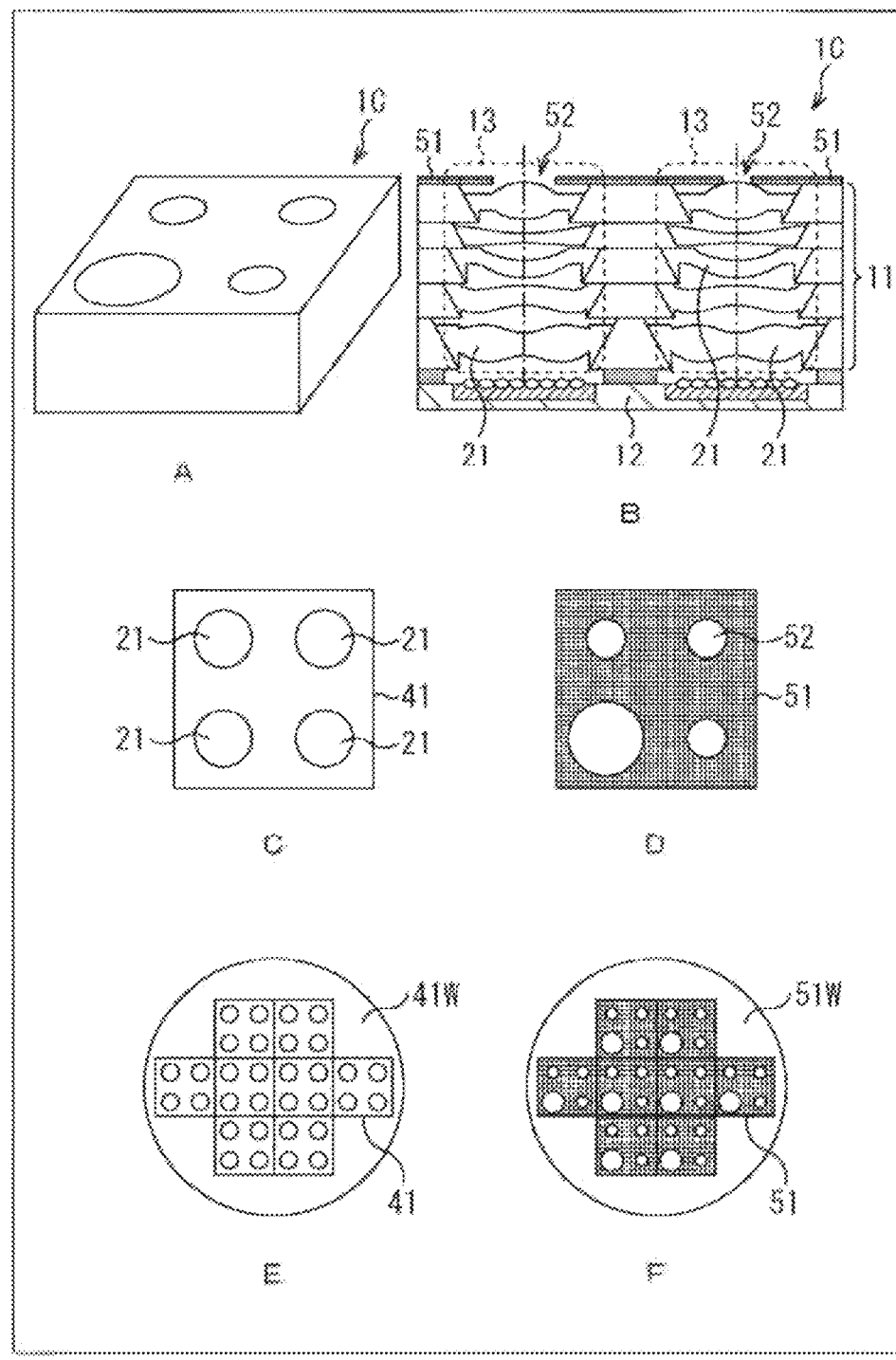
FIG. 10 is a diagram showing a third embodiment of a camera module using a laminated lens structure to which the present technology is applied.

FIG. 10 is a diagram showing a third embodiment of a camera module using a laminated lens structure to which the present technology is applied.

A of FIG. 10 is a schematic diagram showing an appearance of a camera module 1C as a third embodiment of the camera module 1. B of FIG. 10 is a schematic cross-sectional view of the camera module 1C.

The camera module 1C includes a total of four optical units 13 including two each of the optical units that are arranged vertically and horizontally on a light incident surface. In the four optical units 13, the lenses 21 have the same shape.

The four optical units 13 include the diaphragm plate 51 on the uppermost layer of the laminated lens structure 11.

However, in the four optical units 13, the size of the opening 52 of the diaphragm plate 51 is different. Accordingly, the camera module 1C can implement, for example, the following camera module 1C. That is, for example, in a monitoring camera for crime prevention, in the camera module 1C using the light receiving element 12 in which light receiving pixels that include three types (R, G, and B) of color filters and receive three types (R, G, and B) of light are used for daytime color image monitoring and light receiving pixels including no color filters for R, G, and B are used for nighttime black and white image monitoring, it is possible to increase the size of the opening of the diaphragm only for pixels for capturing a nighttime black and white image with low illumination. Thus, in the planar shape of the lens 21 in one camera module 1C, for example, as shown in C of FIG. 10, the diameters of the lenses 21 included in the four optical units 13 are the same, and as shown in D of FIG. 10, the size of the opening 52 of the diaphragm plate 51 is different depending on the optical unit 13.

E of FIG. 10 is a plan view of the substrate with lenses 41W in a substrate state for obtaining the substrate with lenses 41 shown in C of FIG. 10. F of FIG. 10 is a plan view showing a diaphragm plate 51W in a substrate state for obtaining the diaphragm plate 51 shown in D of FIG. 10.

The substrate with lenses 41W in a substrate state in E of FIG. 10 and the diaphragm plate 51W in a substrate state in F of FIG. 10 have a configuration in which eight camera modules 1C shown in A of FIG. 10 are obtained for each substrate.

As shown in F of FIG. 10, in the diaphragm plate 51W in a substrate state, in order to form the camera module 1C, the sizes of the openings 52 can be set to be different for each optical unit 13 included in the camera module 1C.

4. Fourth Embodiment of Camera Module

Figure 11:
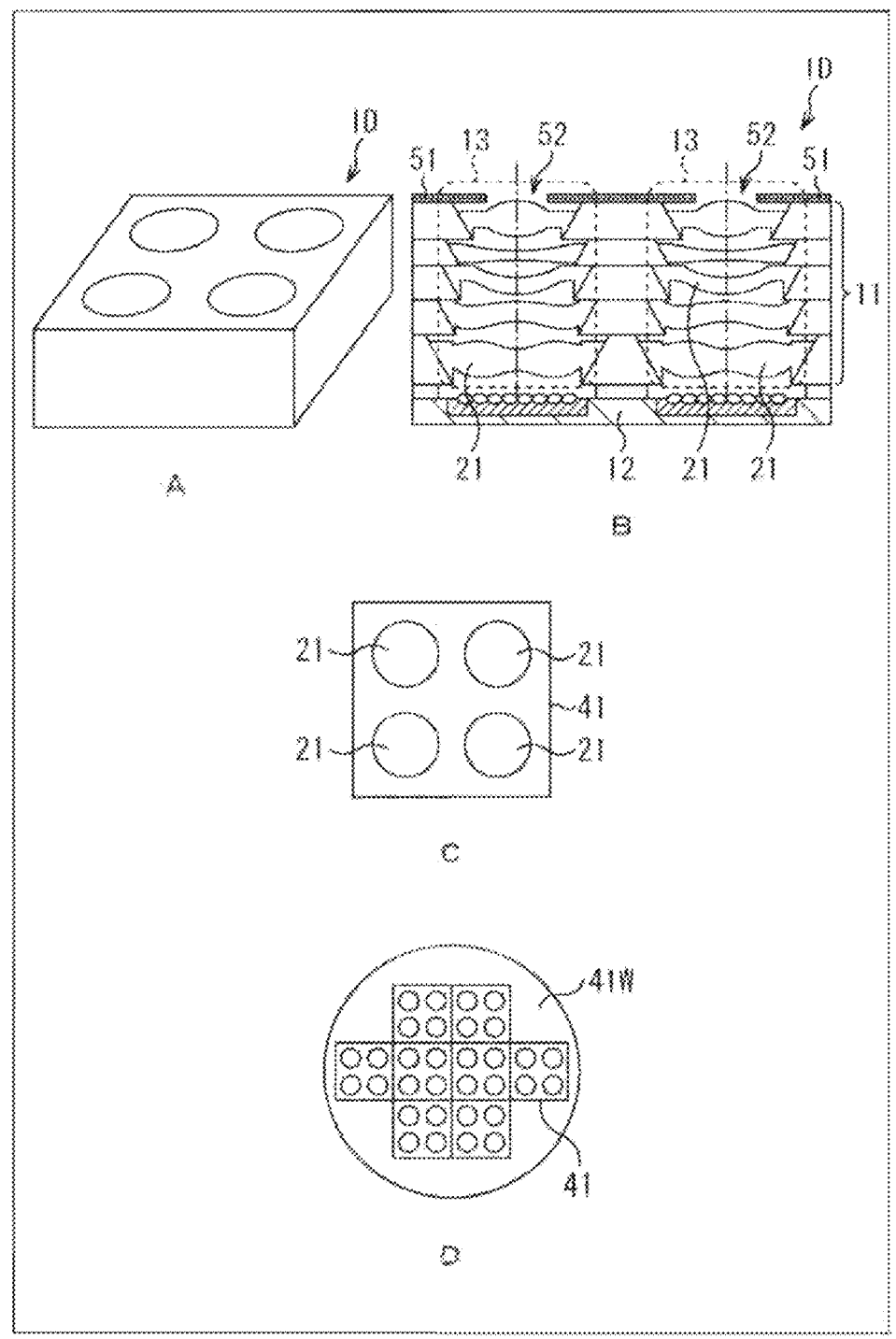
FIG. 11 is a diagram showing a fourth embodiment of a camera module using a laminated lens structure to which the present technology is applied.

FIG. 11 is a diagram showing a fourth embodiment of a camera module using a laminated lens structure to which the present technology is applied.

A of FIG. 11 is a schematic diagram showing an appearance of a camera module 1D as a fourth embodiment of the camera module 1. B of FIG. 11 is a schematic cross-sectional view of the camera module 1D.

Similarly to the camera module 1C, in the camera module 1D, a total of four optical units 13 including two each of the optical units that are arranged vertically and horizontally on a light incident surface. In the four optical units 13, the shapes of the lenses 21 are the same and the sizes of the openings 52 of the diaphragm plates 51 are the same.

In the camera module 1D, optical axes of the optical units 13 including two each of the optical units 13 are arranged in a vertical direction and a lateral direction of the light incident surface extend in the same direction. Dashed lines shown in B of FIG. 11 indicate optical axes of the optical units 13. The camera module 1D having such a structure is suitable for capturing an image with a high resolution compared to capturing using one optical unit 13 using a super-resolution technique.

In the camera module 1D, in the vertical direction and the lateral direction, while optical axes are oriented in the same direction, an image is captured using a plurality of light receiving elements 12 that are disposed at different positions or an image is captured using light receiving pixels in different areas within one light receiving element 12. Therefore, a plurality of images that are not necessarily the same can be obtained while optical axes are oriented in the same direction. When image data of each place that the plurality of images that are not necessarily the same include matches, it is possible to obtain an image with a high resolution. Thus, as shown in C of FIG. 11, the planar shape of the lens 21 in one camera module 1D is desirably the same in the four optical units 13.

D of FIG. 11 is a plan view of the substrate with lenses 41W in a substrate state for obtaining the substrate with lenses 41 shown in C of FIG. 11. The substrate with lenses 41W in a substrate state has a configuration in which eight camera modules 1D shown in A of FIG. 11 are obtained for each substrate.

As shown in D of FIG. 11, in the substrate with lenses 41W in a substrate state, in order to form the camera module 1D, the camera module 1D includes a plurality of lenses 21, and a plurality of lens groups for one module are disposed on a substrate at constant pitches.

5. Fifth Embodiment of Camera Module

Figure 12:
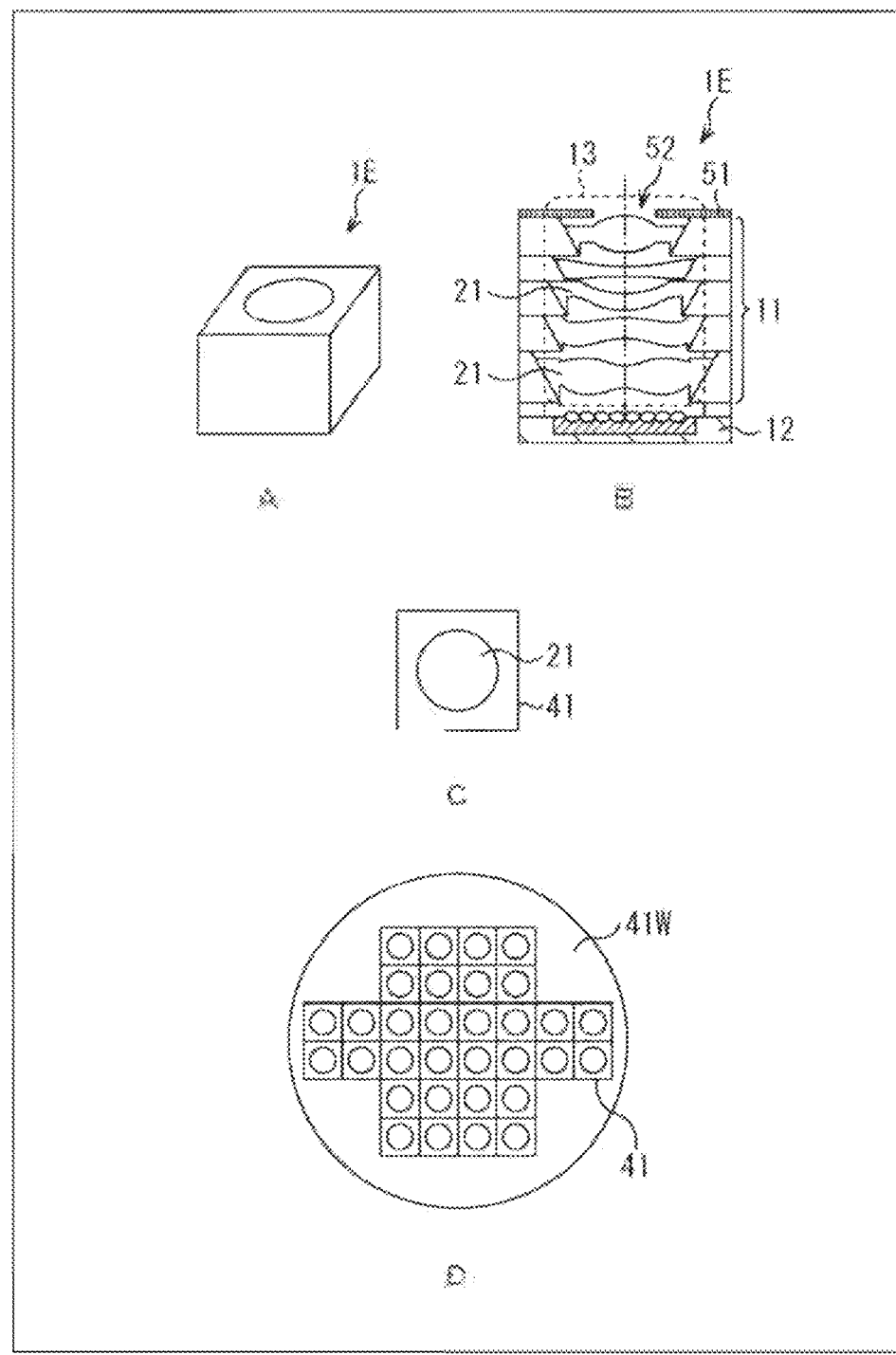
FIG. 12 is a diagram showing a fifth embodiment of a camera module using a laminated lens structure to which the present technology is applied.

FIG. 12 is a diagram showing a fifth embodiment of a camera module using a laminated lens structure to which the present technology is applied.

A of FIG. 12 is a schematic diagram showing an appearance of a camera module 1E as a fifth embodiment of the camera module 1. B of FIG. 12 is a schematic cross-sectional view of the camera module 1E.

The camera module 1E is a monocular camera module in which one optical unit 13 having one optical axis is included in the camera module 1E.

C of FIG. 12 is a plan view of the substrate with lenses 41, which shows the planar shape of the lens 21 in the camera module 1E. The camera module 1E includes one optical unit 13.

D of FIG. 12 is a plan view of the substrate with lenses 41W in a substrate state for obtaining the substrate with lenses 41 shown in C of FIG. 12. The substrate with lenses 41W in a substrate state has a configuration in which 32 camera modules 1E shown in A of FIG. 12 are obtained for each substrate.

As shown in D of FIG. 12, in the substrate with lenses 41W in a substrate state, a plurality of lenses 21 for the camera module 1E are disposed on a substrate at constant pitches.

6. Detailed Configuration of Camera Module of Fourth Embodiment

Next, a detailed configuration of the camera module 1D according to the fourth embodiment shown in FIG. 11 will be described with reference to FIG. 13.

Figure 13:
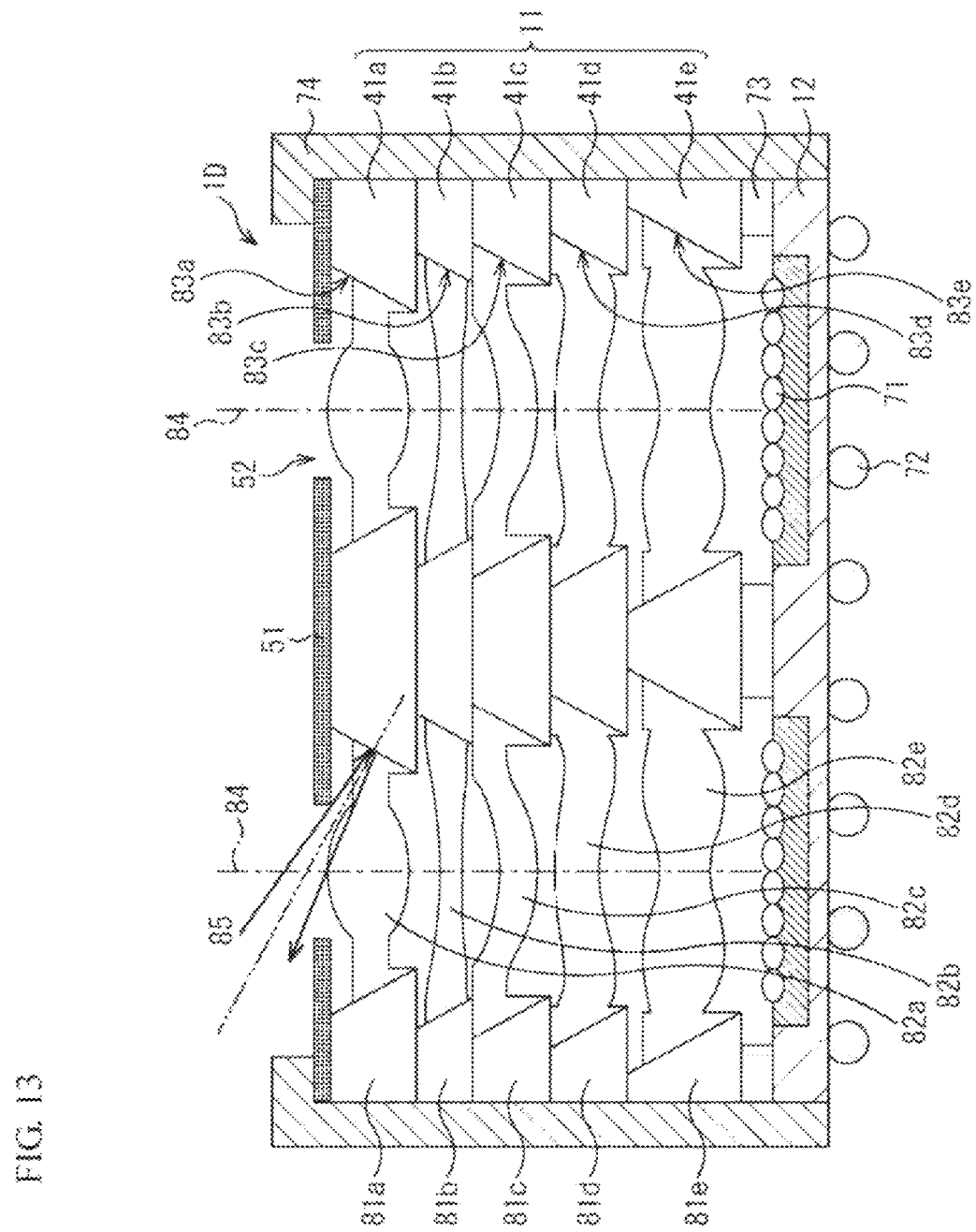
FIG. 13 is a diagram describing a detailed configuration of the camera module according to the fourth embodiment.

FIG. 13 is a cross-sectional view of the camera module 1D shown in B of FIG. 11.

The camera module 1D includes the laminated lens structure 11 in which a plurality of substrates with lenses 41a to 41e are laminated and the light receiving element 12. The laminated lens structure 11 includes a plurality of optical units 13. A dashed line 84 indicates optical axes of the optical units 13. The light receiving element 12 is disposed below the laminated lens structure 11. In the camera module 1D, light that enters the camera module 1D from above passes through the laminated lens structure 11 and is received by the light receiving element 12 disposed below the laminated lens structure 11.

The laminated lens structure 11 includes the five substrates with lenses 41a to 41e that are laminated. When the five substrates with lenses 41a to 41e are not particularly distinguished, they will be simply described as the substrate with lenses 41.

The cross-sectional shape of through-holes 83 of the substrates with lenses 41 constituting the laminated lens structure 11 is a so-called upward fan shape in which the opening width decreases downward (a side on which the light receiving element 12 is disposed).

The diaphragm plate 51 is disposed on the laminated lens structure 11. The diaphragm plate 51 includes, for example, a layer formed of a material having a light absorbing property or a light blocking property. The opening 52 is provided in the diaphragm plate 51.

The light receiving element 12 includes, for example, a surface illumination type or back side illumination type complementary metal-oxide-semiconductor (CMOS) image sensor. An on-chip lens 71 is formed on a surface of the upper side which is the side of the laminated lens structure 11 of the light receiving element 12. An external terminal 72 configured to input and output a signal is formed on a surface of the lower side of the light receiving element 12.

The laminated lens structure 11, the light receiving element 12, and the diaphragm plate 51 are stored in a lens barrel 74.

A structural material 73 is disposed above the light receiving element 12. The laminated lens structure 11 and the light receiving element 12 are fixed through the structural material 73. The structural material 73 is, for example, an epoxy resin.

In the present embodiment, the laminated lens structure 11 includes the five substrates with lenses 41a to 41e that are laminated. However, there is no particular limitation as long as the number of the substrates with lenses 41 that are laminated is two or more.

The substrates with lenses 41 constituting the laminated lens structure 11 have a configuration in which a lens resin part 82 is added to a carrier substrate 81. The carrier substrate 81 has the through-hole 83, and the lens resin part 82 is formed inside the through-hole 83. The lens resin part 82 includes the above-described lens 21 and indicates a part integrated with a material forming the lens 21 in addition to a part that extends to the carrier substrate 81 and carries the lens 21.

Here, when the carrier substrates 81, the lens resin parts 82, or the through-holes 83 of the substrates with lenses 41a to 41e are distinguished, as shown in FIG. 13, they will be described as carrier substrates 81a to 81e, lens resin parts 82a to 82e, or through-holes 83a to 83e corresponding to the substrates with lenses 41a to 41e.

<Detailed Description of Lens Resin Part>

Next, the shape of the lens resin part 82 will be described using the lens resin part 82a of the substrate with lenses 41a as an example.

Figure 14:
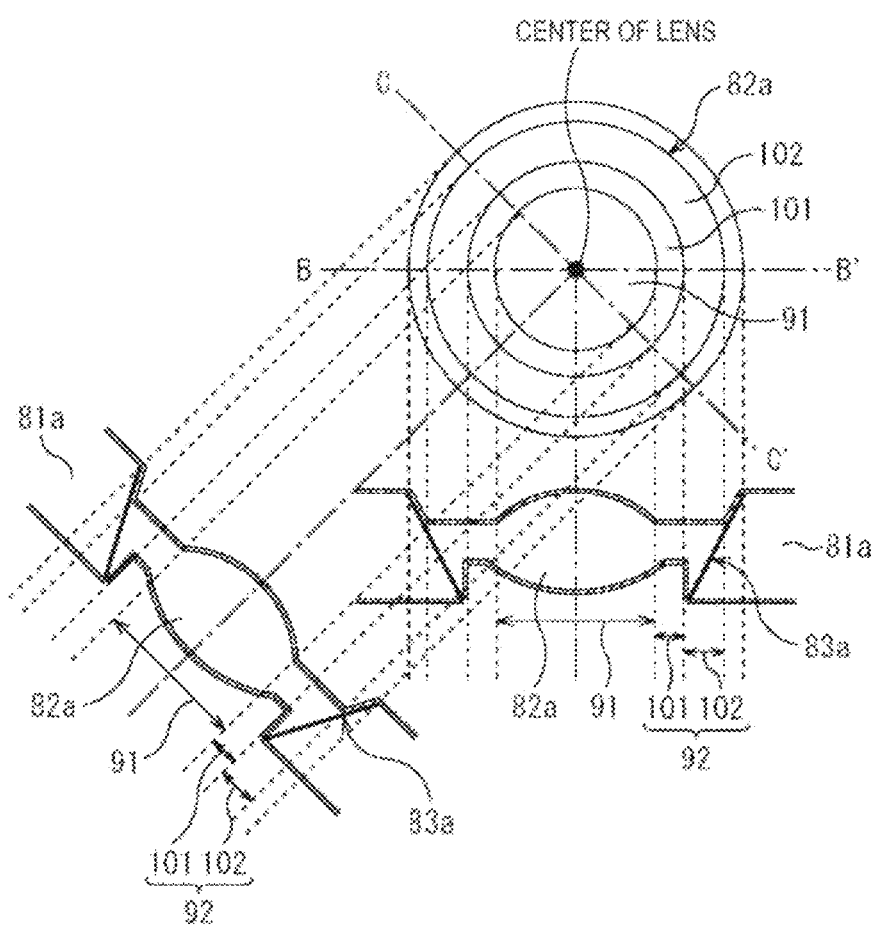
FIG. 14 shows a plan view and a cross-sectional view of a carrier substrate and a lens resin part.

FIG. 14 shows a plan view and a cross-sectional view of the carrier substrate 81a and the lens resin part 82a constituting the substrate with lenses 41a.

The cross-sectional view of the carrier substrate 81a and the lens resin part 82a shown in FIG. 14 is a cross-sectional view taken along the line B-B' and the line C-C' shown in the plan view.

The lens resin part 82a is a part that is integrally formed with a material forming the lens 21, and includes a lens part 91 and a carrying part 92. In the above description, the lens 21 corresponds to the entire lens part 91 or lens resin part 82a.

The lens part 91 is a part having performance as a lens, in other words, a "part in which light is refracted and converged or diverged," or a "part including a curved surface such as a convex surface, a concave surface, or an aspherical surface or a part in which a plurality of polygons used for a fresnel lens or a lens using diffraction grating are continuously disposed."

The carrying part 92 is a part that extends from the lens part 91 to the carrier substrate 81a and carries the lens part 91. The carrying part 92 includes an arm part 101 and a leg part 102 and is positioned on the outer circumference of the lens part 91.

The arm part 101 is a part that is disposed in contact with the lens part 91 outside the lens part 91 and extends from the lens part 91 in the outside direction at a constant film thickness. The leg part 102 is a part other than the arm part 101 within the carrying part 92 and is a part including a part in contact with a side wall of the through-hole 83a. Preferably, the leg part 102 has a thicker resin film thickness than the arm part 101.

The planar shape of the through-hole 83a formed in the carrier substrate 81a is a circle, and the cross-sectional shape thereof is naturally the same irrespective of the direction of the diameter. The shape of the lens resin part 82a which is a shape determined by shapes of an upper mold and a lower mold when a lens is formed is also formed so that the cross-sectional shape thereof is the same irrespective of the direction of the diameter.

Figure 15:
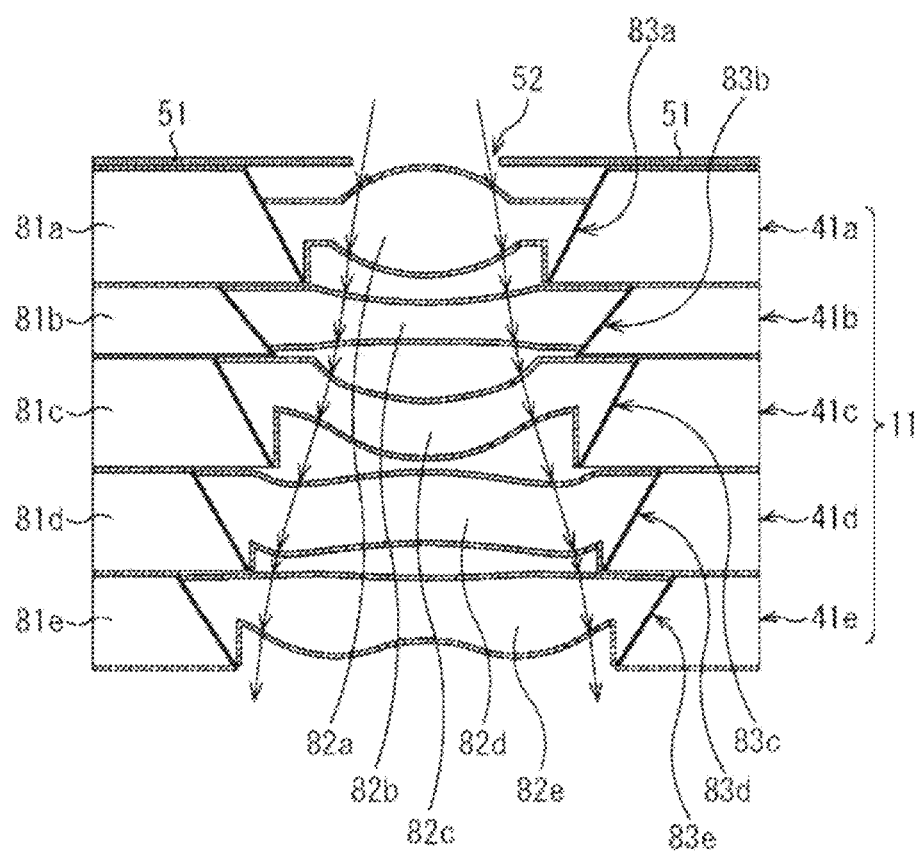
FIG. 15 is a cross-sectional view showing a laminated lens structure and a diaphragm plate.

FIG. 15 is a cross-sectional view showing the laminated lens structure 11 and the diaphragm plate 51 which are parts of the camera module 1D in FIG. 13.

In the camera module 1D, light incident on the module is limited by the diaphragm plate 51 and then spreads inside the laminated lens structure 11, and enters the light receiving element 12 (not shown in FIG. 15) disposed below the laminated lens structure 11. That is, when the laminated lens structure 11 is generally overviewed, light incident on the module proceeds downward from the opening 52 of the diaphragm plate 51 and spreads downward almost like a fan. Thus, as an example of the size of the lens resin part 82 included in the laminated lens structure 11, in the laminated lens structure 11 in FIG. 15, the lens resin part 82a included in the substrate with lenses 41a disposed directly below the diaphragm plate 51 is the smallest, and the lens resin part 82e included in the substrate with lenses 41e disposed on the lowermost layer of the laminated lens structure 11 is the largest.

If the thickness of the lens resin part 82 of the substrate with lenses 41 is set to be constant, it is more difficult to make a lens with a large size than a lens having a small size. This is because, for example, a lens is easily deformed due to a load applied to the lens when the lens is produced, and it is difficult to keep the strength due to a large size. Thus, it is preferable that the thickness of a lens with a large size be thicker than that of a lens with a small size. Thus, in the laminated lens structure 11 in FIG. 15, regarding the thickness of the lens resin part 82, the lens resin part 82e included in the substrate with lenses 41e disposed on the lowermost layer is the thickest.

The laminated lens structure 11 in FIG. 15 further includes at least one of the following features in order to increase the degree of freedom in a lens design.

(1) The thickness of the carrier substrate 81 is different between at least a plurality of substrates with lenses 41 constituting the laminated lens structure 11. For example, the thickness of the substrate with lenses 41 of the lower layer is thicker than that of the carrier substrate 81.

(2) The opening width of the through-hole 83 included in the substrate with lenses 41 is different between at least a plurality of substrates with lenses 41 constituting the laminated lens structure 11. For example, the opening width of the substrate with lenses 41 of the lower layer is larger than that of the through-hole 83.

(3) The diameter of the lens part 91 included in the substrate with lenses 41 is different between at least a plurality of substrates with lenses 41 constituting the laminated lens structure 11. For example, the diameter of the lens part 91 of the substrate with lenses 41 of the lower layer is larger than that of the lens part 91.

(4) The thickness of the lens part 91 included in the substrate with lenses 41 is different between at least a plurality of substrates with lenses 41 constituting the laminated lens structure 11. For example, the thickness of the lens part 91 of the substrate with lenses 41 of the lower layer is thicker than that of the lens part 91.

(5) A distance between lenses included in the substrate with lenses 41 is different between at least a plurality of substrates with lenses 41 constituting the laminated lens structure 11.

(6) The volume of the lens resin part 82 included in the substrate with lenses 41 is different between at least a plurality of substrates with lenses 41 constituting the laminated lens structure 11. For example, the volume of the lens resin part 82 of the substrate with lenses 41 of the lower layer is larger than that of the lens resin part 82.

(7) A material of the lens resin part 82 included in the substrate with lenses 41 is different between at least a plurality of substrates with lenses 41 constituting the laminated lens structure 11.

Generally, incident light that enters the camera module includes both normal incident light and obliquely incident light. Most of the obliquely incident light hits the diaphragm plate 51, and is absorbed thereinto or is reflected to the outside of the camera module 1D. Obliquely incident light that is not limited by the diaphragm plate 51 hits a side wall of the through-hole 83 depending on an incident angle thereof, and thus may be reflected at the side wall.

A direction in which reflected light of the obliquely incident light proceeds is determined by an incident angle of obliquely incident light 85 and an angle of the side wall of the through-hole 83 shown in FIG. 13. In a so-called downward fan shape in which the opening width of the through-hole 83 increases toward the light receiving element 12 from the incident side, when the obliquely incident light 85 having a specific incident angle that is not limited by the diaphragm plate 51 hits the side wall of the through-hole 83, the light is reflected toward the light receiving element 12, and may become stray light or noise light.

However, in the laminated lens structure 11 shown in FIG. 13, as shown in FIG. 15, the through-hole 83 has a so-called upward fan shape in which the opening width decreases downward (a side on which the light receiving element 12 is disposed). In this shape, the obliquely incident light 85 that hits the side wall of the through-hole 83 is reflected toward the upper side in a so-called incident side direction, rather than toward the lower side in a so-called direction of the light receiving element 12. Accordingly, a function or effect of preventing the generation of stray light or noise light is obtained.

A light absorbing material may be provided for a side wall of the through-hole 83 of the substrate with lenses 41 in order to reduce light that hits the side wall and is then reflected.

As an example, light having a wavelength (for example, visible light) to be received when the camera module 1D is used as a camera is set as first light, and light having a different wavelength from the first light (for example, UV light) is set as second light. A substance in which carbon particles are dispersed as an absorbing material of the first light (visible light) in a resin that is cured by the second light (UV light) is applied or sprayed to a surface of the carrier substrate 81. The second light (UV light) is emitted only to a resin of the side wall of the through-hole 83 and curing is performed, and a resin in the other area is removed. Therefore, a layer formed of a material having a light absorbing property with respect to the first light (visible light) may be formed on the side wall of the through-hole 83.

The laminated lens structure 11 shown in FIG. 15 is an example of a structure in which the diaphragm plate 51 is disposed on the top of a plurality of laminated substrates with lenses 41. The diaphragm plate 51 may be inserted and disposed at any position of intermediate substrates with lenses 41 rather than the top of a plurality of laminated substrates with lenses 41.

As still another example, instead of the plate-like diaphragm plate 51 that is provided separately from the substrate with lenses 41, a layer formed of a material having a light absorbing property is formed on a surface of the substrate with lenses 41, and this may function as a diaphragm. For example, a substance in which carbon particles are dispersed as an absorbing material of the first light (visible light) in a resin that is cured by the second light (UV light) is applied or sprayed to a surface of the substrate with lenses 41, and the second light (UV light) is emitted to a resin in the other area excluding an area through which light passes when it functions as a diaphragm, and the resin is cured and left. A resin of an area that is not cured, that is, an area through which light passes when it functions as a diaphragm, is removed, and thus a diaphragm may be formed on a surface of the substrate with lenses 41.

Here, the substrate with lenses 41 of which a diaphragm is formed on the surface may be the substrate with lenses 41 disposed on the uppermost layer of the laminated lens structure 11 or may be the substrate with lenses 41 in an inner layer of the laminated lens structure 11.

The laminated lens structure 11 shown in FIG. 15 has a structure in which the substrates with lenses 41 are laminated.

As another embodiment, the laminated lens structure 11 may have a structure including a plurality of substrates with lenses 41 and at least one carrier substrate 81 having no lens resin part 82. In this structure, the carrier substrate 81 having no lens resin part 82 may be disposed on the lowermost layer or the uppermost layer of the laminated lens structure 11 or may be disposed as an inner layer in the laminated lens structure 11. This structure provides, for example, a function or effect of arbitrarily setting a distance between a plurality of lenses included in the laminated lens structure 11 and a distance between the lens resin part 82 of the lowermost layer of the laminated lens structure 11 and the light receiving element 12 disposed below the laminated lens structure 11.

Alternatively, this structure provides a function or effect of appropriately setting the opening width of the carrier substrate 81 having no lens resin part 82, providing a material having a light absorbing property in an area excluding the opening, and thus causing the area to function as a diaphragm plate.

7. Sixth Embodiment of Camera Module

Figure 16:
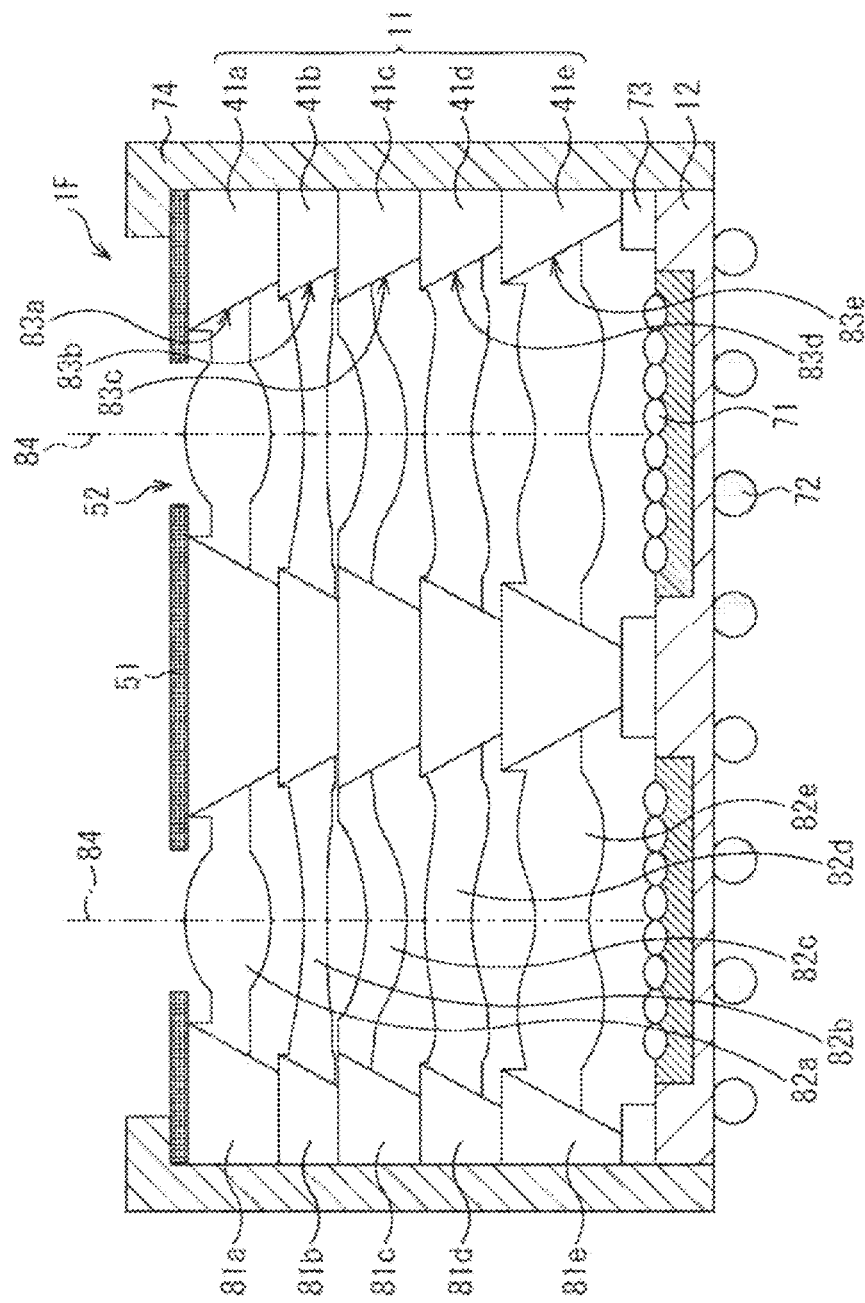
FIG. 16 is a diagram showing a sixth embodiment of a camera module using a laminated lens structure to which the present technology is applied.

FIG. 16 is a diagram showing a sixth embodiment of a camera module using a laminated lens structure to which the present technology is applied.

In FIG. 16, parts corresponding to those in the fourth embodiment shown in FIG. 13 are denoted with the same reference numerals, and description will focus on parts different from those of the camera module 1D in FIG. 13.

In a camera module 1F shown in FIG. 16, similarly to the camera module 1D shown in FIG. 13, incident light is limited in the diaphragm plate 51 and then spreads inside the laminated lens structure 11, and enters the light receiving element 12 disposed below the laminated lens structure 11. That is, when the laminated lens structure 11 is generally overviewed, light proceeds downward from the opening 52 of the diaphragm plate 51 and spreads downward almost like a fan.

The camera module 1F in FIG. 16 is different from the camera module 1D shown in FIG. 13 in that the cross-sectional shape of the through-holes 83 of the substrates with lenses 41 constituting the laminated lens structure 11 is a so-called downward fan shape in which the opening width increases downward (a side on which the light receiving element 12 is disposed).

The laminated lens structure 11 of the camera module 1F is a structure in which incident light proceeds downward from the opening 52 of the diaphragm plate 51 and spreads downward like a fan. Therefore, for example, the carrier substrate 81 is less likely to be an obstacle of the optical path in the downward fan shape in which the opening width of the through-hole 83 increases downward than the downward fan shape in which the opening width of the through-hole 83 decreases downward. Accordingly, a function of increasing the degree of freedom in a lens design is provided.

In addition, when the cross-sectional area in a substrate planar direction of the lens resin part 82 including the carrying part 92 is the downward fan shape in which the opening width of the through-hole 83 decreases downward, it has a specific size in order for light incident on the lens 21 to pass on a lower surface of the lens resin part 82, and the cross-sectional area thereof increases from the lower surface of the lens resin part 82 toward the upper surface.

On the other hand, in the downward fan shape in which the opening width of the through-hole 83 increases downward, the cross-sectional area on the lower surface of the lens resin part 82 is substantially the same as that in the downward fan shape, but the cross-sectional area thereof decreases from the lower surface to the upper surface of the lens resin part 82.

Accordingly, the structure in which the opening width of the through-hole 83 increases downward provides a function or effect of reducing the size of the lens resin part 82 including the carrying part 92. In addition, accordingly, there is provided a function or effect of reducing the difficulty in lens formation occurring when the lens is large, which is described above.

8. Seventh Embodiment of Camera Module

Figure 17:
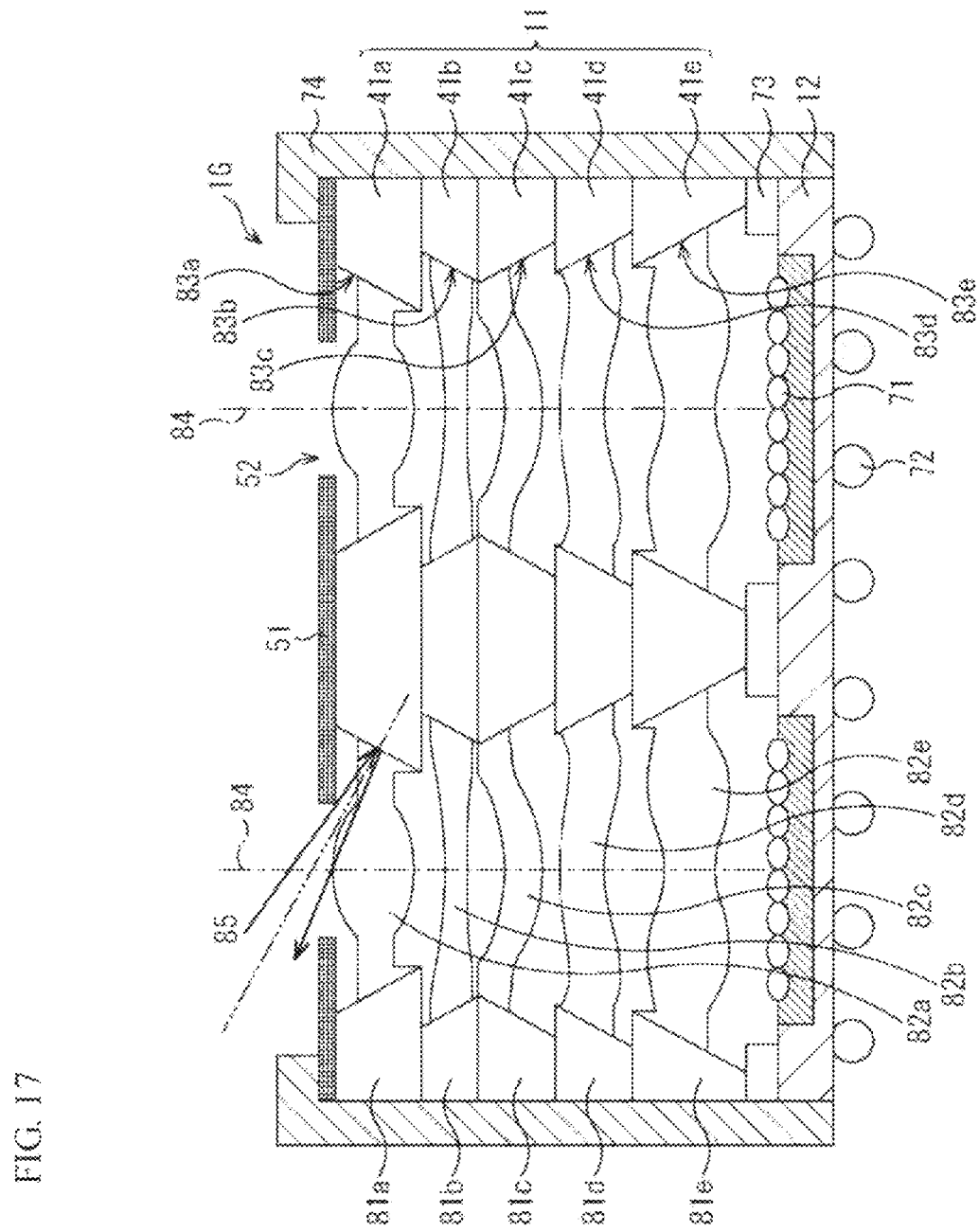
FIG. 17 is a diagram showing a seventh embodiment of a camera module using a laminated lens structure to which the present technology is applied.

FIG. 17 is a diagram showing a seventh embodiment of a camera module using a laminated lens structure to which the present technology is applied.

In FIG. 17, parts corresponding to those in FIG. 13 are denoted with the same reference numerals, and description will focus on parts different from those of the camera module 1D shown in FIG. 13.

In a camera module 1G in FIG. 17, also, shapes of the lens resin part 82 and the through-hole 83 of the substrates with lenses 41 constituting the laminated lens structure 11 are different from those of the camera module 1D shown in FIG. 13.

The laminated lens structure 11 of the camera module 1G includes both the substrate with lenses 41 in which the shape of the through-hole 83 is a so-called upward fan shape in which the opening width decreases downward (a side on which the light receiving element 12 is disposed) and the substrate with lenses 41 in which the shape of the through-hole 83 is a so-called downward fan shape in which the opening width increases downward.

The substrate with lenses 41 in which the through-hole 83 has a so-called upward fan shape in which the opening width decreases downward provides a function or effect of reflecting the obliquely incident light 85 hit the side wall of the through-hole 83 in an upper direction which is a so-called incident side direction and thus preventing the generation of stray light or noise light as described above.

Therefore, in the laminated lens structure 11 in FIG. 17, among the plurality of substrates with lenses 41 constituting the laminated lens structure 11, particularly for a plurality of substrates on the upper side (incident side), the substrate with lenses 41 in which the through-hole 83 has a so-called upward fan shape in which the opening width decreases downward is used.

In the substrate with lenses 41 in which the through-hole 83 has a so-called downward fan shape in which the opening width increases downward, as described above, the carrier substrate 81 included in the substrate with lenses 41 is unlikely to be an obstacle of the optical path. Thus, there is provided a function or effect of increasing the degree of freedom in a lens design or reducing the size of the lens resin part 82 including the carrying part 92 included in the substrate with lenses 41.

In the laminated lens structure 11 in FIG. 17, since light proceeds downward from the diaphragm and spreads downward like a fan, among the plurality of substrates with lenses 41 constituting the laminated lens structure 11, the size of the lens resin part 82 included in some of the substrates with lenses 41 disposed on the lower side is large. In such a large lens resin part 82, when the through-hole 83 having a downward fan shape is used, a function of reducing the size of the lens resin part 82 becomes significant.

Therefore, in the laminated lens structure 11 in FIG. 17, among the plurality of substrates with lenses 41 constituting the laminated lens structure 11, particularly for a plurality of substrates on the lower side, the substrate with lenses 41 in which the through-hole 83 has a so-called downward fan shape in which the opening width increases downward is used.

9. Detailed Configuration of Substrate with Lenses

Next, a detailed configuration of the substrate with lenses 41 will be described.

Figure 18:
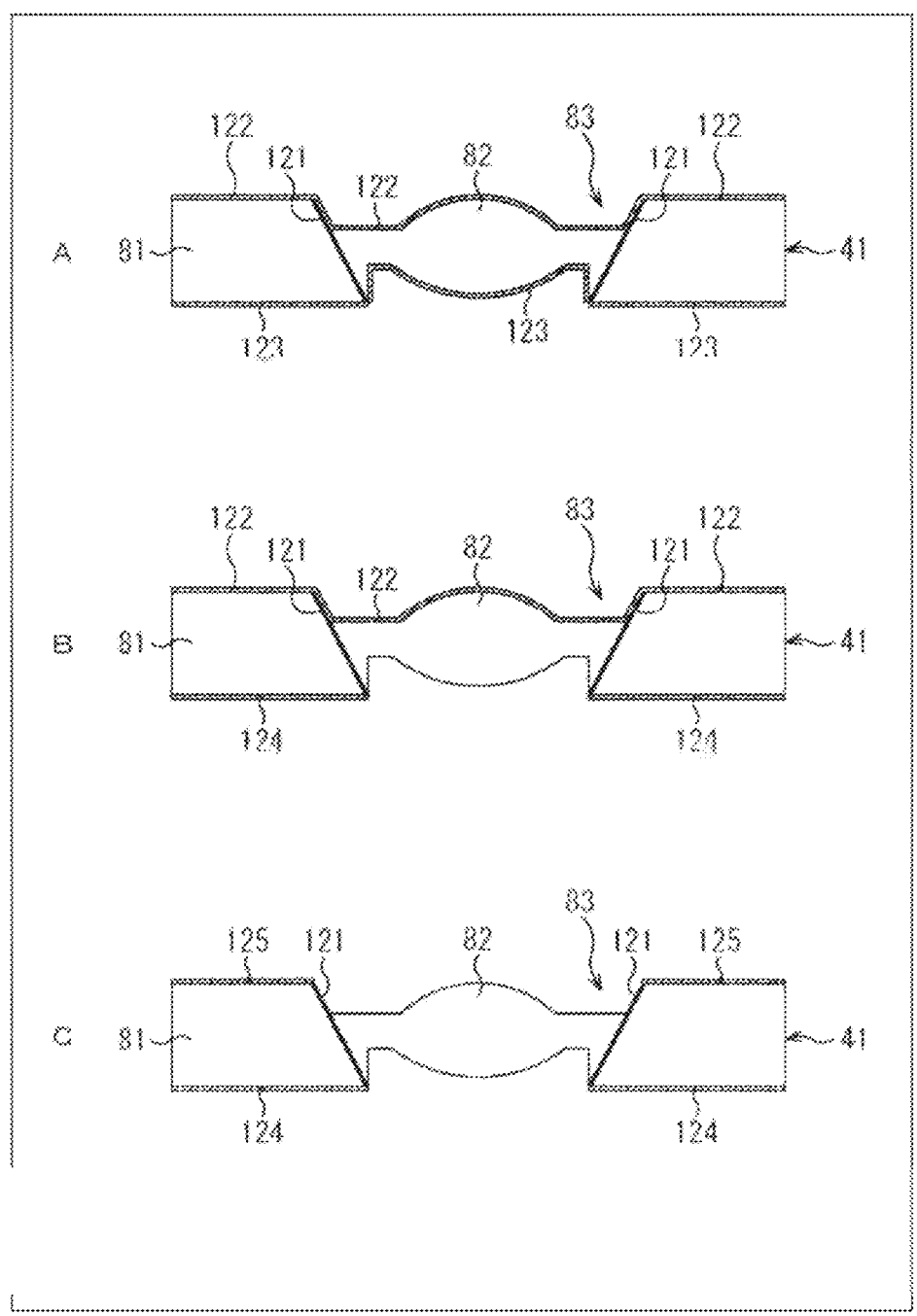
FIG. 18 is a cross-sectional view showing a detailed configuration of a substrate with lenses.

FIG. 18 is a cross-sectional view showing a detailed configuration of the substrate with lenses 41.

Here, in FIG. 18, while the substrate with lenses 41a of the uppermost layer among the five substrates with lenses 41a to 41e is shown, the other substrates with lenses 41 have the same configuration.

As a configuration of the substrate with lenses 41, any configuration in A to C of FIG. 18 can be used.

In the substrate with lenses 41 shown in A of FIG. 18, the lens resin part 82 is formed to block the through-hole 83 when viewed from the upper surface with respect to the through-hole 83 provided in the carrier substrate 81. As described with reference to FIG. 14, the lens resin part 82 includes the lens part 91 (not shown) at the center and the carrying part 92 (not shown) at the peripheral part.

A film 121 having a light absorbing property or light blocking property is formed on a side wall which becomes the through-hole 83 of the substrate with lenses 41 in order to prevent ghost or flare which causes light reflection. For convenience, this film 121 is called a light blocking film 121.

On the upper surface of the carrier substrate 81 and the lens resin part 82, an upper surface layer 122 including an oxide or a nitride, alternatively, another insulating material is formed. On the lower surface of the carrier substrate 81 and the lens resin part 82, a lower surface layer 123 including an oxide or a nitride, alternatively, another insulating material is formed.

As an example, the upper surface layer 122 constitutes an antireflection film in which a plurality of low refractive films and high refractive films are alternately laminated. The antireflection film can be formed by, for example, alternately laminating a total of four layers including low refractive films and high refractive films. The low refractive film is formed of, for example, an oxide film of SiOx (1≤x≤2), SiOC, or SiOF. The high refractive film includes, for example, a metal oxide film of TiO, TaO, or $Nb_2O_5$.

Here, the configuration of the upper surface layer 122 may be designed to obtain desired antireflection performance using, for example, an optical simulation. The material and the film thickness of the low refractive film and the high refractive film, and the number of laminations are not particularly limited. In the present embodiment, the outermost surface of the upper surface layer 122 is the low refractive film. The film thickness is, for example, 20 to 1000 nm, the density is, for example, 2.2 to 2.5 g/cm³, and the flatness is, for example, a root mean square roughness Rq(RMS) of about 1 nm or less. In addition, although details will be described below, the upper surface layer 122 also serves as a bonding film when it is bonded to another substrate with lenses 41.

As an example, the upper surface layer 122 may be an antireflection film in which a plurality of low refractive films and high refractive films are alternately laminated and may be an antireflection film made of an inorganic substance among antireflection films. As another example, the upper surface layer 122 may be a monolayer film including an oxide or a nitride, alternatively, another insulating material and may be a film made of an inorganic substance among films.

As an example, the lower surface layer 123 may be an antireflection film in which a plurality of low refractive films and high refractive films are alternately laminated and may be an antireflection film made of an inorganic substance among antireflection films. As another example, the lower surface layer 123 may be a monolayer film including an oxide or a nitride, alternatively, another insulating material and may be a film made of an inorganic substance among films.

Regarding the substrate with lenses 41 in B to C of FIG. 18, only parts different from those of the substrate with lenses 41 shown in A of FIG. 18 will be described.

In the substrate with lenses 41 shown in B of FIG. 18, a film formed on the lower surface of the carrier substrate 81 and the lens resin part 82 is different from that of the substrate with lenses 41 shown in A of FIG. 18.

In the substrate with lenses 41 in B of FIG. 18, a lower surface layer 124 including an oxide or a nitride, alternatively, another insulating material is formed on the lower surface of the carrier substrate 81. On the other hand, no lower surface layer 124 is formed on the lower surface of the lens resin part 82. The lower surface layer 124 may include the same material as or a material different from the upper surface layer 122.

Such a structure may be formed by, for example, a production method in which, before the lens resin part 82 is formed, the lower surface layer 124 is formed on the lower surface of the carrier substrate 81, and the lens resin part 82 is then formed. Alternatively, such a structure may be formed as follows. After the lens resin part 82 is formed, while a mask is formed on the lens resin part 82 and no mask is formed on the carrier substrate 81, a film forming the lower surface layer 124 is deposited on the lower surface of the carrier substrate 81 by, for example, PVD.

In the substrate with lenses 41 in C of FIG. 18, an upper surface layer 125 including an oxide or a nitride, alternatively, another insulating material is formed on the upper surface of the carrier substrate 81. On the other hand, no upper surface layer 125 is formed on the upper surface of the lens resin part 82.

Similarly, on the lower surface of the substrate with lenses 41, the lower surface layer 124 including an oxide or a nitride, alternatively, another insulating material is formed on the lower surface of the carrier substrate 81. On the other hand, no lower surface layer 124 is formed on the lower surface of the lens resin part 82.

Such a structure may be formed by, for example, a production method in which, before the lens resin part 82 is formed, the upper surface layer 125 and the lower surface layer 124 are formed on the carrier substrate 81, and the lens resin part 82 is then formed. Alternatively, such a structure may be formed as follows. After the lens resin part 82 is formed, while a mask is formed on the lens resin part 82 and no mask is formed on the carrier substrate 81, a film forming the upper surface layer 125 and the lower surface layer 124 is deposited on a surface of the carrier substrate 81 by, for example, PVD. The lower surface layer 124 and the upper surface layer 125 may include the same material or different materials.

The substrate with lenses 41 can be configured as described above.

10. Method of Producing Substrate with Lenses

Next, a method of producing the substrate with lenses 41 will be described with reference to FIG. 19 to FIG. 29.

First, a carrier substrate 81W in a substrate state in which a plurality of through-holes 83 are formed is prepared. As the carrier substrate 81W, for example, a silicon substrate used for a general semiconductor device can be used. The shape of the carrier substrate 81W is, for example, a circle as shown in A of FIG. 19, and the diameter is, for example, 200 mm or 300 mm. The carrier substrate 81W may be, for example, a glass substrate, a resin substrate, or a metal substrate, rather than a silicon substrate.

Figure 19:
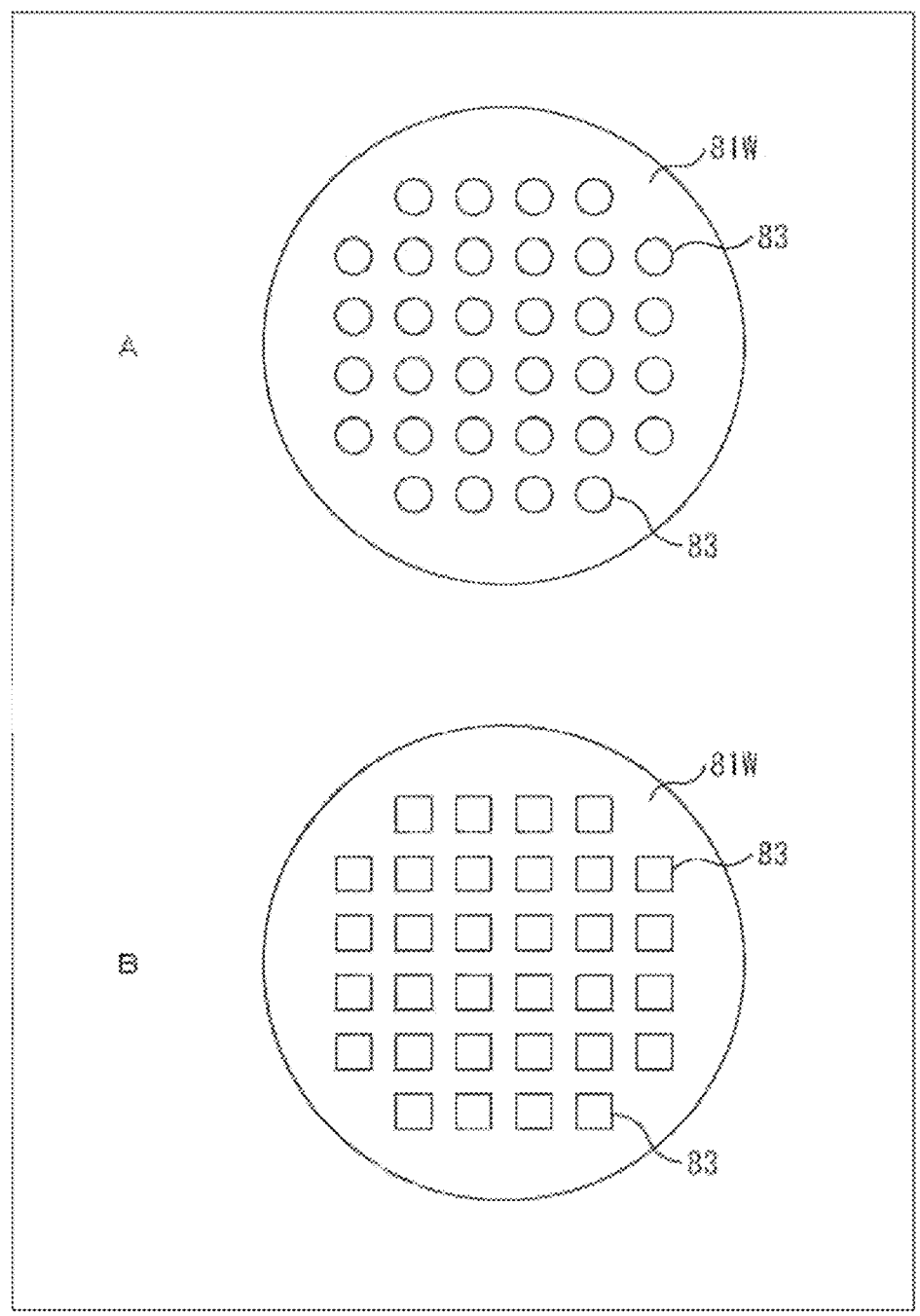
FIG. 19 is a diagram describing a method of producing a substrate with lenses.

In addition, in the present embodiment, the planar shape of the through-hole 83 is a circle as shown in A of FIG. 19. However, as shown in B of FIG. 19, the planar shape of the through-hole 83 may be a polygon, for example, a rectangle.

The opening width of the through-hole 83 may be, for example, about 100 μm to about 20 mm. In this case, in the carrier substrate 81W, for example, about 100 through-holes to about 5 million through-holes may be disposed.

In this specification, the size of the through-hole 83 in the planar direction of the substrate with lenses 41 is called an opening width. Unless otherwise specified, the opening width refers to a length of one side when the planar shape of the through-hole 83 is a rectangle and refers to a diameter when the planar shape of the through-hole 83 is a circle.

Figure 20:
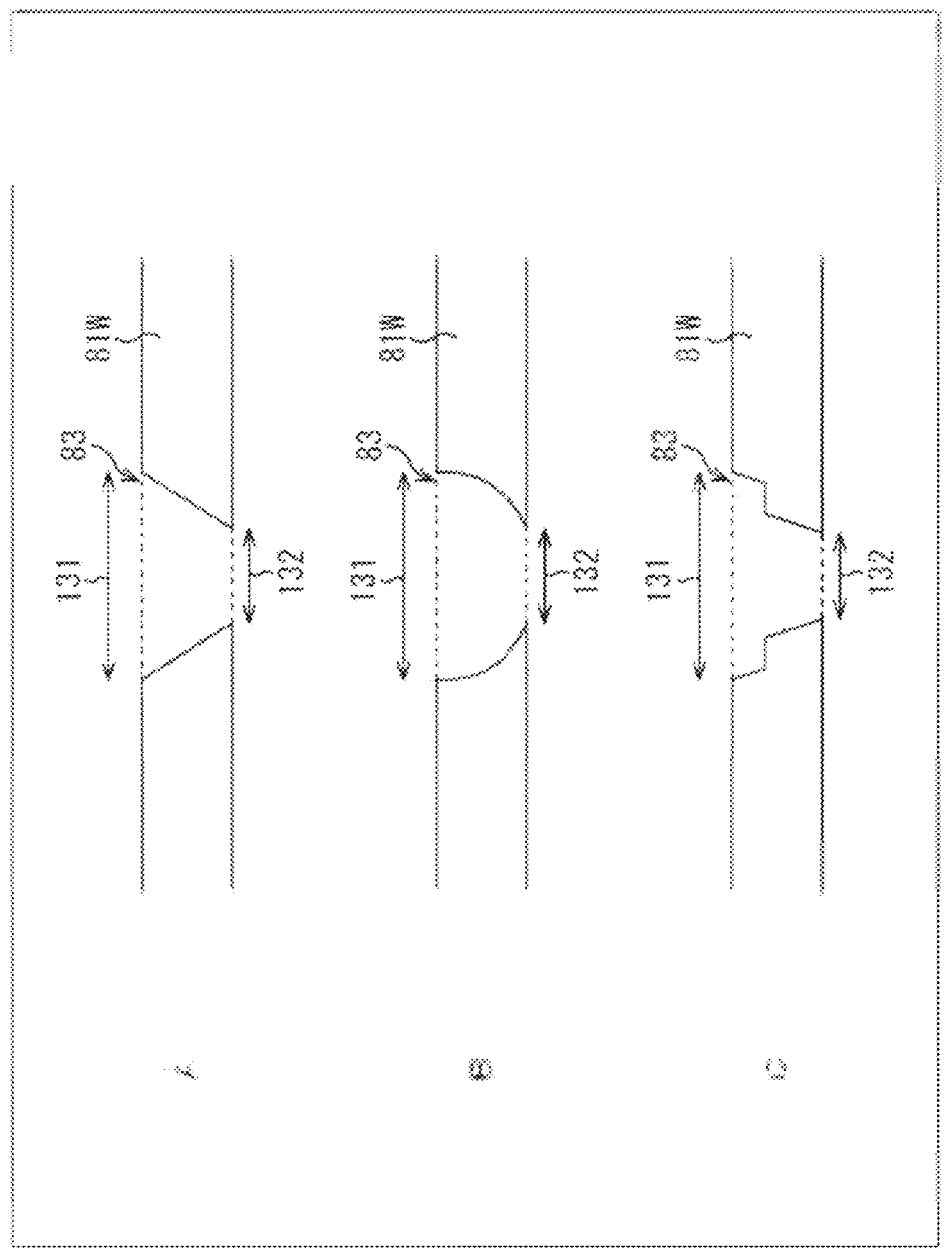
FIG. 20 is a diagram describing a method of producing a substrate with lenses.

As shown in FIG. 20, regarding the through-hole 83, a second opening width 132 on a second surface that faces a first surface is smaller than a first opening width 131 on the first surface of the carrier substrate 81W.

As an example of a 3-dimensional shape of the through-hole 83 in which the second opening width 132 is smaller than the first opening width 131, the through-hole 83 may be a truncated cone shape shown in A of FIG. 20 or a polygonal truncated pyramid shape. The cross-sectional shape of the side wall of the through-hole 83 may be a straight line shape as shown in A of FIG. 20, a curved line shape as shown in B of FIG. 20, or a shape with a step as shown in C of FIG. 20.

In the through-hole 83 having a shape in which the second opening width 132 is smaller than the first opening width 131, when a resin is supplied into the through-hole 83 and the resin is pushed from the first and second surfaces in opposite directions by mold members to form the lens resin part 82, the resin which becomes the lens resin part 82 receives a force from two opposing mold members, and is pressed against the side wall of the through-hole 83. Accordingly, there is provided a function of increasing an adhesion strength between the resin which becomes the lens resin part 82 and the carrier substrate.

Here, as another embodiment, the through-hole 83 may have a shape in which the first opening width 131 and the second opening width 132 are the same, that is, a shape in which the side wall of the through-hole 83 has a vertical cross-sectional shape.

<Method of Forming Through-Hole Using Wet Etching>

The through-hole 83 of the carrier substrate 81W can be formed by etching, according to wet etching of the carrier substrate 81W. Specifically, before the carrier substrate 81W is etched, an etching mask for preventing a non-opening area of the carrier substrate 81W from being etched is formed on a surface of the carrier substrate 81W. As a material of the etching mask, for example, an insulating film such as a silicon oxide film or a silicon nitride film is used. The etching mask is formed when an etching mask material layer is formed on a surface of the carrier substrate 81W and a pattern which forms the planar shape of the through-hole 83 is open in the layer. After the etching mask is formed, the carrier substrate 81W is etched, and thus the through-hole 83 is formed in the carrier substrate 81W.

For example, when a single crystal silicon with the (100) substrate surface orientation is used for the carrier substrate 81W, in order to form the through-hole 83, crystal anisotropic wet etching using an alkaline solution such as KOH can be used.

When crystal anisotropic wet etching using an alkaline solution such as KOH is performed on the carrier substrate 81W which includes a single crystal silicon with the (100) substrate surface orientation, etching progresses so that the (111) plane appears in an opening side wall. As a result, the through-hole 83 of which the planar shape is a rectangle when the planar shape of the opening of the etching mask is a circle or a rectangle and in which, regarding the opening width of the through-hole 83, the second opening width 132 is smaller than the first opening width 131, and a 3-dimensional shape of the through-hole 83 is a truncated pyramid or a shape similar thereto is obtained. An angle of the side wall of the through-hole 83 which forms a truncated pyramid is an angle of about 55° with respect to the substrate plane.

Regarding etching for forming a through-hole, as another example, wet etching using a chemical solution by which silicon can be etched into an arbitrary shape without being restricted by crystal orientation as disclosed in WO 2011/010739 may be performed. As the chemical solution, for example, a chemical solution in which at least one of a polyoxyethylene alkyl phenyl ether, a polyoxyalkylene alkyl ether, and a polyethylene glycol which are a surfactant is added to a tetramethylammonium hydroxide (TMAH) aqueous solution, a chemical solution in which an isopropyl alcohol is added to a KOH aqueous solution, or the like can be used.

When etching for forming the through-hole 83 is performed on the carrier substrate 81W which includes a single crystal silicon with the (100) substrate surface orientation using any of the above-described chemical solutions, if the planar shape of the opening of the etching mask is a circle, the through-hole 83 of which the planar shape is a circle and in which the second opening width 132 is smaller than the first opening width 131 and a 3-dimensional shape is a truncated cone or a shape similar thereto is obtained.

When the planar shape of the opening of the etching mask is a rectangle, the through-hole 83 of which the planar shape is a rectangle and in which, regarding the opening width, the second opening width 132 is smaller than the first opening width 131, and a 3-dimensional shape is a truncated pyramid or a shape similar thereto is obtained. An angle of the side wall of the through-hole 83 which forms the truncated cone or the truncated pyramid is an angle of about 45° with respect to the substrate plane.

<Method of Forming Through-Hole Using Dry Etching>

In addition, as etching for forming the through-hole 83, dry etching can be used instead of the above-described wet etching.

A method of forming the through-hole 83 using dry etching will be described with reference to FIG. 21.

Figure 21:
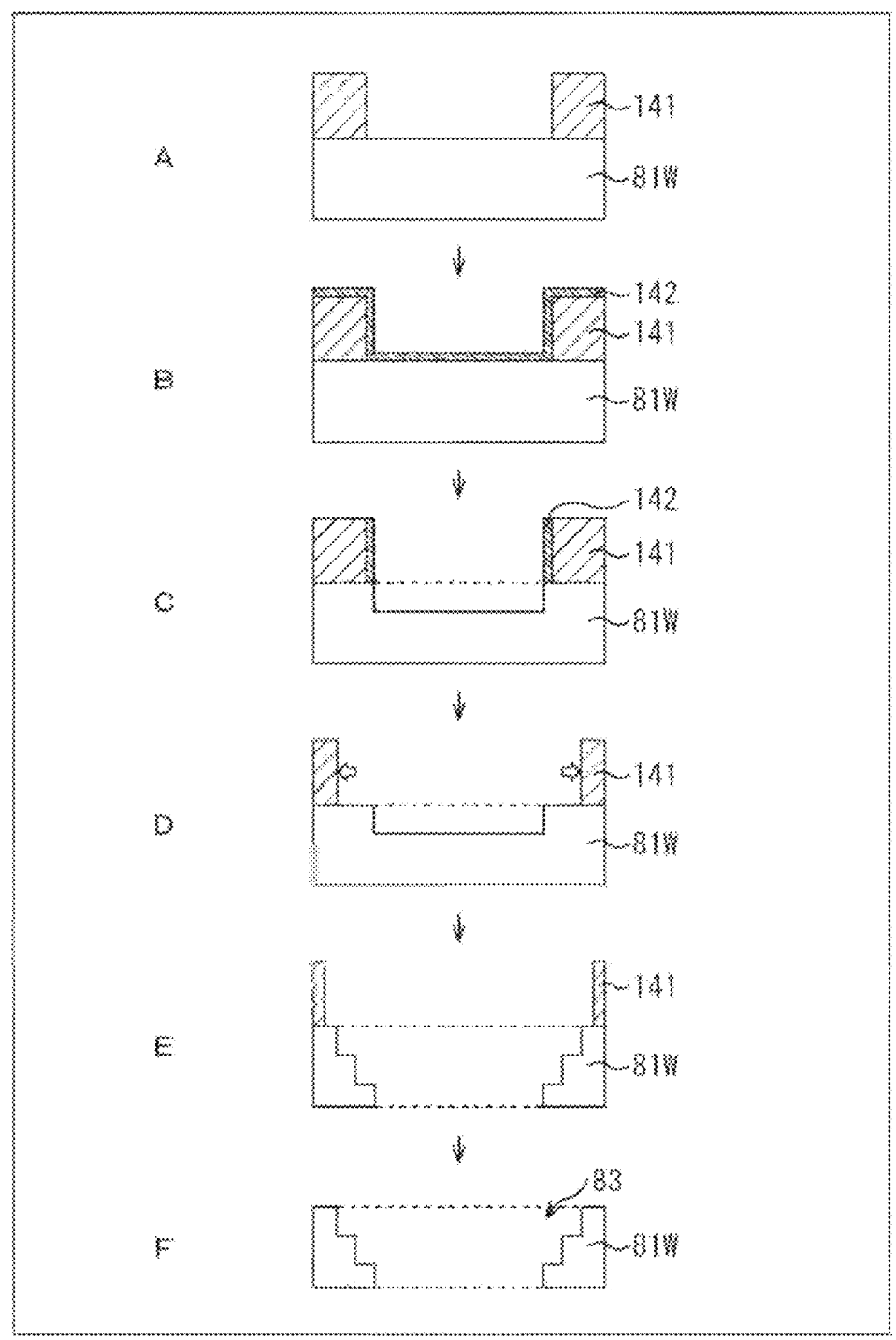
FIG. 21 is a diagram describing a method of producing a substrate with lenses.

As shown in A of FIG. 21, an etching mask 141 is formed on one surface of the carrier substrate 81W. The etching mask 141 is a mask pattern in which a part forming the through-hole 83 is open.

Next, as shown in B of FIG. 21, after a protective film 142 for protecting a side wall of the etching mask 141 is formed, as shown in C of FIG. 21, the carrier substrate 81W is etched to a predetermined depth by dry etching. According to a dry etching process, the protective film 142 on the surface of the carrier substrate 81W and the surface of the etching mask 141 is removed. However, the protective film 142 on the side surface of the etching mask 141 remains and the side wall of the etching mask 141 is protected. After etching, as shown in D of FIG. 21, the protective film 142 of the side wall is removed, and the etching mask 141 is retreated in a direction in which the pattern size of the opening pattern increases.

Then, again, the protective film forming process, the dry etching process, and the etching mask retreating process in B to D of FIG. 21 are performed a plurality of times. Accordingly, as shown in E of FIG. 21, the carrier substrate 81W is etched to have a staircase shape (uneven shape) with periodic steps.

Finally, when the etching mask 141 is removed, as shown in F of FIG. 21, the through-hole 83 having a staircase-shaped side wall is formed in the carrier substrate 81W. A width (width of one step) of the staircase shape of the through-hole 83 in the planar direction is, for example, about 400 nm to 1 μm.

As described above, when the through-hole 83 is formed using dry etching, the protective film forming process, the dry etching process, and the etching mask retreating process are repeatedly performed.

When the side wall of the through-hole 83 has a staircase shape (uneven shape) with periodicity, reflection of incident light can be prevented. In addition, if the side wall of the through-hole 83 has an uneven shape with a random size, voids (gaps) are generated in an adhesive layer between the lens formed in the through-hole 83 and the side wall. Due to the voids, adhesion with the lens may decrease. However, according to the above-described forming method, the side wall of the through-hole 83 has an uneven shape with periodicity, adhesion is improved, and a change in optical properties due to a positional deviation of lenses can be prevented.

As examples of materials used in the processes, for example, a single crystal silicon can be used for the carrier substrate 81W, a photoresist can be used for the etching mask 141, a fluorocarbon polymer obtained using a gas plasma such as $C_4F_8$ or $CHF_3$ can be used for the protective film 142, plasma etching using a gas containing F such as $SF_6/O_2$ or $C_4F_8/SF_6$ can be used for the etching treatment, and plasma etching using a gas containing $O_2$ such as $CF_4/O_2$ can be used for the mask retreating process.

Alternatively, a single crystal silicon can be used for the carrier substrate 81W, $SiO_2$ can be used for the etching mask 141, a plasma containing $Cl_2$ can be used for etching, an oxide film obtained by oxidizing an etching target material using $O_2$ plasma can be used for the protective film 142, plasma etching using a gas containing $Cl_2$ can be used for the etching treatment, and plasma etching using a gas containing F such as $CF_4/O_2$ can be used for the mask retreating process.

As described above, a plurality of through-holes 83 can be formed in the carrier substrate 81W at the same time by wet etching or dry etching. However, as shown in A of FIG. 22, in the carrier substrate 81W, through-grooves 151 may be formed in areas in which no through-hole 83 is formed.

Figure 22:
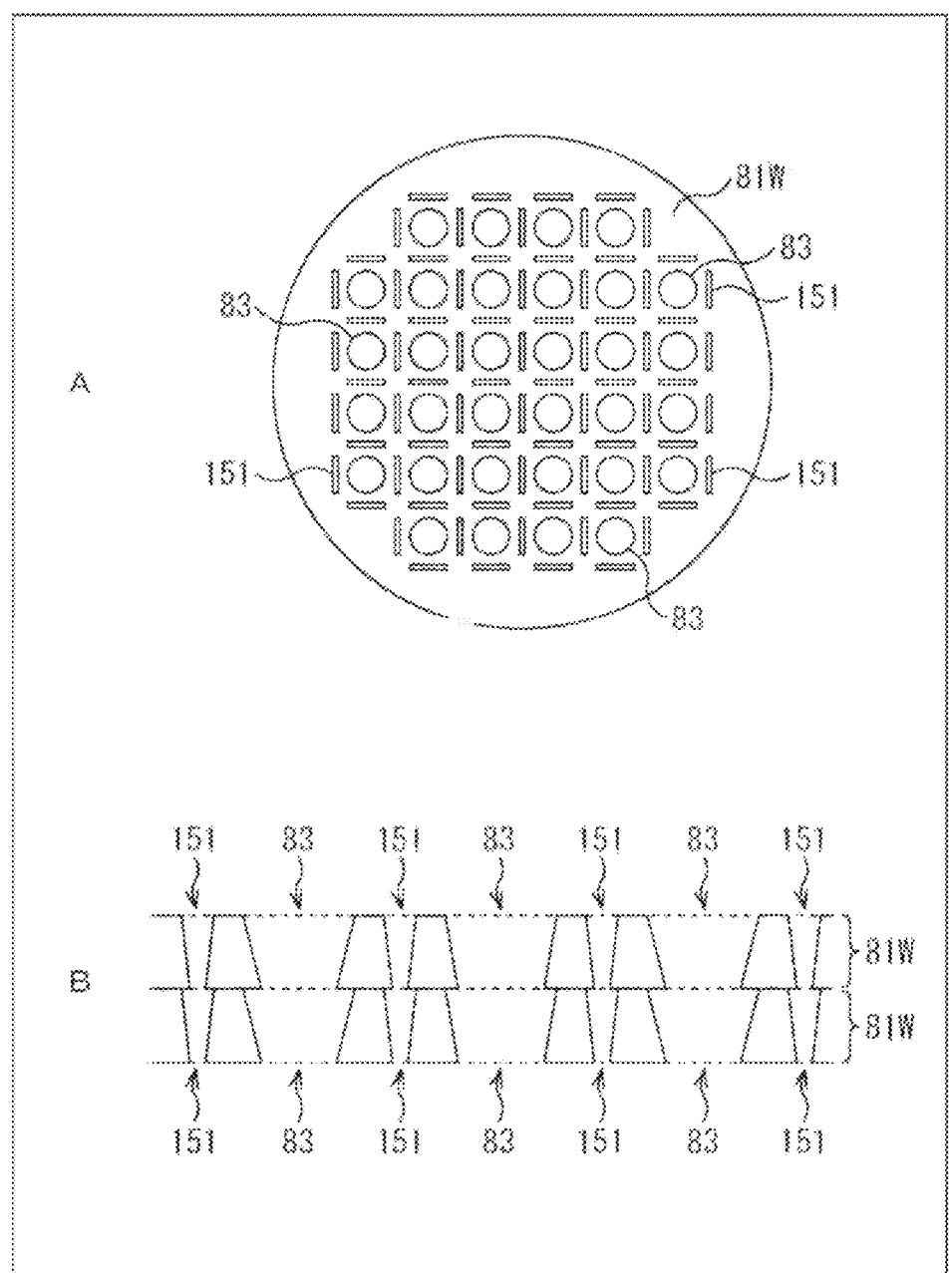
FIG. 22 is a diagram describing a method of producing a substrate with lenses.

A of FIG. 22 is a plan view of the carrier substrate 81W in which the through-grooves 151 are formed in addition to the through-holes 83.

For example, as shown in A of FIG. 22, the through-grooves 151 are disposed only in parts between the through-holes 83 in the row direction and the column direction other than parts of the plurality of through-holes 83 that are disposed in rows and columns.

In addition, the through-grooves 151 of the carrier substrate 81W can be disposed at the same positions in the substrates with lenses 41 constituting the laminated lens structure 11. In this case, when a plurality of carrier substrates 81W are laminated as the laminated lens structure 11, as shown in the cross-sectional view in B of FIG. 22, a structure in which the through-grooves 151 of the plurality of carrier substrates 81W penetrate between the plurality of carrier substrates 81W is obtained.

For example, when stress that deforms the substrate with lenses 41 acts from the outside of the substrate with lenses 41, the through-groove 151 of the carrier substrate 81W as a part of the substrate with lenses 41 may provide a function or effect of reducing deformation of the substrate with lenses 41 due to the stress.

Alternatively, for example, when stress that deforms the substrate with lenses 41 is generated from the inside of the substrate with lenses 41, the through-groove 151 may provide a function or effect of reducing deformation of the substrate with lenses 41 due to the stress.

<Method of Producing Substrate with Lenses>

Next, a method of producing the substrate with lenses 41W in a substrate state will be described with reference to FIG. 23.

Figure 23:
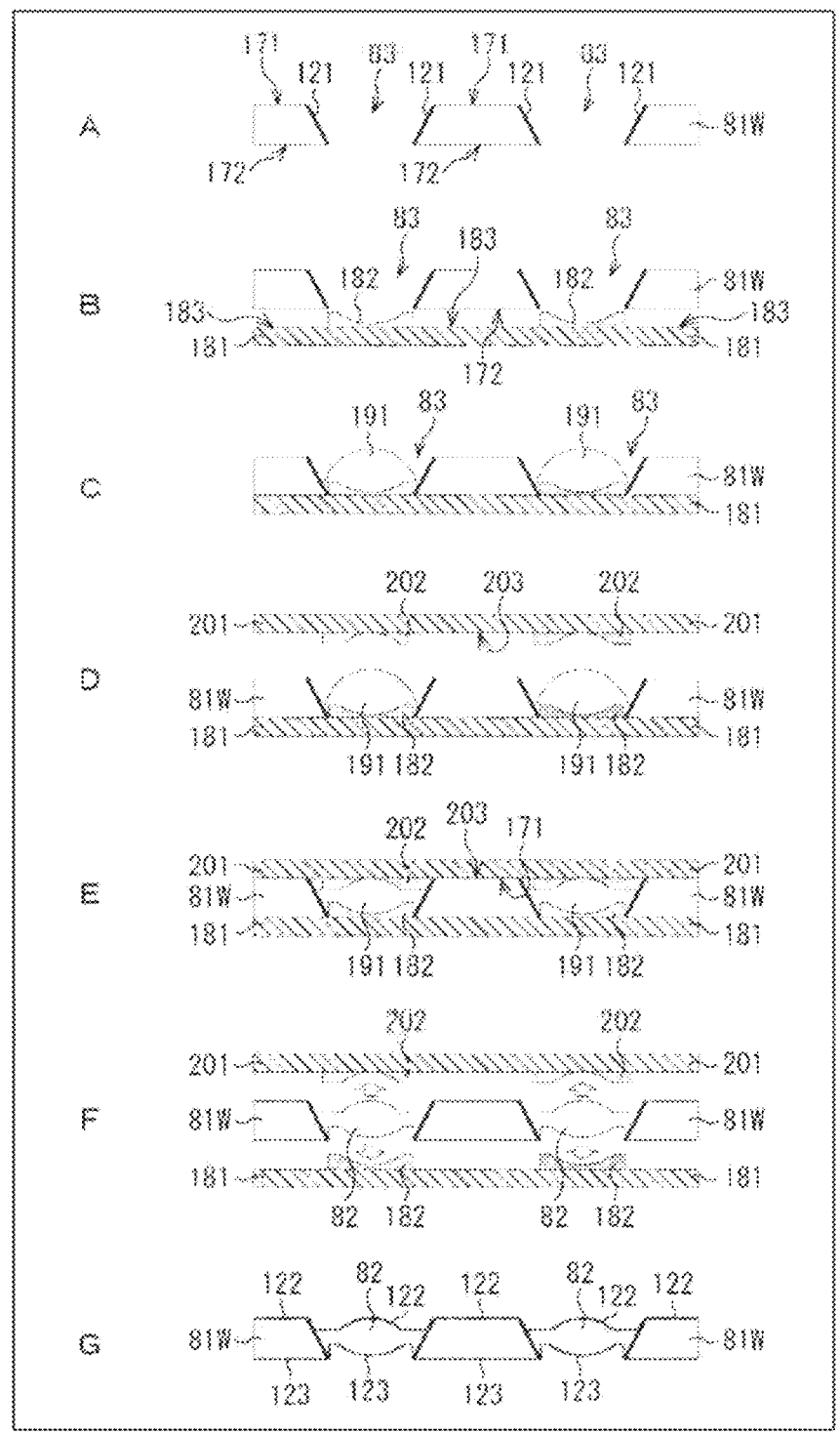
FIG. 23 is a diagram describing a method of producing a substrate with lenses.

First, as shown in A of FIG. 23, the carrier substrate 81W in which a plurality of through-holes 83 are formed is prepared. The light blocking film 121 is filmed on the side wall of the through-hole 83. In FIG. 23, while only two through-holes 83 are shown due to limitations of space, in practice, as shown in FIG. 19, the plurality of through-holes 83 are formed in the carrier substrate 81W in the planar direction. In addition, an alignment mark (not shown) for position alignment is formed in an area close to the outer circumference of the carrier substrate 81W.

A front side flat part 171 above the carrier substrate 81W and a back side flat part 172 below the carrier substrate 81W have a flat surface that is formed to flat to the extent at which plasma bonding performed in the subsequent process can be possible. The thickness of the carrier substrate 81W is used as a spacer for determining a distance between lenses when division is finally performed for the substrate with lenses 41 and superimposition with other substrates with lenses 41 is performed.

A base material with a low coefficient of thermal expansion (a coefficient of thermal expansion of 10 ppm/° C. or less) is preferably used for the carrier substrate 81W.

Next, as shown in B of FIG. 23, the carrier substrate 81W is disposed on a lower mold 181 in which a plurality of concave optical transfer surfaces 182 are disposed at constant intervals. More specifically, the back side flat part 172 of the carrier substrate 81W and a flat surface 183 of the lower mold 181 are superimposed so that the concave optical transfer surface 182 is positioned inside the through-hole 83 of the carrier substrate 81W. The optical transfer surface 182 of the lower mold 181 is formed to the through-hole 83 of the carrier substrate 81W in one-to-one correspondence. Positions of the carrier substrate 81W and the lower mold 181 in the planar direction are adjusted so that the centers of the optical transfer surface 182 and the through-hole 83 which correspond to each other match in the optical axis direction. The lower mold 181 is formed of a hard mold member, and is formed of, for example, a metal, silicon, quartz, or glass.

Next, as shown in C of FIG. 23, an energy curable resin 191 fills (is dripped) inside the through-hole 83 of the carrier substrate 81W that is superimposed with the lower mold 181. The lens resin part 82 is formed using the energy curable resin 191. Thus, a degassing treatment is preferably performed on the energy curable resin 191 in advance so that no bubbles are included. As the degassing treatment, a vacuum degassing treatment or a degassing treatment using a centrifugal force is preferable. In addition, the vacuum degassing treatment is preferably performed after filling. When the degassing treatment is performed, the lens resin part 82 can be molded without including bubbles.

Next, as shown in D of FIG. 23, an upper mold 201 is disposed on the lower mold 181 and the carrier substrate 81W that are superimposed. In the upper mold 201, a plurality of concave optical transfer surfaces 202 are disposed at constant intervals. In the same manner as when the lower mold 181 is disposed, positioning is performed with high accuracy and the upper mold 201 is then disposed so that the center of the through-hole 83 and the center of the optical transfer surface 202 match in the optical axis direction.

In the height direction that is a vertical direction on the paper surface, according to a control device configured to control an interval between the upper mold 201 and the lower mold 181, the position of the upper mold 201 is fixed so that an interval between the upper mold 201 and the lower mold 181 has a predetermined distance. In this case, a space interposed between the optical transfer surface 202 of the upper mold 201 and the optical transfer surface 182 of the lower mold 181 has the same thickness of the lens resin part 82 (the lens 21) calculated according to an optical design.

Alternatively, as shown in E of FIG. 23, in the same manner as when the lower mold 181 is disposed, a flat surface 203 of the upper mold 201 and the front side flat part 171 of the carrier substrate 81W may be superimposed. In this case, a distance between the upper mold 201 and the lower mold 181 has the same value as the thickness of the carrier substrate 81W, and position alignment with high accuracy in the planar direction and the height direction can be possible.

When an interval between the upper mold 201 and the lower mold 181 is controlled to have a preset distance, in the above-described process in C of FIG. 23, a filling amount of the energy curable resin 191 that is dripped inside the through-hole 83 of the carrier substrate 81W is an amount that is controlled not to overflow a space surrounded by the through-hole 83 of the carrier substrate 81W and the upper mold 201 and the lower mold 181 which are positioned thereabove and therebelow, respectively. Accordingly, it is possible to reduce production costs without wasting the material of the energy curable resin 191.

Subsequently, in the state shown in E of FIG. 23, a curing process of the energy curable resin 191 is performed. For example, the energy curable resin 191 is cured after being left for a predetermined time when heat or UV light is received as energy. During curing, when the upper mold 201 is pushed downward and aligned, it is possible to minimize an amount of deformation due to contraction of the energy curable resin 191.

A thermoplastic resin may be used in place of the energy curable resin 191. In this case, in the state shown in E of FIG. 23, when the upper mold 201 and the lower mold 181 are heated, the energy curable resin 191 is molded into a lens shape and cooled for curing.

Next, as shown in F of FIG. 23, a control device configured to control positions of the upper mold 201 and the lower mold 181 moves the upper mold 201 upward and the lower mold 181 downward, and releases the upper mold 201 and the lower mold 181 from the carrier substrate 81W. When the upper mold 201 and the lower mold 181 are released from the carrier substrate 81W, the lens resin part 82 including the lens 21 is formed inside the through-hole 83 of the carrier substrate 81W.

Here, a fluorine or silicon mold release agent may be applied to the surface of the upper mold 201 and the lower mold 181 in contact with the carrier substrate 81W. According to the application, the carrier substrate 81W can be easily released from the upper mold 201 and the lower mold 181. In addition, as a method of easily performing releasing from a surface in contact with the carrier substrate 81W, various types of coating such as fluorine-containing diamond like carbon (DLC) may be performed.

Next, as shown in G of FIG. 23, the upper surface layer 122 is formed on the surface of the carrier substrate 81W and the lens resin part 82, and the lower surface layer 123 is formed on the back surface of the carrier substrate 81W and the lens resin part 82. Before and after the upper surface layer 122 and the lower surface layer 123 are formed into films, chemical mechanical polishing (CMP) or the like is performed as necessary. Therefore, the front side flat part 171 and the back side flat part 172 of of the carrier substrate 81W may be flattened.

As described above, when the energy curable resin 191 is pressure-molded (imprinted) in the through-hole 83 formed in the carrier substrate 81W using the upper mold 201 and the lower mold 181, the lens resin part 82 can be formed and the substrate with lenses 41 can be produced.

The shape of the optical transfer surface 182 and the optical transfer surface 202 is not limited to the above-described concave shape, but is appropriately determined according to the shape of the lens resin part 82. As shown in FIG. 15, the lenses of the substrates with lenses 41a to 41e may have various shapes derived according to an optical system design. For example, a biconvex shape, a flat concave shape, a flat convex shape, a flat concave shape, a convex meniscus shape, a concave meniscus shape, and a higher-order aspherical shape may be used.

In addition, the optical transfer surface 182 and the optical transfer surface 202 can have shapes such that the shapes of the lenses after formation form a moth-eye structure.

According to the above-described production method, since a variation in distance between the lens resin parts 82 in the planar direction due to curing contraction of the energy curable resin 191 can be prevented with the carrier substrate 81W interposed therebetween, it is possible to control an inter-lens distance with high accuracy. In addition, there is an effect of reinforcing the low-strength energy curable resin 191 with the high-strength carrier substrate 81W. Accordingly, it is possible to provide a lens array substrate in which a plurality of lenses having a favorable handling property are disposed and an effect of preventing warping of the lens array substrate is provided.

<Example in which Shape of Through-Hole is Polygon>

As shown in B of FIG. 19, the planar shape of the through-hole 83 may be a polygon, for example, a rectangle.

Figure 24:
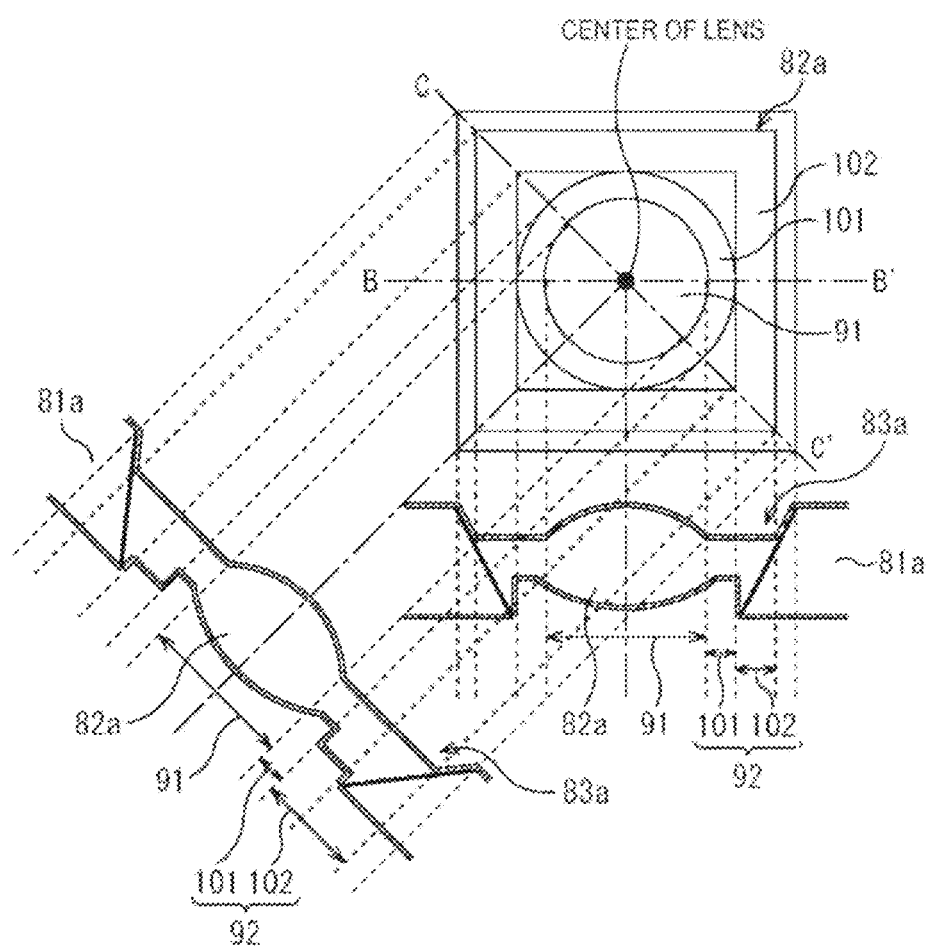
FIG. 24 is a diagram describing a method of producing a substrate with lenses.

FIG. 24 shows a plan view and a cross-sectional view of the carrier substrate 81a and the lens resin part 82a of the substrate with lenses 41a when the planar shape of the through-hole 83 is a rectangle.

The cross-sectional view of the substrate with lenses 41a shown in FIG. 24 is a cross-sectional view taken along the line B-B' and the line C-C' in the plan view.

As can be understood for comparing the cross-sectional view taken along the line B-B' and the cross-sectional view taken along the line C-C', when the through-hole 83a is a rectangle, a distance from the center of the through-hole 83a to the upper outer edge of the through-hole 83a and a distance from the center of the through-hole 83a to the lower outer edge of the through-hole 83a are different in the side directions and the diagonal directions of the rectangular through-hole 83a, and the distance in the diagonal direction is larger than the distance in the side direction. Thus, when the planar shape of the through-hole 83a is a rectangle, if the lens part 91 is formed as a circle, it is necessary to set a distance from the outer circumference of the lens part 91 to the side wall of the through-hole 83a, in other words, the length of the carrying part 92, to a length that is different from those of the rectangle in the side directions and the diagonal directions.

Therefore, the lens resin part 82a shown in FIG. 24 has the following structure. (1) Lengths of the arm part 101 disposed on the outer circumference of the lens part 91 are the same as in the side directions and the diagonal directions of the rectangle. (2) Regarding lengths of the leg part 102 which is disposed outside the arm part 101 and extends to the side wall of the through-hole 83a, the length of the leg part 102 in the diagonal direction is larger than the length of the leg part 102 in the side direction of the rectangle.

As shown in FIG. 24, the leg part 102 is not directly in contact with the lens part 91, but the arm part 101 is directly in contact with the lens part 91.

In the lens resin part 82a in FIG. 24, when the length and the thickness of the arm part 101 in direct contact with the lens part 91 are set to be constant throughout the entire outer circumference of the lens part 91, it is possible to provide a function or effect of supporting the entire lens part 91 without deviation and with a constant force.

Further, when the entire lens part 91 is supported without deviation and with a constant force, for example, if stress is applied from the carrier substrate 81a surrounding the through-hole 83a throughout the entire outer circumference of the through-hole 83a, the stress is transmitted to the entire lens part 91 without deviation. Therefore, a function or effect of preventing transmission of stress biased only toward a specific part of the lens part 91 is provided.

Figure 25:
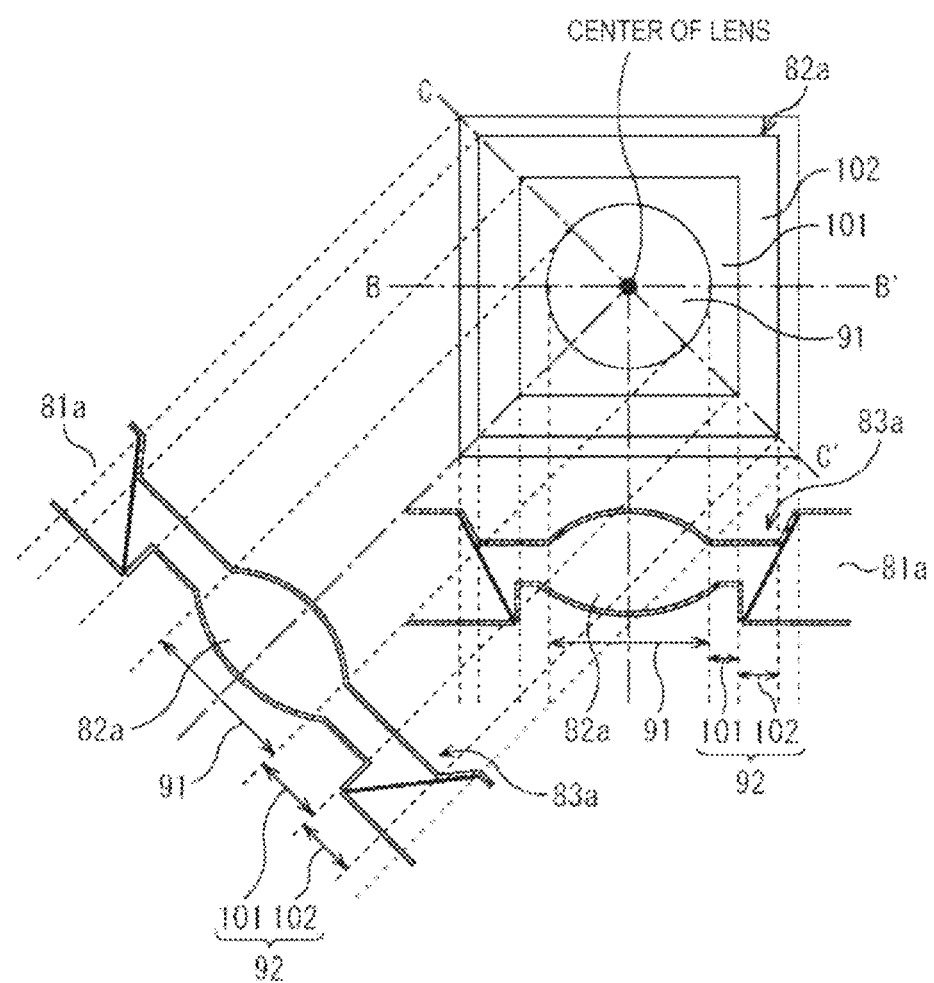
FIG. 25 is a diagram describing a method of producing a substrate with lenses.

FIG. 25 shows another example of the through-hole 83 of which the planar shape is a rectangle, and shows a plan view and a cross-sectional view of the carrier substrate 81a and the lens resin part 82a of the substrate with lenses 41a.

The cross-sectional view of the substrate with lenses 41a shown in FIG. 25 is a cross-sectional view taken along the line B-B' and the line C-C' in the plan view.

In a way similar to FIG. 22, also in FIG. 25, a distance from the center of the through-hole 83a to the upper outer edge of the through-hole 83a and a distance from the center of the through-hole 83a to the lower outer edge of the through-hole 83a are different in the side directions and the diagonal directions of the rectangular through-hole 83a, and the distance in the diagonal direction is larger than the distance in the side direction. Thus, when the planar shape of the through-hole 83a is a rectangle, if the lens part 91 is formed as a circle, it is necessary to set a distance from the outer circumference of the lens part 91 to the side wall of the through-hole 83a, in other words, the length of the carrying part 92, to a length that is different from those of the rectangle in the side directions and the diagonal directions.

Therefore, the lens resin part 82a shown in FIG. 25 has the following structure. (1) Lengths of the leg part 102 disposed on the outer circumference of the lens part 91 are set to be constant along four sides of the rectangle of the through-hole 83a. (2) In order to implement the structure of (1), regarding lengths of the arm part 101, the length of the arm part in the diagonal direction is larger than the length of the arm part in the side direction of the rectangle.

As shown in FIG. 25, the leg part 102 has a thicker resin film thickness than the arm part 101. Thus, the leg part 102 has a larger volume per unit area of the substrate with lenses 41a in the planar direction than the arm part 101.

In the example in FIG. 25, when the volume of the leg part 102 is set to be as small as possible, and is set to be constant along four sides of the rectangle of the through-hole 83a, for example, if deformation such as resin swelling occurs, there is provided a function or effect of preventing such a change in volume as much as possible and preventing a change in volume from being deviated throughout the entire outer circumference of the lens part 91 as much as possible.

Figure 26:
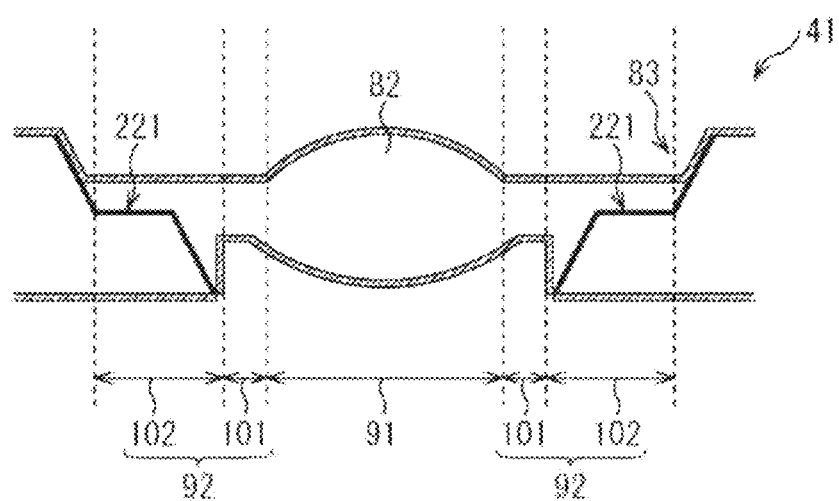
FIG. 26 is a diagram describing a method of producing a substrate with lenses.

FIG. 26 is a cross-sectional view showing another embodiment of the lens resin part 82 and the through-hole 83 of the substrate with lenses 41.

The lens resin part 82 and the through-hole 83 shown in FIG. 26 have the following structure. (1) The side wall of the through-hole 83 has a stepped shape including a stepped part 221. (2) The leg part 102 of the carrying part 92 of the lens resin part 82 is disposed not only above the side wall of the through-hole 83 but also above the stepped part 221 included in the through-hole 83, which extends in the planar direction of the substrate with lenses 41.

A method of forming the through-hole 83 having a stepped shape shown in FIG. 26 will be described with reference to FIG. 27.

Figure 27:
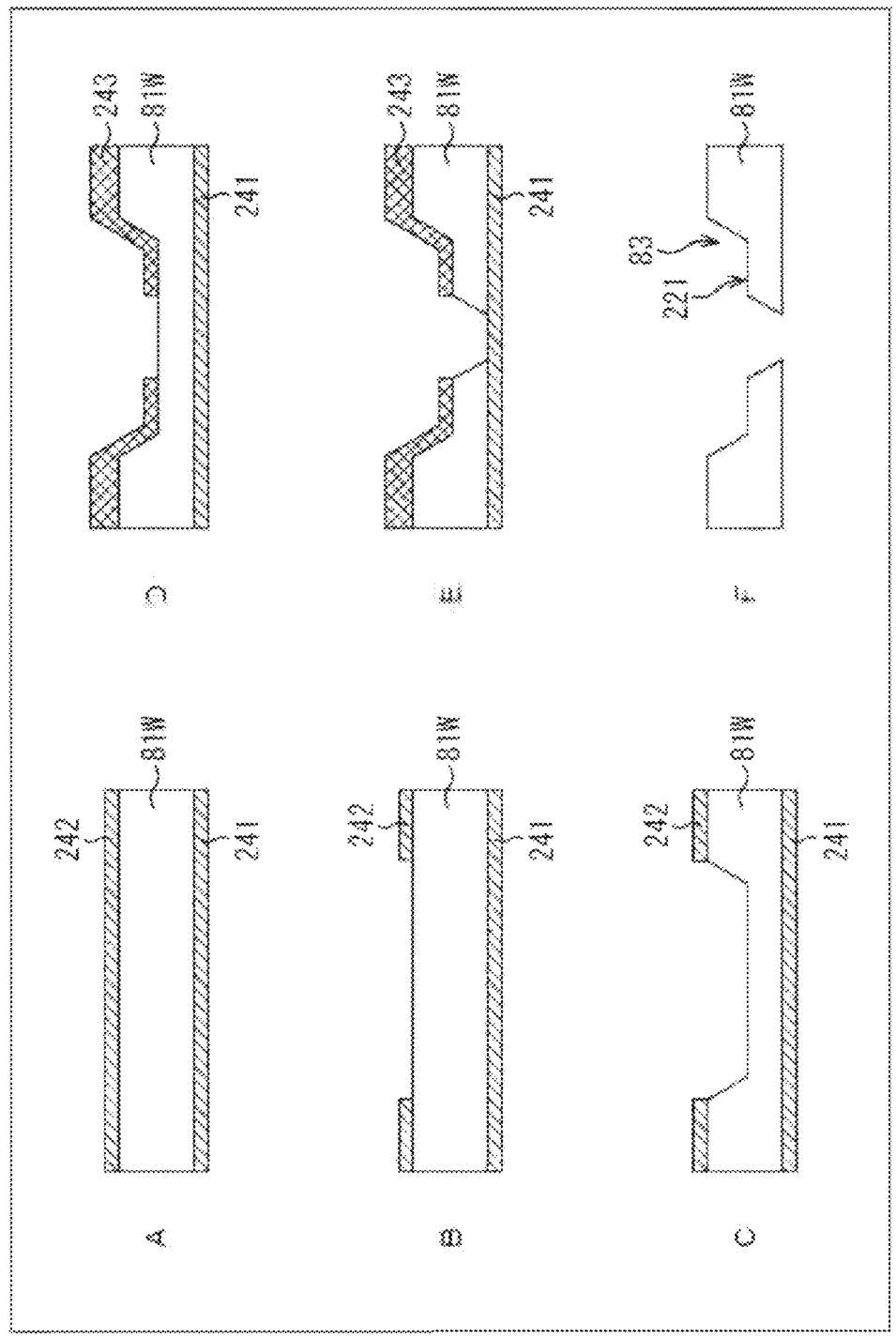
FIG. 27 is a diagram describing a method of producing a substrate with lenses.

First, as shown in A of FIG. 27, on one surface of the carrier substrate 81W, an etching stop film 241 having resistance to wet etching when the through-hole is open is formed. The etching stop film 241 may be, for example, a silicon nitride film.

Next, on the other surface of the carrier substrate 81W, a hard mask 242 having resistance to wet etching when the through-hole is open is formed. The hard mask 242 may also be, for example, a silicon nitride film.

Next, as shown in B of FIG. 27, a predetermined area of the hard mask 242 is open for first etching. In the first etching, a part which becomes an upper portion of the stepped part 221 of the through-hole 83 is etched. Thus, the opening of the hard mask 242 for the first etching is an area corresponding to the opening on the upper substrate surface of the substrate with lenses 41 shown in FIG. 26.

Next, as shown in C of FIG. 27, by wet etching, according to the opening of the hard mask 242, the carrier substrate 81W is etched only to a predetermined depth.

Next, as shown in D of FIG. 27, on the surface of the carrier substrate 81W after etching, a hard mask 243 is formed again. The hard mask 243 is open to correspond to a part which becomes the lower side of the stepped part 221 of the through-hole 83. The hard mask 243 for second etching also can use, for example, a silicon nitride film.

Next, as shown in E of FIG. 27, by wet etching, according to the opening of the hard mask 243, the carrier substrate 81W is etched until it reaches the etching stop film 241.

Finally, as shown in F of FIG. 27, the hard mask 243 on the upper surface of the carrier substrate 81W and the etching stop film 241 on the lower surface thereof are removed.

As described above, when etching of the carrier substrate 81W for forming the through-hole according to wet etching is performed twice, the through-hole 83 having a stepped shape shown in FIG. 26 is obtained.

Figure 28:
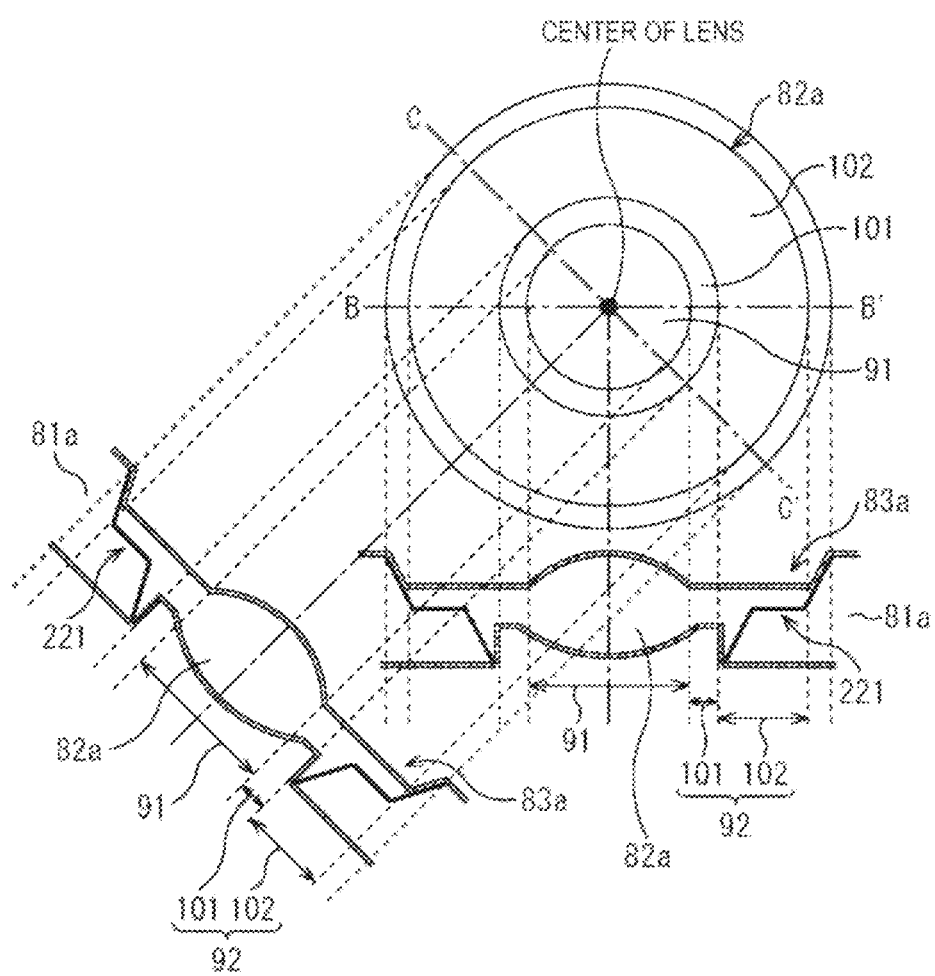
FIG. 28 is a diagram describing a method of producing a substrate with lenses.

FIG. 28 shows a plan view and a cross-sectional view of the carrier substrate 81a and the lens resin part 82a of the substrate with lenses 41a when the through-hole 83a includes the stepped part 221 and the planar shape of the through-hole 83a is a circle.

The cross-sectional view of the substrate with lenses 41a shown in FIG. 28 is a cross-sectional view taken along the line B-B' and the line C-C' in the plan view.

When the planar shape of the through-hole 83a is a circle, the cross-sectional shape of the through-hole 83a is naturally the same irrespective of the direction of the diameter. In addition, the outer edge of the lens resin part 82a, and cross-sectional shapes of the arm part 101 and the leg part 102 are also formed to be the same irrespective of the direction of the diameter.

Comparing the through-hole 83a in FIG. 14 in which no stepped part 221 is provided in the through-hole 83a, the through-hole 83a having a stepped shape in FIG. 28 provides a function or effect of increasing an area of the leg part 102 of the carrying part 92 of the lens resin part 82 in contact with the side wall of the through-hole 83a. In addition, accordingly, there is provided an a function or effect of increasing an adhesion strength between the lens resin part 82 and the side wall of the through-hole 83a, in other words, an adhesion strength between the lens resin part 82a and the carrier substrate 81W.

Figure 29:
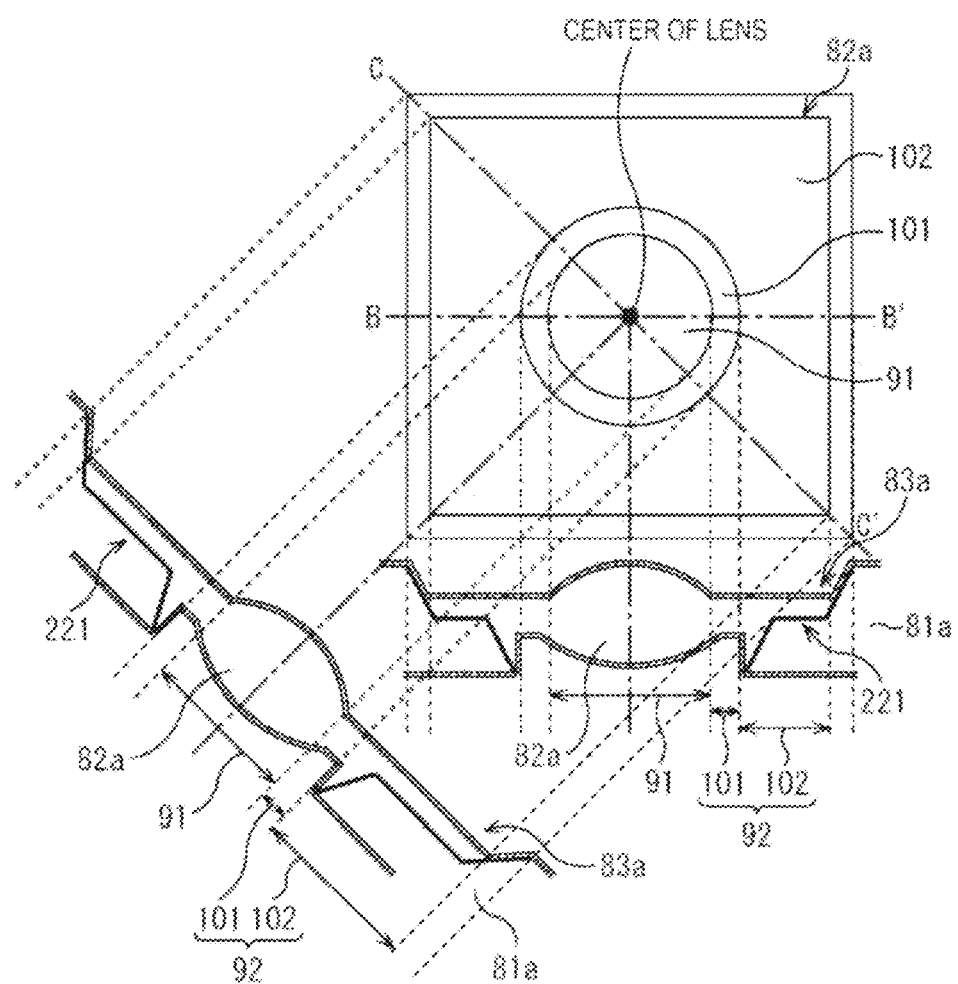
FIG. 29 is a diagram describing a method of producing a substrate with lenses.

FIG. 29 shows a plan view and a cross-sectional view of the carrier substrate 81a and the lens resin part 82a of the substrate with lenses 41a when the through-hole 83a includes the stepped part 221 and the planar shape of the through-hole 83a is a rectangle.

The cross-sectional view of the substrate with lenses 41a shown in FIG. 29 is a cross-sectional view taken along the line B-B' and the line C-C' in the plan view.

The lens resin part 82 and the through-hole 83 shown in FIG. 29 has the following structure.

(1) Lengths of the arm part 101 disposed on the outer circumference of the lens part 91 are the same as in the side directions and the diagonal directions of the rectangle.

(2) Regarding lengths of the leg part 102 which is disposed outside the arm part 101 and extends to the side wall of the through-hole 83a, the length of the leg part 102 in the diagonal direction is larger than the length of the leg part 102 in the side direction of the rectangle.

As shown in FIG. 29, the leg part 102 is not directly in contact with the lens part 91, but the arm part 101 is directly in contact with the lens part 91.

In a way similar to the lens resin part 82a in FIG. 24, in the lens resin part 82a in FIG. 29, when the length and the thickness of the arm part 101 in direct contact with the lens part 91 are set to be constant throughout the entire outer circumference of the lens part 91, it is possible to provide a function or effect of supporting the entire lens part 91 without deviation and with a constant force.

Further, when the entire lens part 91 is supported without deviation and with a constant force, for example, if stress is applied from the carrier substrate 81a surrounding the through-hole 83a throughout the entire outer circumference of the through-hole 83a, the stress is transmitted to the entire lens part 91 without deviation. Therefore, a function or effect of preventing transmission of stress biased only toward a specific part of the lens part 91 is provided.

Further, comparing the through-hole 83a in FIG. 24 or the like in which no stepped part 221 is provided in the through-hole 83a, the structure of the through-hole 83a in FIG. 29 provides a function or effect of increasing an area of the leg part 102 of the carrying part 92 of the lens resin part 82a in contact with the side wall of the through-hole 83a. Accordingly, there is provided a function or effect of increasing an adhesion strength between the lens resin part 82a and the side wall of the through-hole 83a, in other words, an adhesion strength between the lens resin part 82a and the carrier substrate 81a.

11. Direct Bonding Between Substrate with Lenses

Next, direct bonding between the substrates with lenses 41W in a substrate state in which a plurality of substrates with lenses 41 are formed will be described.

Figure 30:
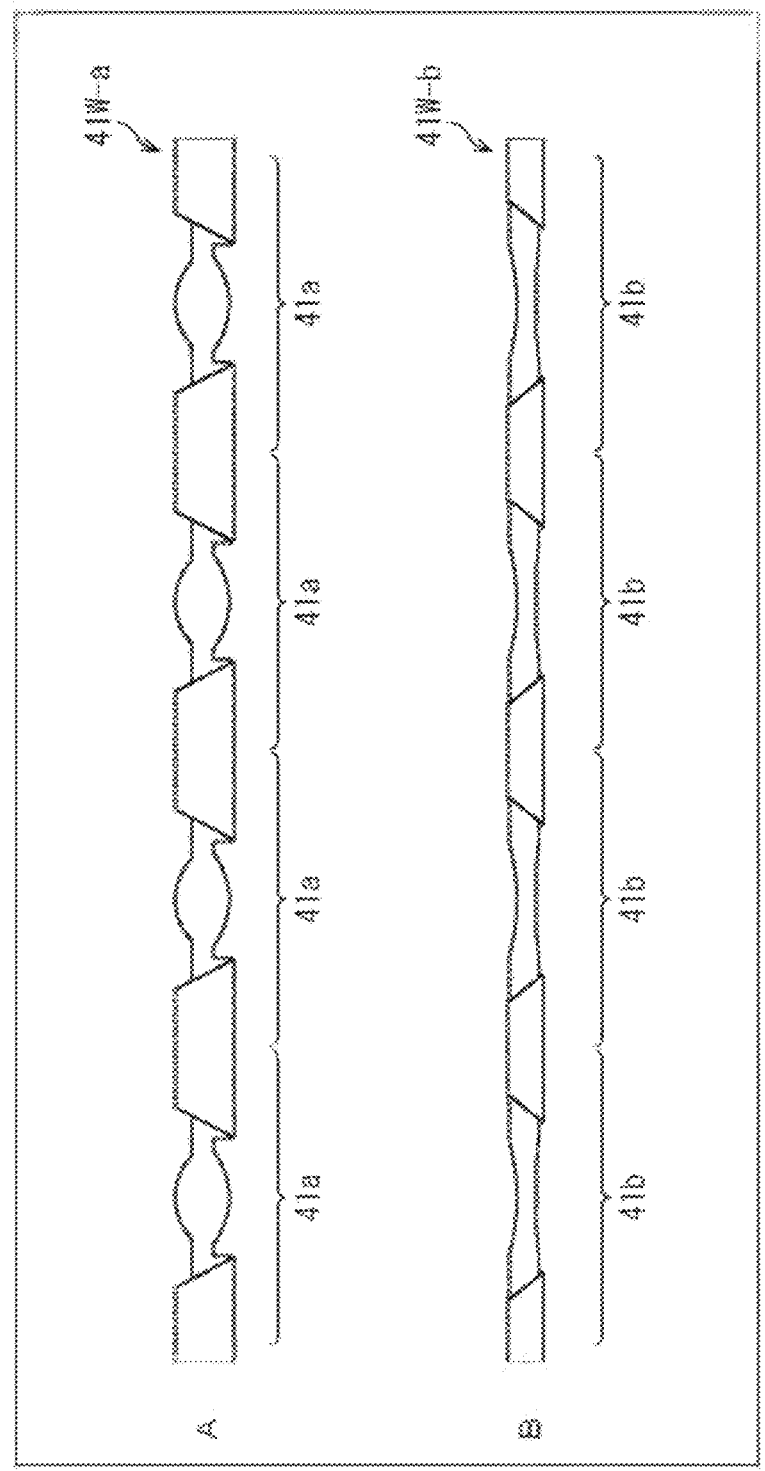
FIG. 30 is a diagram describing bonding between substrates with lenses in a substrate state.

In the following description, as shown in FIG. 30, the substrate with lenses 41W in a substrate state in which the plurality of substrates with lenses 41a are formed will be described as a substrate with lenses 41W-a, and the substrate with lenses 41W in a substrate state in which the plurality of substrates with lenses 41b are formed will be described as a substrate with lenses 41W-b. This rule similarly applies to the other substrates with lenses 41c to 41e.

Direct bonding between the substrate with lenses 41W-a in a substrate state and the substrate with lenses 41W-b in a substrate state will be described with reference to FIG. 31.

Figure 31:
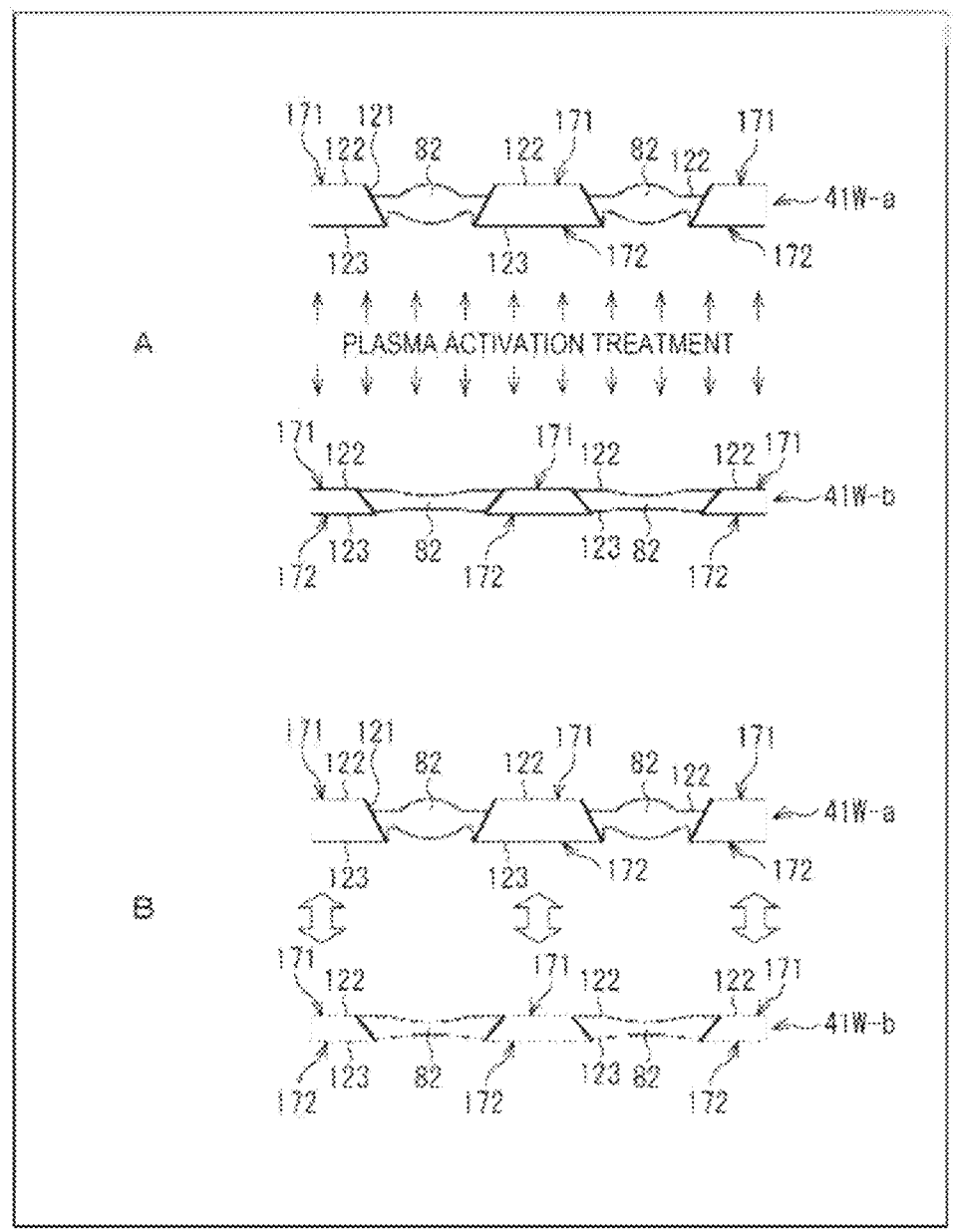
FIG. 31 is a diagram describing bonding between substrates with lenses in a substrate state.

Here, in FIG. 31, parts of the substrate with lenses 41W-b corresponding to parts of the substrate with lenses 41W-a are denoted with the same reference numerals as those of the substrate with lenses 41W-a for description.

On the upper surface of the substrate with lenses 41W-a and the substrate with lenses 41W-b, the upper surface layer 122 or 125 is formed. On the lower surface of the substrate with lenses 41W-a and the substrate with lenses 41W-b, the lower surface layer 123 or 124 is formed. Then, as shown in A of FIG. 31, a plasma activation treatment is performed on the entire lower surface including the back side flat part 172 of the substrate with lenses 41W-a and the entire upper surface including the front side flat part 171 of the substrate with lenses 41W-b which are surfaces of the substrates with lenses 41W-a and 41W-b to be bonded. As a gas used for the plasma activation treatment, any plasma treatment gas such as $O_2$, $N_2$, He, Ar, and $H_2$ can be used. However, when the same gas as the constituent element of the upper surface layer 122 and the lower surface layer 123 is used as a gas used for the plasma activation treatment, this is preferable because it is possible to prevent deterioration of the film themselves of the upper surface layer 122 and the lower surface layer 123.

Then, as shown in B of FIG. 31, the back side flat part 172 of the substrate with lenses 41W-a and the front side flat part 171 of the substrate with lenses 41W-b which are in an activated surface state adhere to each other.

According to a treatment for adhering the substrates with lenses, a hydrogen bond is formed between hydrogen of an OH group on the surface of the lower surface layer 123 or 124 of the substrate with lenses 41W-a and hydrogen of an OH group on the surface of the upper surface layer 122 or 125 of the substrate with lenses 41W-b. Accordingly, the substrate with lenses 41W-a and the substrate with lenses 41W-b are fixed. The treatment for adhering the substrates with lenses is performed under an atmospheric pressure condition.

An annealing treatment is performed on the substrate with lenses 41W-a and the substrate with lenses 41W-b on which the adhering treatment is performed. Accordingly, dehydration condensation occurs in a state in which OH groups form a hydrogen bond, and a covalent bond is formed between the lower surface layer 123 or 124 of the substrate with lenses 41W-a and the upper surface layer 122 or 125 of the substrate with lenses 41W-b through oxygen. Alternatively, an element included in the lower surface layer 123 or 124 of the substrate with lenses 41W-a and an element included in the upper surface layer 122 or 125 of the substrate with lenses 41W-b form a covalent bond. According to this bond, the two substrates with lenses are firmly fixed. In this manner, a covalent bond is formed between the lower surface layer 123 or 124 of the substrate with lenses 41W disposed on the upper side and the upper surface layer 122 or 125 of the substrate with lenses 41W disposed on the lower side, and accordingly the two substrates with lenses 41W are fixed, which is called direct bonding in this specification. In a method of fixing a plurality of substrates with lenses throughout the entire substrate surface using a resin disclosed in PTL 1, there is a concern of curing contraction and thermal expansion of the resin and resulting deformation of the lens. On the other hand, in the direct bonding according to an embodiment of the present technology, since no resin is used when the plurality of substrates with lenses 41W are fixed, there is provided an a function or effect of fixing the plurality of substrates with lenses 41W without resulting curing contraction and thermal expansion.

The annealing treatment may also be performed under an atmospheric pressure condition. The annealing treatment may be performed at 100° C. or more, 150° C. or more, or 200° C. or more in order for dehydration condensation. On the other hand, the annealing treatment may be performed at 400° C. or less, 350° C. or less, or 300° C. or less in consideration of protecting the energy curable resin 191 from heat and preventing degassing from the energy curable resin 191 in order to form the lens resin part 82.

If the adhering treatment for the substrates with lenses 41W and the direct bonding treatment for the substrates with lenses 41W are performed under a condition other than the atmospheric pressure condition, when the bonded substrate with lenses 41W-a and substrate with lenses 41W-b are returned to an atmospheric pressure environment, a pressure difference occurs between a space between the bonded lens resin part 82 and lens resin part 82 and the outside of the lens resin part 82. Due to this pressure difference, a pressure is applied to the lens resin part 82 and there is a concern of deformation of the lens resin part 82.

When both of the adhering treatment for the substrates with lenses 41W and the direct bonding treatment for the substrates with lenses are performed under an atmospheric pressure condition, there is provided a function or effect of avoiding deformation of the lens resin part 82 which is a concern when bonding is performed under a condition other than the atmospheric pressure condition.

When the substrates on which the plasma activation treatment is performed are directly bonded, in other words, are plasma-bonded, it is possible to reduce flowability and thermal expansion which occur when, for example, a resin is used as an adhesive. Therefore, it is possible to improve the positional accuracy when the substrate with lenses 41W-a and the substrate with lenses 41W-b are bonded.

As described above, the upper surface layer 122 and the lower surface layer 123 are formed into films on the back side flat part 172 of the substrate with lenses 41W-a and the front side flat part 171 of the substrate with lenses 41W-b. The upper surface layer 122 and the lower surface layer 123 easily form a dangling bond according to the plasma activation treatment performed earlier. That is, the lower surface layer 123 formed on the back side flat part 172 of the substrate with lenses 41W-a and the upper surface layer 122 formed on the front side flat part 171 of the substrate with lenses 41W-b have a role of increasing the bonding strength.

In addition, when the upper surface layer 122 or the lower surface layer 123 is formed of an oxide film, since it is not affected by a change in film quality due to plasma ($O_2$), there is provided an effect of preventing corrosion due to plasma for the lens resin part 82.

As described above, the substrate with lenses 41W-a in a substrate state in which the plurality of substrates with lenses 41a are formed and the substrate with lenses 41W-b in a substrate state in which the plurality of substrates with lenses 41b are formed are directly bonded after the surface activation treatment using plasma is performed, in other words, are bonded using plasma bonding.

Figure 32:
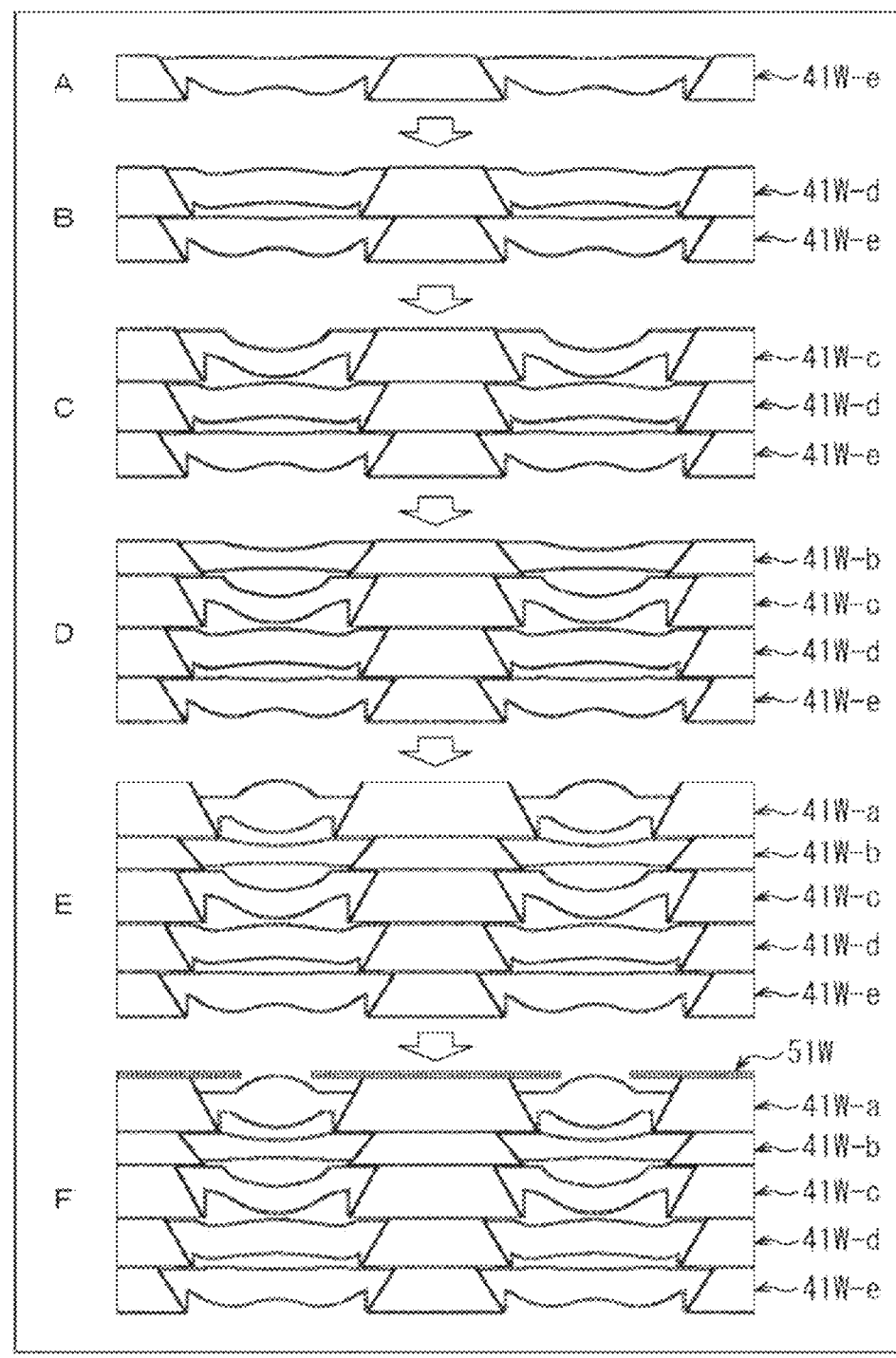
FIG. 32 is a diagram describing a first lamination method in which five substrates with lenses in a substrate state are laminated.

FIG. 32 shows a first lamination method in which the five substrates with lenses 41a to 41e in a substrate state corresponding to the laminated lens structure 11 in FIG. 13 are laminated using a method of bonding the substrates with lenses 41W in a substrate state which has been described with reference to FIG. 31.

First, as shown in A of FIG. 32, the substrate with lenses 41W-e in a substrate state positioned on the lowermost layer in the laminated lens structure 11 is prepared.

Next, as shown in B of FIG. 32, the substrate with lenses 41W-d in a substrate state positioned in the second layer from the bottom in the laminated lens structure 11 is bonded onto the substrate with lenses 41W-e in a substrate state.

Next, as shown in C of FIG. 32, the substrate with lenses 41W-c in a substrate state positioned in the third layer from the bottom in the laminated lens structure 11 is bonded onto the substrate with lenses 41W-d in a substrate state.

Next, as shown in D of FIG. 32, the substrate with lenses 41W-b in a substrate state positioned in the fourth layer from the bottom in the laminated lens structure 11 is bonded onto the substrate with lenses 41W in a substrate state-c.

Next, as shown in E of FIG. 32, the substrate with lenses 41W-a in a substrate state positioned in the fifth layer from the bottom in the laminated lens structure 11 is bonded onto the substrate with lenses 41W-b in a substrate state.

Finally, as shown in F of FIG. 32, the diaphragm plate 51W positioned on the upper layer of the substrate with lenses 41a in the laminated lens structure 11 is bonded onto the substrate with lenses 41W-a in a substrate state.

As described above, when the five substrates with lenses 41W-a to 41W-e in a substrate state are sequentially laminated one by one from the substrate with lenses 41W of the lower layer to the substrate with lenses 41W of the upper layer in the laminated lens structure 11, the laminated lens structure 11W in a substrate state is obtained.

Figure 33:
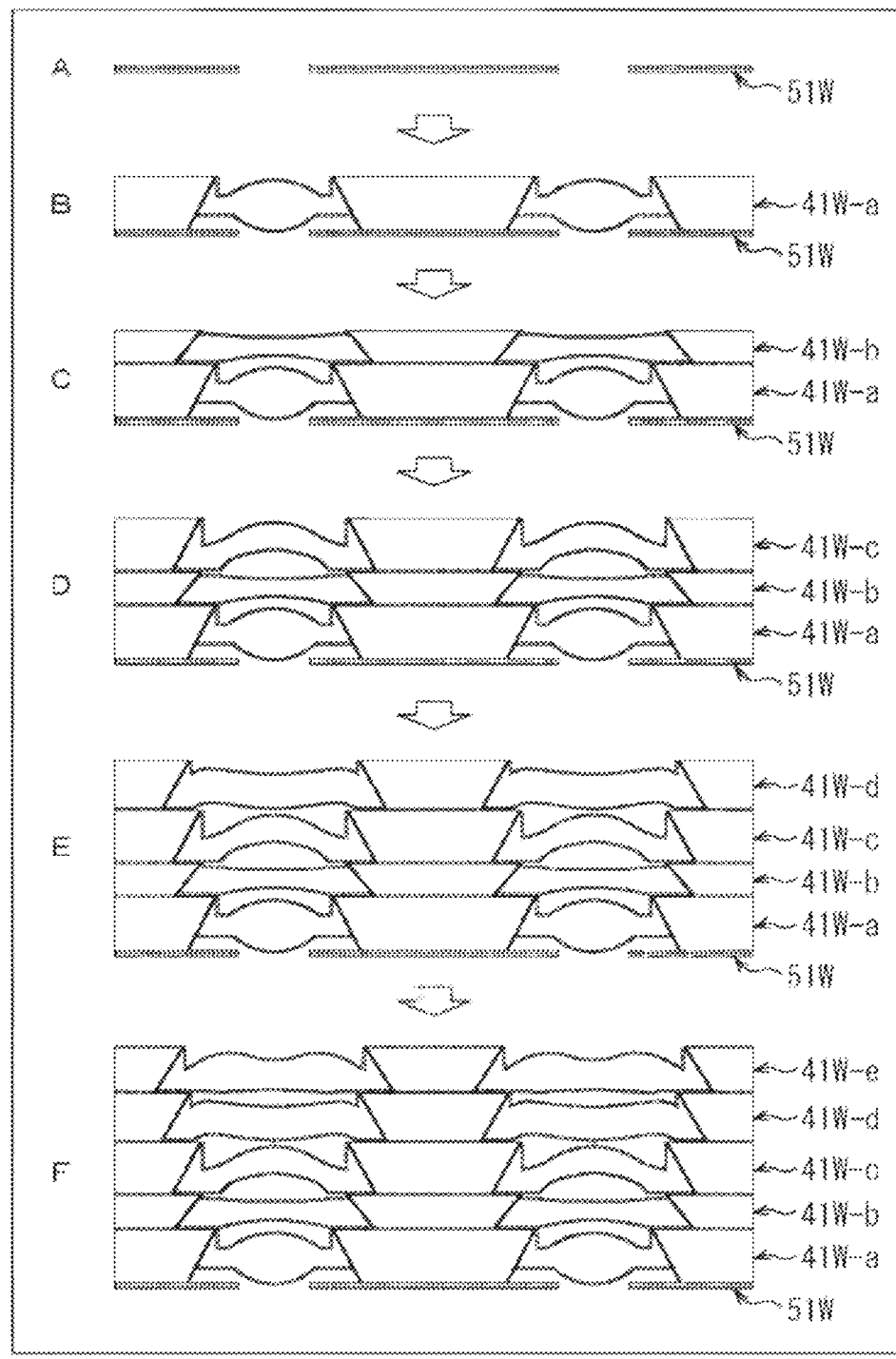
FIG. 33 is a diagram describing a second lamination method in which five substrates with lenses in a substrate state are laminated.

FIG. 33 shows a second lamination method in which the five substrates with lenses 41a to 41e in a substrate state corresponding to the laminated lens structure 11 in FIG. 13 are laminated using a method of bonding the substrates with lenses 41W in a substrate state which has been described with reference to FIG. 31.

First, as shown in A of FIG. 33, the diaphragm plate 51W positioned on the upper layer of the substrate with lenses 41a in the laminated lens structure 11 is prepared.

Next, as shown in B of FIG. 33, the substrate with lenses 41W-a in a substrate state positioned on the uppermost layer in the laminated lens structure 11 is reversed vertically and is bonded onto the diaphragm plate 51W.

Next, as shown in C of FIG. 33, the substrate with lenses 41W-b in a substrate state positioned in the second layer from the top in the laminated lens structure 11 is reversed vertically and is bonded onto the substrate with lenses 41W-a in a substrate state.

Next, as shown in D of FIG. 33, the substrate with lenses 41W-c in a substrate state positioned in the third layer from the top in the laminated lens structure 11 is reversed vertically and is bonded onto the substrate with lenses 41W-b in a substrate state.

Next, as shown in E of FIG. 33, the substrate with lenses 41W-d in a substrate state positioned in the fourth layer from the top in the laminated lens structure 11 is reversed vertically and is bonded onto the substrate with lenses 41W-c in a substrate state.

Finally, as shown in F of FIG. 33, the substrate with lenses 41W-e in a substrate state positioned in the fifth layer from the top in the laminated lens structure 11 is reversed vertically and is bonded onto the substrate with lenses 41W-d in a substrate state.

As described above, when the five substrates with lenses 41W-a to 41W-e in a substrate state are sequentially laminated one by one from the substrate with lenses 41W of the upper layer to the substrate with lenses 41W of the lower layer in the laminated lens structure 11, the laminated lens structure 11W in a substrate state is obtained.

When the five substrates with lenses 41W-a to 41W-e in a substrate state laminated by the lamination method described in FIG. 32 or FIG. 33 are divided into module units or chip units using a blade, a laser, or the like, the laminated lens structure 11 in which the five substrates with lenses 41a to 41e are laminated is obtained.

12. Eighth and Ninth Embodiments of Camera Module

Figure 34:
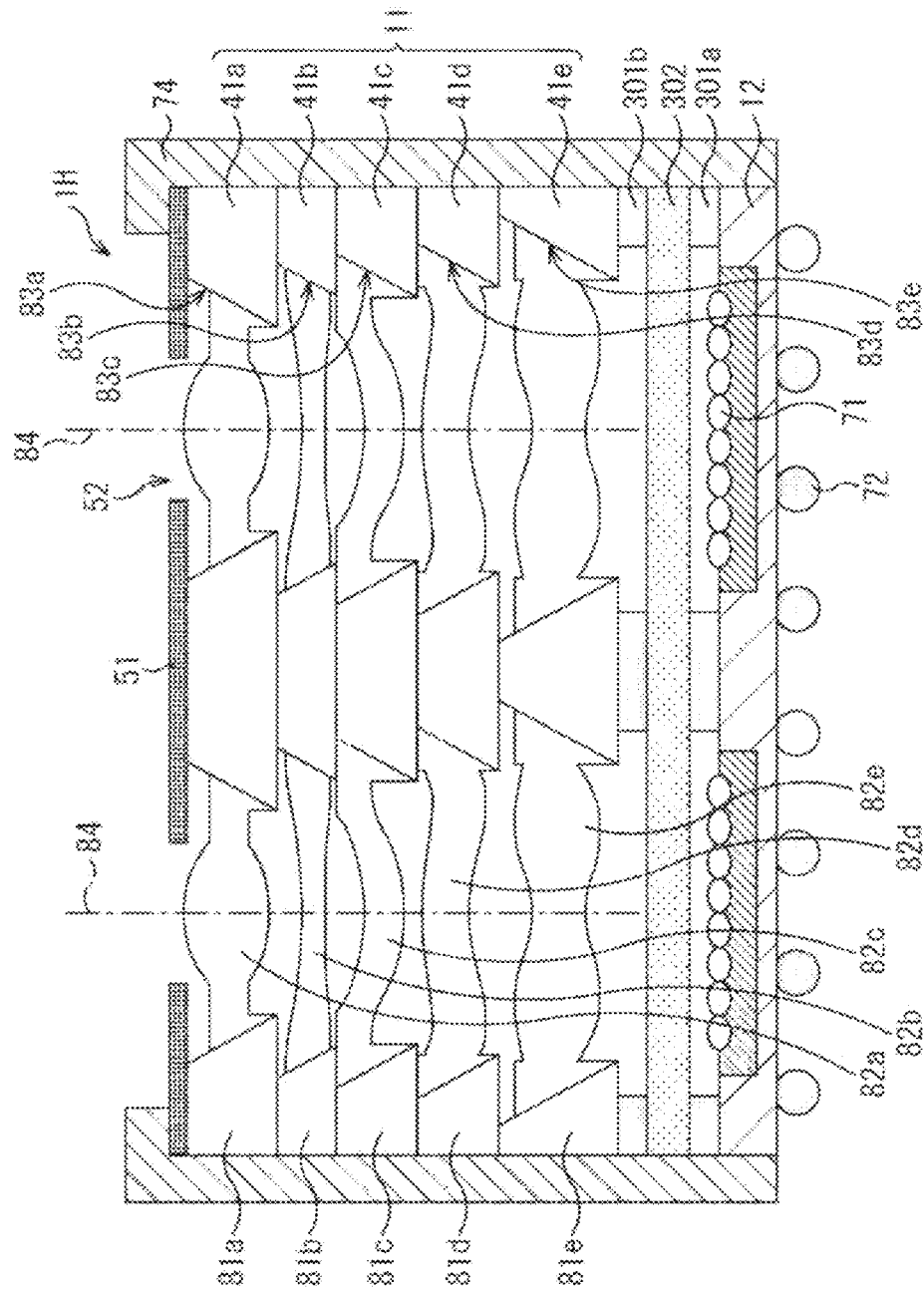
FIG. 34 is a diagram showing an eighth embodiment of a camera module using a laminated lens structure to which the present technology is applied.

FIG. 34 is a diagram showing an eighth embodiment of a camera module using a laminated lens structure to which the present technology is applied.

Figure 35:
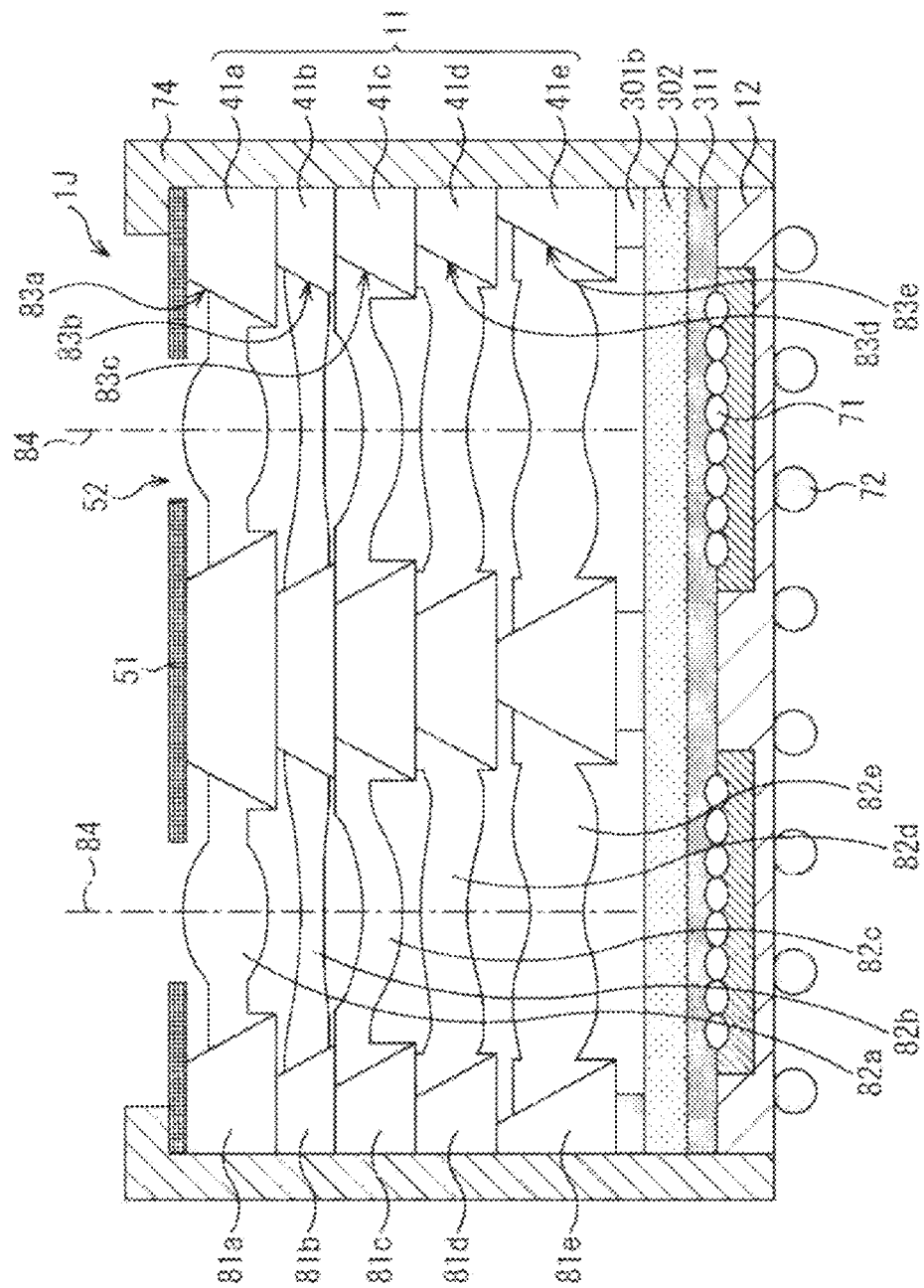
FIG. 35 is a diagram showing a ninth embodiment of a camera module using a laminated lens structure to which the present technology is applied.

FIG. 35 is a diagram showing a ninth embodiment of a camera module using a laminated lens structure to which the present technology is applied.

In description of FIG. 34 and FIG. 35, only parts different from those of the camera module 1D shown in FIG. 13 will be described.

In a camera module 1H in FIG. 34 and a camera module 1J in FIG. 35, parts of the structural material 73 in the camera module 1D shown in FIG. 13 are replaced with different structures.

In the camera module 1H in FIG. 34, parts of the structural material 73 in the camera module 1J are replaced with structural materials 301a and 301b and a light-transmitting substrate 302.

Specifically, the structural material 301a is disposed on a part of the upper side of the light receiving element 12. The light receiving element 12 and the light-transmitting substrate 302 are fixed through the structural material 301a. The structural material 301a is, for example, an epoxy resin.

The structural material 301b is disposed above the light-transmitting substrate 302. The light-transmitting substrate 302 and the laminated lens structure 11 are fixed through the structural material 301b. The structural material 301b is, for example, an epoxy resin.

On the other hand, in the camera module 1J in FIG. 35, a part of the structural material 301a of the camera module 1H in FIG. 34 is replaced with a resin layer 311 having light transmittance.

The resin layer 311 is disposed on the entire upper surface of the light receiving element 12. The light receiving element 12 and the light-transmitting substrate 302 are fixed through the resin layer 311. The resin layer 311 disposed on the entire upper surface of the light receiving element 12 provides a function or effect of, when stress is applied to the light-transmitting substrate 302 from above the light-transmitting substrate 302, preventing the stress from being concentratedly applied to an area of a part of the light receiving element 12 while dispersing the stress to the entire surface of the light receiving element 12 when received.

The structural material 301b is disposed above the light-transmitting substrate 302. The light-transmitting substrate 302 and the laminated lens structure 11 are fixed through the structural material 301b.

The camera module 1H in FIG. 34 and the camera module 1J in FIG. 35 include the light-transmitting substrate 302 above the light receiving element 12. The light-transmitting substrate 302 provides a function or effect of preventing the light receiving element 12 from being scratched, for example, while the camera module 1H or 1J is produced.

13. Tenth Embodiment of Camera Module

Figure 36:
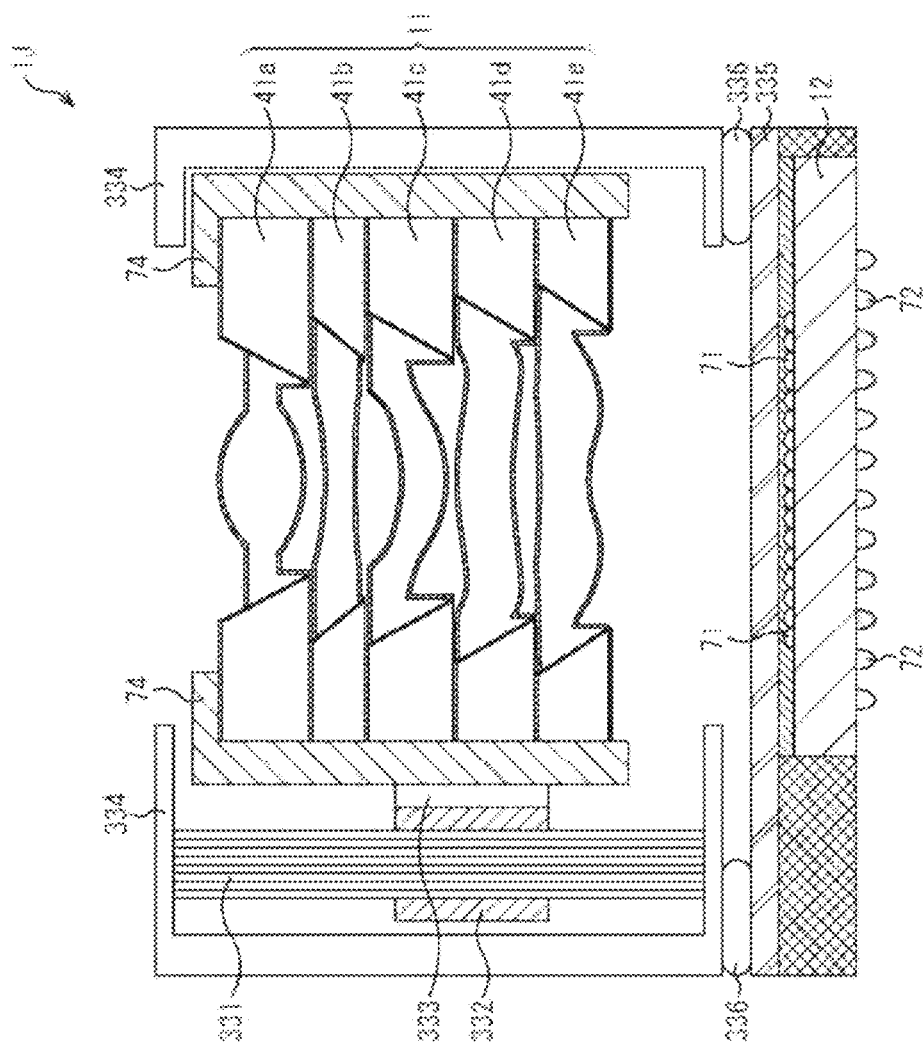
FIG. 36 is a diagram showing a tenth embodiment of a camera module using a laminated lens structure to which the present technology is applied.

FIG. 36 is a diagram showing a tenth embodiment of a camera module using a laminated lens structure to which the present technology is applied.

In the camera module 1J shown in FIG. 36, the laminated lens structure 11 is stored in the lens barrel 74. The lens barrel 74 is fixed by a moving member 332 that moves along a shaft 331, and a fixing member 333. When the lens barrel 74 is moved in an axial direction of the shaft 331 by a drive motor (not shown), a distance from the laminated lens structure 11 to an imaging surface of the light receiving element 12 is adjusted.

The lens barrel 74, the shaft 331, the moving member 332, and the fixing member 333 are stored in a housing 334. A protective substrate 335 is disposed above the light receiving element 12, and the protective substrate 335 and the housing 334 are connected by an adhesive 336.

The mechanism of moving the laminated lens structure 11 provides a function or effect of performing an autofocus operation when a camera using the camera module 1J captures an image.

14. 11th Embodiment of Camera Module

Figure 37:
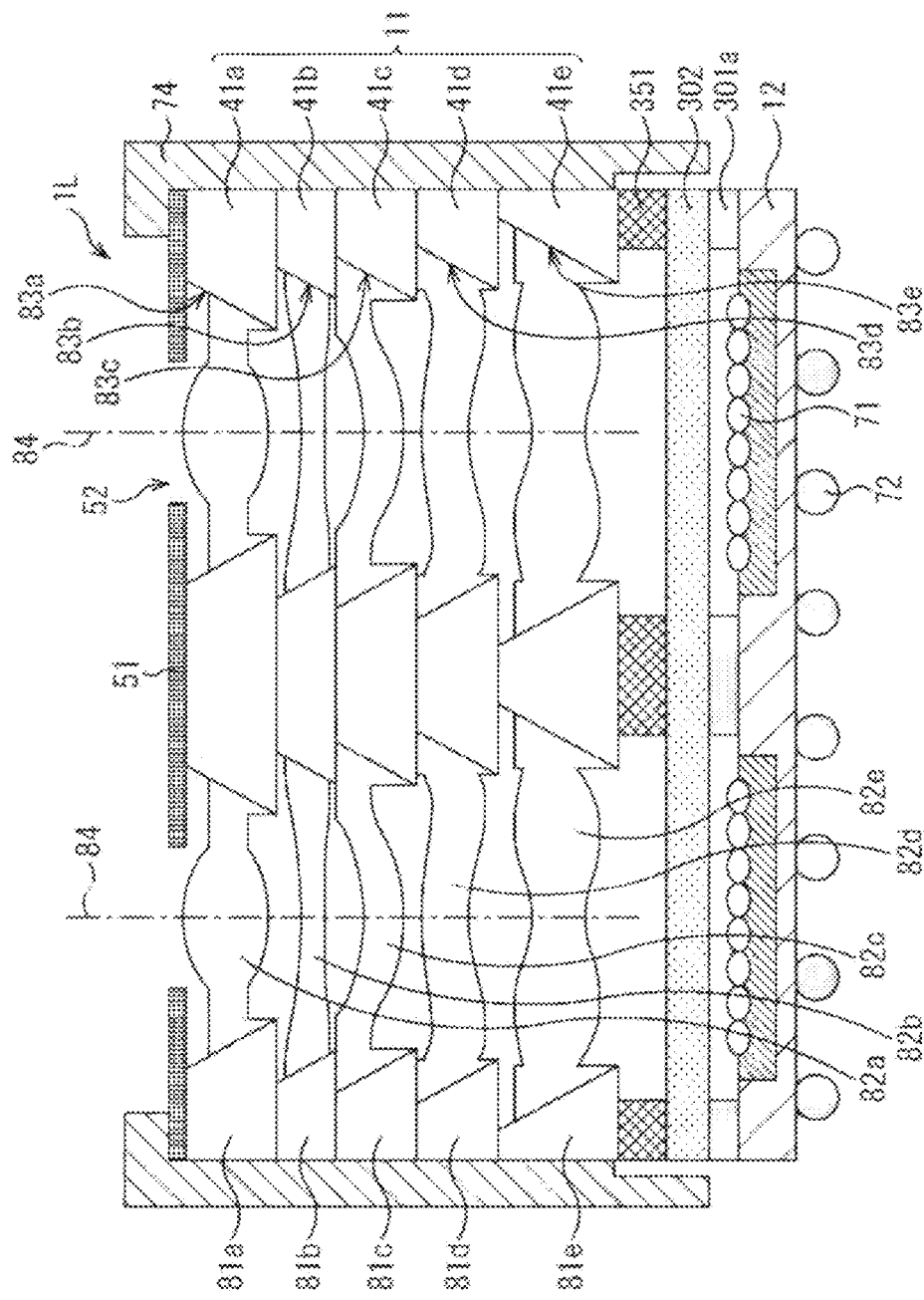
FIG. 37 is a diagram showing an 11th embodiment of a camera module using a laminated lens structure to which the present technology is applied.

FIG. 37 is a diagram showing an 11th embodiment of a camera module using a laminated lens structure to which the present technology is applied.

A camera module 1L in FIG. 37 is a camera module in which a focus adjustment mechanism using a piezoelectric element is added.

That is, in the camera module 1L, similarly to the camera module 1H in FIG. 34, the structural material 301a is disposed on a part of the upper side of the light receiving element 12. The light receiving element 12 and the light-transmitting substrate 302 are fixed through the structural material 301a. The structural material 301a is, for example, an epoxy resin.

A piezoelectric element 351 is disposed above the light-transmitting substrate 302. The light-transmitting substrate 302 and the laminated lens structure 11 are fixed by the piezoelectric element 351.

In the camera module 1L, when a voltage is applied or not applied to the piezoelectric element 351 disposed below the laminated lens structure 11, it is possible to move the laminated lens structure 11 in the vertical direction. A device for moving the laminated lens structure 11 is not limited to the piezoelectric element 351, but another device whose shape is changed according to applying or blocking of a voltage can be used. For example, a MEMS device can be used.

The mechanism of moving the laminated lens structure 11 provides a function or effect of performing an autofocus operation when a camera using the camera module 1L captures an image.

15. Effects of Present Structure Compared to Other Structures

The laminated lens structure 11 is a structure (hereinafter referred to as a present structure) in which the substrates with lenses 41 are fixed by direct bonding. Operations and effects of the present structure will be described in comparison with other structures of substrates with lenses in which lenses are formed.

Comparative Structure Example 1

Figure 38:
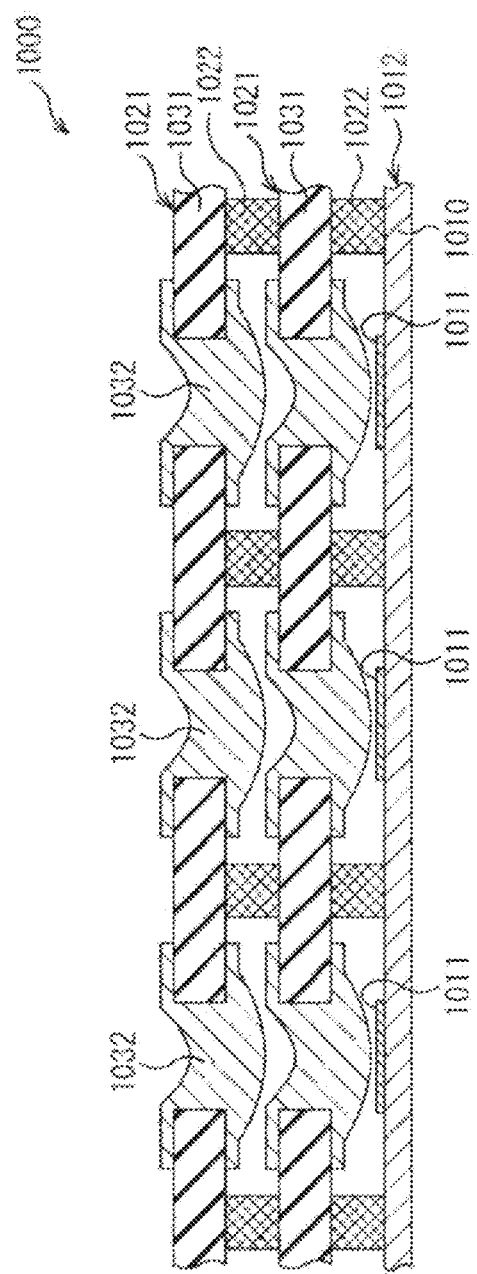
FIG. 38 is a cross-sectional view of a wafer level laminated structure of Comparative Structure Example 1.

FIG. 38 is a cross-sectional view of a wafer level laminated structure disclosed as FIG. 14(b) in JP 2011-138089A (hereinafter referred to as Comparative Document 1), which is a first substrate structure (hereinafter referred to as Comparative Structure Example 1) for comparison with the present structure.

A wafer level laminated structure 1000 shown in FIG. 38 has a structure in which two lens array substrates 1021 are laminated with a columnar spacer 1022 therebetween on a sensor array substrate 1012 in which a plurality of image sensors 1011 are arranged on a wafer substrate 1010. The lens array substrates 1021 each include a substrate with lenses 1031 and a lens 1032 that is formed in a plurality of through-hole parts formed in the substrate with lenses 1031.

Comparative Structure Example 2

Figure 39:
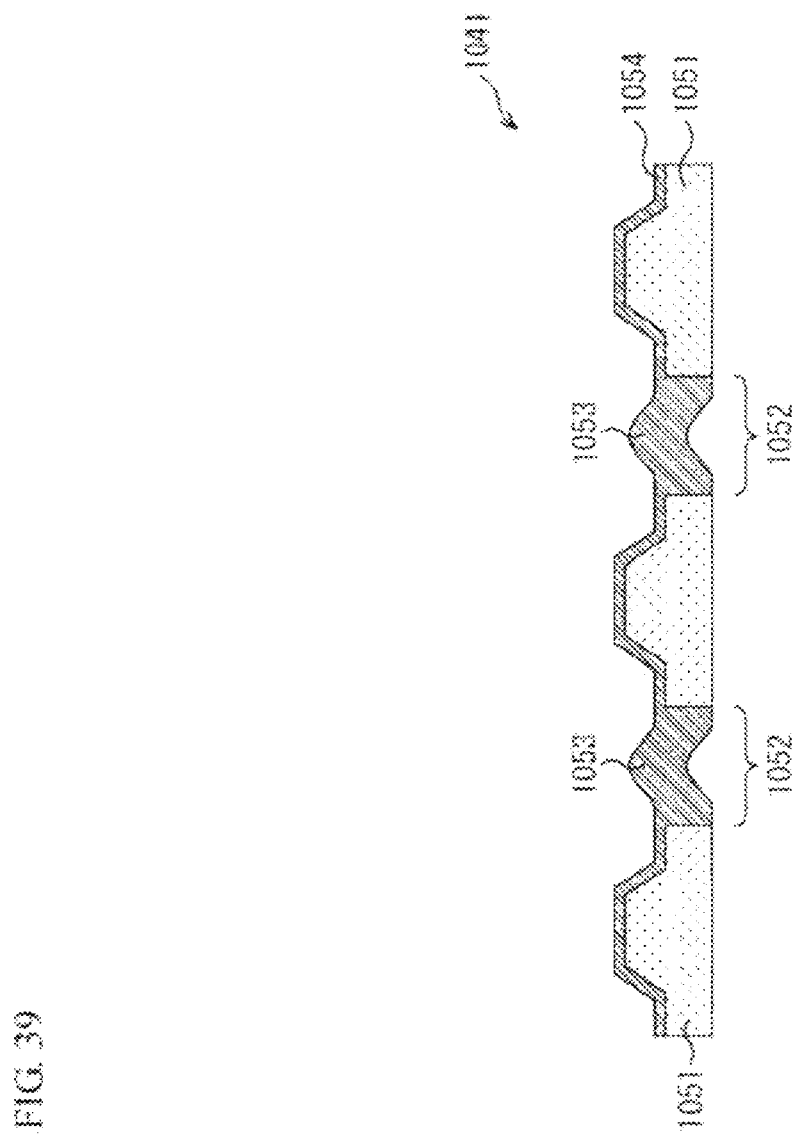
FIG. 39 is a cross-sectional view of a lens array substrate of Comparative Structure Example 2.

FIG. 39 is a cross-sectional view of a lens array substrate disclosed as FIG. 5(*a*) in JP 2009-279790A (hereinafter referred to as Comparative Document 2) which is a second substrate structure (hereinafter referred to as Comparative Structure Example 2) for comparison with the present structure.

In a lens array substrate 1041 shown in FIG. 39, lenses 1053 are provided in a plurality of through-holes 1052 provided in a plate-like substrate 1051. The lenses 1053 are formed in a resin (energy curable resin) 1054, and the resin 1054 is also formed on the upper surface of the substrate 1051.

A method of producing the lens array substrate 1041 in FIG. 39 will be briefly described with reference to FIG. 40.

Figure 40:
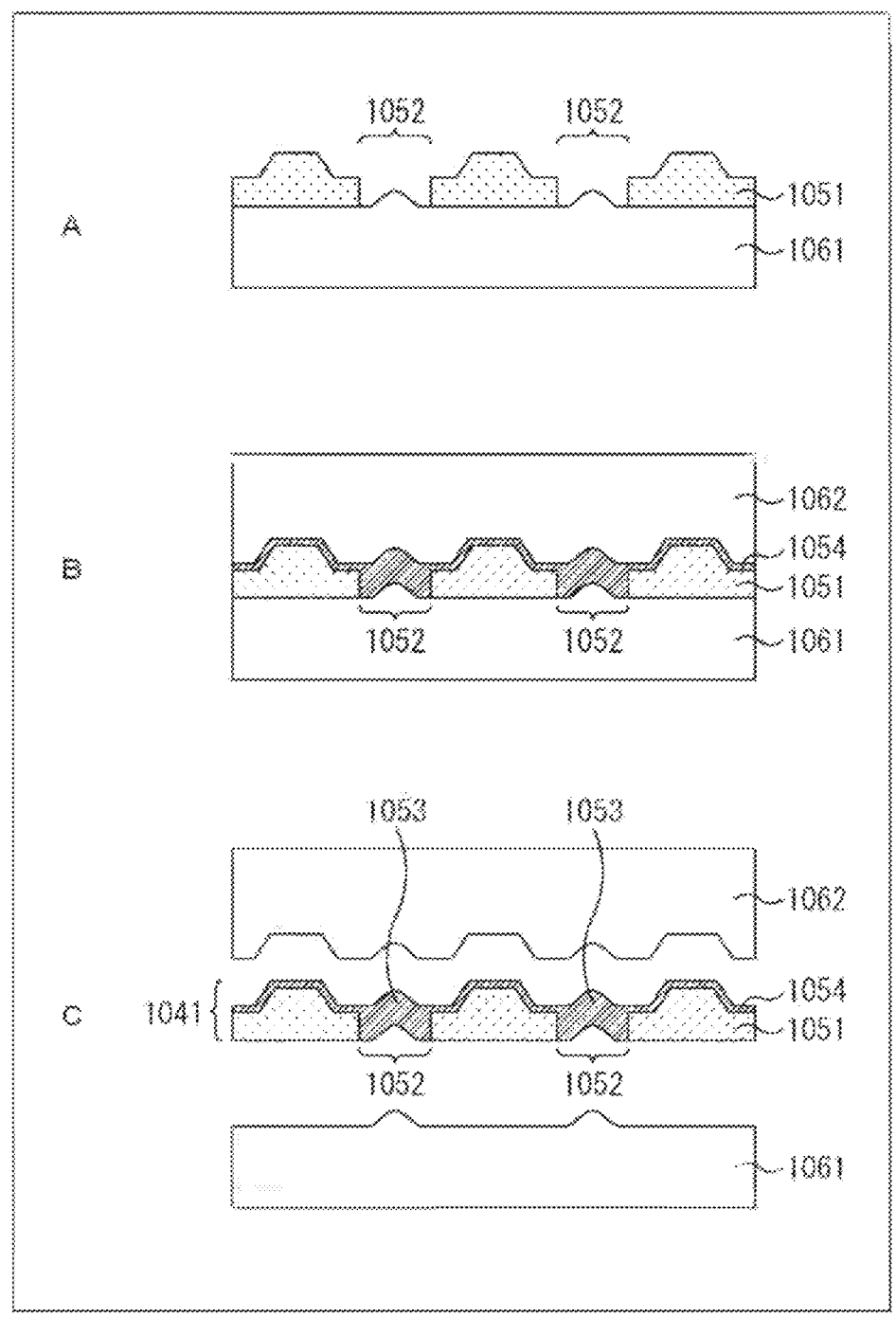
FIG. 40 is a diagram describing a method of producing the lens array substrate in FIG. 39.

A of FIG. 40 shows a state in which the substrate 1051 in which a plurality of through-holes 1052 are formed is placed above a lower mold 1061. The lower mold 1061 is a mold that presses the resin 1054 upward from below in the subsequent process.

B of FIG. 40 shows a state in which, after the resin 1054 is applied to the inside of the plurality of through-holes 1052 and the upper surface of the substrate 1051, an upper mold 1062 is disposed above the substrate 1051, and pressure molding is performed using the upper mold 1062 and the lower mold 1061. The upper mold 1062 is a mold that presses the resin 1054 downward from above. In the state shown in B of FIG. 40, the resin 1054 is cured.

C of FIG. 40 shows a state in which, after the resin 1054 is cured, the upper mold 1062 and the lower mold 1061 are separated from each other, and the lens array substrate 1041 is completed.

The lens array substrate 1041 is characterized by the features that (1) the resin 1054 formed at the position of the through-hole 1052 of the substrate 1051 becomes the lens 1053, and the plurality of lenses 1053 are formed in the substrate 1051, and (2) a thin layer of the resin 1054 is formed on the entire upper surface of the substrate 1051 positioned between the plurality of lenses 1053.

When a structure in which the plurality of lens array substrates 1041 are laminated is formed, the thin layer of the resin 1054 formed on the entire upper surface of the substrate 1051 provides a function or effect as an adhesive for adhering substrates.

In addition, when a structure in which the plurality of lens array substrates 1041 are laminated is formed, since an area in which substrates are adhered is larger than that of the wafer level laminated structure 1000 in FIG. 38 shown as Comparative Structure Example 1, it is possible to adhere substrates with a stronger force.

<Operation of Resin in Comparative Structure Example 2>

In Comparative Document 2 in which the lens array substrate 1041 in FIG. 39 which is Comparative Structure Example 2 is disclosed, the following is disclosed as a function of the resin 1054 which becomes the lens 1053.

In Comparative Structure Example 2, an energy curable resin is used as the resin 1054. Then, as an example of the energy curable resin, a photocurable resin is used. When the photocurable resin is used as the energy curable resin, if UV light is emitted to the resin 1054, the resin 1054 is cured. Due to the curing, curing contraction occurs in the resin 1054.

However, according to the structure of the lens array substrate 1041 in FIG. 39, even if curing contraction of the resin 1054 occurs, since the substrate 1051 is interposed between the plurality of lenses 1053, it is possible to prevent a variation in distance between the lenses 1053 due to curing contraction of the resin 1054. Accordingly, it is possible to prevent warping of the lens array substrate 1041 in which the plurality of lenses 1053 are disposed.

Comparative Structure Example 3

Figure 41:
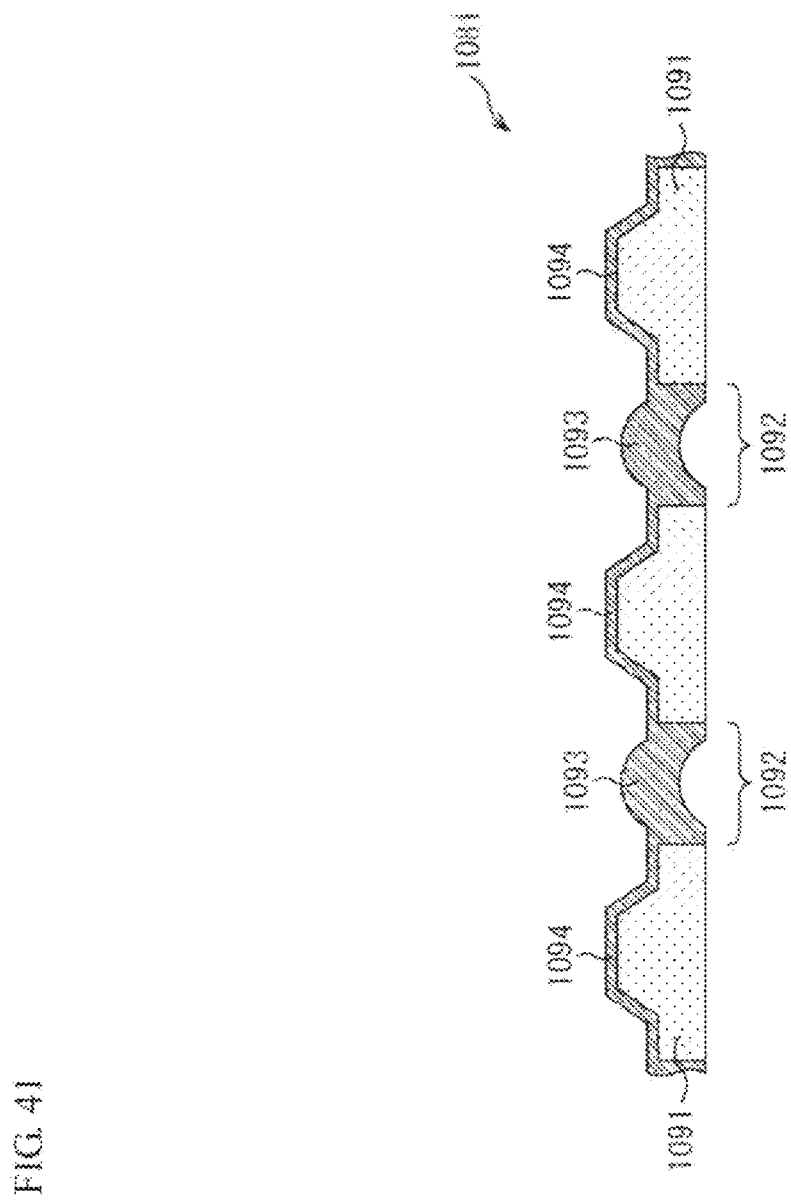
FIG. 41 is a cross-sectional view of a lens array substrate of Comparative Structure Example 3.

FIG. 41 is a cross-sectional view of a lens array substrate disclosed as FIG. 1 in JP 2010-256563A (hereinafter referred to as Comparative Document 3) which is a third substrate structure (hereinafter referred to as Comparative Structure Example 3) for comparison with the present structure.

In a lens array substrate 1081 shown in FIG. 41, lenses 1093 are provided in a plurality of through-holes 1092 provided in a plate-like substrate 1091. The lenses 1093 are formed in a resin (energy curable resin) 1094, and the resin 1094 is also formed on the upper surface of the substrate 1091 without the through-holes 1092.

A method of producing the lens array substrate 1081 in FIG. 41 will be briefly described with reference to FIG. 42.

Figure 42:
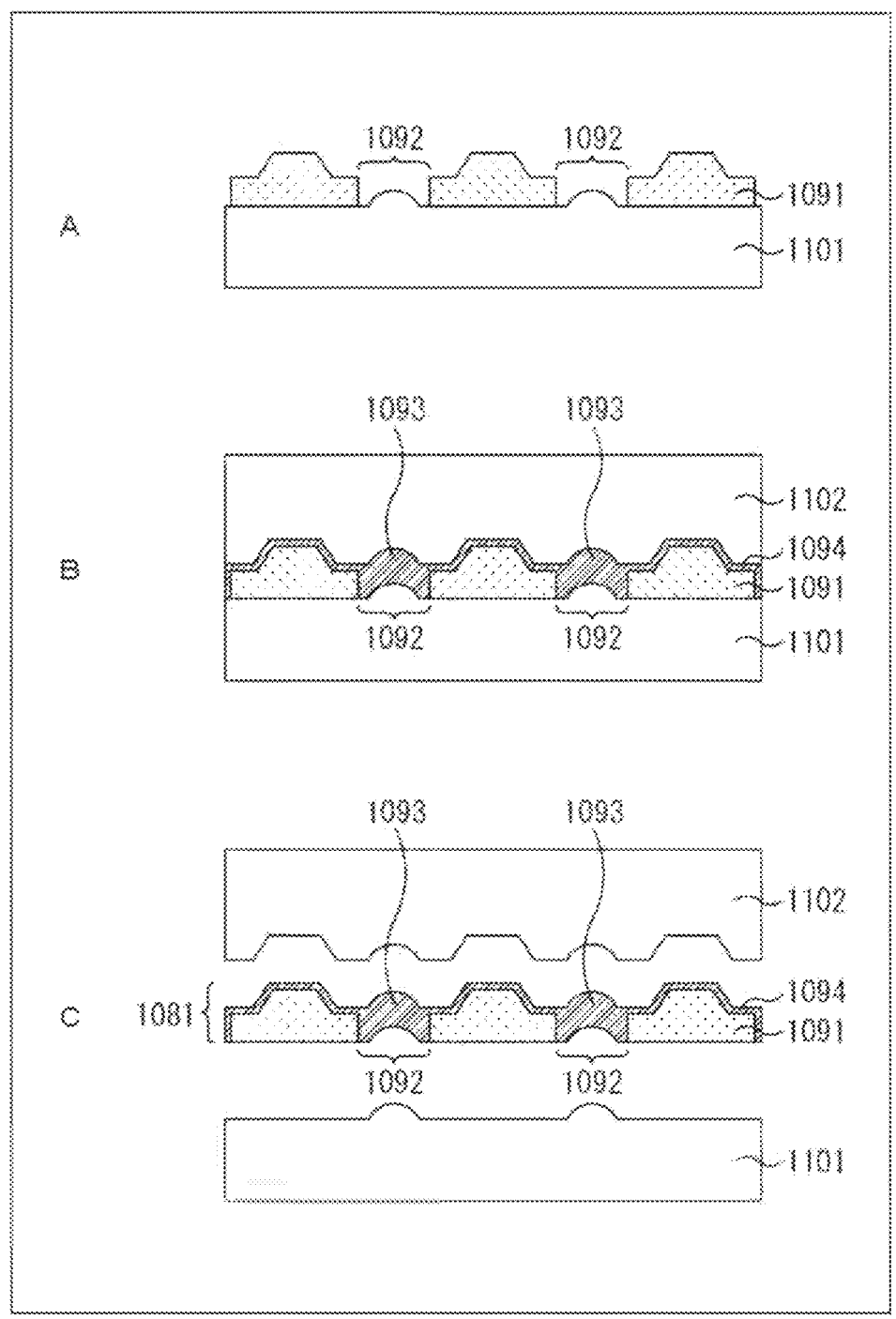
FIG. 42 is a diagram describing a method of producing the lens array substrate in FIG. 41.

A of FIG. 42 shows a state in which the substrate 1091 in which a plurality of through-holes 1092 are formed is placed above a lower mold 1101. The lower mold 1101 is a mold that presses the resin 1094 upward from below in the subsequent process.

B of FIG. 42 shows a state in which, after the resin 1094 is applied to the inside of the plurality of through-holes 1092 and the upper surface of the substrate 1091, an upper mold 1102 is disposed above the substrate 1091, and pressure molding is performed using the upper mold 1102 and the lower mold 1101. The upper mold 1102 is a mold that presses the resin 1094 downward from above. In the state shown in B of FIG. 42, the resin 1094 is cured.

C of FIG. 42 shows a state in which, after the resin 1094 is cured, the upper mold 1102 and the lower mold 1101 are separated from each other, and the lens array substrate 1081 is completed.

The lens array substrate 1081 is characterized by the features that (1) the resin 1094 formed at the position of the through-hole 1092 of the substrate 1091 becomes the lens 1093, and the plurality of lenses 1093 are formed in the substrate 1091, and (2) a thin layer of the resin 1094 is formed on the entire upper surface of the substrate 1091 positioned between the plurality of lenses 1093.

<Operation of Resin in Comparative Structure Example 3>

In Comparative Document 3 in which the lens array substrate 1081 in FIG. 41 which is Comparative Structure Example 3 is disclosed, the following is disclosed as a function of the resin 1094 which becomes the lens 1093.

In Comparative Structure Example 3, an energy curable resin is used as the resin 1094. Then, as an example of the energy curable resin, a photocurable resin is used. When the photocurable resin is used as the energy curable resin, if UV light is emitted to the resin 1094, the resin 1094 is cured. Due to the curing, curing contraction occurs in the resin 1094.

However, according to the structure of the lens array substrate 1081 in FIG. 41, even if curing contraction of the resin 1094 occurs, since the substrate 1091 is interposed between the plurality of lenses 1093, it is possible to prevent a variation in distance between the lenses 1093 due to curing contraction of the resin 1094. Accordingly, it is possible to prevent warping of the lens array substrate 1081 in which the plurality of lenses 1093 are disposed.

As described above, in Comparative Documents 2 and 3, it is disclosed that, when a photocurable resin is cured, curing contraction occurs. Here, the fact that, when the photocurable resin is cured, curing contraction occurs is also disclosed in, for example, JP 2013-1091A, in addition to Comparative Documents 2 and 3.

In addition, when a resin is molded into a lens shape, and the molded resin is cured, curing contraction occurs in the resin. This problem is not limited to the photocurable resin. For example, similarly to the photocurable resin, when a thermosetting resin which is one type of the energy curable resin is cured, there is a problem of curing contraction. This is also disclosed in, for example, Comparative Documents 1 and 3, and JP 2010-204631A.

Comparative Structure Example 4

Figure 43:
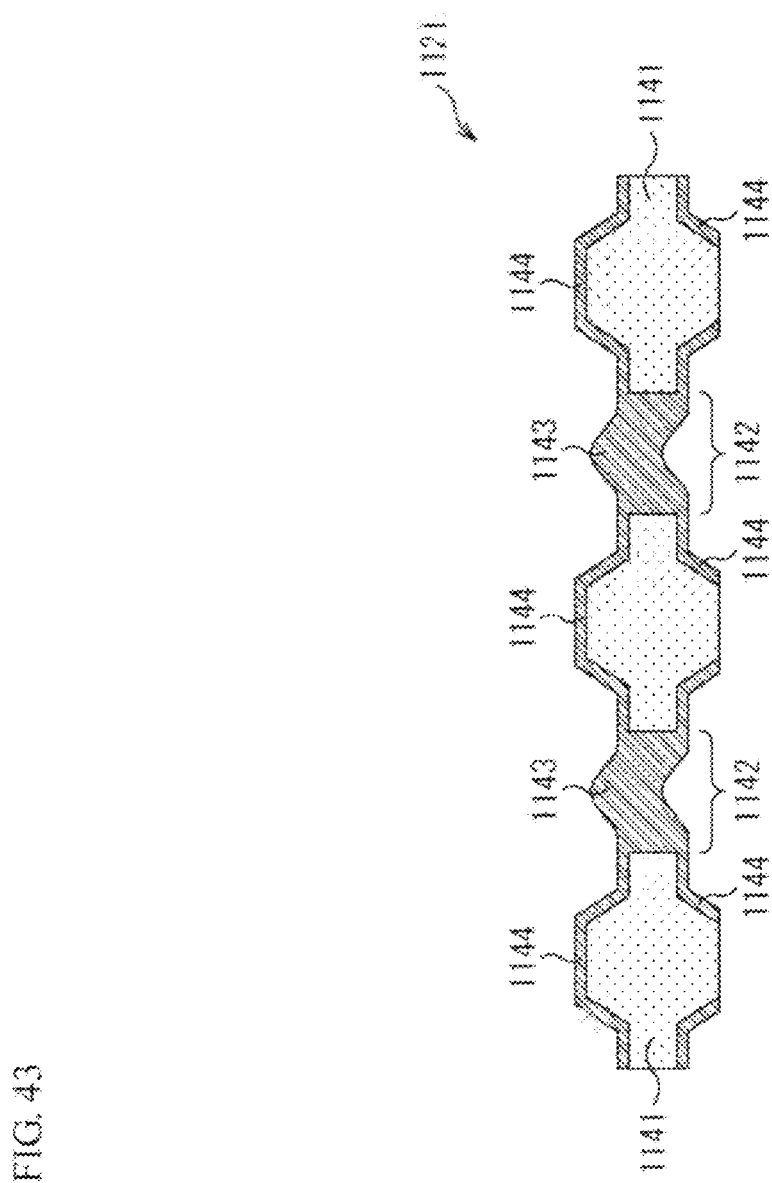
FIG. 43 is a cross-sectional view of a lens array substrate of Comparative Structure Example 4.

FIG. 43 is a cross-sectional view of the lens array substrate disclosed as FIG. 6 in Comparative Document 2 which is a fourth substrate structure (hereinafter referred to as Comparative Structure Example 4) for comparison with the present structure.

A lens array substrate 1121 in FIG. 43 is different from the lens array substrate 1041 shown in FIG. 39 in that the substrate 1141 other than the part of a through-hole 1042 has a shape that protrudes not only upward but also downward and a resin 1144 is also formed in a part of the lower surface of the substrate 1141. The other configuration of the lens array substrate 1121 is the same as that of the lens array substrate 1041 shown in FIG. 39.

Figure 44:
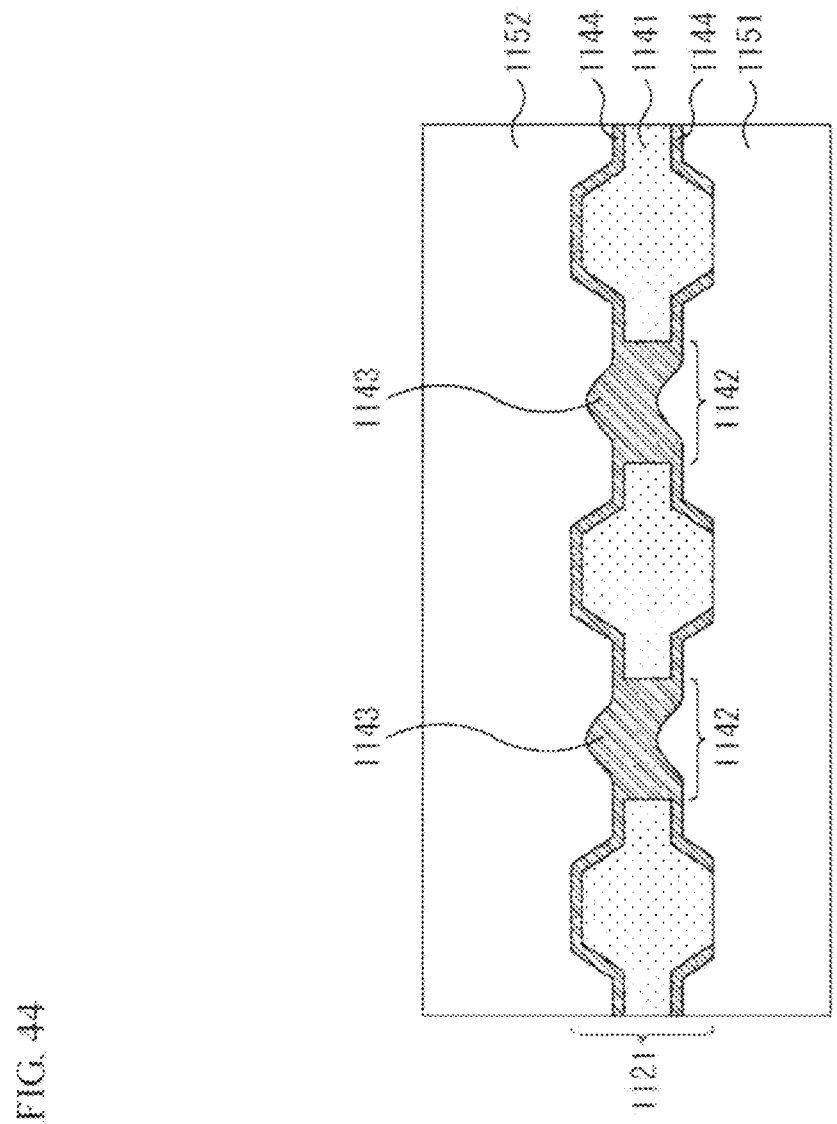
FIG. 44 is a diagram describing a method of producing the lens array substrate in FIG. 43.

FIG. 44 is a diagram describing a method of producing the lens array substrate 1121 in FIG. 43 and is a diagram corresponding to B of FIG. 40.

FIG. 44 shows a state in which the resin 1144 is applied to the inside of a plurality of through-holes 1142 and the upper surface of the substrate 1141 and then pressure molding is performed using an upper mold 1152 and a lower mold 1151. The resin 1144 is also injected between the lower surface of the substrate 1141 and the lower mold 1151. In the state shown in FIG. 44, the resin 1144 is cured.

The lens array substrate 1121 is characterized by the features that (1) the resin 1144 formed at the position of the through-holes 1142 of the substrate 1141 becomes a lens 1143 and the plurality of lenses 1143 are formed in the substrate 1141, and (2) not only a thin layer of the resin 1144 is formed on the entire upper surface of the substrate 1141 positioned between the plurality of lenses 1143 but also a thin layer of the resin 1144 is formed on a part of the lower surface of the substrate 1141.

<Operation of Resin in Comparative Structure Example 4>

In Comparative Document 2 in which the lens array substrate 1121 in FIG. 43 which is Comparative Structure Example 4 is disclosed, the following is disclosed as a function of the resin 1144 which becomes the lens 1143.

In the lens array substrate 1121 in FIG. 43 which is Comparative Structure Example 4, as the resin 1144, a photocurable resin which is an example of the energy curable resin is used. Then, when UV light is emitted to the resin 1144, the resin 1144 is cured. Due to the curing, similarly to Comparative Structure Examples 2 and 3, curing contraction occurs in the resin 1144.

However, in the lens array substrate 1121 of Comparative Structure Example 4, a thin layer of the resin 1144 is formed not only on the entire upper surface of the substrate 1141 positioned between the plurality of lenses 1143 but also on a certain area of the lower surface of the substrate 1141.

In this manner, according to a structure in which the resin 1144 is formed on both the upper surface and the lower surface of the substrate 1141, it is possible to offset warping directions of the entire lens array substrate 1121.

On the other hand, in the lens array substrate 1041 shown in FIG. 39 as Comparative Structure Example 2, a thin layer of the resin 1054 is formed on the entire upper surface of the substrate 1051 positioned between the plurality of lenses 1053, but a thin layer of the resin 1054 is not formed on the lower surface of the substrate 1051 at all.

Therefore, in the lens array substrate 1121 in FIG. 43, it is possible to provide a lens array substrate with a smaller amount of warp than that of to the lens array substrate 1041 in FIG. 39.

Comparative Structure Example 5

Figure 45:
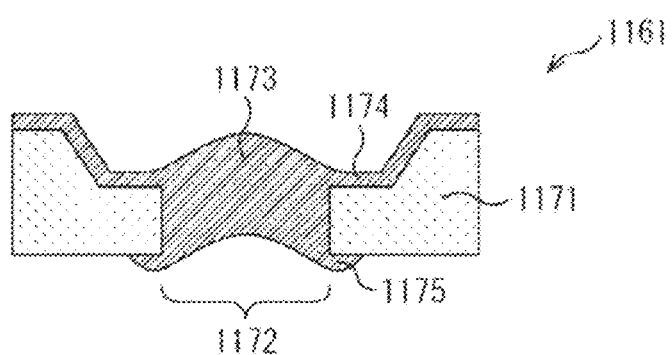
FIG. 45 is a cross-sectional view of a lens array substrate of Comparative Structure Example 5.

FIG. 45 is a cross-sectional view of the lens array substrate disclosed as FIG. 9 in Comparative Document 2 which is a fifth substrate structure (hereinafter referred to as Comparative Structure Example 5) for comparison with the present structure.

A lens array substrate 1161 in FIG. 45 is different from the lens array substrate 1041 shown in FIG. 39 that a back surface of the substrate in the vicinity of a through-hole 1172 formed in a substrate 1171 includes a resin protruding area 1175. The other configuration of the lens array substrate 1161 is the same as that of the lens array substrate 1041 shown in FIG. 39.

Here, the lens array substrate 1161 in FIG. 45 shows a state after being divided into individual units.

The lens array substrate 1161 is characterized by the features that (1) the resin 1174 formed at the position of the through-holes 1172 of the substrate 1171 becomes a lens 1173 and the plurality of lenses 1173 are formed in the substrate 1171, and (2) not only a thin layer of the resin 1174 is formed on the entire upper surface of the substrate 1171 positioned between the plurality of lenses 1173 but also a thin layer of the resin 1174 is formed on a part of the lower surface of the substrate 1141.

<Operation of Resin in Comparative Structure Example 5>

In Comparative Document 2 in which the lens array substrate 1161 in FIG. 45 which is Comparative Structure Example 5 is disclosed, the following is disclosed as a function of the resin 1174 which becomes the lens 1173.

In the lens array substrate 1161 in FIG. 45 which is Comparative Structure Example 5, as the resin 1174, a photocurable resin which is an example of the energy curable resin is used. Then, when UV light is emitted to the resin 1174, the resin 1174 is cured. Due to the curing, similarly to Comparative Structure Examples 2 and 3, curing contraction occurs in the resin 1174.

However, in the lens array substrate 1171 of Comparative Structure Example 5, a thin layer (the resin protruding area 1175) of the resin 1174 is formed not only on the entire upper surface of the substrate 1171 positioned between the plurality of lenses 1173 but also on a certain area of the lower surface of the substrate 1171. Accordingly, it is possible to offset warping directions of the entire lens array substrate 1171 and it is possible to provide a lens array substrate with a smaller amount of warp.

<Comparison of Operations of Resin in Comparative Structure Examples 2 to 5>

Operations of a resin in Comparative Structure Examples 2 to 5 are summarized as follows.

(1) As in Comparative Structure Examples 2 and 3, in a structure in which a resin layer is disposed on the entire upper surface of the lens array substrate, warping occurs in the substrate in which a plurality of lenses are disposed.

Figure 46:
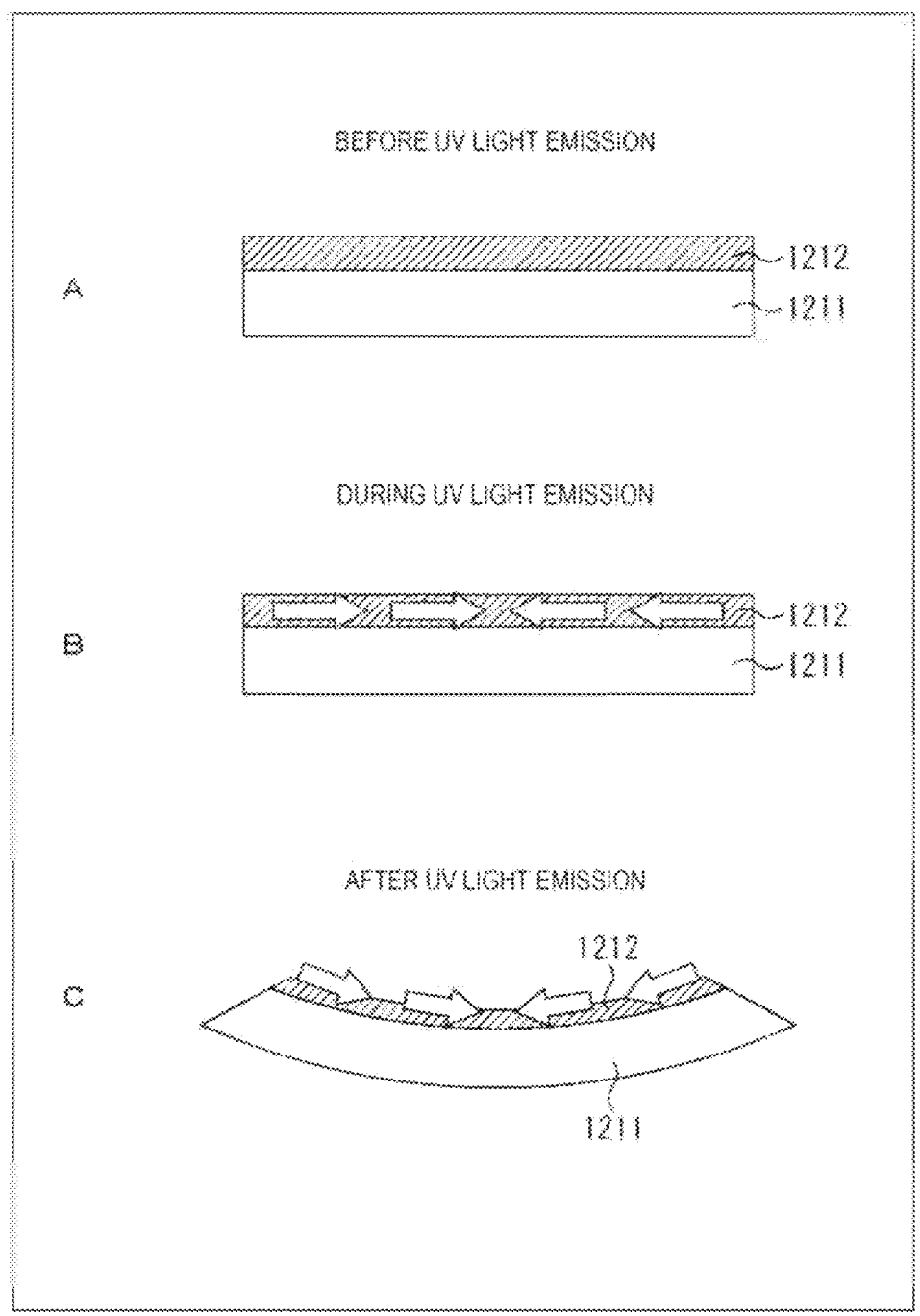
FIG. 46 is a diagram describing a function of a resin that becomes a lens.

FIG. 46 is a diagram schematically showing a structure in which a resin layer is disposed on the entire upper surface of the lens array substrate as in Comparative Structure Examples 2 and 3 and is a diagram describing a function of a resin that becomes a lens.

As shown in A and B of FIG. 46, in a layer of a photocurable resin 1212 disposed on the upper surface of a lens array substrate 1211 (lenses and through-holes are not shown), curing contraction occurs due to UV light emission for curing. Accordingly, a force in the contraction direction due to the photocurable resin 1212 is generated in the layer of the photocurable resin 1212.

On the other hand, even if UV light is emitted, the lens array substrate 1211 itself does not contract or expand. That is, no force due to the substrate is generated in the lens array substrate 1211 itself. As a result, the lens array substrate 1211 warps in a downward convex shape as shown in C of FIG. 46.

(2) However, as in Comparative Structure Examples 4 and 5, in a structure in which a resin layer is disposed on both the upper surface and the lower surface of the lens array substrate, since warping directions of the lens array substrate are offset, it is possible to reduce an amount of warp of the lens array substrate compared to Comparative Structure Examples 2 and 3.

Figure 47:
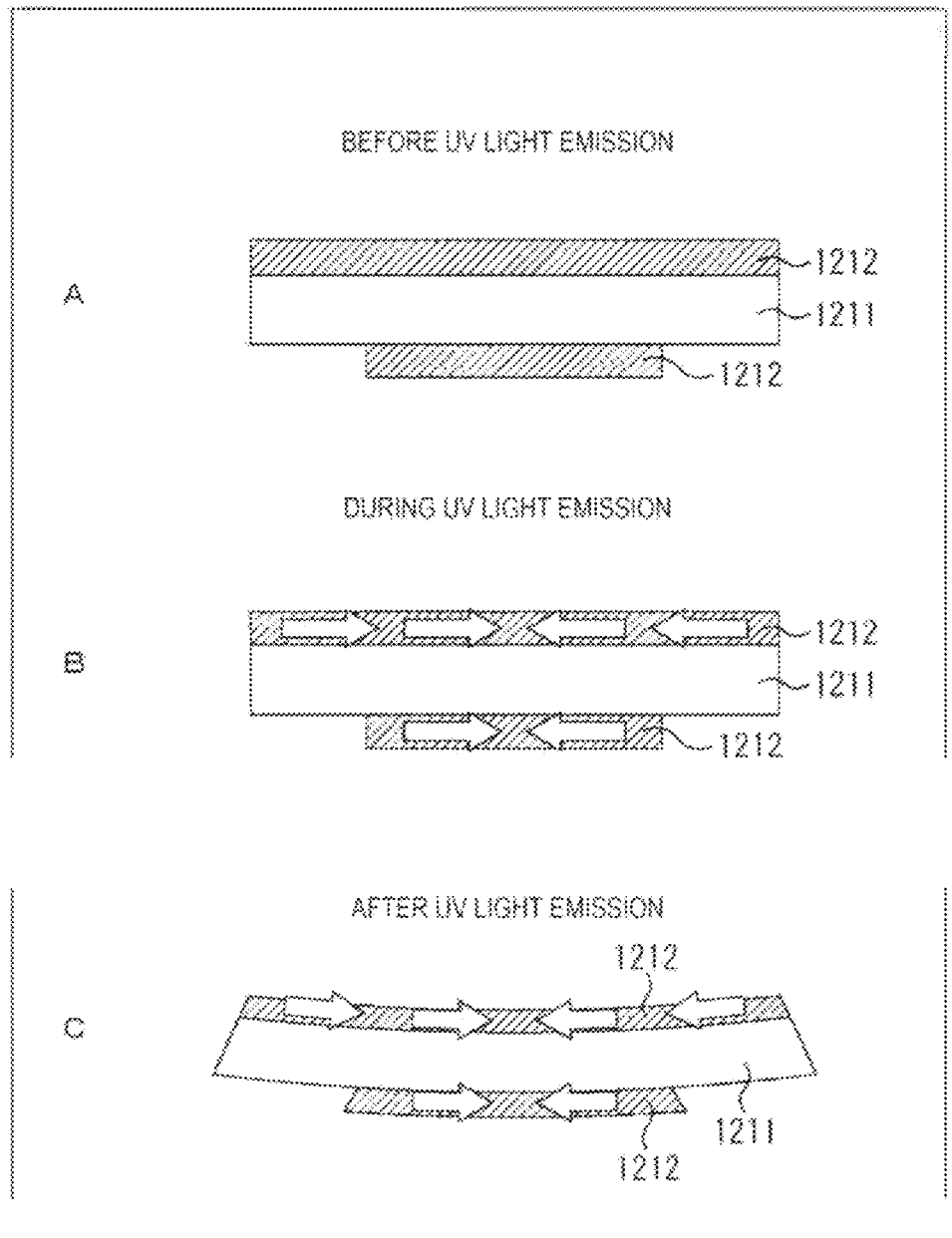
FIG. 47 is a diagram describing a function of a resin that becomes a lens.

FIG. 47 is a diagram schematically showing a structure in which a resin layer is disposed on both the upper surface and the lower surface of the lens array substrate as in Comparative Structure Examples 4 and 5, and is a diagram describing a function of a resin that becomes a lens.

As shown in A and B of FIG. 47, in a layer of a photocurable resin 1212 disposed on the upper surface of a lens array substrate 1211, curing contraction occurs due to UV light emission for curing. Accordingly, a force in the contraction direction due to the photocurable resin 1212 disposed on the upper surface of the lens array substrate 1211 is generated in the layer of the photocurable resin 1212. Therefore, a force that warps the lens array substrate 1211 into a downwardly convex shape acts on the upper surface side of the lens array substrate 1211.

On the other hand, even if UV light is emitted, the lens array substrate 1211 itself does not contract or expand. That is, no force due to the substrate is generated in the lens array substrate 1211 itself.

On the other hand, in a layer of a photocurable resin 1212 disposed on the lower surface of a lens array substrate 1211, curing contraction occurs due to UV light emission for curing. Accordingly, a force in the contraction direction due to the photocurable resin 1212 disposed on the lower surface of the lens array substrate 1211 is generated in the layer of the photocurable resin 1212. Therefore, a force that warps the lens array substrate 1211 into a upwardly convex shape acts on the lower surface side of the lens array substrate 1211.

A force that warps the lens array substrate 1211 into a downwardly convex shape on the upper surface side of the lens array substrate 1211 and a force that warps the lens array substrate 1211 into an upward convex shape on the lower surface side of the lens array substrate 1211 act in an offset manner.

As a result, as shown in C of FIG. 47, an amount of warp of the lens array substrate 1211 in Comparative Structure Examples 4 and 5 is smaller than an amount of warp in Comparative Structure Examples 2 and 3 shown in C of FIG. 46.

As described above, a force that warps the lens array substrate and an amount of warp of the lens array substrate are influenced by a relative relationship between (1) a direction and a magnitude of a force that acts on the lens array substrate on the upper surface of the lens array substrate, and (2) a direction and a magnitude of a force that acts on the lens array substrate on the lower surface of the lens array substrate.

Comparative Structure Example 6

Figure 48:
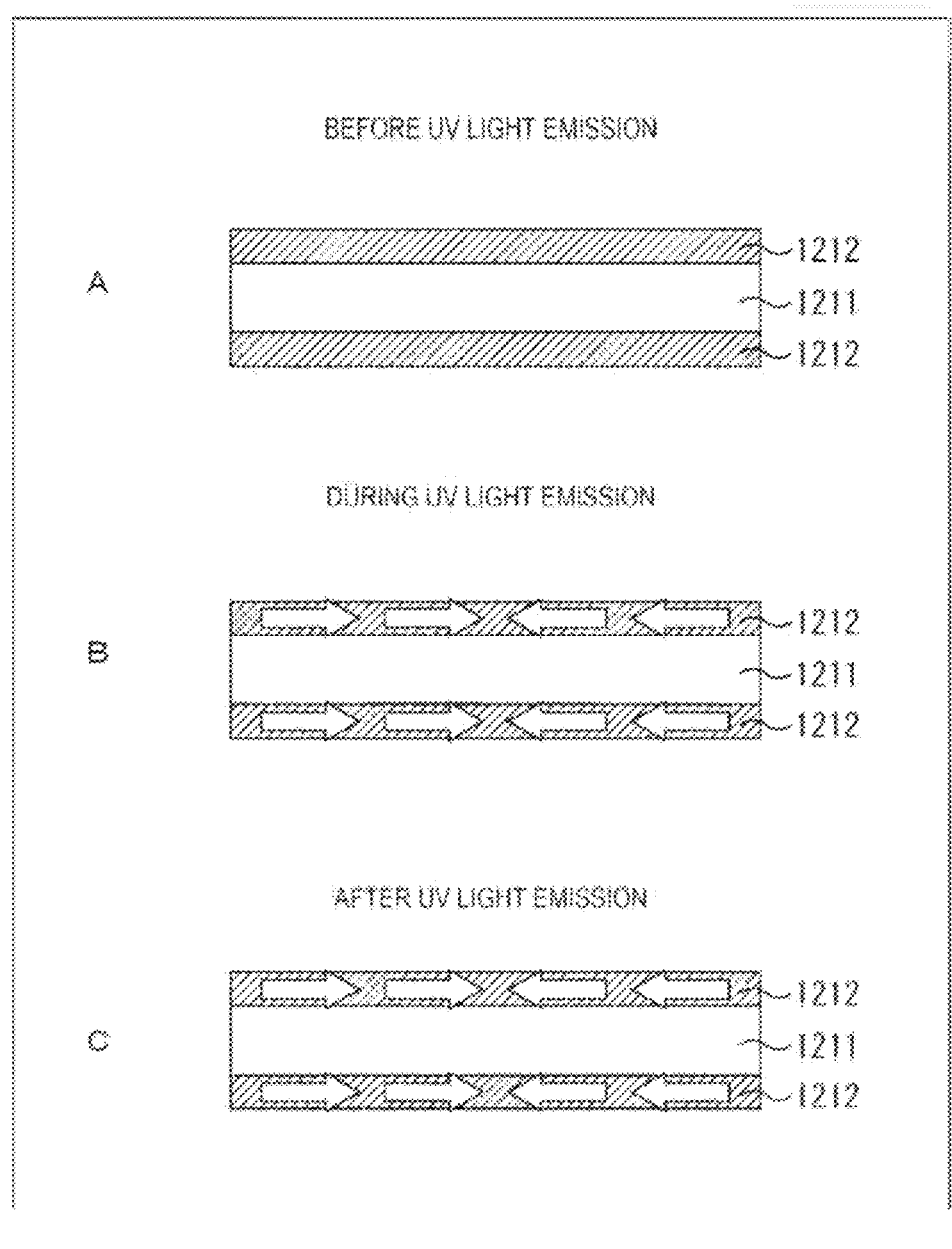
FIG. 48 is a diagram schematically showing a lens array substrate of Comparative Structure Example 6.

Therefore, for example, as shown in A of FIG. 48, a lens array substrate structure in which a layer and an area of the photocurable resin 1212 disposed on the upper surface of the lens array substrate 1211 and a layer and an area of the photocurable resin 1212 disposed on the lower surface of the lens array substrate 1211 are the same is considered. This lens array substrate structure is called a sixth substrate structure (hereinafter referred to as Comparative Structure Example 6) for comparison with the present structure.

In Comparative Structure Example 6, a force in the contraction direction due to the photocurable resin 1212 is generated in a layer of the photocurable resin 1212 disposed on the upper surface of the lens array substrate 1211. No force due to the substrate is generated in the lens array substrate 1211 itself. Therefore, a force that warps the lens array substrate 1211 into a downwardly convex shape acts on the upper surface side of the lens array substrate 1211.

On the other hand, a force in the contraction direction due to the photocurable resin 1212 is generated in a layer of the photocurable resin 1212 disposed on the lower surface of the lens array substrate 1211. No force due to the substrate is generated in the lens array substrate 1211 itself. Therefore, a force that warps the lens array substrate 1211 into a upwardly convex shape acts on the lower surface side of the lens array substrate 1211.

The two forces that warp the lens array substrate 1211 act in a direction in which offset is much more than in the structure shown in A of FIG. 47. As a result, a force that warps the lens array substrate 1211 and an amount of warp of the lens array substrate 1211 are further reduced than those in Comparative Structure Examples 4 and 5.

Comparative Structure Example 7

Incidentally, in practice, the shapes of substrate with lenses constituting the laminated lens structure incorporated into the camera module are not the same. More specifically, in a plurality of substrates with lenses constituting the laminated lens structure, for example, the thicknesses of the substrates with lenses and the sizes of the through-holes may be different, and the thicknesses, the shapes, and the volumes of the lenses formed in the through-holes may be different. Furthermore, the film thickness of the photocurable resin formed on the upper surface and the lower surface of the substrate with lenses may also be different for each substrate with lenses.

Figure 49:
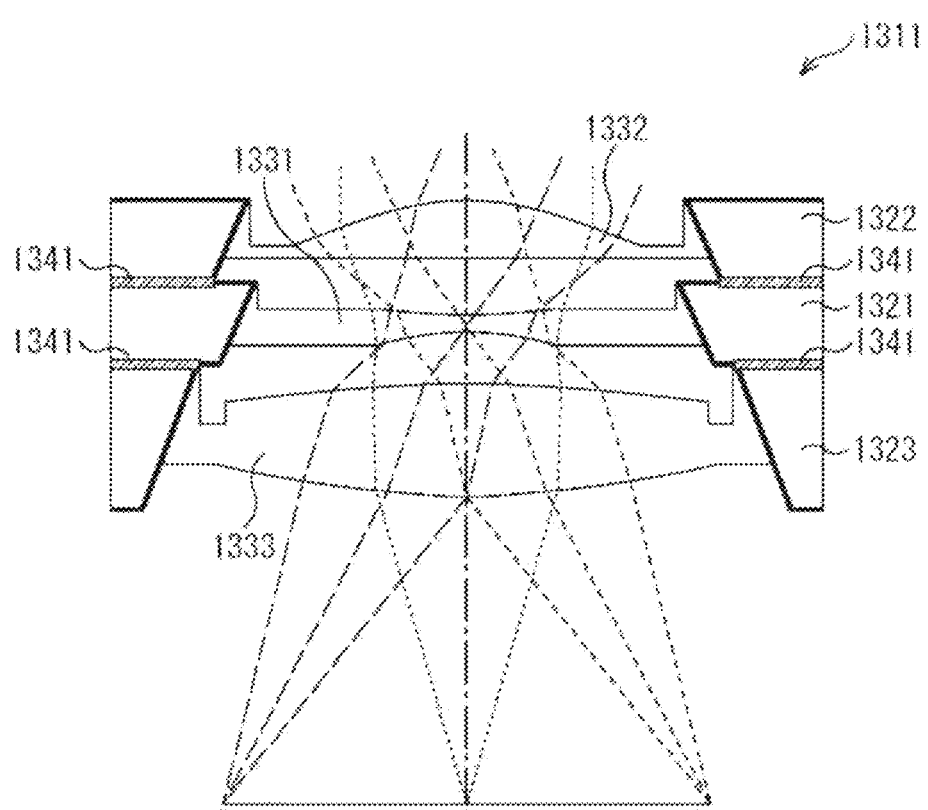
FIG. 49 is a cross-sectional view of a laminated lens structure of Comparative Structure Example 7.

FIG. 49 is a cross-sectional view of a laminated lens structure in which three substrates with lenses are laminated as a seventh substrate structure (hereinafter referred to as Comparative Structure Example 7). In this laminated lens structure, similarly to Comparative Structure Example 6 shown in FIG. 48, the layers and the areas of the photocurable resins disposed on the upper surface and the lower surface of the substrates with lenses are formed to be the same.

A laminated lens structure 1311 shown in FIG. 49 includes three substrates with lenses 1321 to 1323.

Hereinafter, among the three substrates with lenses 1321 to 1323, the intermediate substrate with lenses 1321 will be referred to as the first substrate with lenses 1321, the substrate with lenses 1322 of the uppermost layer will be referred to as the second substrate with lenses 1322, and the substrate with lenses 1323 of the lowermost layer will be referred to as the third substrate with lenses 1323.

The second substrate with lenses 1322 disposed on the uppermost layer and the third substrate with lenses 1323 disposed on the lowermost layer have different thicknesses of substrates and different thicknesses of lenses.

More specifically, the thickness of the lens is thicker in the third substrate with lenses 1323 than the second substrate with lenses 1322, and accordingly, the thickness of the substrate is also thicker in the third substrate with lenses 1323 than the second substrate with lenses 1322.

A resin 1341 is formed throughout the entire surface in which the first substrate with lenses 1321 and the second substrate with lenses 1322 are in contact with each other and the entire surface in which the first substrate with lenses 1321 and the third substrate with lenses 1323 are in contact with each other.

The cross-sectional shape of the through-hole of the three substrates with lenses 1321 to 1323 is a so-called downward fan shape in which the lower surface of the substrate is wider than the upper surface of the substrate.

A function of the three substrates with lenses 1321 to 1323 with different shapes will be described with reference to FIG. 50.

Figure 50:
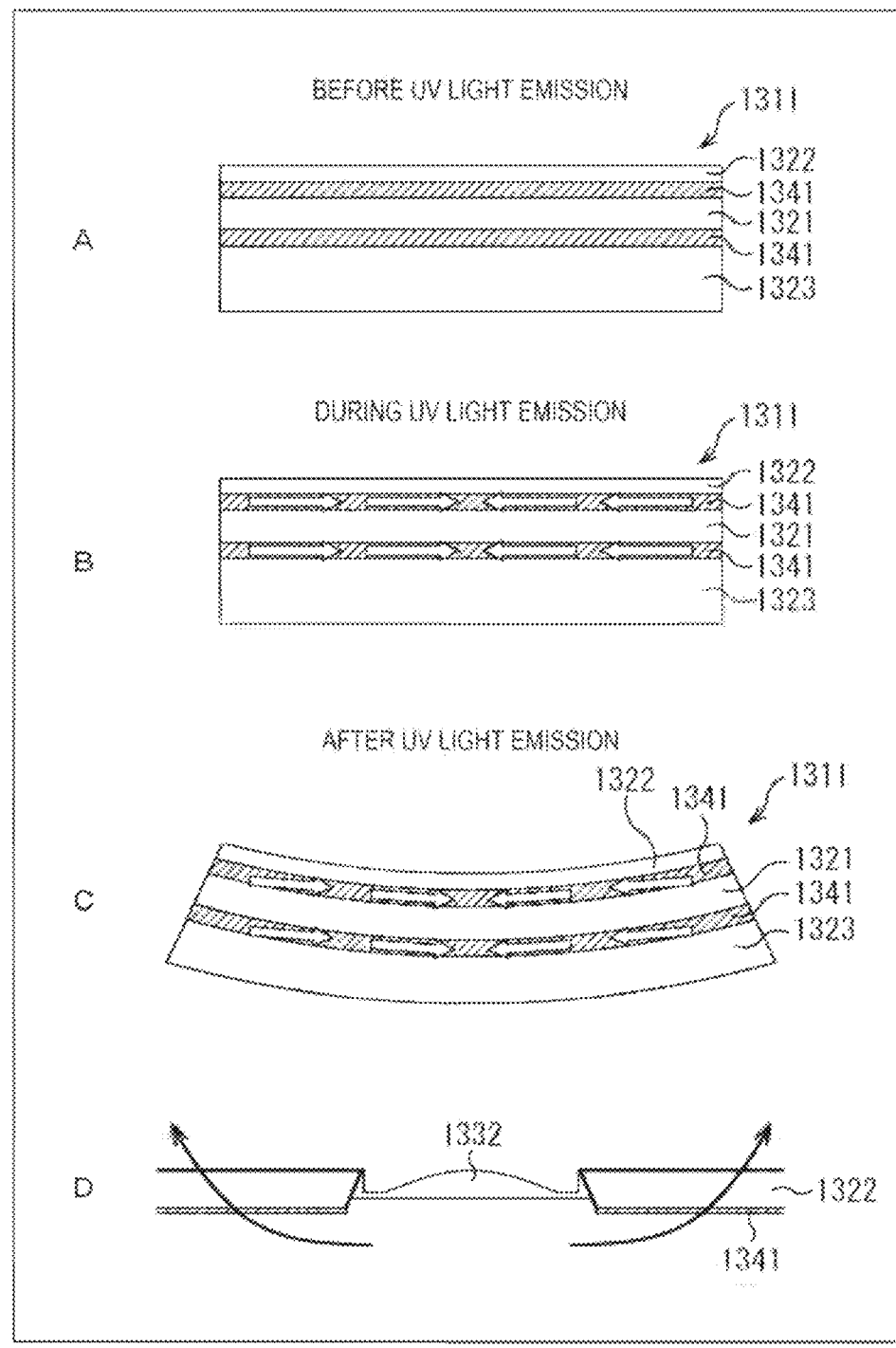
FIG. 50 is a diagram describing a function of the laminated lens structure in FIG. 49.

A to C of FIG. 50 are diagrams schematically showing the laminated lens structure 1311 shown in FIG. 49.

As in the laminated lens structure 1311, when the second substrate with lenses 1322 and the third substrate with lenses 1323 with different substrate thicknesses are disposed on the upper surface and the lower surface of the first substrate with lenses 1321, according to a position of a layer of the resin 1341 present throughout the entire contact surface of the three substrates with lenses 1321 to 1323 in the thickness direction of the laminated lens structure 1311, a force that warps the laminated lens structure 1311 and an amount of warp of the laminated lens structure 1311 change.

When the layer of the resin 1341 present throughout the entire contact surface of the three substrates with lenses 1321 to 1323 is not disposed symmetrically with respect to a line that proceeds in the planar direction of the substrate through the center line of the laminated lens structure 1311, that is, the middle point of the laminated lens structure 1311 in the thickness direction, it is not possible to completely offset operations of forces generated due to curing contraction of the resins 1341 disposed on the upper surface and the lower surface of the first substrate with lenses 1321 as shown in C of FIG. 48. As a result, the laminated lens structure 1311 warps in any direction.

For example, when two layers of the resin 1341 on the upper surface and the lower surface of the first substrate with lenses 1321 are disposed shifted in the upper direction relative to the center line of the laminated lens structure 1311 in the thickness direction, if two layers of the resin 1341 are cured and contract, the laminated lens structure 1311 warps into a downwardly convex shape as shown in C of FIG. 50.

Further, when the cross-sectional shape of the through-hole of the substrate with a thinner thickness between the second substrate with lenses 1322 and the third substrate with lenses 1323 is a shape that is larger in the direction of the first substrate with lenses 1321, there is much concern of a defect or damage of the lens.

In the example shown in FIG. 49, the cross-sectional shape of the through-hole of the second substrate with lenses 1322 with a thinner thickness between the second substrate with lenses 1322 and the third substrate with lenses 1323 is a downward fan shape that is larger in the direction of the first substrate with lenses 1321. In such a shape, when two layers of the resin 1341 on the upper surface and the lower surface of the first substrate with lenses 1321 are cured and contract, a force that warps the substrate into a downwardly convex shape acts in the laminated lens structure 1311 as shown in C of FIG. 50, and this force acts as a force in the direction in which the lens and the substrate are separated from each other in the second substrate with lenses 1322 as shown in D of FIG. 50. According to the operation, there is much concern of a defect or damage of a lens 1332 of the second substrate with lenses 1322.

Next, a case in which a resin thermally expands is considered.

Comparative Structure Example 8

Figure 51:
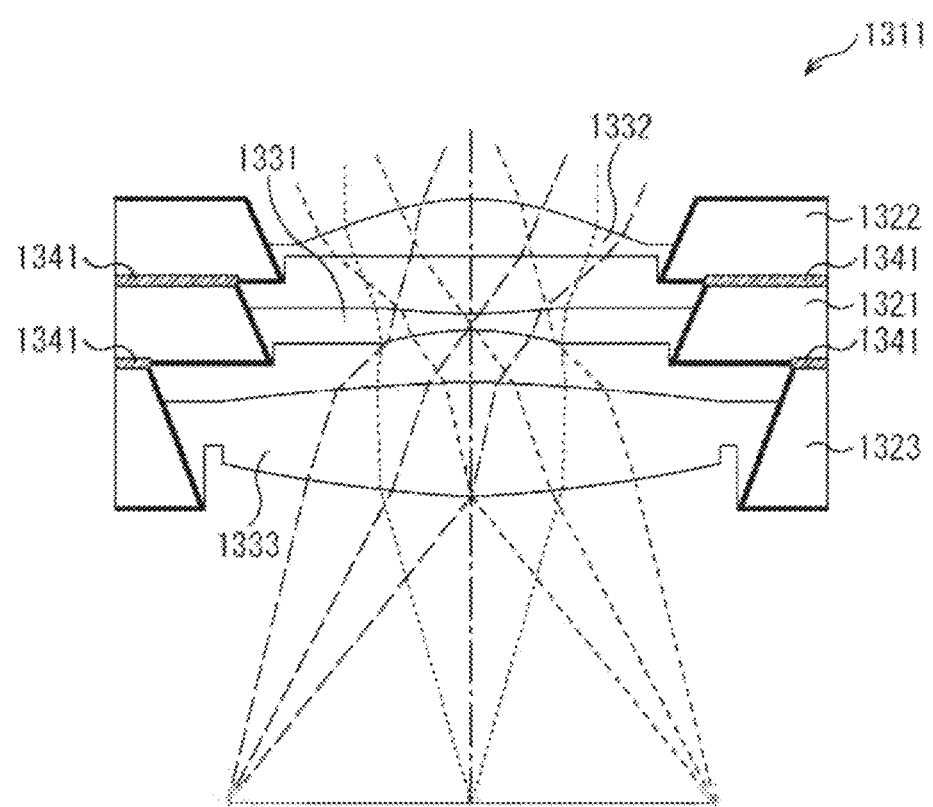
FIG. 51 is a cross-sectional view of a laminated lens structure of Comparative Structure Example 8.

FIG. 51 is a cross-sectional view of a laminated lens structure in which three substrates with lenses are laminated as an eighth substrate structure (hereinafter referred to as Comparative Structure Example 8). In this laminated lens structure, similarly to Comparative Structure Example 6 shown in FIG. 48, the layers and the areas of the photocurable resins disposed on the upper surface and the lower surface of the substrates with lenses are formed to be the same.

Comparative Structure Example 8 in FIG. 51 is the same as Comparative Structure Example 7 in FIG. 49 except that the cross-sectional shape of the through-hole of the three substrates with lenses 1321 to 1323 is a so-called downward fan shape in which the lower surface of the substrate is narrower than the upper surface of the substrate.

Figure 52:
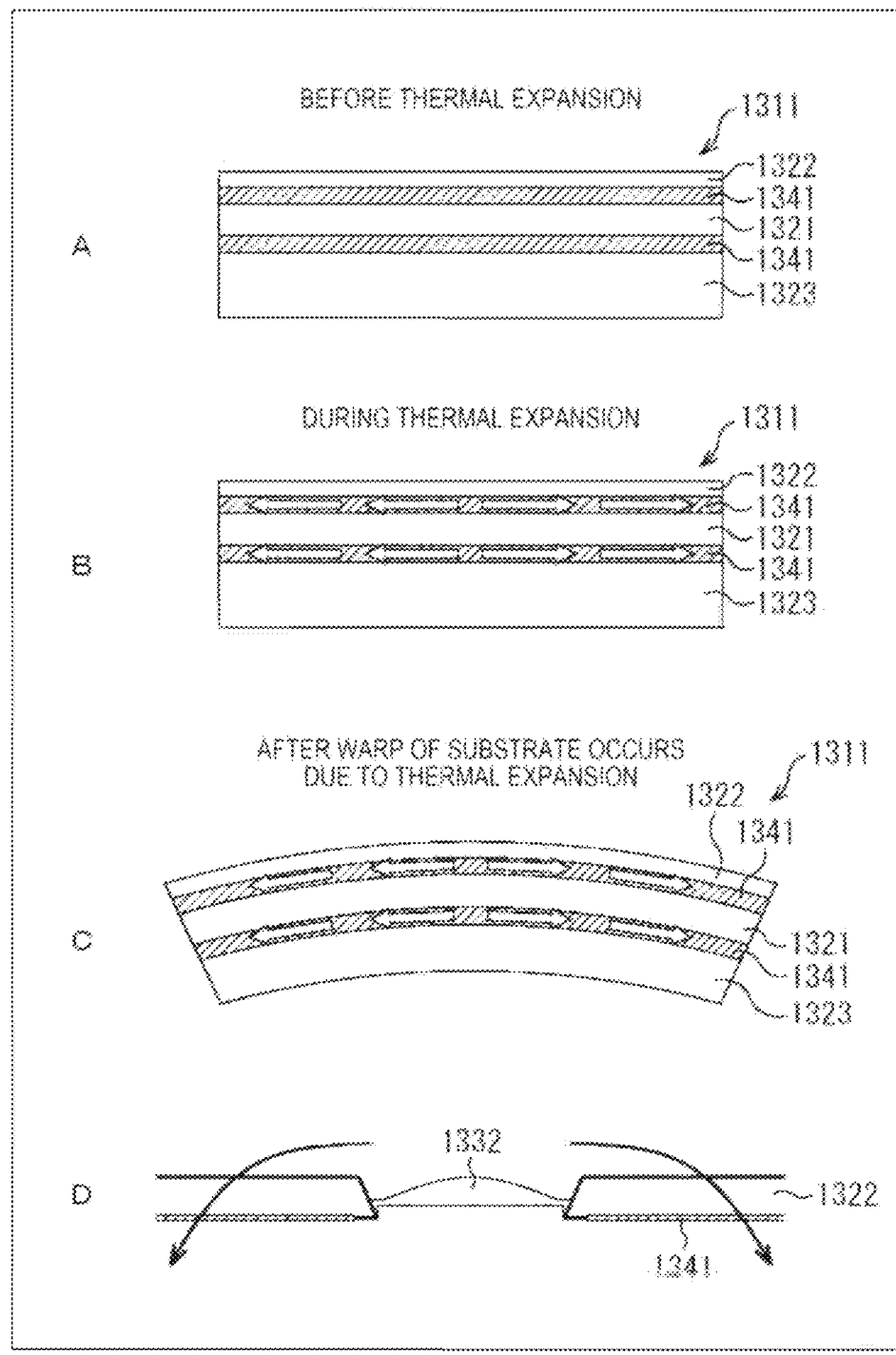
FIG. 52 is a diagram describing a function of the laminated lens structure in FIG. 51.

A to C of FIG. 52 are diagrams schematically showing the laminated lens structure 1311 shown in FIG. 51.

When a user actually uses the camera module, the temperature inside the camera case increases due to an increase in power consumption according to the operation, and the temperature of the camera module also increases. Due to the temperature rise, in the laminated lens structure 1311 in FIG. 51, the resin 1341 disposed on the upper surface and the lower surface of the first substrate with lenses 1321 thermally expands.

Even if the area and the thickness of the resin 1341 disposed on the upper surface and the lower surface of the first substrate with lenses 1321 are set to be the same as in A of FIG. 48, when the layer of the resin 1341 present throughout the entire contact surface of the three substrates with lenses 1321 to 1323 is not disposed symmetrically with respect to a line that proceeds in the planar direction of the substrate through the center line of the laminated lens structure 1311, that is, the middle point of the laminated lens structure 1311 in the thickness direction, it is not possible to completely offset operations of forces generated due to thermal expansion of the resins 1341 disposed on the upper surfaces and the lower surface of the first substrate with lenses 1321 as shown in C of FIG. 48. As a result, the laminated lens structure 1311 warps in any direction.

For example, when two layers of the resin 1341 on the upper surface and the lower surface of the first substrate with lenses 1321 are disposed shifted in the upper direction relative to the center line of the laminated lens structure 1311 in the thickness direction, if two layers of the resin 1341 thermally expand, the laminated lens structure 1311 warps into a upwardly convex shape as shown in C of FIG. 52.

Further, in the example shown in FIG. 51, the cross-sectional shape of the through-hole of the second substrate with lenses 1322 with a thinner thickness between the second substrate with lenses 1322 and the third substrate with lenses 1323 is a downward fan shape that is smaller in the direction of the first substrate with lenses 1321. In such a shape, when two layers of the resin 1341 on the upper surface and the lower surface of the first substrate with lenses 1321 thermally expand, a force that warps the substrate into an upward convex shape acts in the laminated lens structure 1311, and this force acts as a force in the direction in which the lens and the substrate are separated from each other in the second substrate with lenses 1322 as shown in D of FIG. 52. According to the operation, there is much concern of a defect or damage of the lens 1332 of the second substrate with lenses 1322.

<Present Structure>

Figure 53:
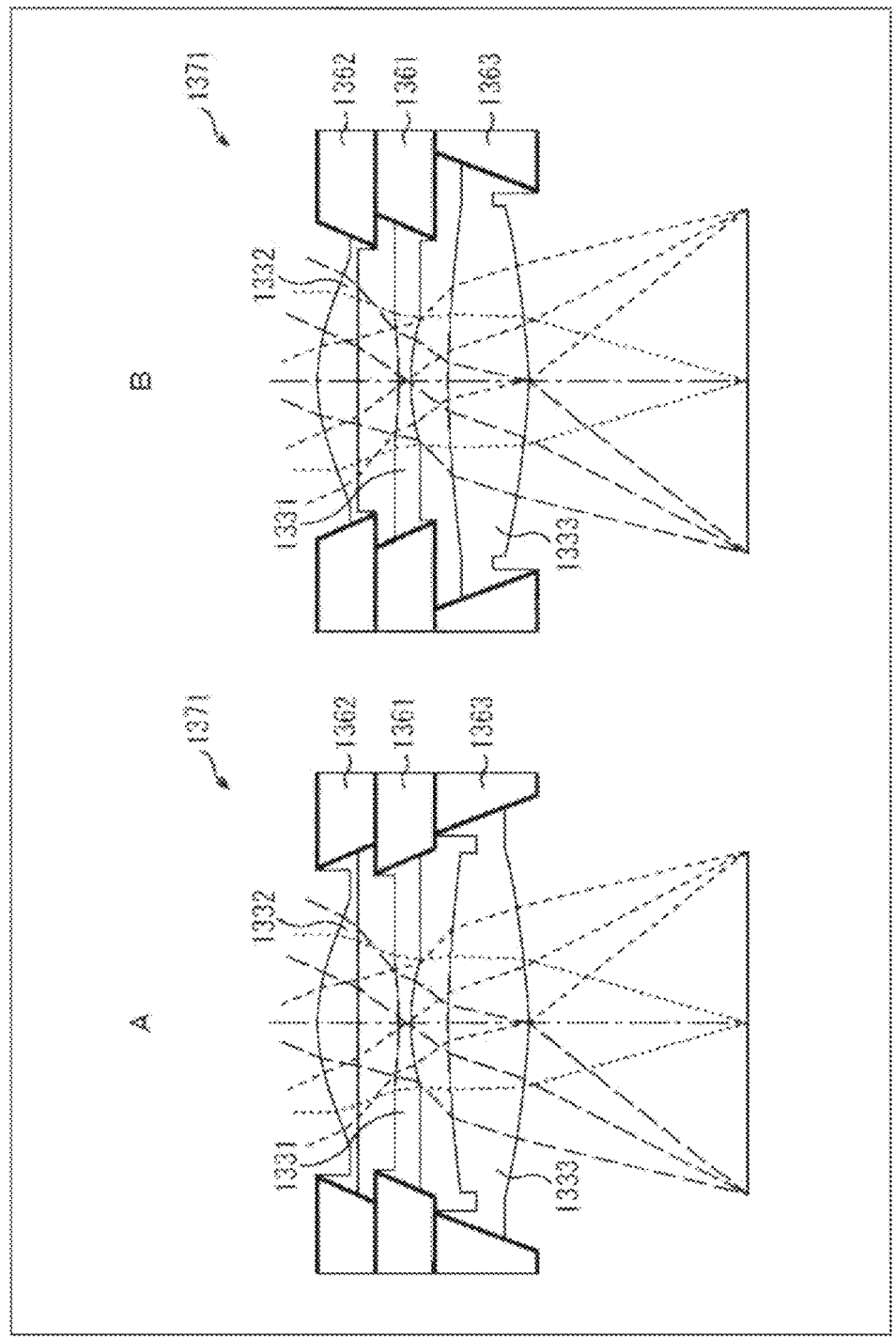
FIG. 53 is a cross-sectional view of a laminated lens structure having the present structure.

FIG. 53 is a diagram showing a laminated lens structure 1371 including three substrates with lenses 1361 to 1363 having the present structure.

A of FIG. 53 is a structure corresponding to the laminated lens structure 1311 in FIG. 49 and is a structure in which the cross-sectional shape of the through-hole is a so-called downward fan shape. On the other hand, B of FIG. 53 is a structure corresponding to the laminated lens structure 1311 in FIG. 51 and is a structure in which the cross-sectional shape of the through-hole is a so-called downward fan shape.

Figure 54:
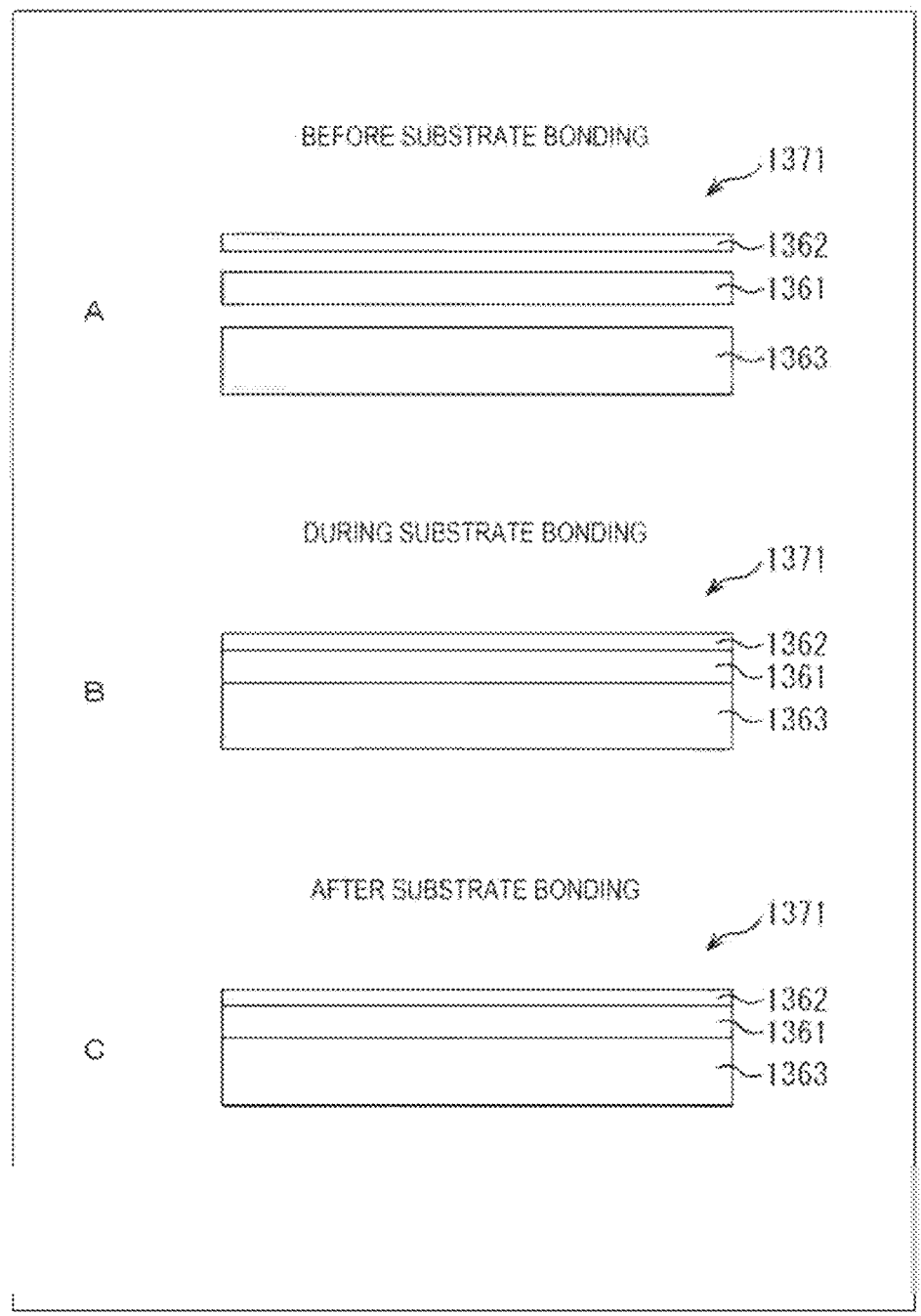
FIG. 54 is a diagram schematically showing the laminated lens structure in FIG. 53.

FIG. 54 is a diagram schematically showing the laminated lens structure 1371 in FIG. 53 in order to describe a function of the present structure.

The laminated lens structure 1371 is a structure in which the second substrate with lenses 1362 is disposed above the intermediate first substrate with lenses 1361 and the third substrate with lenses 1363 is disposed below the first substrate with lenses 1361.

The second substrate with lenses 1362 disposed on the uppermost layer and the third substrate with lenses 1363 disposed on the lowermost layer have different thicknesses of substrates and different thicknesses of lenses. More specifically, the thickness of the lens is thicker in the third substrate with lenses 1363 than the second substrate with lenses 1362, and accordingly, the thickness of the substrate is also thicker in the third substrate with lenses 1363 than the second substrate with lenses 1362.

In the laminated lens structure 1371 of the present structure, as a method of fixing substrates with lenses, direct bonding between substrates is used. In other words, a plasma activation treatment is performed on substrates with lenses to be fixed, and two substrates with lenses to be fixed are plasma-bonded. Further, in other words, a silicon oxide film is formed on surfaces of two substrates with lenses to be laminated, and a hydroxyl group is bonded thereto. Then, the two substrates with lenses are adhered, and heated, dehydrated, and condensated. In this manner, the two substrates with lenses are directly bonded by a silicon-oxygen covalent bond.

Therefore, in the laminated lens structure 1371 of the present structure, as a method of fixing substrates with lenses, adhesion using a resin is not used. Therefore, a resin for forming a lens or a resin for adhering substrates is not disposed between a substrate with lenses and a substrate with lenses. In addition, since no resin is disposed on the upper surface and the lower surface of the substrate with lenses, there is no resin that thermally expands or that is cured and contracts on the upper surface and the lower surface of the substrate with lenses.

Therefore, in the laminated lens structure 1371, even if the second substrate with lenses 1362 and the third substrate with lenses 1363 having different thicknesses of lenses and different thicknesses of substrates are disposed on the upper layer and the lower layer of the first substrate with lenses 1351, warping of the substrate due to curing contraction and warping of the substrate due to thermal expansion as in Comparative Structure Examples 1 to 8 do not occur.

That is, even if substrates with lenses having different thicknesses of lenses and different thicknesses of substrates are laminated above and below, the present structure in which the substrates with lenses are fixed by direct bonding provides a function and effect of reducing warping of the substrate to a greater extent than in Comparative Structure Examples 1 to 8.

16. Various Modified Examples

Other modified examples of the above-described embodiments will be described below.

<16.1 Cover Glass with Optical Diaphragm>

A cover glass may be provided above the laminated lens structure 11 in order to protect a surface of the lens 21 of the laminated lens structure 11. In this case, it is possible for the cover glass to have a function of an optical diaphragm.

Figure 55:
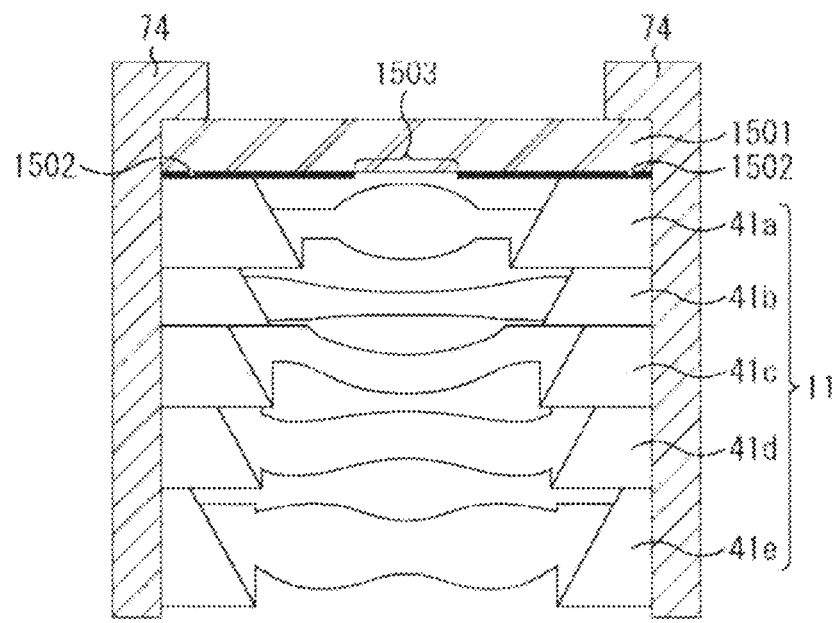
FIG. 55 is a diagram showing a first configuration example in which a diaphragm is added to a cover glass.

FIG. 55 is a diagram showing a first configuration in which a cover glass has a function of an optical diaphragm.

In the first configuration example in which the cover glass shown in FIG. 55 has a function of an optical diaphragm, a cover glass 1501 is additionally laminated on the laminated lens structure 11. Then, the lens barrel 74 is disposed outside the laminated lens structure 11 and the cover glass 1501.

A light blocking film 1502 is formed on a surface (in the drawing, on the lower surface of the cover glass 1501) on the side of the substrate with lenses 41a of the cover glass 1501. Here, a predetermined range from the center (optical center) of the lenses of the substrates with lenses 41a to 41e becomes an opening 1503 in which no light blocking film 1502 is formed, and the opening 1503 functions as an optical diaphragm. Accordingly, for example, the diaphragm plate 51 included in the camera module 1D in FIG. 13 or the like is omitted.

Figure 56:
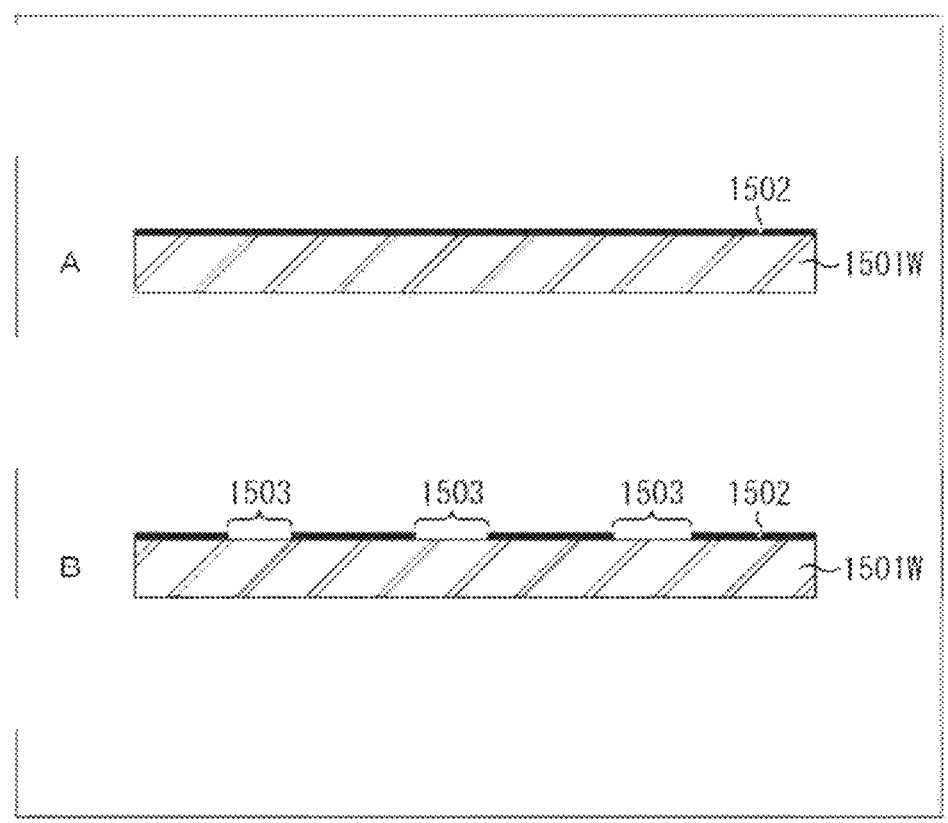
FIG. 56 is a diagram describing a method of producing the cover glass in FIG. 55.

FIG. 56 is a diagram describing a method of producing the cover glass 1501 in which the light blocking film 1502 is formed.

First, as shown in A of FIG. 56, for example, when a light absorbing material is applied to the one entire surface of a cover glass (glass substrate) 1501W in the form of a wafer or a panel by spin coating, the light blocking film 1502 is formed. As the light absorbing material forming the light blocking film 1502, for example, a resin having light absorbing property in which a carbon black pigment or a titanium black pigment is internally added is used.

Next, when a predetermined area of the light blocking film 1502 is removed by a lithography technology or an etching treatment, as shown in B of FIG. 56, a plurality of openings 1503 are formed at predetermined intervals. Dispositions of the openings 1503 correspond to dispositions of the through-holes 83 of the carrier substrate 81W in FIG. 23 in one-to-one correspondence. Here, as another example of a method of forming the light blocking film 1502 and the opening 1503, a method in which a light absorbing material forming the light blocking film 1502 is sprayed to an area except the opening 1503 by an inkjet can be used.

The cover glass 1501W in a substrate state produced as described above and the plurality of substrates with lenses 41W in a substrate state are adhered to each other, and then divided into individual units by dicing using a blade or a laser. Accordingly, the laminated lens structure 11 in which the cover glass 1501 having a diaphragm function is laminated as shown in FIG. 55 is completed.

In this manner, as one step of the semiconductor process, the cover glass 1501 is formed. Therefore, it is possible to prevent the occurrence of a dust defect which is a concern when a cover glass is formed in another assembly process.

According to the first configuration example shown in FIG. 55, since the optical diaphragm is formed by coating, the light blocking film 1502 can be formed with a thin film thickness of about 1 μm, and it is possible to prevent deterioration (light reduction in the peripheral part) of optical performance due to blocking of incident light when the diaphragm mechanism has a predetermined thickness.

Here, in the above-described example, division of the cover glass 1501W may be performed after or before it is bonded with the plurality of substrates with lenses 41W. In other words, bonding of the cover glass 1501 including the light blocking film 1502 and the five substrates with lenses 41a to 41e may be performed at a wafer level or a chip level.

The surface of the light blocking film 1502 may be rough. In this case, since surface reflection on the surface of the cover glass 1501 on which the light blocking film 1502 is formed is reduced, and it is possible to increase the surface area of the light blocking film 1502, it is possible to improve the bonding strength between the cover glass 1501 and the substrate with lenses 41.

As a method of forming the surface of the light blocking film 1502 to be rough, a method in which, for example, a light absorbing material forming the light blocking film 1502 is applied, and the surface is then processed to be rough by etching or the like, a method in which the cover glass 1501 before a light absorbing material is applied is formed into a rough surface and a light absorbing material is then applied, a method in which a film is formed of an aggregated light absorbing material and an unevenness is then formed on the surface, and a method in which a film is formed of a light absorbing material including a solid content and an unevenness is then formed on the surface are exemplified.

In addition, an antireflection film may be formed between the light blocking film 1502 and the cover glass 1501.

Since the cover glass 1501 also serves as a support substrate for the diaphragm, it is possible to reduce the size of the camera module 1.

Figure 57:
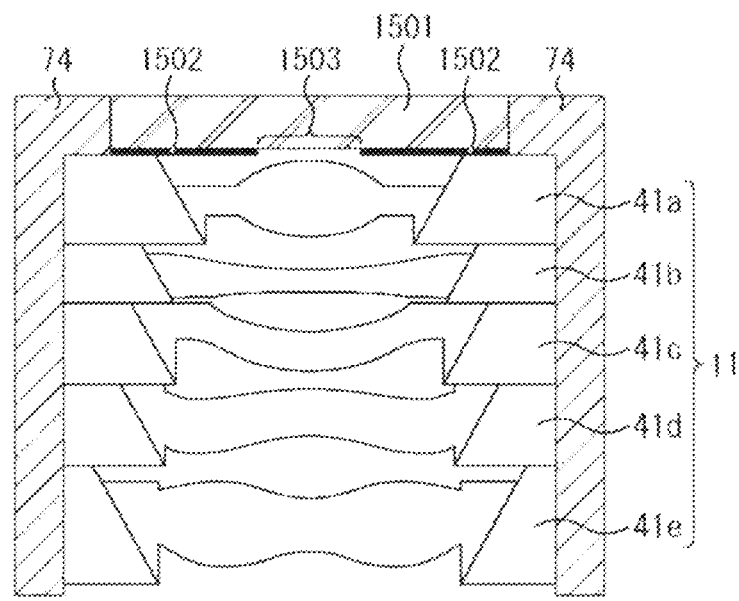
FIG. 57 is a diagram showing a second configuration example in which a diaphragm is added to a cover glass.

FIG. 57 is a diagram showing a second configuration in which a cover glass has a function of an optical diaphragm.

In a second configuration example in which the cover glass shown in FIG. 57 has a function of an optical diaphragm, the cover glass 1501 is disposed at the position of the opening of the lens barrel 74. The other configuration is the same as that of the first configuration example shown in FIG. 55.

Figure 58:
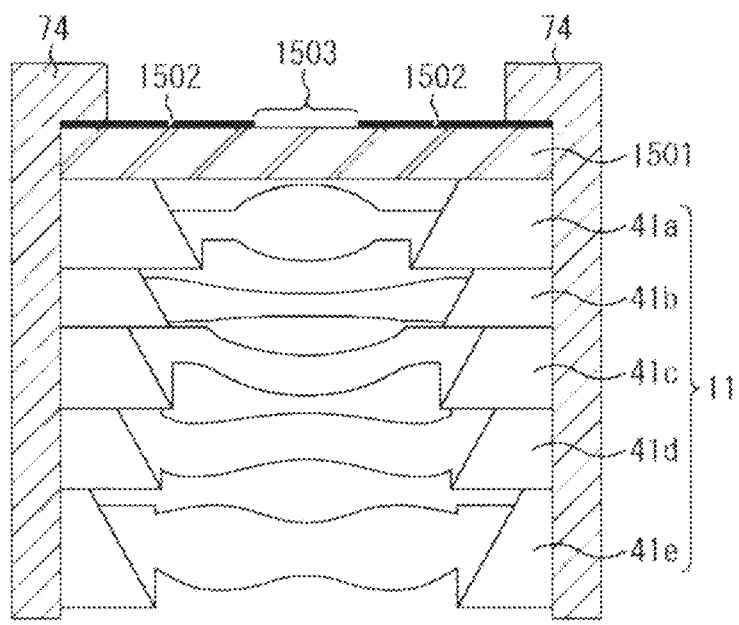
FIG. 58 is a diagram showing a third configuration example in which a diaphragm is added to a cover glass.

FIG. 58 is a diagram showing a third configuration in which a cover glass has a function of an optical diaphragm.

In a third configuration example in which the cover glass shown in FIG. 58 has a function of an optical diaphragm, the light blocking film 1502 is formed on the upper surface of the cover glass 1501, in other words, on the side opposite to the substrate with lenses 41a. The other configuration is the same as that of the first configuration example shown in FIG. 55.

Here, in the configuration in which the cover glass 1501 is disposed on the opening of the lens barrel 74 shown in FIG. 57, the light blocking film 1502 may also be formed on the upper surface of the cover glass 1501.

<16.2 Formation of Diaphragm by Through-Hole>

Next, an example in which the opening itself of the through-hole 83 of the substrate with lenses 41 is used as a diaphragm mechanism in place of the above-described diaphragm using the diaphragm plate 51 or the cover glass 1501, will be described.

Figure 59:
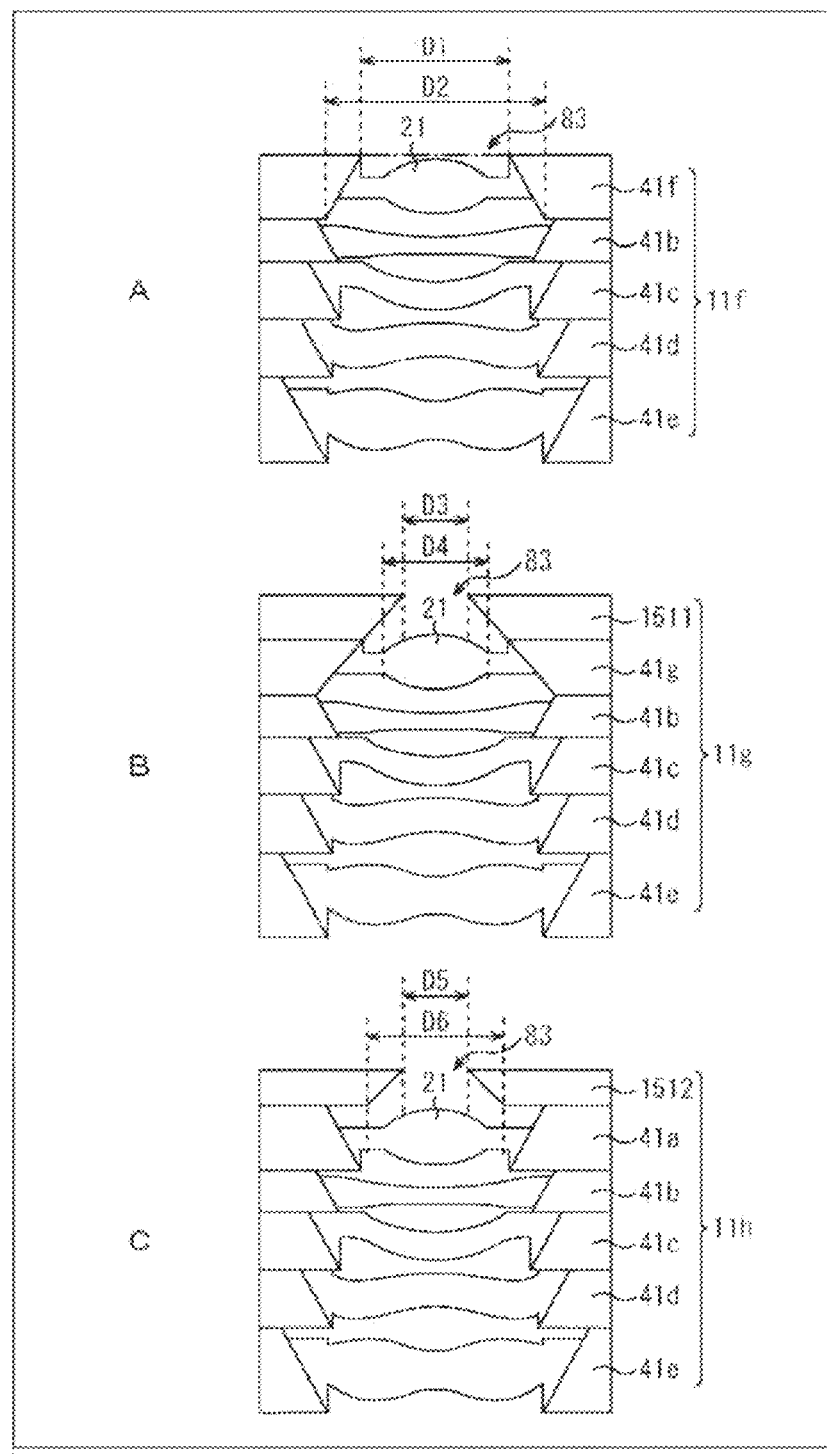
FIG. 59 is a diagram showing a configuration example in which the opening itself of a through-hole is used as a diaphragm mechanism.

A of FIG. 59 is a diagram showing a first configuration example in which the opening itself of the through-hole 83 is used as a diaphragm mechanism.

Here, in description in FIG. 59, only parts different from those of the laminated lens structure 11 shown in FIG. 58 are described and description of the same parts is appropriately omitted. In addition, in FIG. 59, in order to avoid complication of the drawing, only reference numerals that are necessary for description are shown.

The laminated lens structure 11f shown in A of FIG. 59 has a configuration in which, among the five substrates with lenses 41a to 41e constituting the laminated lens structure 11 shown in FIG. 58, the substrate with lenses 41a that is closest to light incident side and is positioned furthest from the light receiving element 12 is replaced with the substrate with lenses 41f.

When the substrate with lenses 41f is compared with the substrate with lenses 41a in FIG. 58, a hole diameter of the upper surface is larger than a hole diameter of the lower surface in the substrate with lenses 41a in FIG. 58, and on other other hand, a hole diameter D1 of the upper surface is smaller than a hole diameter D2 of the lower surface in the substrate with lenses 41f in FIG. 59. That is, the cross-sectional shape of the through-hole 83 of the substrate with lenses 41f is a so-called downward fan shape.

A height position of the outermost surface of the lens 21 formed in the through-hole 83 of the substrate with lenses 41f is lower than a position of the uppermost surface of the substrate with lenses 41f indicated by a dash-dotted line in A of FIG. 59.

In the laminated lens structure 11f, among the plurality of substrates with lenses 41, a hole diameter on the light incident side of the through-hole 83 of the substrate with lenses 41f of the uppermost layer is the smallest. Therefore, a part (a part of the hole diameter D1) in which the hole diameter of the through-hole 83 is the smallest functions as an optical diaphragm that restricts a beam of incident light.

B of FIG. 59 is a diagram showing a second configuration example in which the opening itself of the through-hole 83 is used as a diaphragm mechanism.

A laminated lens structure 11g shown in B of FIG. 59 has a configuration in which, among the five substrates with lenses 41a to 41e constituting the laminated lens structure 11 shown in FIG. 58, the substrate with lenses 41a of the uppermost layer is replaced with the substrate with lenses 41g. Then, a substrate 1511 is additionally laminated on the substrate with lenses 41g.

Similarly to the substrate with lenses 41f shown in A of FIG. 59, the hole diameter of the through-hole 83 of the substrate with lenses 41g has a downward fan shape in which the diameter becomes smaller toward the light incident side. The substrate 1511 is a substrate that includes the through-hole 83 but does not retain the lens 21. The cross-sectional shapes of the through-holes 83 of the substrate with lenses 41g and the substrate 1511 are both a so-called downward fan shape.

When the substrate 1511 is laminated on the substrate with lenses 41g, a planar area in which incident light enters is narrower than the substrate with lenses 41f in A of FIG. 59. A hole diameter D3 of the upper surface of the substrate 1511 is set to be smaller than a diameter D4 of a curved surface part (the lens part 91) of the lens 21. Accordingly, a part (a part of the hole diameter D3) in which the hole diameter of the through-hole 83 of the substrate 1511 is the smallest functions as an optical diaphragm that restricts a beam of incident light.

When the position of the optical diaphragm is set to be as far from the lens 21 of the uppermost surface within the laminated lens structure 11g as possible, it is possible to release an exit pupil position and prevent shading.

As shown in B of FIG. 59, when the substrate 1511 is additionally laminated on the five substrates with lenses 41b to 41e and 41g, it is possible to set the position of the optical diaphragm to be far away from the lens 21 of the substrate with lenses 41g which is the lens 21 of the uppermost surface within the laminated lens structure 11g in a direction opposite to the light incident direction and it is possible to prevent shading.

C of FIG. 59 is a diagram showing a third configuration example in which the opening itself of the through-hole 83 is used as a diaphragm mechanism.

The laminated lens structure 11h shown in C of FIG. 59 has a configuration in which a substrate 1512 is additionally laminated on the substrate with lenses 41a among the five substrates with lenses 41a to 41f constituting the laminated lens structure 11 shown in FIG. 58.

The substrate 1512 is a substrate that includes the through-hole 83 but does not retain the lens 21. The through-hole 83 of the substrate 1512 has a so-called downward fan shape in which the hole diameter is different between the uppermost surface and the lowermost surface of the substrate 1512 and a hole diameter D5 of the upper surface is smaller than a hole diameter D5 of the lower surface. In addition, the hole diameter D5 of the uppermost surface of the substrate 1512 is set to be smaller than the diameter of a curved surface part (the lens part 91) of the lens 21. Accordingly, a part (a part of the hole diameter D5) in which the hole diameter of the through-hole 83 is the smallest functions as an optical diaphragm that restricts a beam of incident light. Here, as another example of the shape of the substrate 1512, a so-called upward fan shape in which the hole diameter D5 of the upper surface is larger than the hole diameter D5 of the lower surface may be used.

Here, all examples in A to C of FIG. 59 are a configuration example in which, among a plurality of substrates with lenses 41 constituting the laminated lens structure 11, the hole diameter of the through-hole 83 of the substrate with lenses 41f of the uppermost surface (position furthest from the light receiving element 12) is set for the optical diaphragm and the hole diameter of the through-hole 83 of the substrate 1511 or 1512 disposed on the uppermost layer is set for the optical diaphragm.

However, among a plurality of substrates with lenses 41 constituting the laminated lens structure 11, the hole diameter of the through-hole 83 of any one of the substrates with lenses 41b to 41e other than the uppermost surface may be configured as in the substrate with lenses 41f or the substrate 1511 or 1512 described above to function as the optical diaphragm.

However, in order to prevent shading, as shown in A to C of FIG. 59, the substrate with lenses 41 having a function of an optical diaphragm may be disposed on the uppermost layer, or on as high a part as possible (a position furthest from the light receiving element 12).

As described above, when one predetermined substrate with lenses 41 among a plurality of substrates with lenses 41 constituting the laminated lens structure 11, or the substrate 1511 or 1512 that does not retain the lens 21 also functions as an optical diaphragm, it is possible to reduce the size of the laminated lens structure 11 and the camera module 1.

When the optical diaphragm is integrated with the substrate with lenses 41 that retains the lens 21, it is possible to improve the positional accuracy between the curved surface of the lens closest to the diaphragm which influences imaging performance and the optical diaphragm, and it is possible to improve imaging performance.

<16.3 Wafer Level Bonding by Metal Bonding>

While the substrates with lenses 41W in which the lens 21 is formed in the through-hole 83 are adhered to each other by plasma bonding in the above-described embodiment, adhesion can be performed using metal bonding.

Figure 60:
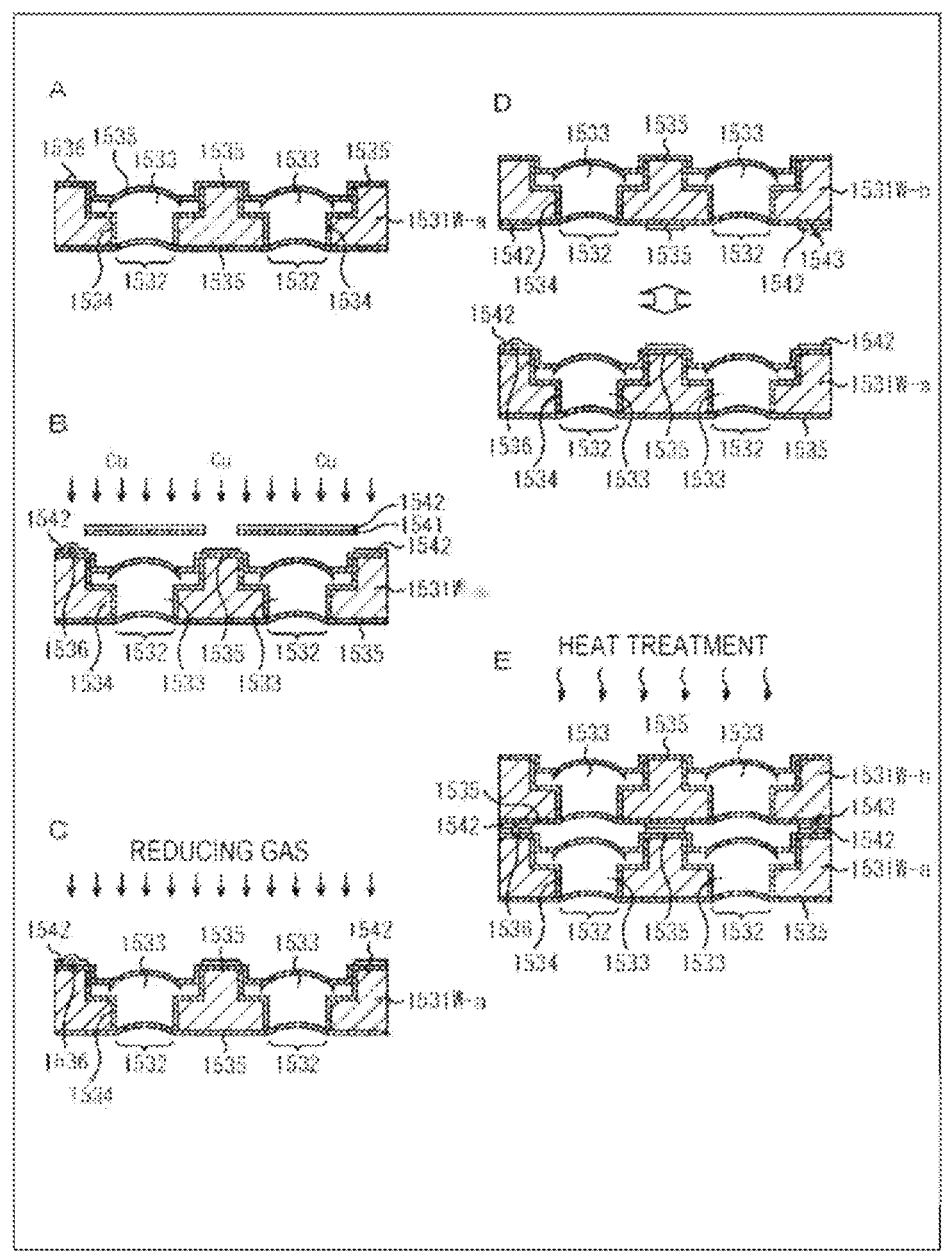
FIG. 60 is a diagram describing adhering at a wafer level using metal bonding.

FIG. 60 is a diagram describing adhering at a wafer level using metal bonding.

First, as shown in A of FIG. 60, a substrate with lenses 1531W-a in a substrate state in which lenses 1533 are formed in a plurality of through-holes 1532 is prepared. An antireflection film 1535 is formed on the upper surface and the lower surface of the substrate with lenses 1531W-a.

The substrate with lenses 1531W corresponds to the substrate with lenses 41W in a substrate state described above. In addition, the antireflection film 1535 corresponds to the upper surface layer 122 and the lower surface layer 123 described above.

Here, a state in which a foreign substance 1536 is mixed into a part of the antireflection film 1535 that is formed on the upper surface of the substrate with lenses 1531W-a is assumed. The upper surface of the substrate with lenses 1531W-a is a surface that is bonded to a substrate with lenses 1531W-b in the following process in D of FIG. 60.

Next, as shown in B of FIG. 60, a metal film 1542 is formed on the upper surface of the substrate with lenses 1531W-a which is a bonding surface with the substrate with lenses 1531W-b. In this case, a part of the through-hole 1532 in which the lens 1533 is formed is masked using a metal mask 1541 so that no metal film 1542 is formed.

As a material of the metal film 1542, for example, Cu which is often used for metal bonding can be used. As a method of forming the metal film 1542, a PVD method such as a vapor deposition method, a sputtering method, and an ion plating method through which formation is possible at a low temperature can be used.

Here, as a material of the metal film 1542, Ni, Co, Mn, Al, Sn, In, Ag, and Zn in addition to Cu, and an alloy material of two or more thereof may be used. In addition, any material other than the exemplified materials may be used as long as it is a metal material that is easily plastically deformed.

As a film formation method of the metal film 1542, in addition to the PVD method and formation using a metal mask, for example, an inkjet method using metal nanoparticles such as silver particles may be used.

Next, as shown in C of FIG. 60, as a pretreatment before bonding, if an oxide film formed on the surface of the metal film 1542 is removed using a reducing gas such as formic acid, a hydrogen gas, and a hydrogen radical when it is opened to an atmosphere, the surface of the metal film 1542 is cleaned.

As a method of cleaning the surface of the metal film 1542, in addition to using the reducing gas, a sputtering operation in which Ar ions in plasma are caused to enter a metal surface may be used to physically remove the oxide film.

In the same processes as in A to C of FIG. 60 described above, the substrate with lenses 1531W-b which is another substrate with lenses 1531W in a substrate state to be bonded is prepared.

Then, as shown in D of FIG. 60, when a bonding surface of the substrate with lenses 1531W-b and a bonding surface of the substrate with lenses 1531W-a are disposed to face each other, position alignment is performed, and an appropriate pressure is then applied, the metal film 1542 of the substrate with lenses 1531W-a and the metal film 1542 of the substrate with lenses 1531W-b are bonded by metal bonding.

Here, for example, a foreign substance 1543 is also mixed into the lower surface of the substrate with lenses 1531W-b which is a bonding surface of the substrate with lenses 1531W-b. However, even if there is the foreign substance 1536 or the foreign substance 1543, since a metal material that is easily plastically deformed is used as the metal film 1542, the metal film 1542 is deformed, and the substrate with lenses 1531W-a and the substrate with lenses 1531W-b are bonded.

Finally, as shown in E of FIG. 60, when the heat treatment is performed, bonding between metallic atoms and crystallization are facilitated and the bonding strength increases. Here, this heat treatment process can be omitted.

As described above, the substrates with lenses 1531W in which the lenses 1533 are formed in the plurality of through-holes 1532 can be adhered to each other using metal bonding.

Here, in order to bond the substrate with lenses 1531W-a and the metal film 1542, a film serving as an adhesive layer can be formed between the substrate with lenses 1531W-a and the metal film 1542. In this case, the adhesive layer is formed above (outside) the antireflection film 1535, in other words, formed between the antireflection film 1535 and the metal film 1542. As the adhesive layer, for example, Ti, Ta, or W can be used. In addition, a nitride or an oxide of Ti, Ta, and W, or a laminated structure of a nitride and an oxide may be used. This similarly applies to bonding of the substrate with lenses 1531W-b and the metal film 1542.

In addition, a material of the metal film 1542 formed on the substrate with lenses 1531W-a and a material of the metal film 1542 formed on the substrate with lenses 1531W-b may be different metal materials.

When the substrates with lenses 1531W in a substrate state are adhered to each other by bonding using a metal which has a low Young's modulus and is easily plastically deformed, even if a foreign substance is included in the bonding surface, a contact area is obtained due to deformation according to a pressing pressure.

When the plurality of substrates with lenses 1531W adhered to each other using metal bonding are divided to form the laminated lens structure 11 and incorporated into the above-described camera module 1, the metal film 1542 has an excellent sealing property and can prevent inflow of light and moisture from the side. Therefore, it is possible to manufacture the laminated lens structure 11 and the camera module 1 with high reliability.

<16.4 Substrate with Lenses Using High-Concentration Doped Substrate>

Figure 61:
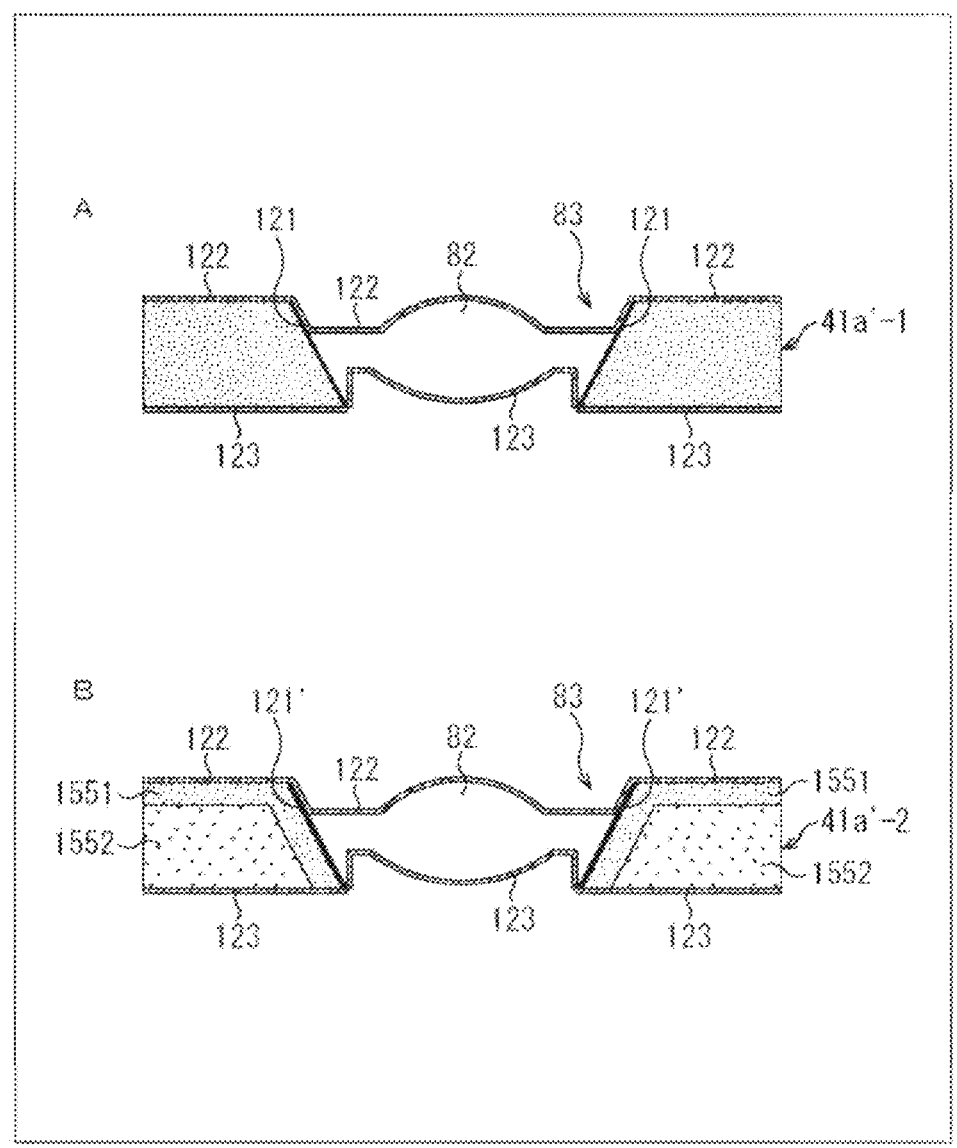
FIG. 61 is a diagram showing an example of a substrate with lenses using a high-concentration doped substrate.

FIG. 61 is a cross-sectional view of substrates with lenses 41a'-1 and 41a'-2 which are modified examples of the substrate with lenses 41a described above.

When the substrates with lenses 41a'-1 and 41a'-2 in FIG. 61 are described, the same parts as in the substrate with lenses 41a described above will not be described, and only different parts will be described.

The substrate with lenses 41a'-1 shown in A of FIG. 61 is a high-concentration doped substrate in which B (boron) with a high concentration is diffused (ion implanted) in a silicon substrate. The impurity concentration of the substrate with lenses 41a'-1 is, for example, a concentration of about $1 \times 10^{19}$ cm$^{-3}$, and the substrate with lenses 41a'-1 can efficiently absorb light having a wide range wavelength.

The other configuration of the substrate with lenses 41a'-1 is the same as that of the substrate with lenses 41a described above.

On the other hand, in the substrate with lenses 41a'-2 shown in B of FIG. 61, an area of the silicon substrate is divided into two areas with different impurity concentrations, that is, a first area 1551 and a second area 1552.

The first area 1551 is formed to a predetermined depth (for example, about 3 μm) from the substrate surface on the side on which light is incident. The impurity concentration of the first area 1551 is a high concentration of, for example, about $1 \times 10^{16}$ cm$^{-3}$. The second area 1552 has an impurity concentration of, for example, about $1 \times 10^{10}$ cm$^{-3}$, which is lower than the first concentration. Similarly to the substrate with lenses 41a'-1, ions diffused (ion implanted) in the first area 1551 and the second area 1552 are, for example, B (boron).

The first area 1551 which serves as a light incident side of the substrate with lenses 41a'-2 has an impurity concentration of about $1 \times 10^{16}$ cm$^{-3}$, which is lower than the impurity concentration (for example, $1 \times 10^{19}$ cm$^{-3}$) of the substrate with lenses 41a'-1. Therefore, in the substrate with lenses 41a'-2, the film thickness of the light blocking film 121' formed on the side wall of the through-hole 83 is thicker than the light blocking film 121 of the substrate with lenses 41a'-1 in A of FIG. 61. For example, when the film thickness of the light blocking film 121 of the substrate with lenses 41a'-1 is 2 μm, the film thickness of the light blocking film 121' of the substrate with lenses 41a'-2 is 5 μm.

The other configuration of the substrate with lenses 41a'-2 is the same as that of the substrate with lenses 41a described above.

As described above, when a high-concentration doped substrate is used as the substrates with lenses 41a'-1 and 41a'-2, light that has passed through the light blocking film 121 and the upper surface layer 122 and reaches the substrate can be absorbed in the base material itself. Therefore, it is possible to reduce reflected light. Since an amount of doping is enough as long as light that reaches the substrate can be absorbed, the amount can be appropriately set according to an amount of light that reaches the substrate and the film thickness of the light blocking film 121 and the upper surface layer 122.

In addition, since a silicon substrate that is easy to handle is used as the substrates with lenses 41a'-1 and 41a'-2, handling becomes easier. Since light that has passed through the light blocking film 121 and the upper surface layer 122 and reaches the substrate can be absorbed in the base material itself, it is possible to reduce the thickness of the light blocking film 121 and the upper surface layer 122, and the laminated substrate itself, and reduce the thickness of the film and simplify the structure.

Here, in the substrates with lenses 41a'-1 and 41a'-2, ions doped into the silicon substrate are not limited to B (boron), but other ions of, for example, phosphorus (P), arsenic (As), or antimony (Sb), may be used. In addition, any element that can form a band structure in which an amount of light absorption increases may be used.

In addition, the other substrates with lenses 41b to 41e constituting the laminated lens structure 11 can have the same configuration as the substrates with lenses 41a'-1 and 41a'-2.

<Production Method>

A method of producing the substrate with lenses 41a'-1 shown in A of FIG. 61 will be described with reference to FIG. 62.

Figure 62:
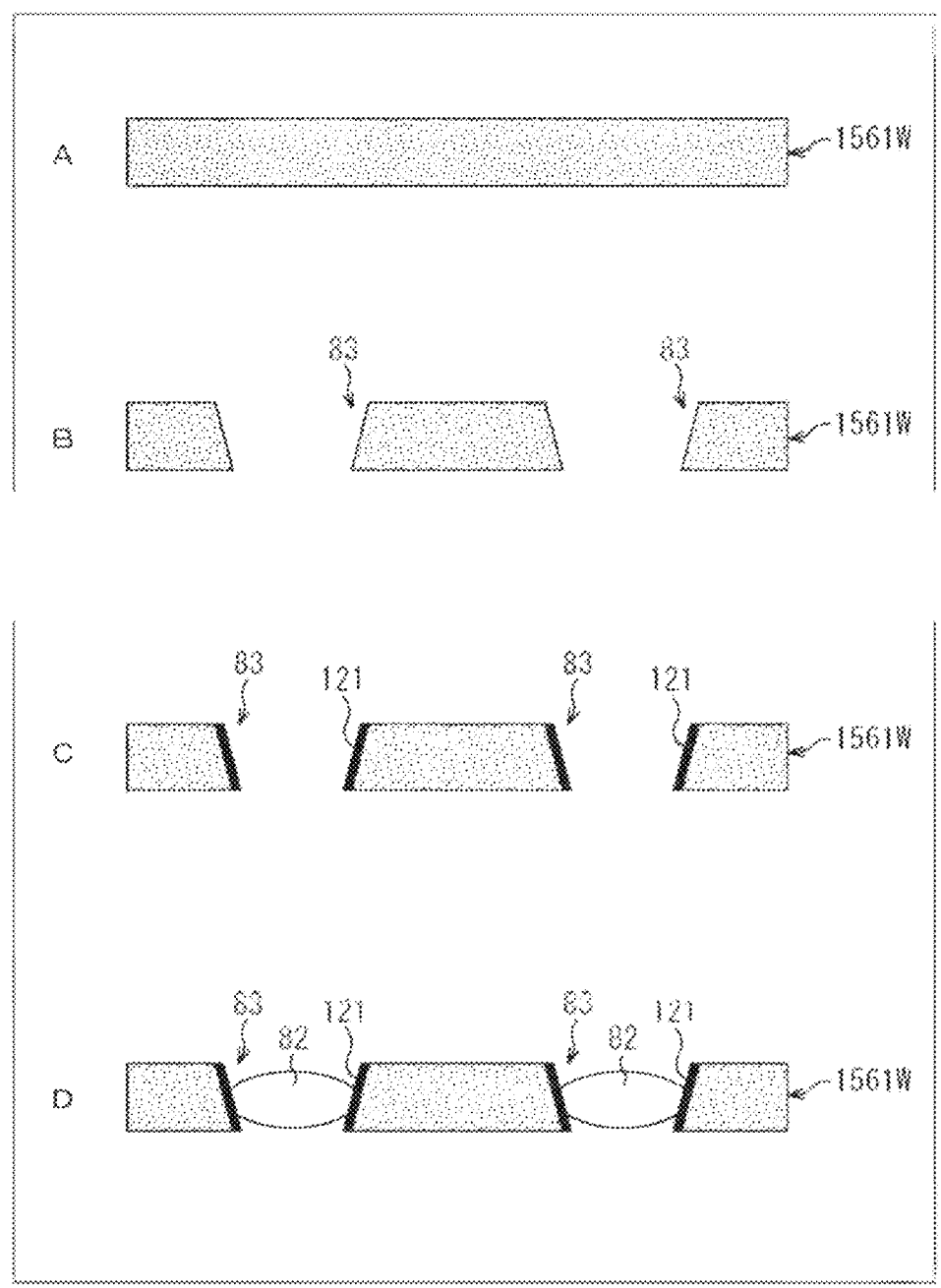
FIG. 62 is a diagram describing a method of producing a substrate with lenses in A of FIG. 61.

First, as shown in A of FIG. 62, a high-concentration doped substrate 1561W in a substrate state in which B (boron) with a high concentration is diffused (ion implanted) is prepared. The high-concentration doped substrate 1561W has an impurity concentration of, for example, about $1 \times 10^{19}$ cm$^{-3}$.

Next, as shown in B of FIG. 62, the through-hole 83 is formed at a predetermined position of the high-concentration doped substrate 1561W by etching. In FIG. 62, while only two through-holes 83 are shown due to limitations of space, in practice, the plurality of through-holes 83 are formed in the high-concentration doped substrate 1561W in the planar direction.

Next, as shown in C of FIG. 62, when a black resist material is applied to the side wall of the through-hole 83 by spray coating, the light blocking film 121 is formed into a film.

Then, as shown in D of FIG. 62, the lens resin part 82 including the lens 21 is formed inside the through-hole 83 according to pressure molding using the upper mold 201 and the lower mold 181 described with reference to FIG. 23.

Then, although not shown, the upper surface layer 122 is formed into a film on the upper surface of the high-concentration doped substrate 1561W and the lens resin part 82, and the lower surface layer 123 is formed into a film on the lower surface of the high-concentration doped substrate 1561W and the lens resin part 82, and divided into individual units. Accordingly, the substrate with lenses 41a'-1 shown in A of FIG. 61 is completed.

Next, a method of producing the substrate with lenses 41a'-2 shown in B of FIG. 61 will be described with reference to FIG. 63.

Figure 63:
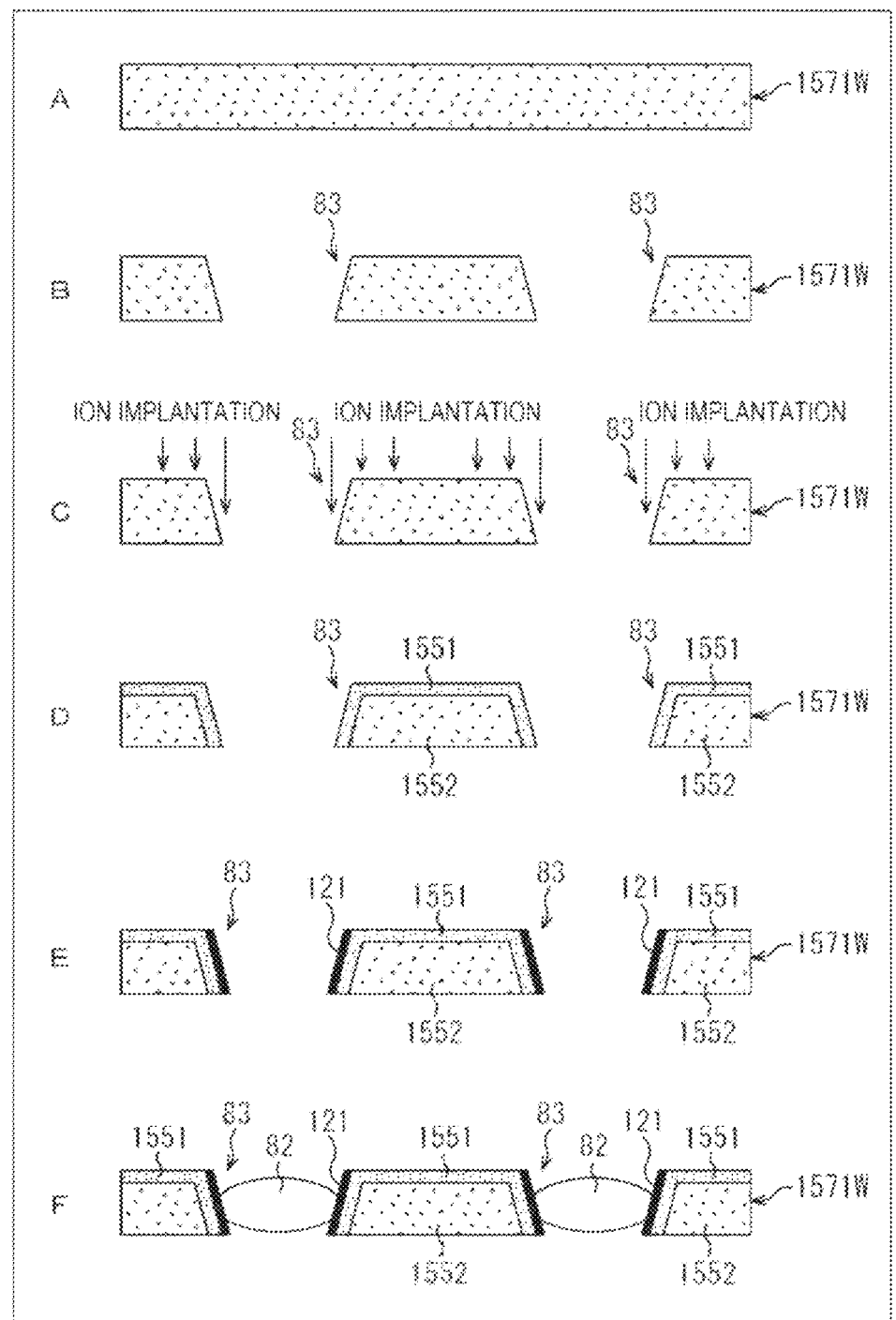
FIG. 63 is a diagram describing a method of producing a substrate with lenses in B of FIG. 61.

First, as shown in A of FIG. 63, a doped substrate 1571W in a substrate state in which B (boron) with a predetermined concentration is diffused (ion implanted) is prepared. The doped substrate 1571W has an impurity concentration of, for example, about $1 \times 10^{10}$ cm$^{-3}$.

Next, as shown in B of FIG. 63, the through-hole 83 is formed at a predetermined position of the doped substrate 1571W by etching. In FIG. 63, while only two through-holes 83 are shown due to limitations of space, in practice, the plurality of through-holes 83 are formed in the doped substrate 1571W in the planar direction.

Next, as shown in C of FIG. 63, B (boron) ions are implanted from the substrate surface on the side of the light incident surface of the doped substrate 1571W to a predetermined depth (for example, about 3 μm) and a heat treatment at 900° C. is then performed. As a result, as shown in D of FIG. 63, the first area 1551 with a high impurity concentration and the second area 1552 with a impurity concentration that is lower than that of the first area 1551 are formed.

Next, as shown in E of FIG. 63, when a black resist material is applied to the side wall of the through-hole 83 by spray coating, the light blocking film 121 is formed into a film.

Then, as shown in F of FIG. 63, the lens resin part 82 including the lens 21 is formed inside the through-hole 83 according to pressure molding using the upper mold 201 and the lower mold 181 described with reference to FIG. 23.

Then, although not shown, the upper surface layer 122 is formed into a film on the upper surface of the doped substrate 1571W and the lens resin part 82, and the lower surface layer 123 is formed into a film on the lower surface of the doped substrate 1571W and the lens resin part 82, and divided into individual units. Accordingly, the substrate with lenses 41a'-2 shown in B of FIG. 61 is completed.

The substrates with lenses 41a to 41e constituting the laminated lens structure 11 shown in FIG. 1 can be set as the high-concentration doped substrate shown in FIG. 61. Accordingly, it is possible to increase an amount of light absorption of the substrate itself.

17. Structure of Pixel Array and Diaphragm Plate of Light Receiving Element and Application Description Next, configurations of the pixel array of the light receiving element 12 and the diaphragm plate 51 included in the camera module 1 shown in FIG. 10 and FIG. 11 will be further described.

Figure 64:
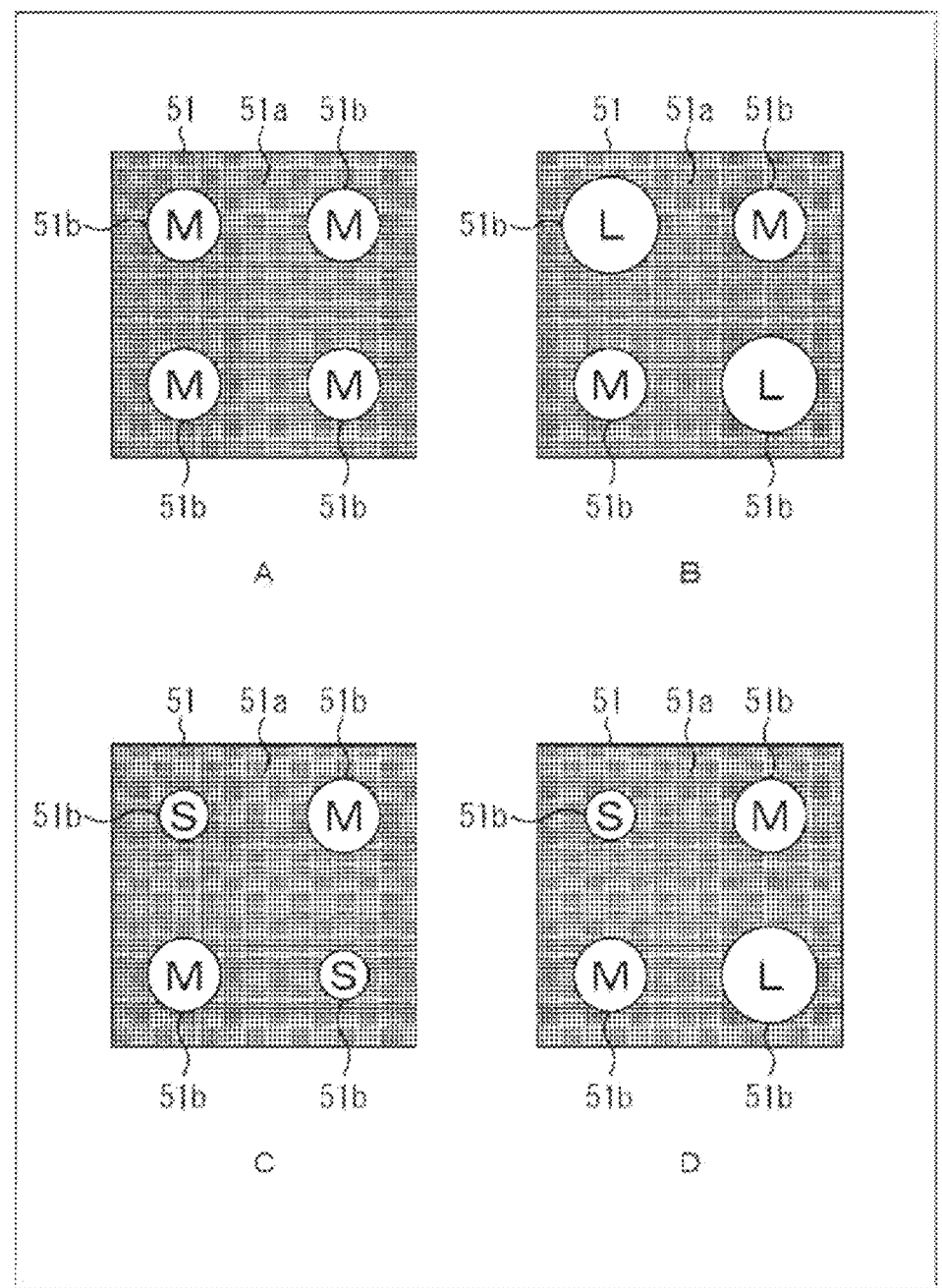
FIG. 64 is a diagram showing examples of a planar shape of a diaphragm plate included in a camera module.

FIG. 64 is a diagram showing examples of a planar shape of the diaphragm plate 51 included in the camera module 1 shown in FIG. 10 and FIG. 11.

The diaphragm plate 51 includes a blocking area 51a for preventing incidence of light by absorbing or reflecting light and an opening area 51b through which light passes.

In the four optical units 13 included in the camera module 1 shown in FIG. 10 and FIG. 11, as shown in A to D of FIG. 64, the opening diameters of the opening areas 51b of the diaphragm plates 51 may have the same size or different sizes among the four optical units. In FIG. 64, "L," "M," and "S" in the drawing indicate that the opening diameter of the opening area 51b is "large," "medium," and "small."

In the diaphragm plate 51 shown in A of FIG. 64, the four opening areas 51b have the same opening diameter.

In the diaphragm plate 51 shown in B of FIG. 64, the sizes of the opening diameters of two opening areas 51b are "medium," that is, a standard diaphragm opening. Thus, for example, as shown in FIG. 13, the diaphragm plate 51 may be slightly superimposed with the lens 21 of the substrate with lenses 41, in other words, the opening area 51b of the diaphragm plate 51 may be slightly smaller than the diameter of the lens 21. Then, in the two remaining opening areas 51b of the diaphragm plate 51 shown in B of FIG. 64, the size of the opening diameter is "large," that is, the opening diameter is larger than the opening diameter having a size of "medium" described above. This large opening area 51b provides a function of causing more light to enter the light receiving element 12 included in the camera module 1, for example, when illumination of a subject is low.

In the diaphragm plate 51 shown in C of FIG. 64, the sizes of the opening diameters of two opening areas 51b are "medium," that is, a standard diaphragm opening. Thus, in the two remaining opening areas 51b of the diaphragm plate 51 shown in C of FIG. 64, the size of the opening diameter is "small," that is, the opening diameter is larger than the opening diameter having a size of "medium" described above. This small opening area 51b provides a function of reducing an amount of light incident on the light receiving element 12 when, for example, illumination of a subject is high, light therefrom enters the light receiving element 12 included in the camera module 1 through the opening area 51b having the opening diameter with a size of "medium," and an amount of charges generated in a photoelectric converting unit included in the light receiving element 12 exceeds a saturation charge amount of the photoelectric converting unit.

In the diaphragm plate 51 shown in D of FIG. 64, the sizes of the opening diameters of two opening areas 51b are "medium," that is, a standard diaphragm opening. Thus, one of the two remaining opening areas 51b of the diaphragm plate 51 shown in D of FIG. 64 has the opening diameter with a size of "large" and the other thereof has the opening diameter with a size of "small." These opening areas 51b perform the same operation as the opening areas 51b whose opening diameters have a size of "large" and "small" shown in B of FIG. 64 and C of FIG. 64.

Figure 65:
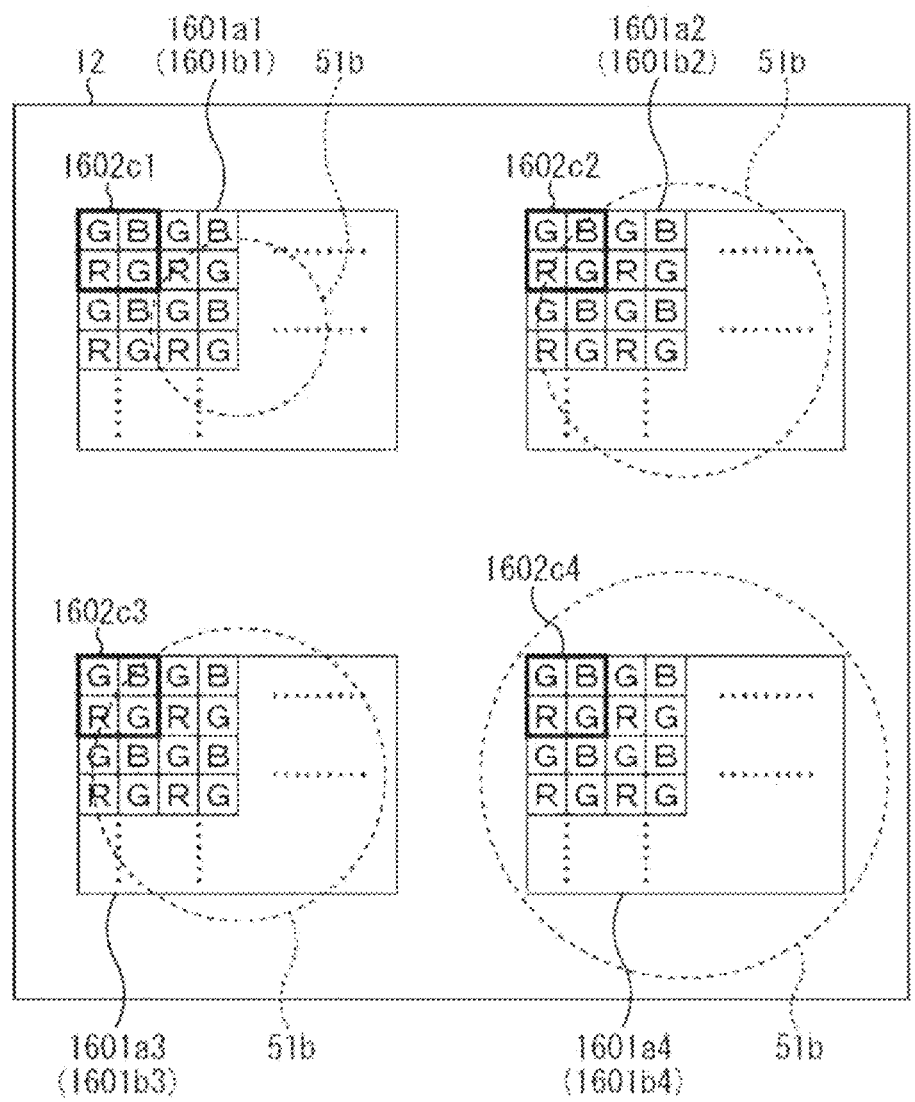
FIG. 65 is a diagram describing a configuration of a light receiving area of the camera module.

FIG. 65 shows a configuration of a light receiving area of the camera module 1 shown in FIG. 10 and FIG. 11.

As shown in FIG. 65, the camera module 1 includes the four optical units 13 (not shown). Thus, light incident on the four optical units 13 is received by light receiving units corresponding to the optical units 13. Therefore, in the camera module 1 shown in FIG. 10 and FIG. 11, the light receiving element 12 includes four light receiving areas 1601a1 to 1601a4.

Here, as another embodiment related to the light receiving unit, there may be provided a configuration in which the light receiving element 12 includes one light receiving area 1601a in which light incident on one optical unit 13 included in the camera module 1 is received, and the camera module 1 includes as many light receiving elements 12 as there are optical units 13 included in the camera module 1, and, for example, the camera module 1 shown in FIG. 10 and FIG. 11 may include four light receiving elements.

The light receiving areas 1601a1 to 1601a4 include pixel arrays 1601b1 to 1601b4 in which pixels for receiving are arranged in the form of an array.

Here, in FIG. 65, for simplicity, a circuit for driving pixels included in the pixel array and a circuit for reading the pixels are omitted, and the light receiving areas 1601a1 to 1601a4 and the pixel arrays 1601b1 to 1601b4 are represented with the same size.

The pixel arrays 1601b1 to 1601b4 included in the light receiving areas 1601a1 to 1601a4 have pixel repeating units 1602c1 to 1602c4 including a plurality of pixels. When the plurality of repeating units 1602c1 to 1602c4 are arranged in both the vertical direction and the lateral direction in the form of an array, the pixel arrays 1601b1 to 1601b4 are formed.

The optical units 13 are disposed on the four light receiving areas 1601a1 to 1601a4 included in the light receiving element 12. The four optical units 13 include the diaphragm plate 51 as a part thereof. In FIG. 65, as an example of the opening diameters of the four opening areas 51b of the diaphragm plate 51, the opening area 51b of the diaphragm plate 51 shown in D of FIG. 64 is indicated by dashed lines.

In the field of image signal processing, as a technique for obtaining an image with a higher resolution when applied to an original image, a super-resolution technique is known. An example thereof is disclosed in, for example, JP 2015-102794A.

The camera module 1 shown in FIG. 10 and FIG. 11 may have the cross-sectional structure that is a structure shown in FIG. 13, FIG. 16, FIG. 17, FIG. 34, FIG. 35, FIG. 37, or FIG. 55.

In the camera module 1, optical axes of the optical units 13 including two each of the optical units 13 are arranged on the surface of the module 1 which is the light incident surface in the vertical direction and the lateral direction extend in the same direction. Accordingly, a plurality of images that are not necessarily the same can be obtained using different light receiving areas while optical axes are oriented in the same direction.

The camera module 1 having such a structure uses a super-resolution technique for the plurality of obtained original images and is suitable for obtaining an image having a higher resolution than one image obtained from one optical unit 13.

FIG. 66 to FIG. 69 show pixel configuration examples of the light receiving area of the camera module 1 shown in FIG. 10 and FIG. 11.

Here, in FIG. 66 to FIG. 69, a G pixel represents a pixel that receives light of a green wavelength, an R pixel represents a pixel that receives light of a red wavelength, and a B pixel represents a pixel that receives light of a blue wavelength. A C pixel represents a pixel that receives light of the full visible light wavelength range.

Figure 66:
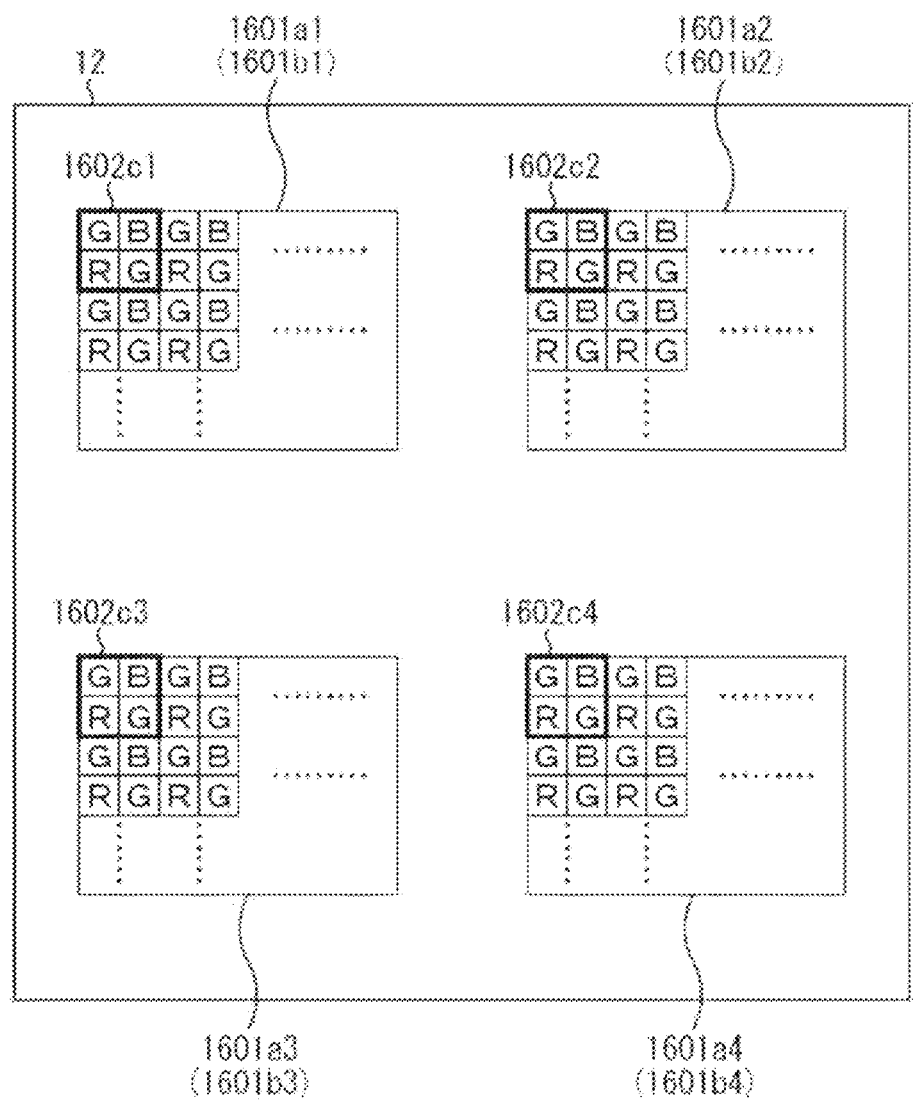
FIG. 66 is a diagram showing a first example of a pixel array of the light receiving area of the camera module.

FIG. 66 shows a first example of pixel arrays of the four pixel arrays 1601b1 to 1601b4 included in the light receiving element 12 of the camera module 1.

In the four pixel arrays 1601b1 to 1601b4, the repeating units 1602c1 to 1602c4 are repeatedly arranged in the row direction and the column direction. The repeating units 1602c1 to 1602c4 in FIG. 66 each include R, G, B, and G pixels.

The pixel array in FIG. 66 provides a function of appropriately obtaining three R, G, and B color images obtained by separating incident light from a subject to which visible light is emitted into red (R), green (G), and blue (B).

Figure 67:
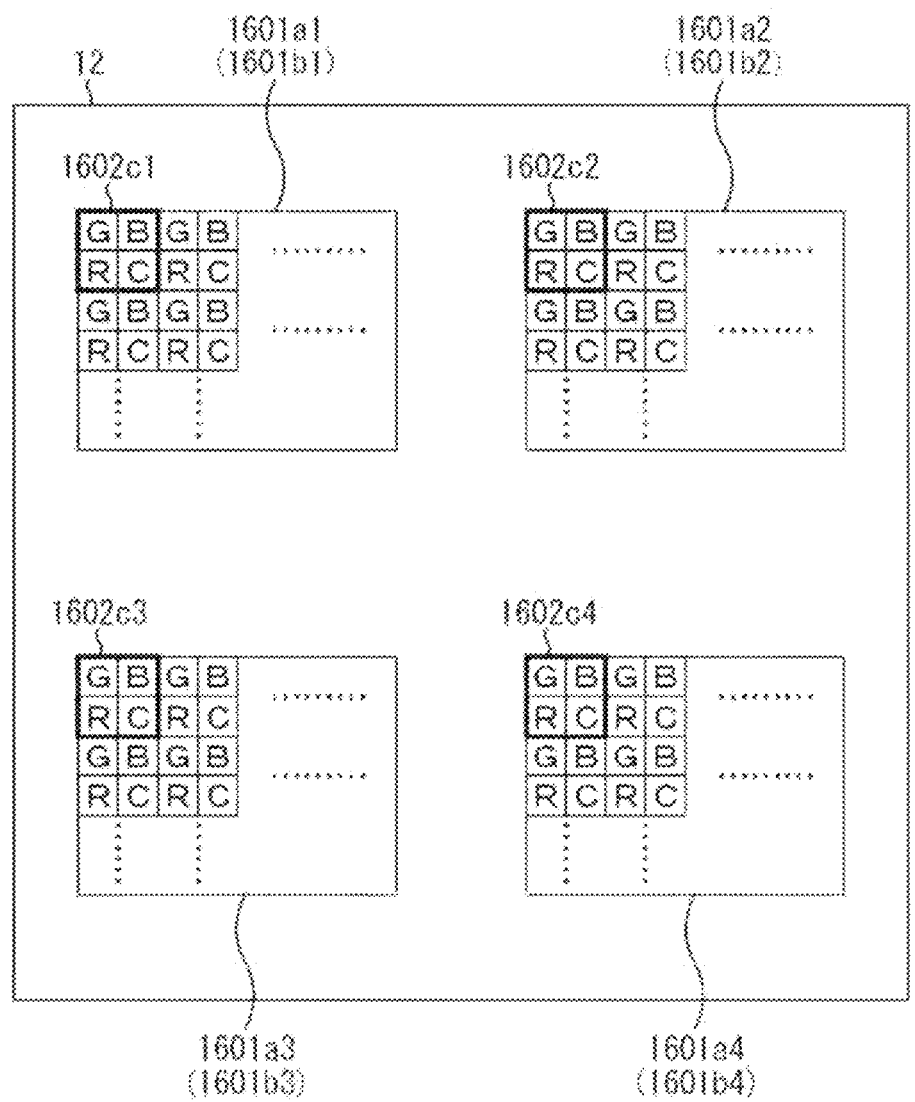
FIG. 67 is a diagram showing a second example of a pixel array of the light receiving area of the camera module.

FIG. 67 shows a second example of pixel arrays of the four pixel arrays 1601b1 to 1601b4 included in the light receiving element 12 of the camera module 1.

The pixel array in FIG. 67 has a different combination of wavelengths (colors) of light that pixels constituting the repeating units 1602c1 to 1602c4 receive from the pixel array in FIG. 66. In FIG. 67, the repeating units 1602c1 to 1602c4 each include R, G, B, and C pixels.

The pixel array in FIG. 67 includes a C pixel that receives light of the full visible light wavelength range that is not separated into R, G, and B as described above. The C pixel receives more light than the R, G, and B pixels that receive a part of separated light. Thus, this configuration provides a function of obtaining an image having a higher brightness or an image having a higher gradation for luminance using information obtained by the C pixel that has received more light, for example, subject luminance information, even if, for example, illumination of a subject is low.

Figure 68:
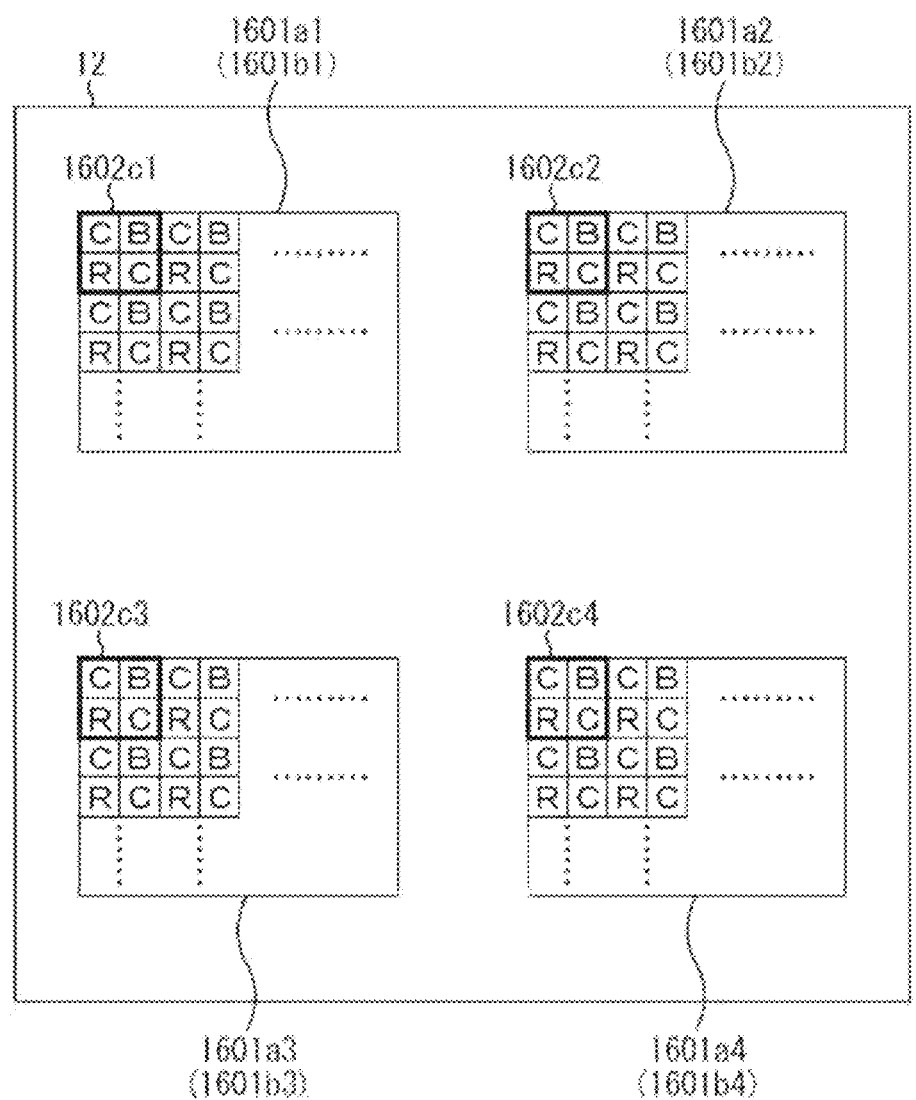
FIG. 68 is a diagram showing a third example of a pixel array of the light receiving area of the camera module.

FIG. 68 shows a third example of pixel arrays of the four pixel arrays 1601b1 to 1601b4 included in the light receiving element 12 of the camera module 1.

In FIG. 68, the repeating units 1602c1 to 1602c4 each include R, C, B, and C pixels.

The repeating units 1602c1 to 1602c4 of pixels in FIG. 68 include no G pixel. Information corresponding to the G pixel is obtained by arithmetically processing information from C, R, and B pixels, and for example, is obtained by subtracting output values of the R pixel and the B pixel from an output value of the C pixel.

The repeating units 1602c1 to 1602c4 of pixels shown in FIG. 68 include two C pixels that receive light of the full light wavelength range, which is twice as many as that of the repeating units 1602c1 to 1602c4 shown in FIG. 67. In addition, in the repeating units 1602c1 to 1602c4 of pixels shown in FIG. 68, two C pixels are disposed in the diagonal direction of the outline of the repeating unit 1602c so that the pitch between the C pixels in the pixel array 1601b in FIG. 68 is twice the pitch between the C pixels in the pixel array 1601b in FIG. 67 in both the vertical direction and the lateral direction of the pixel array 1601b.

Thus, the configuration shown in FIG. 68 can obtain information obtained from the C pixel that has received more light, for example, luminance information, for example, when illumination of a subject is low, with a resolution that is twice that of the configuration shown in FIG. 67. Thus, there is provided a function of obtaining a vivid image with a resolution that is twice as high.

Figure 69:
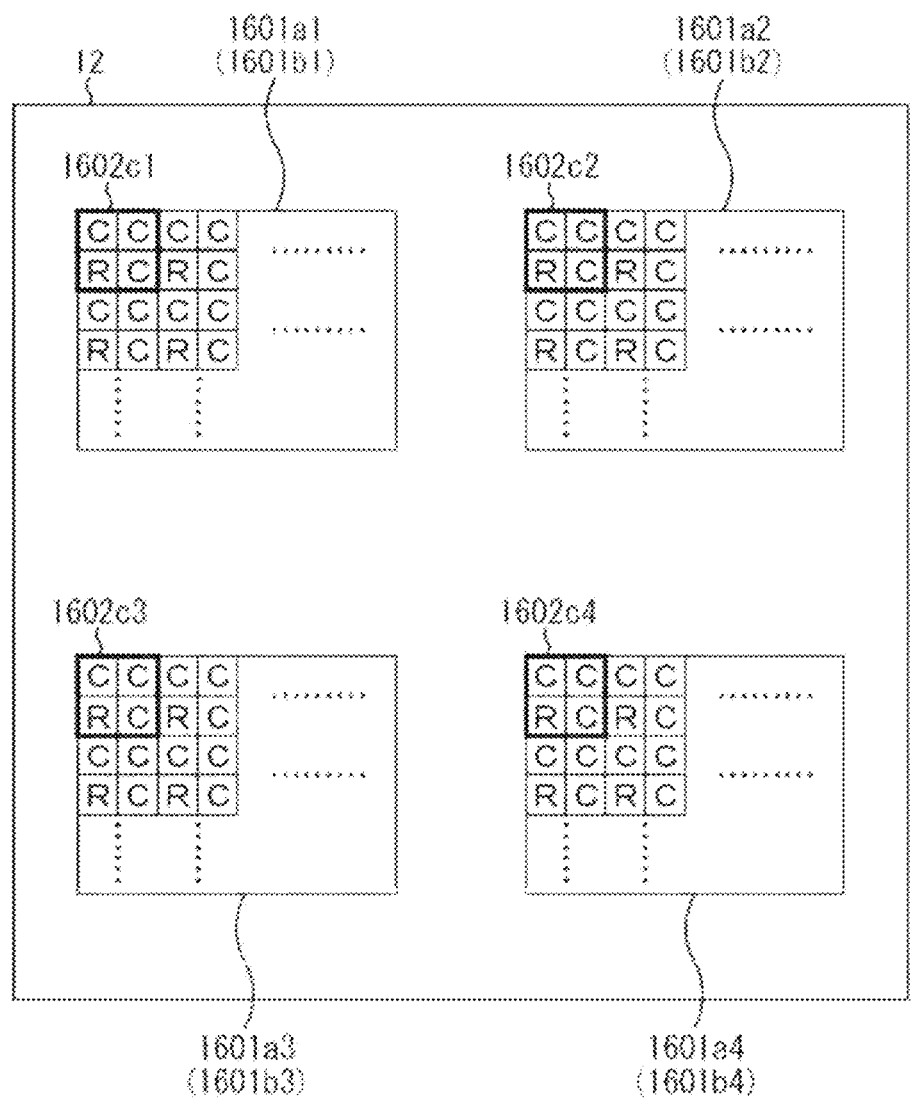
FIG. 69 is a diagram showing a fourth example of a pixel array of the light receiving area of the camera module.

FIG. 69 shows a fourth example of pixel arrays of the four pixel arrays 1601b1 to 1601b4 included in the light receiving element 12 of the camera module 1.

In FIG. 69, the repeating units 1602c1 to 1602c4 each include R, C, C, and C pixels.

For example, in an application for a camera which is mounted in an automobile and captures an image in front thereof, color images are not necessarily demanded in many cases. A function of recognizing a red brake lamp of the automobile that runs forward and a red signal of a traffic light installed at a road and recognizing shapes of other subjects is necessary in many cases.

Thus, the configuration shown in FIG. 69 includes the R pixel so that a red brake lamp of the automobile and a red signal of the traffic light installed at the road are recognized and includes a larger number of C pixels that receive more light than the repeating unit 1602c of pixels shown in FIG. 68. Therefore, for example, even if illumination of a subject is low, there is provided a function of obtaining a vivid image with a higher resolution.

Here, all of the camera modules 1 including the light receiving element 12 shown in FIGS. 66 to 69 may use any of the shapes shown in A to D of FIG. 64 as the shape of the diaphragm plate 51.

In the camera module 1 shown in FIG. 10 and FIG. 11 which includes any of the light receiving elements 12 shown in FIGS. 66 to 69 and any of the diaphragm plates 51 in A to D of FIG. 64, optical axes of the optical units 13 including two each of the optical units 13 are arranged on the surface of the camera module 1 which is the light incident surface extend in the same direction in the vertical direction and the lateral direction.

The camera module 1 having such a structure provides a function of obtaining an image with a higher resolution by applying a super-resolution technique to a plurality of obtained original images.

Figure 70:
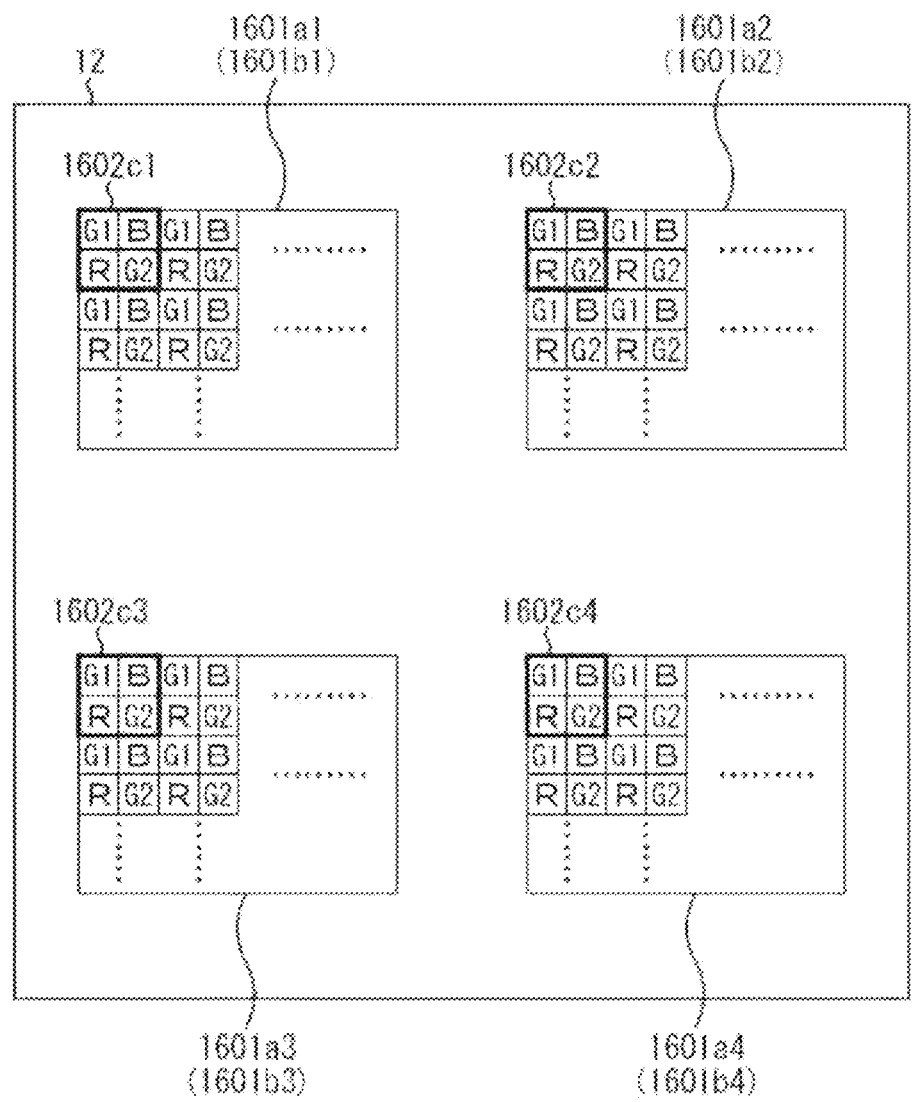
FIG. 70 is a diagram showing a modified example of the pixel array shown in FIG. 66.

FIG. 70 shows modified examples of the pixel array shown in FIG. 66.

The repeating units 1602c1 to 1602c4 in FIG. 66 include R, G, B, and G pixels, and two G pixels with the same color have the same structure. On the other hand, in FIG. 70, the repeating units 1602c1 to 1602c4 include R, G1, B, and G2 pixels, and two G pixels with the same color, that is, the G1 pixel and the G2 pixel, have different pixel structures.

As a signal generating unit (for example, a photodiode) included in the pixel, the G1 pixel and the G2 pixel include a unit in which the G2 pixel has an appropriate operation limit higher than the G1 pixel (for example, has a larger saturation charge amount). In addition, the magnitude (for example, a charge voltage conversion capacity) of a unit for converting a generated signal included in the pixel is larger in the G2 pixel than the G1 pixel.

In such a configuration, since the G2 pixel has an output signal when a signal of a certain amount (for example, of electric charge) is generated for each unit time that is reduced to be smaller than the G1 pixel, and has a larger saturation charge amount than the G1 pixel, for example, even if illumination of a subject is high, the pixel does not reach an operation limit and accordingly, there is provided a function of obtaining an image having a high gradation.

On the other hand, when a signal of a certain amount (for example, of electric charge) is generated for each unit time, since the G1 pixel obtains a larger output signal than the G2 pixel, for example, even if illumination of a subject is low, there is provided a function of obtaining an image having a high gradation.

Since the light receiving element 12 shown in FIG. 70 includes the G1 pixel and the G2 pixel, there is provided a function of obtaining an image having a high gradation in a wide illumination range which is a so-called wide dynamic range image.

Figure 71:
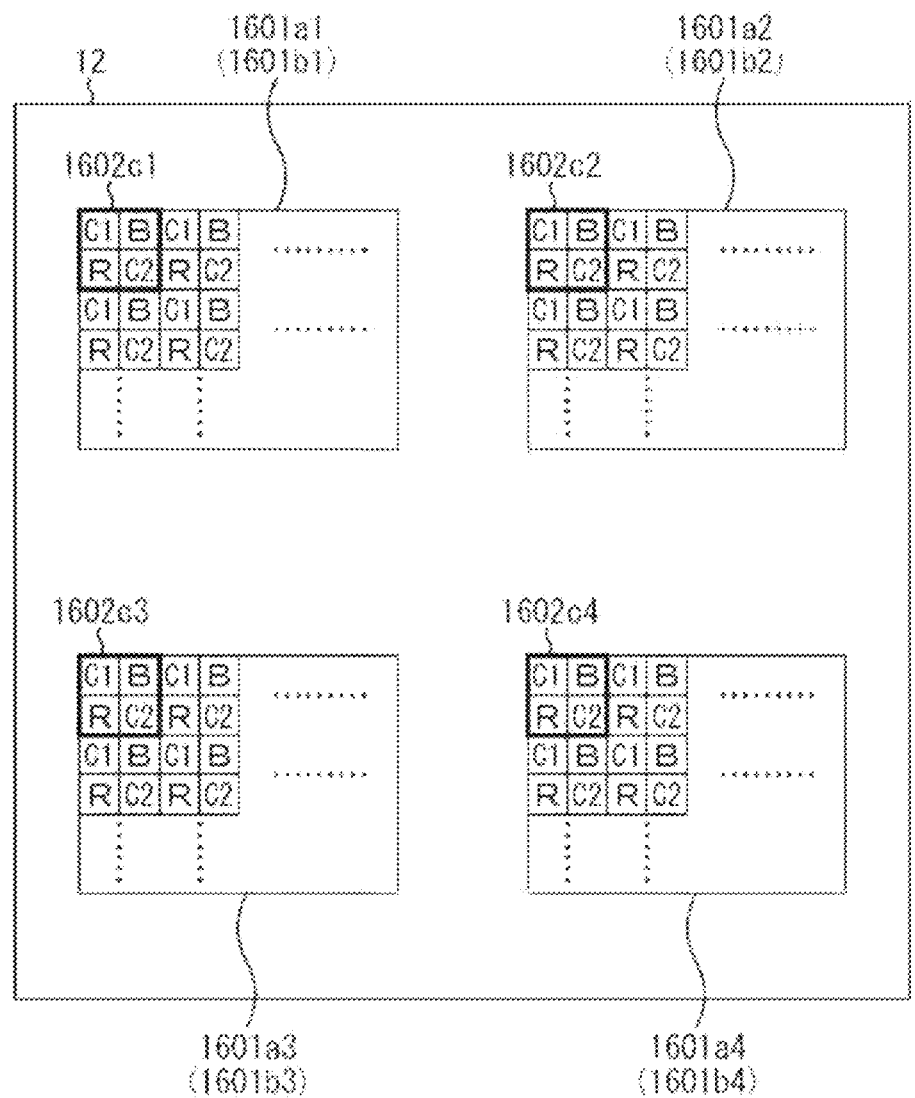
FIG. 71 is a diagram showing a modified example of the pixel array in FIG. 68.

FIG. 71 shows modified examples of the pixel array in FIG. 68.

The repeating units 1602c1 to 1602c4 in FIG. 68 include R, C, B, and C pixels, and two C pixels with the same color have the same structure. On the other hand, in FIG. 71, the repeating units 1602c1 to 1602c4 include R, C1, B, and C2 pixels, and two C pixels with the same color, that is, the C1 pixel and the C2 pixel, have different pixel structures.

As a signal generating unit (for example, a photodiode) included in the pixel, the C1 pixel and the C2 pixel also include a unit in which the C2 pixel has an operation limit higher than the C1 pixel (for example, has a larger saturation charge amount). In addition, the magnitude (for example, a charge voltage conversion capacity) of a unit for converting a generated signal included in the pixel is larger in the C2 pixel than the C1 pixel.

Figure 72:
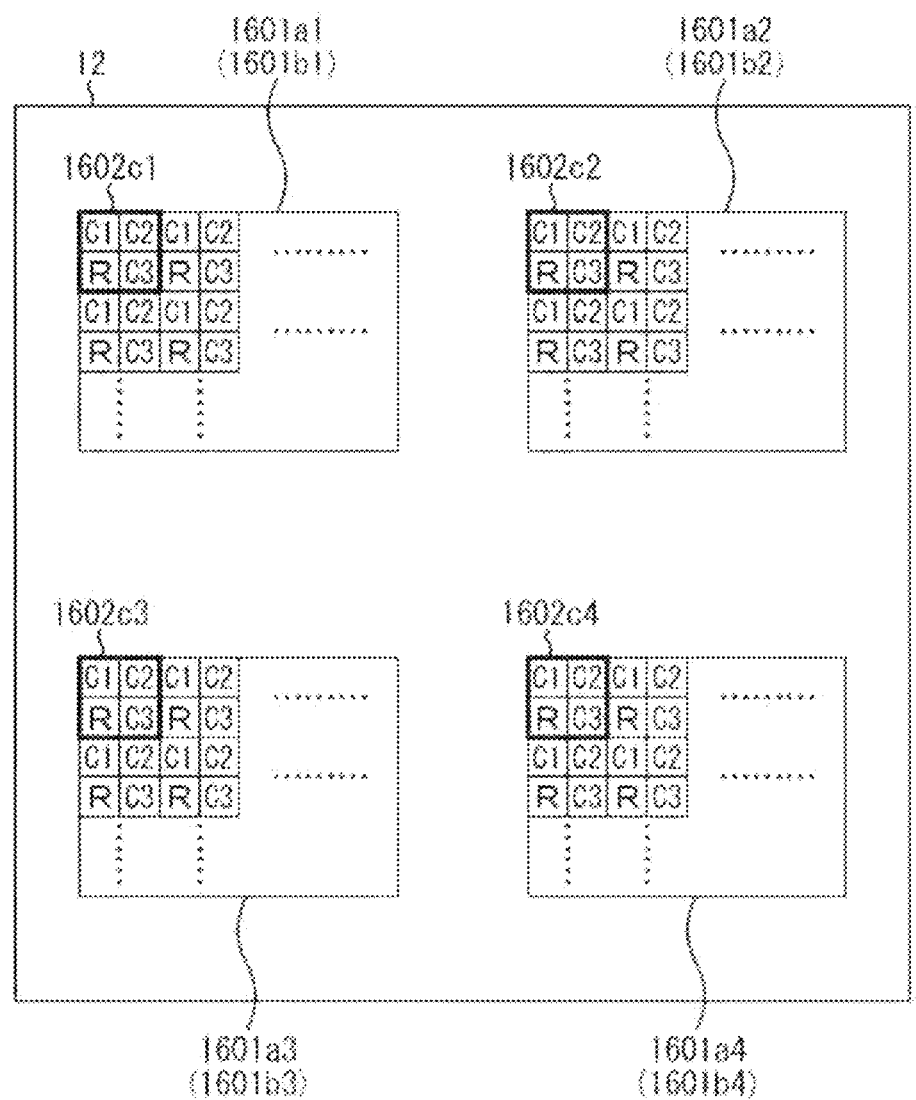
FIG. 72 is a diagram showing a modified example of the pixel array in FIG. 69.

FIG. 72 shows modified examples of the pixel array in FIG. 69.

The repeating units 1602c1 to 1602c4 in FIG. 69 include R, C, C, and C pixels, and three C pixels with the same color have the same structure. On the other hand, in FIG. 72, the repeating units 1602c1 to 1602c4 include R, C1, C2, and C pixels, and three C pixels with the same color, that is, the C1 pixel to the C3 pixel, have different pixel structures.

For example, as a signal generating unit (for example, a photodiode) included in the pixel, the C1 to C3 pixels include a unit in which the C2 pixel has a higher operation limit than the C1 pixel and the C3 pixel has a higher operation limit than the C2 pixel (for examples, has a higher saturation charge amount). In addition, the magnitude (for example, a charge voltage conversion capacity) of a unit for converting a generated signal included in the pixel is larger in the C2 pixel than the C1 pixel and is larger in the C3 pixel than the C2 pixel.

Since the light receiving element 12 shown in FIG. 71 and FIG. 72 has the above configuration, similarly to the light receiving element 12 shown in FIG. 70, there is provided a function of obtaining an image having a high gradation in a wide illumination range which is a so-called wide dynamic range image.

As a configuration of the diaphragm plate 51 of the camera module 1 including the light receiving element 12 shown in FIG. 70 to FIG. 72, various configurations of the diaphragm plate 51 shown in A to D of FIG. 64 and modified examples thereof can be used.

Here, all of the camera modules 1 including the light receiving element 12 shown in FIGS. 70 to 72 may use any of the shapes shown in A to D of FIG. 64 as the shape of the diaphragm plate 51.

In the camera module 1 shown in FIG. 10 and FIG. 11 which includes any of the light receiving elements 12 shown in FIGS. 66 to 69 and any of the diaphragm plates 51 in A to D of FIG. 64, optical axes of the optical units 13 including two each of the optical units 13 are arranged on the surface of the camera module 1 which is the light incident surface extend in the same direction in the vertical direction and the lateral direction.

Figure 73:
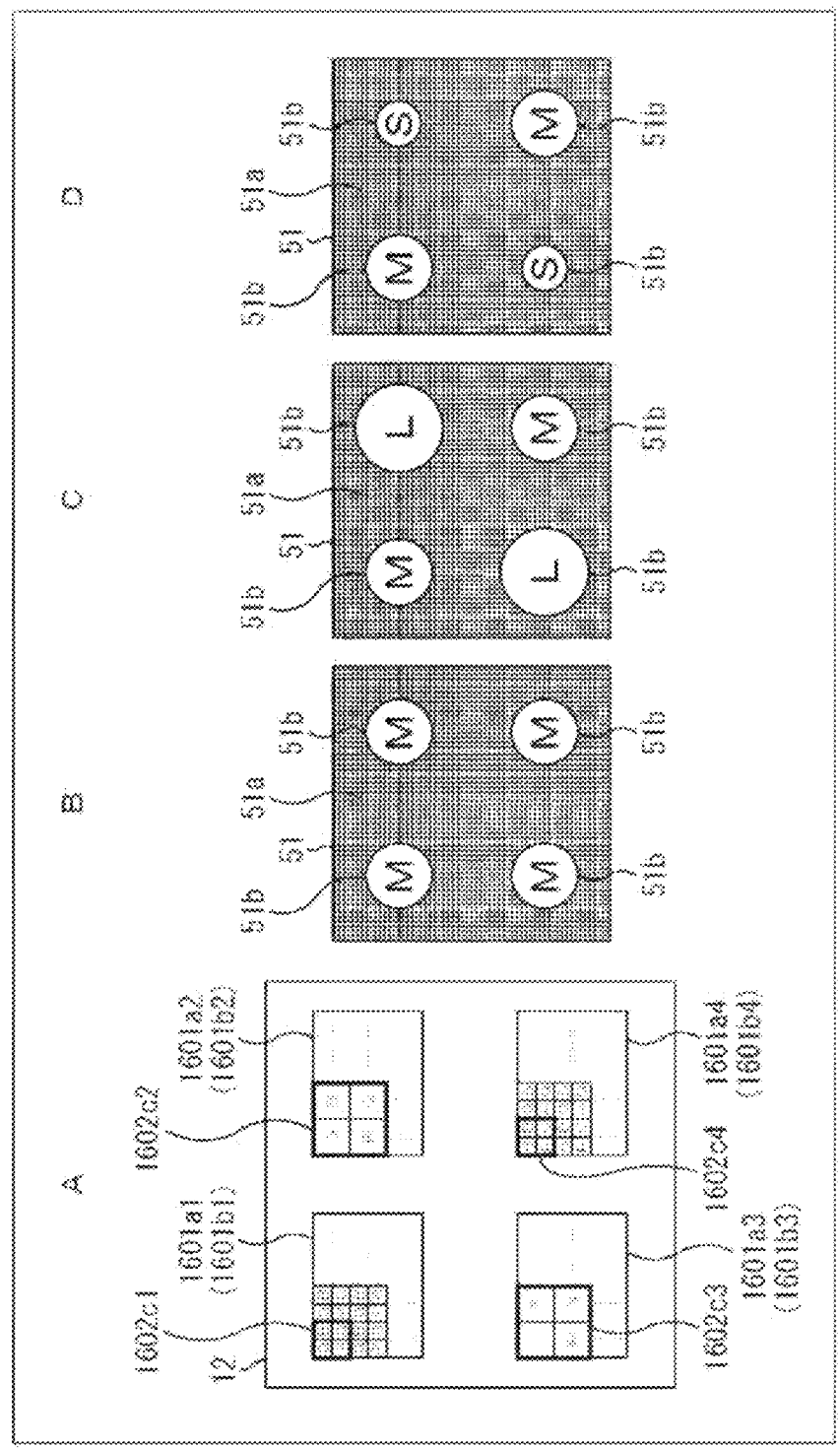
FIG. 73 is a diagram showing a fifth example of the pixel array of the light receiving area of the camera module.

A of FIG. 73 shows a fifth example of pixel arrays of the four pixel arrays 1601b1 to 1601b4 included in the light receiving element 12 of the camera module 1.

The four pixel arrays 1601b1 to 1601b4 included in the light receiving element 12 do not necessarily have the same structure as described above, but may have different structures as shown in A of FIG. 73.

In the light receiving element 12 shown in A of FIG. 73, the pixel array 1601b1 and the pixel array 1601b4 have the same structure, and the repeating units 1602c1 and 1602c4 constituting the pixel arrays 1601b1 and 1601b4 have the same structure.

On the other hand, the structures of the pixel array 1601b2 and the pixel array 1601b3 are different from the structures of the pixel array 1601b1 and the pixel array 1601b4. Specifically, the size of pixels included in the repeating units 1602c2 and 1602c3 of the pixel array 1601b2 and the pixel array 1601b3 is larger than the size of pixels included in the repeating units 1602c1 and 1602c4 of the pixel array 1601b1 and the pixel array 1601b4. Furthermore, the size of the photoelectric converting unit included in the pixel is large. Since the size of the pixel size is large, the area size of the repeating units 1602c2 and 1602c3 is larger than the area size of the repeating units 1602c1 and 1602c4. Therefore, the pixel array 1601b2 and the pixel array 1601b3 have the same areas as and a smaller number of pixels than the pixel array 1601b1 and the pixel array 1601b4.

As a configuration of the diaphragm plate 51 of the camera module 1 including the light receiving element 12 in A of FIG. 73, various configurations of the diaphragm plate 51 shown in A to C of FIG. 64, configurations of the diaphragm plate 51 shown in B to D of FIG. 73, or modified examples thereof can be used.

Generally, a light receiving element using large pixels provides a function of obtaining a higher signal noise ratio (S/N ratio) than that of a light receiving element using small pixels.

For example, the magnitude of noise in a circuit configured to read a signal and a circuit configured to amplify the read signal is almost the same in the light receiving element using large pixels and the light receiving element using small pixels. On the other hand, the magnitude of a signal generated in a signal generating unit included in the pixel is larger when the pixel is larger.

Therefore, a light receiving element using large pixels provides a function of obtaining a higher signal noise ratio (S/N ratio) than that of a light receiving element using small pixels.

On the other hand, when the size of the pixel array is the same, the light receiving element using small pixels has a higher resolution than the light receiving element using large pixels.

Therefore, the light receiving element using small pixels provides a function of obtaining a higher resolution image than that of the light receiving element using large pixels.

The configuration included in the light receiving element 12 shown in A of FIG. 73 provides a function of obtaining an image having a high resolution using the light receiving areas 1601a1 and 1601a4 having a small pixel size and a high resolution, for example, when illumination of a subject is high and therefore a large signal is obtained in the light receiving element 12, and furthermore, obtaining an image with a higher resolution by applying a super-resolution technique to these two images.

In addition, when there is a concern of a S/N ratio of an image being lowered because illumination of a subject is low and therefore no large signal is obtained in the light receiving element 12, there is provided a function of obtaining an image having a high S/N ratio using the light receiving areas 1601a2 and 1601a3 in which an image having a high S/N ratio is obtained and furthermore obtaining an image with a higher resolution by applying a super-resolution technique to these two images.

In this case, in the camera module 1 including the light receiving element 12 shown in A of FIG. 73, as the shape of the diaphragm plate 51, for example, the shape of the diaphragm plate 51 shown in B of FIG. 73, may be used, among three shapes of the diaphragm plates 51 shown in B to D of FIG. 73.

Among three shapes of the diaphragm plates 51 shown in B to D of FIG. 73, for example, in the diaphragm plate 51 in C of FIG. 73, the opening area 51b of the diaphragm plate 51 used in combination with the light receiving areas 1601a2 and 1601a3 using large pixels is larger than the opening area 51b of the diaphragm plate 51 used in combination with other light receiving areas.

Therefore, the camera module 1 in which the diaphragm plate 51 in C of FIG. 73 among three shapes of the diaphragm plate 51 shown in B to D of FIG. 73 is used in combination with the light receiving element 12 shown in A of FIG. 73 provides a function of obtaining an image having a higher S/N ratio in the light receiving areas 1601a2 and 1601a3 than that of the camera module 1 in which the diaphragm plate 51 in B of FIG. 73 is used in combination with the light receiving element 12 shown in A of FIG. 73, for example, when illumination of a subject is low and therefore no large signal is obtained in the light receiving element 12.

Among three shapes of the diaphragm plates 51 shown in B to D of FIG. 73, for example, in the diaphragm plate 51 in D of FIG. 73, the opening area 51b of the diaphragm plate 51 used in combination with the light receiving areas 1601a2 and 1601a3 using large pixels is smaller than the opening area 51b of the diaphragm plate 51 used in combination with other light receiving areas.

Therefore, the camera module 1 in which the diaphragm plate 51 in D of FIG. 73 among three shapes of the diaphragm plate 51 shown in B to D of FIG. 73 is used in combination with the light receiving element 12 shown in A of FIG. 73 provides a function of further reducing an amount of light incident on the light receiving areas 1601a2 and 1601a3, for example, when illumination of a subject is high and therefore a large signal is obtained in the light receiving element 12, than the camera module 1 in which the diaphragm plate 51 in B of FIG. 73 among three shapes of the diaphragm plate 51 shown in B to D of FIG. 73 is used in combination with the light receiving element 12 shown in A of FIG. 73.

Accordingly, there is provided a function of preventing the occurrence of an event which is caused when excessive light enters pixels included in the light receiving areas 1601a2 and 1601a3 and therefore exceeds an appropriate operation limit of pixels included in the light receiving areas 1601a2 and 1601a3 (for example, exceeds a saturation charge amount).

Figure 74:
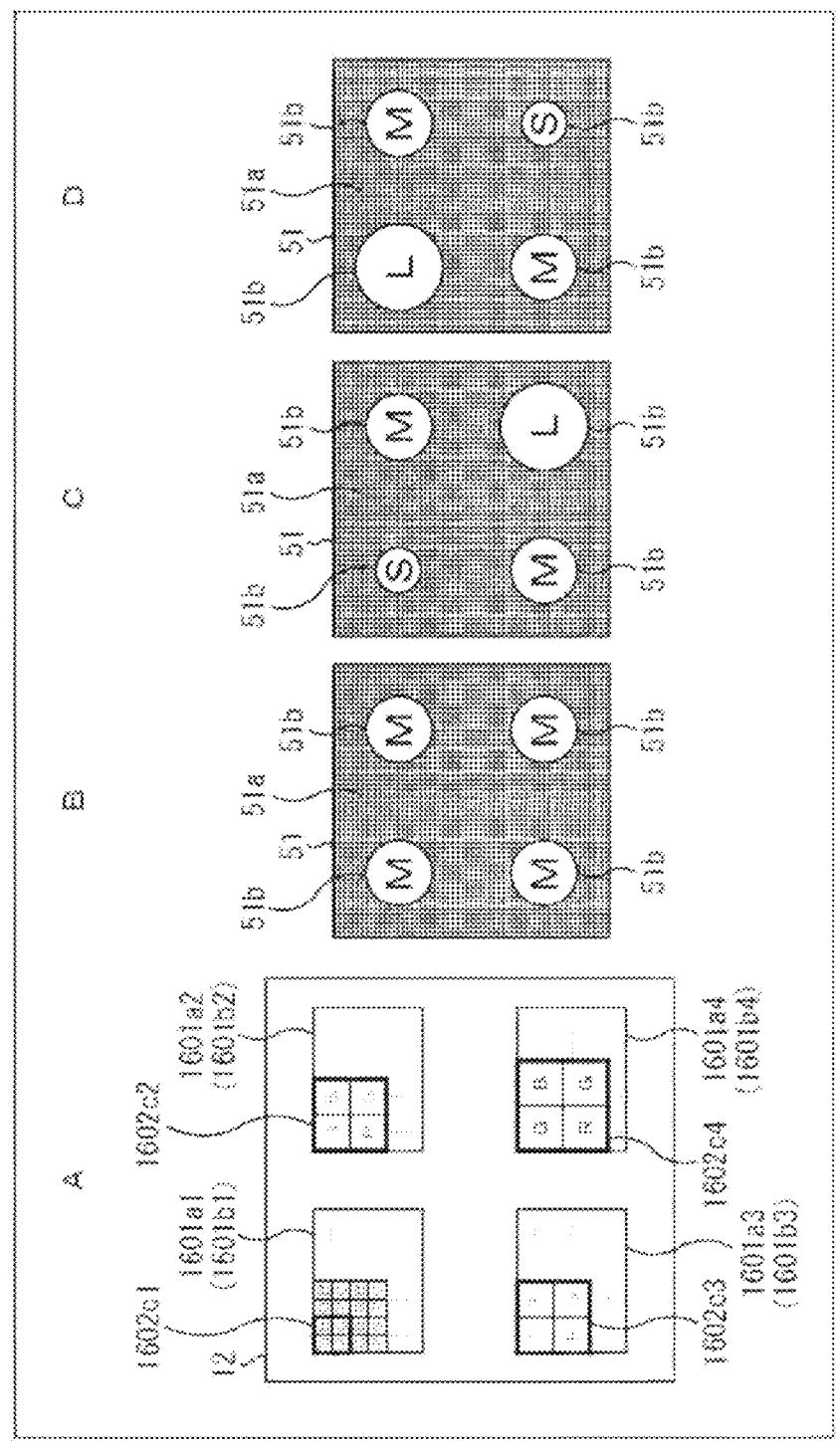
FIG. 74 is a diagram showing a sixth example of the pixel array of the light receiving area of the camera module.

A of FIG. 74 shows a sixth example of pixel arrays of the four pixel arrays 1601b1 to 1601b4 included in the light receiving element 12 of the camera module 1.

In the light receiving element 12 shown in A of FIG. 74, the area size of the repeating unit 1602c1 of the pixel array 1601b1 is smaller than the area size of the repeating units 1602c1 and 1602c2 of the pixel arrays 1601b2 and 1601b3. The area size of the repeating unit 1602c4 of the pixel array 1601b4 is larger than the area size of the repeating units 1602c1 and 1602c2 of the pixel arrays 1601b2 and 1601b3.

That is, the area sizes of the repeating units 1602c1 to 1602c4 have the relationship of the repeating unit 1602c1< (the repeating unit 1602c2=the repeating unit 1602c3)<the repeating unit 1602c4.

When the area size of the repeating units 1602c1 to 1602c4 is larger, the pixel size is larger and the size of the photoelectric converting unit is larger.

As a configuration of the diaphragm plate 51 of the camera module 1 including the light receiving element 12 in A of FIG. 74, various configurations of the diaphragm plate 51 shown in A to D of FIG. 64, configurations of the diaphragm plate 51 shown in B to D of FIG. 74, or modified examples thereof can be used.

The above configuration of the light receiving element 12 shown in A of FIG. 74 provides a function of obtaining an image having a high resolution using the light receiving area 1601a1 having a small pixel size and a high resolution when, for example, illumination of a subject is high is high and therefore a large signal is obtained in the light receiving element 12.

In addition, when there is a concern of a S/N ratio of an image being lowered because illumination of a subject is low and therefore no large signal is obtained in the light receiving element 12, there is provided a function of obtaining an image having a high S/N ratio using the light receiving areas 1601a2 and 1601a3 in which an image having a high S/N ratio is obtained and furthermore obtaining an image with a higher resolution by applying a super-resolution technique to these two images.

When there is a concern of illumination of a subject being even lower and therefore an S/N ratio of an image in the light receiving element 12 being even lower, there is provided a function of obtaining an image having a higher S/N ratio using the light receiving area 1601a4 in which an image having a higher S/N ratio having is obtained.

In this case, in the camera module 1 including the light receiving element 12 shown in A of FIG. 74, as the shape of the diaphragm plate 51, for example, the shape of the diaphragm plate 51 shown in B of FIG. 74, may be used, among three shapes of the diaphragm plates 51 shown in B to D of FIG. 74.

Among three shapes of the diaphragm plate 51 shown in B to D of FIG. 74, for example, in the diaphragm plate 51 in C of FIG. 74, the opening area 51b of the diaphragm plate 51 in used in combination with the light receiving areas 1601a2 and 1601a3 using large pixels is larger than the opening area 51b of the diaphragm plate 51 used in combination with the light receiving area 1601a1 using small pixels. In addition, the opening area 51b of the diaphragm plate 51 used in combination with the light receiving area 1601a4 using larger pixels is even larger.

Therefore, the camera module 1 in which the diaphragm plate 51 in C of FIG. 74 among three shapes of the diaphragm plate 51 shown in B to D of FIG. 74 is used in combination with the light receiving element 12 shown in A of FIG. 74 provides a function of obtaining an image having a higher S/N ratio in the light receiving areas 1601a2 and 1601a3 than that of the camera module 1 in which the diaphragm plate 51 in B of FIG. 74 among three shapes of the diaphragm plate 51 shown in B to D of FIG. 74 is used in combination with the light receiving element 12 shown in A of FIG. 74, for example, when illumination of a subject is low and therefore no large signal is obtained in the light receiving element 12, and obtaining an image having an even higher S/N ratio in the light receiving area 1601a4 when illumination of a subject is even lower.

Among three shapes of the diaphragm plate 51 shown in B to D of FIG. 74, for example, in the diaphragm plate 51 in D of FIG. 74, the opening area 51b of the diaphragm plate 51 in used in combination with the light receiving areas 1601a2 and 1601a3 using large pixels is smaller than the opening area 51b of the diaphragm plate 51 used in combination with the light receiving area 1601a1 using small pixels. In addition, the opening area 51b of the diaphragm plate 51 used in combination with the light receiving area 1601a4 using larger pixels is even smaller.

Therefore, the camera module 1 in which the diaphragm plate 51 in D of FIG. 74 among three shapes of the diaphragm plate 51 shown in B to D of FIG. 74 is used in combination with the light receiving element 12 shown in A of FIG. 74 provides a function of further reducing an amount of light incident on the light receiving areas 1601a2 and 1601a3, for example, when illumination of a subject is high and therefore a large signal is obtained in the light receiving element 12, than the camera module 1 in which the diaphragm plate 51 in B of FIG. 74 among three shapes of the diaphragm plate 51 shown in B to D of FIG. 73 is used in combination with the light receiving element 12 shown in A of FIG. 74.

Accordingly, there is provided a function of preventing the occurrence of an event which is caused when excessive light enters pixels included in the light receiving areas 1601a2 and 1601a3 and therefore exceeds an appropriate operation limit of pixels included in the light receiving areas 1601a2 and 1601a3 (for example, exceeds a saturation charge amount).

In addition, there is provided a function of further reducing an amount of light incident on the light receiving area 1601a4, and therefore preventing the occurrence of an event which is caused when excessive light enters pixels included in the light receiving area 1601a4 and therefore exceeds an appropriate operation limit of pixels included in the light receiving area 1601a4 (for example, exceeds a saturation charge amount).

Here, as another embodiment, for example, using a structure similar to a diaphragm which is used in a general camera and in which a plurality of plates are combined, and a positional relation thereof is changed to change the size of an opening, a structure in which a camera module includes the diaphragm plate 51 in which the opening area 51b is variable, and the size of the opening of the diaphragm according to illumination of a subject is changed may be used.

For example, a structure in which, when the light receiving element 12 shown in A of FIG. 73 and A of FIG. 74 is used, if illumination of a subject is low, shapes of C of FIG. 73 and C of FIG. 74 among three shapes of the diaphragm plate 51 shown in B to D of FIG. 73 and B to D of FIG. 74 are used, if illumination of a subject is higher, shapes of B of FIG. 73 and B of FIG. 74 are used, and if illumination of a subject is even higher, shapes of D of FIG. 73 and D of FIG. 74 are used may be used.

Figure 75:
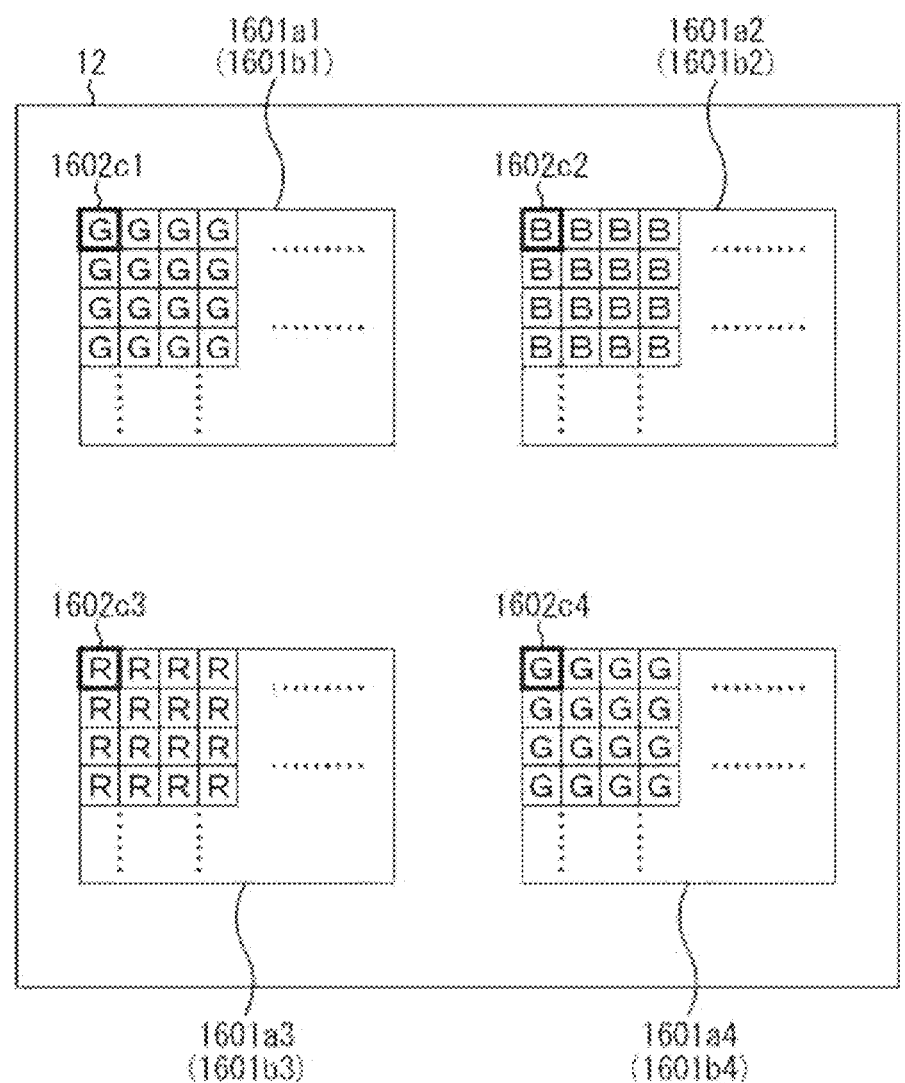
FIG. 75 is a diagram showing a seventh example of the pixel array of the light receiving area of the camera module.

FIG. 75 shows a seventh example of pixel arrays of the four pixel arrays 1601b1 to 1601b4 included in the light receiving element 12 of the camera module 1.

In the light receiving element 12 shown in FIG. 75, all pixels of the pixel array 1601b1 are pixels that receive light of a green wavelength. All pixels of the pixel array 1601b2 are pixels that receive light of a blue wavelength. All pixels of the pixel array 1601b3 are pixels that receive light of a red wavelength. All pixels of the pixel array 1601b4 are pixels that receive light of a green wavelength.

Figure 76:
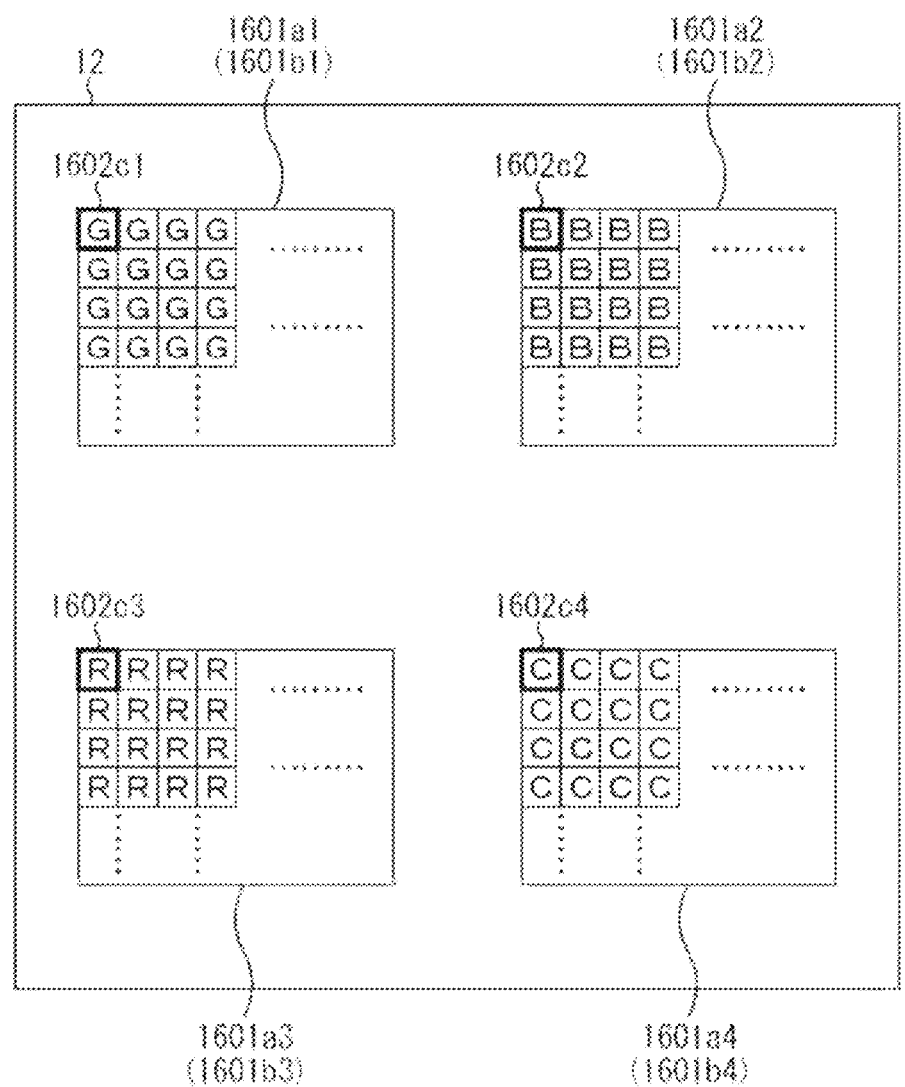
FIG. 76 is a diagram showing an eighth example of the pixel array of the light receiving area of the camera module.

FIG. 76 shows an eighth example of pixel arrays of the four pixel arrays 1601b1 to 1601b4 included in the light receiving element 12 of the camera module 1.

In the light receiving element 12 shown in FIG. 76, all pixels of the pixel array 1601b1 are pixels that receive light of a green wavelength. All pixels of the pixel array 1601b2 are pixels that receive light of a blue wavelength. All pixels of the pixel array 1601b3 are pixels that receive light of a red wavelength. All pixels of the pixel array 1601b4 are pixels that receive light of the full visible light wavelength range.

Figure 77:
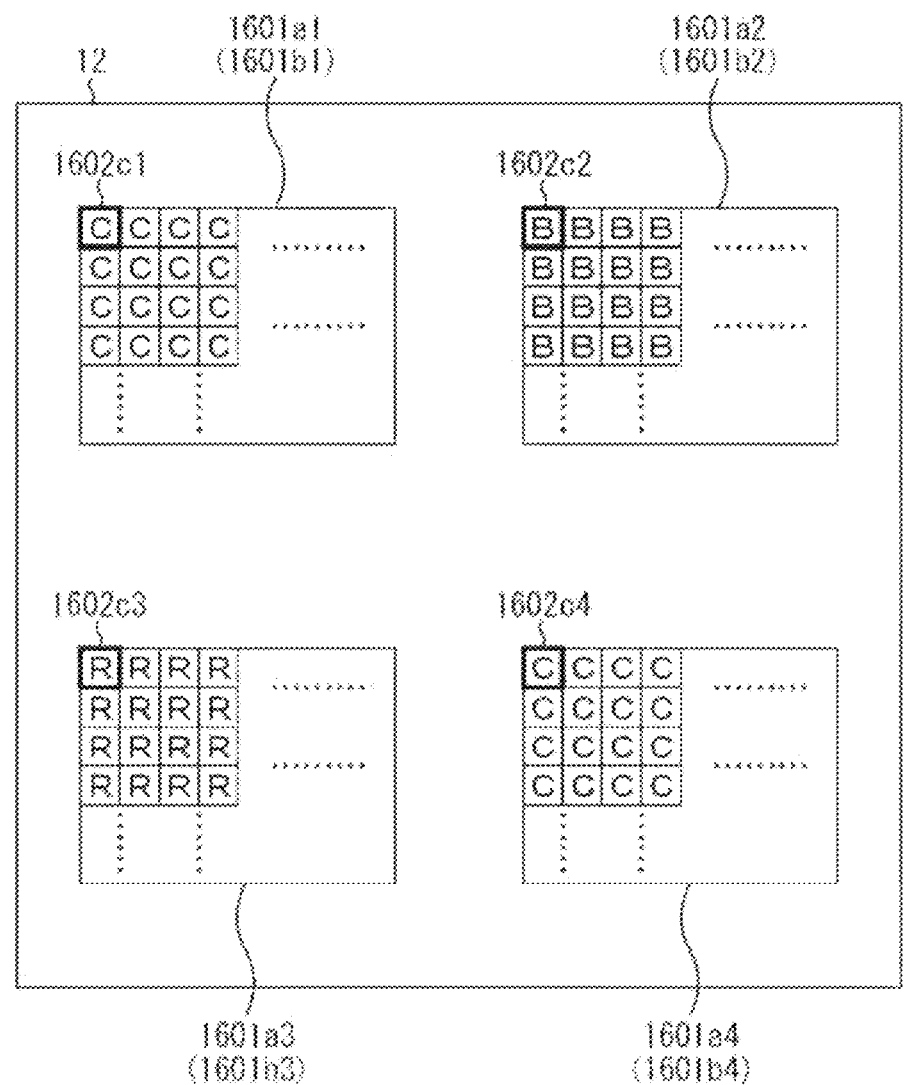
FIG. 77 is a diagram showing a ninth example of the pixel array of the light receiving area of the camera module.

FIG. 77 shows a ninth example of pixel arrays of the four pixel arrays 1601b1 to 1601b4 included in the light receiving element 12 of the camera module 1.

In the light receiving element 12 shown in FIG. 77, all pixels of the pixel array 1601b1 are pixels that receive light of the full visible light wavelength range. All pixels of the pixel array 1601b2 are pixels that receive light of a blue wavelength. All pixels of the pixel array 1601b3 are pixels that receive light of a red wavelength. All pixels of the pixel array 1601b4 are pixels that receive light of the full visible light wavelength range.

Figure 78:
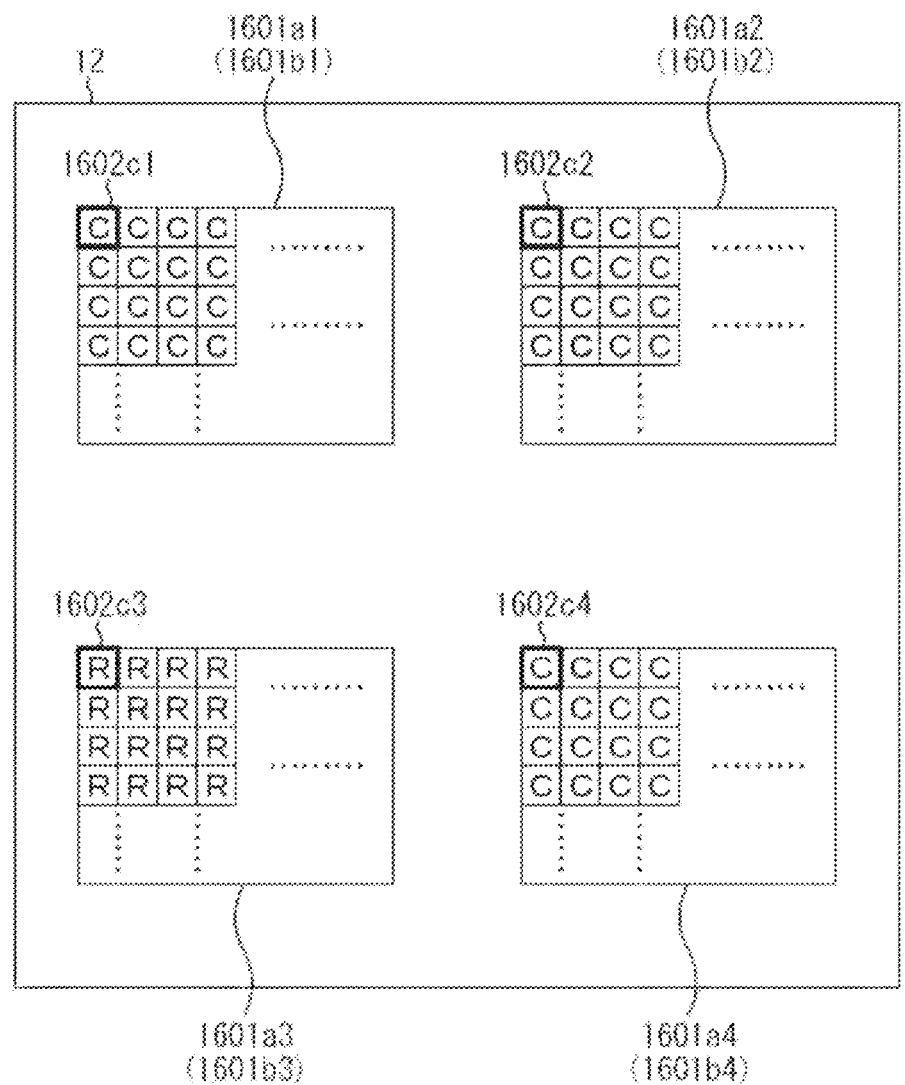
FIG. 78 is a diagram showing a tenth example of the pixel array of the light receiving area of the camera module.

FIG. 78 shows a tenth example of pixel arrays of the four pixel arrays 1601b1 to 1601b4 included in the light receiving element 12 of the camera module 1.

In the light receiving element 12 shown in FIG. 78, all pixels of the pixel array 1601b1 are pixels that receive light of the full visible light wavelength range. All pixels of the pixel array 1601b2 are pixels that receive light of the full visible light wavelength range. All pixels of the pixel array 1601b3 are pixels that receive light of a red wavelength. All pixels of the pixel array 1601b4 are pixels that receive light of the full visible light wavelength range.

As shown in FIG. 75 to FIG. 78, the pixel arrays 1601b1 to 1601b4 of the light receiving element 12 can receive light of the same wavelength band in units of pixel array.

A three RGB plate type solid state imaging device known in the related art includes three light receiving elements, and each of the light receiving elements images only an R image, only a G image, or only a B image. In the three RGB plate type solid state imaging device known in the related art, light incident on one optical unit is separated into light beams in three directions by a prism and light beams are then received using three light receiving element. Thus, positions of subject images incident on the three light receiving elements are the same among three images. Therefore, it is difficult to obtain a high sensitivity image by applying a super-resolution technique to these three images.

On the other hand, in the camera module 1 shown in FIG. 10 and FIG. 11 in which any of the light receiving elements 12 shown in FIG. 75 to FIG. 78 is used, on the surface of the camera module 1 which is the light incident surface, two each of the optical units 13 are disposed in in the vertical direction and the lateral direction in the surface, and optical axes of the four optical units 13 are parallel and extend the same direction. Accordingly, a plurality of images that are not necessarily the same can be obtained using four different light receiving areas 1601a1 to 1601a4 included in the light receiving element 12 while optical axes are oriented in the same direction.

The camera module 1 having such a structure provides a function of obtaining an image having a higher resolution than one image obtained from one optical unit 13 using a super-resolution technique for the plurality of images obtained from the four optical units 13 disposed as above.

Here, a configuration in which four images of G, R, G, and B are obtained by the light receiving element 12 shown in FIG. 75 performs the same operation as in a configuration in which four G, R, G, and B pixels are used as a repeating unit in the light receiving element 12 shown in FIG. 66.

A configuration in which four images of R, G, B, and C are obtained by the light receiving element 12 shown in FIG. 76 performs the same operation as in a configuration in which four R, G, B, and C pixels are used as a repeating unit in the light receiving element 12 shown in FIG. 67.

A configuration in which four images of R, C, B, and C are obtained by the light receiving element 12 shown in FIG. 77 performs the same operation as in a configuration in which four R, C, B, and C pixels are used as a repeating unit in the light receiving element 12 shown in FIG. 68.

A configuration in which four images of R, C, C, and C are obtained by the light receiving element 12 shown in FIG. 78 performs the same operation as in a configuration in which four R, C, C, and C pixels are used as a repeating unit in the light receiving element 12 shown in FIG. 69.

As a configuration of the diaphragm plate 51 of the camera module 1 including any of the light receiving elements 12 in FIG. 75 to FIG. 75, various configurations of the diaphragm plate 51 shown in A to D of FIG. 64, or modified examples thereof can be used.

Figure 79:
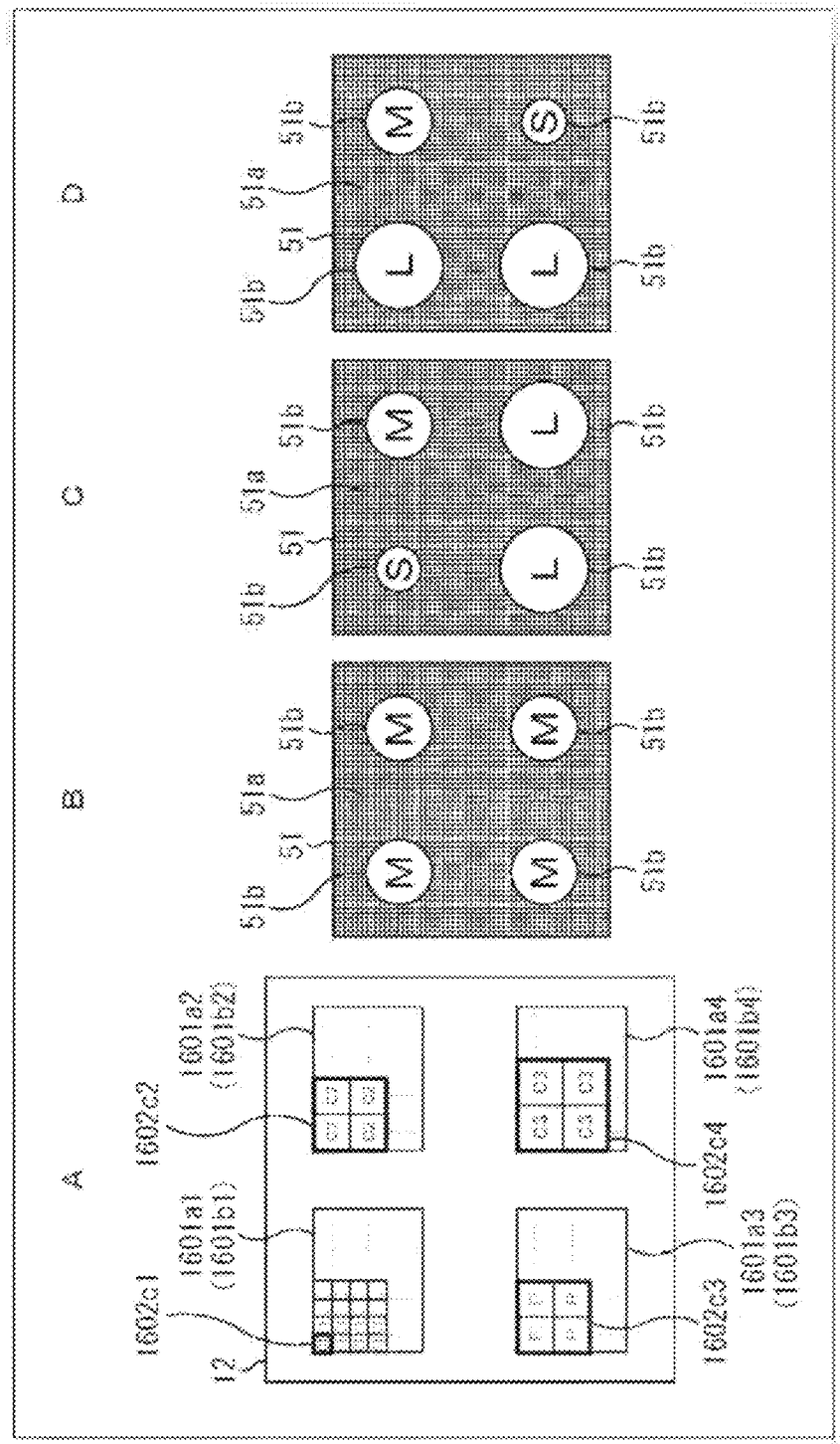
FIG. 79 is a diagram showing an 11th example of the pixel array of the light receiving area of the camera module.

A of FIG. 79 shows an 11th example of pixel arrays of the four pixel arrays 1601b1 to 1601b4 included in the light receiving element 12 of the camera module 1.

In the light receiving element 12 shown in A of FIG. 79, the pixel size of one pixel and wavelengths of light that the pixels receive are different in the pixel arrays 1601b1 to 1601b4.

The pixel array 1601b1 has the smallest pixel size, the pixel arrays 1601b2 and 1601b3 have the same pixel size which is larger than the pixel array 1601b1, and the pixel array 1601b4 has a larger pixel size than the pixel arrays 1601b2 and 1601b3. The size of the pixel is proportional to the size of the photoelectric converting unit included in the pixels.

Regarding wavelengths of light that pixels receive, the pixel arrays 1601b1, 1601b2, and 1601b4 include pixels that receive light of the full visible light wavelength range, and the pixel array 1601b3 includes pixels that receive light of a red wavelength.

The above configuration of the light receiving element 12 shown in A of FIG. 79 provides a function of obtaining an image having a high resolution using the light receiving area 1601a1 having a small pixel size and a high resolution when, for example, illumination of a subject is high is high and therefore a large signal is obtained in the light receiving element 12.

In addition, when there is a concern of a S/N ratio of an image being lowered because illumination of a subject is low and therefore no large signal is obtained in the light receiving element 12, there is provided a function of obtaining an image having a high S/N ratio using the light receiving area 1601a2 in which an image having a high S/N ratio is obtained.

When there is a concern of illumination of a subject being even lower and therefore an S/N ratio of an image in the light receiving element 12 being even lower, there is provided a function of obtaining an image having a higher S/N ratio using the light receiving area 1601a4 in which an image having a higher S/N ratio having is obtained.

Here, a configuration in which the diaphragm plate 51 in B of FIG. 79 is used combination with the light receiving element 12 shown in A of FIG. 79 among three shapes of the diaphragm plate 51 shown in B to D of FIG. 79 performs the same operation as in a configuration in which the diaphragm plate 51 in B of FIG. 74 is used in combination with the light receiving element 12 shown in A of FIG. 74 among three shapes of the diaphragm plate 51 shown in B to D of FIG. 74.

In addition, a configuration in which the diaphragm plate 51 in C of FIG. 79 is used combination with the light receiving element 12 shown in A of FIG. 79 among three shapes of the diaphragm plate 51 shown in B to D of FIG. 79 performs the same operation as in a configuration in which the diaphragm plate 51 in C of FIG. 74 is used in combination with the light receiving element 12 shown in A of FIG. 74 among three shapes of the diaphragm plate 51 shown in B to D of FIG. 74.

In addition, a configuration in which the diaphragm plate 51 in D of FIG. 79 is used in combination with the light receiving element 12 shown in A of FIG. 79 among three shapes of the diaphragm plate 51 shown in B to D of FIG. 79 performs the same operation as in a configuration in which the diaphragm plate 51 in D of FIG. 74 is used in combination with the light receiving element 12 shown in A of FIG. 74 among three shapes of the diaphragm plate 51 shown in B to D of FIG. 74.

For the camera module 1 including the light receiving element 12 in A of FIG. 79, configurations of the diaphragm plate 51 shown in A or D of FIG. 64, configurations of the diaphragm plate 51 shown in B to D of FIG. 79, or modified examples thereof can be used.

18. 12th Embodiment of Camera Module

Figure 80:
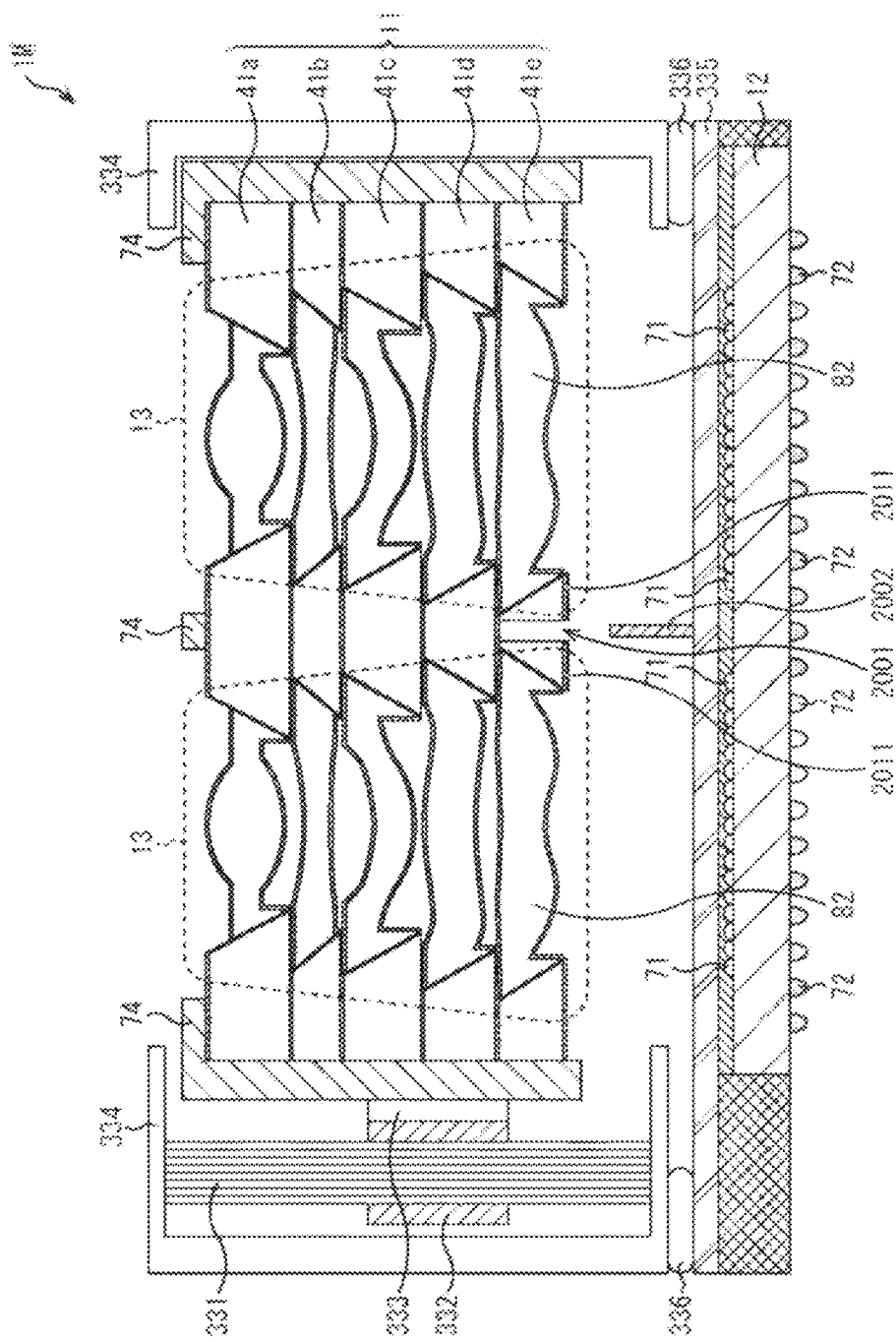
FIG. 80 is a diagram showing a 12th embodiment of a camera module using a laminated lens structure to which the present technology is applied.

FIG. 80 is a diagram showing a 12th embodiment of a camera module using a laminated lens structure to which the present technology is applied.

A camera module 1M as the 12th embodiment shown in FIG. 80 is a compound eye camera module that includes two or more optical units 13 and the light receiving element 12 including light receiving areas (light receiving part) corresponding to the optical units 13 and is a compound eye camera module having a focus adjustment mechanism (autofocus mechanism).

In the above FIG. 36, as the camera module 1J according to the 11th embodiment, a configuration of a monocular camera module having a focus adjustment mechanism (autofocus mechanism) has already been shown.

In FIG. 80, parts corresponding to those of the camera module 1J shown in FIG. 36 are denoted by the same reference numerals and description of the parts will be appropriately omitted.

As described with reference to FIG. 13, the laminated lens structure 11 includes five substrates with lenses 41a to 41e that are laminated. The substrates with lenses 41 constituting the laminated lens structure 11 have a configuration in which the lens resin part 82 is added inside the through-hole 83 provided in the carrier substrate 81. The lens resin part 82 includes the above-described lens 21, and indicates a part integrated with a material forming the lens 21 in addition to a part that extends to the carrier substrate 81 and carries the lens 21.

Here, in FIG. 80, in order to prevent the drawing from being complicated, the reference numerals of the carrier substrate 81 and the through-hole 83 are omitted.

In the 12th embodiment shown in FIG. 80, the laminated lens structure 11 including the plurality of optical units 13 is stored in the lens barrel 74. When the lens barrel 74 is moved in an axial direction of the shaft 331 by a drive motor (not shown), a distance from the laminated lens structure 11 to an imaging surface of the light receiving element 12 is adjusted.

The 12th embodiment is different from that of the monocular camera module 1J having a focus adjustment mechanism shown in FIG. 36. One difference is that a through-groove 2001 that penetrates the substrate with lenses 41e is provided at a position between the adjacent optical units 13 of the substrate with lenses 41e of the lowermost layer, and a blocking plate 2002 is provided at a position corresponding to the through-groove 2001 on the upper surface of the protective substrate 335 above the light receiving element 12. The blocking plate 2002 is formed on the side of the light receiving element 12 below the laminated lens structure 11.

The through-groove 2001 is provided such that it does not interfere with the blocking plate 2002 when the lens barrel 74 driven by the drive motor is moved to a position closest to the light receiving element 12, but it can be omitted when there is no interference even if no through-groove 2001 is provided.

In addition, another difference from that of the monocular camera module 1J having a focus adjustment mechanism shown in FIG. 36 is that a light absorbing film 2011 is formed on the lower surface of the carrier substrate 81 between the lens resin parts 82 of the adjacent optical units 13 of the substrate with lenses 41e of the lowermost layer.

The light absorbing film 2011 can include, for example, a carbon-containing black resist, a titanium oxide-containing black resist, an organic film using a pigment or a dye that absorbs a specific wavelength, or an inorganic film having a light absorbing property. As the inorganic film having a light absorbing property, a film of, for example, SiN or $SiO_2$ may be exemplified.

As described with reference to C of FIG. 18, in the substrate with lenses 41, the upper surface layer 125 is formed on the upper surface of the carrier substrate 81, and the lower surface layer 124 is formed on the lower surface thereof. However, the light absorbing film 2011 can be formed on the upper surface of the lower surface layer 124 in an overlapping manner. Of course, the light absorbing film 2011 may be formed in place of the lower surface layer 124.

In addition, since the light absorbing film 2011 can be formed on the upper surface and the lower surface of the carrier substrate 81 at the same time, it can be formed on the upper surface of the upper surface layer 125 in an overlapping manner.

Figure 81:
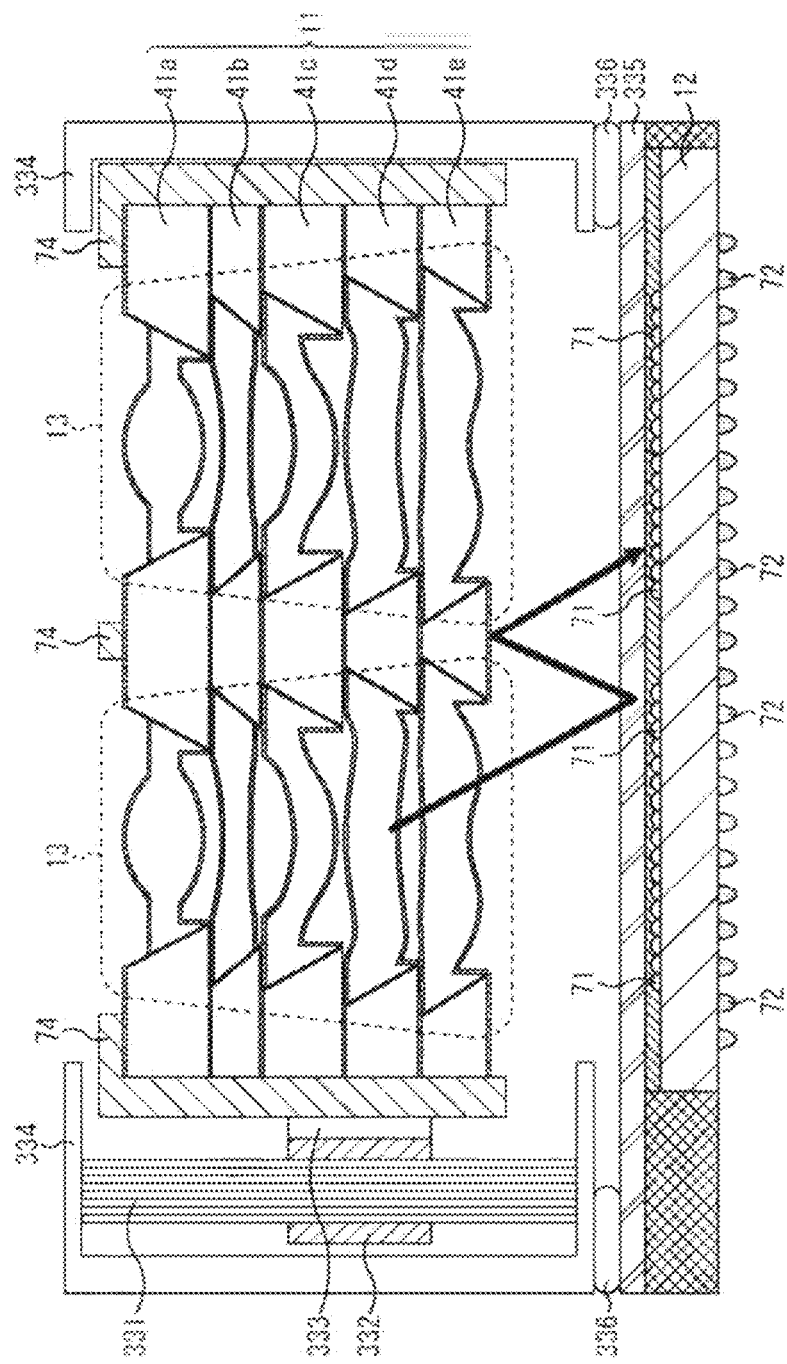
FIG. 81 is a diagram describing stray light generated when no blocking plate or light absorbing film is provided.

In the compound eye camera module 1M having a focus adjustment mechanism, when the through-groove 2001, the blocking plate 2002, and the light absorbing film 2011 are not provided, as indicated by the arrow in FIG. 81, there is a risk of light incident on a predetermined optical unit 13 being reflected at the carrier substrate 81, the protective substrate 335, and the like, and entering a light receiving area of an adjacent optical unit 13. Such incidence of light leaking from the other optical unit 13 may cause mixed color or ghosting.

As in the 12th embodiment, when the through-groove 2001, the blocking plate 2002, and the light absorbing film 2011 are provided, it is possible to prevent stray light between the optical units 13 and prevent the occurrence of mixed color or ghosting.

In addition, compared to a configuration in which the plurality of monocular camera modules 1J shown in FIG. 36 are arranged, in the camera module 1M of the 12th embodiment, there is only one drive system such as the drive motor and the shaft 331, and it is possible to reduce the weight of the camera module, which contributes to decreasing power consumption for autofocus drive and speeding up autofocus drive.

Here, in order to obtain an ability or effect of preventing stray light, among the through-groove 2001, the blocking plate 2002, and the light absorbing film 2011, at least one of the blocking plate 2002 and the light absorbing film 2011 may be provided.

Figure 82:
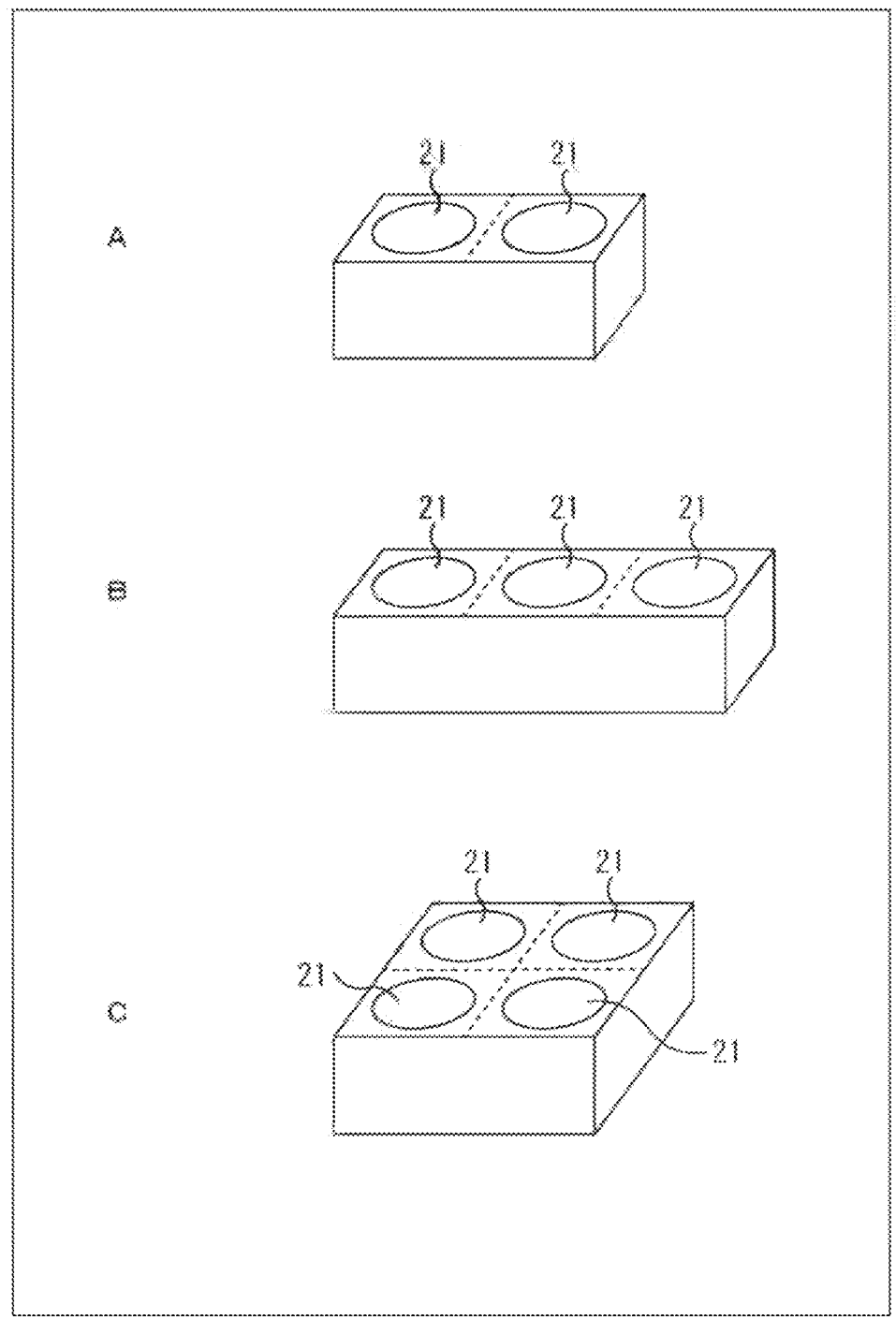
FIG. 82 is a diagram showing positions at which a through-groove and a blocking plate are disposed.

FIG. 82 is a diagram showing positions at which the through-groove 2001 and the blocking plate 2002 are disposed in various compound eye camera modules.

In A of FIG. 82, positions at which the through-groove 2001 and the blocking plate 2002 are disposed in a 2-eye camera module are indicated by dashed lines.

In B of FIG. 82, positions at which the through-groove 2001 and the blocking plate 2002 are disposed in a 3-eye camera module are indicated by dashed lines.

In C of FIG. 82, positions at which the through-groove 2001 and the blocking plate 2002 are disposed in a 4-eye camera module are indicated by dashed lines.

As shown in A to C of FIG. 82, the through-groove 2001 and the blocking plate 2002 are disposed between adjacent optical units 13.

Figure 83:
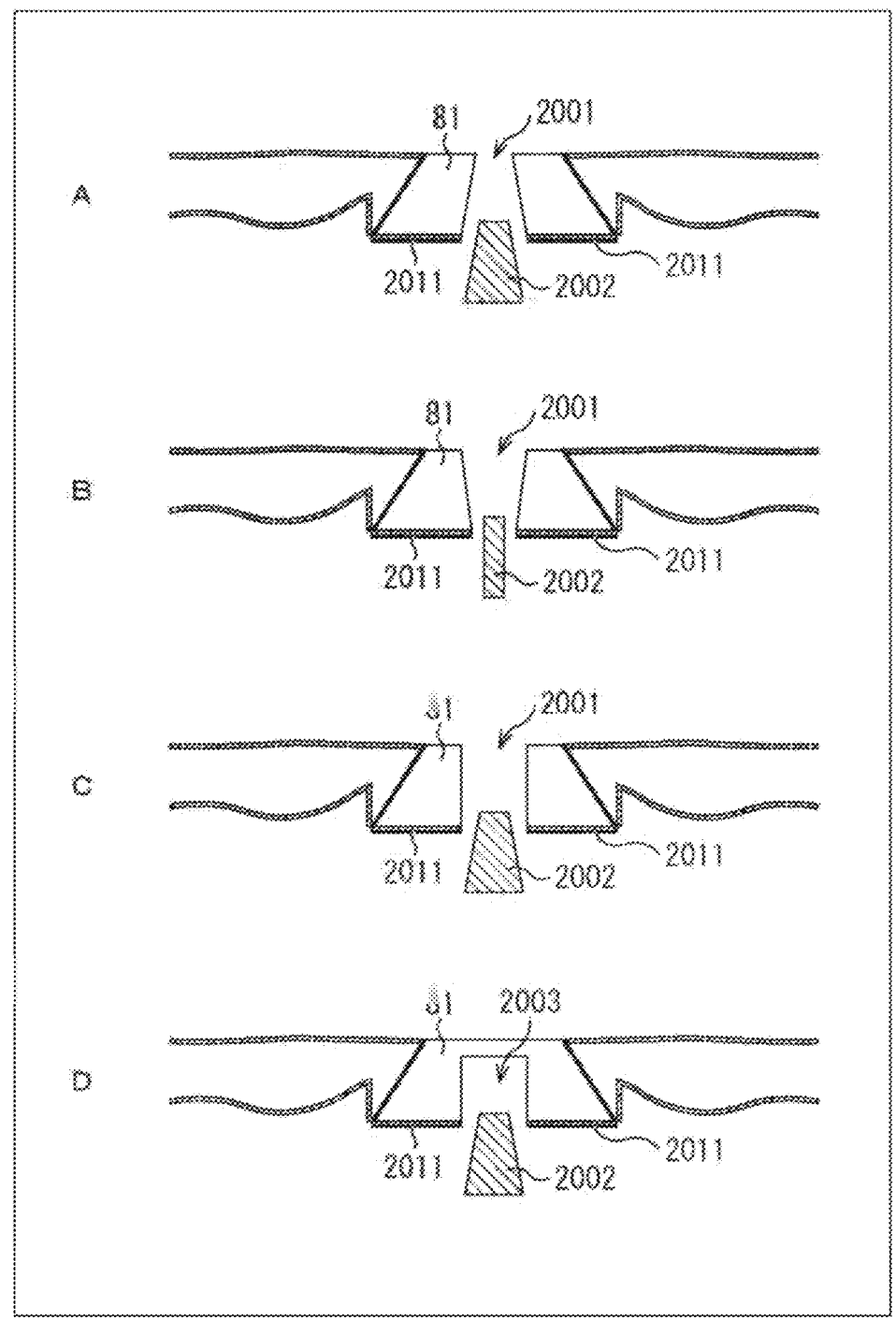
FIG. 83 is a diagram showing examples of shapes of a through-groove and a blocking plate.

FIG. 83 shows examples of shapes of the through-groove 2001 and the blocking plate 2002.

As shown in A to C of FIG. 83, the through-groove 2001 and the blocking plate 2002 can have any of a so-called downward fan shape (tapered shape) in which the opening width increases downward (a side on which the light receiving element 12 is disposed), an upward fan shape (inverted tapered shape) in which the opening width decreases downward, and a rectangular shape in which the opening width does not change upward or downward, and the through-groove 2001 and the blocking plate 2002 which have arbitrary shapes can be appropriately combined.

The through-groove 2001 is formed to penetrate only the substrate with lenses 41e of the lowermost layer among the five substrates with lenses 41a to 41e that are laminated, but it may be formed to penetrate not only the substrate with lenses 41e of the lowermost layer but also the substrate with lenses 41a of the uppermost layer through the substrates with lenses 41b to 41d therebetween.

In addition, as shown in D of FIG. 83, a groove 2003 that is engraved to a predetermined depth from the lower surface of the carrier substrate 81 so that it does not penetrate the carrier substrate 81 may be formed in place of the through-groove 2001.

The through-groove 2001 can be formed at the same time when the through-hole 83 is formed by dry etching, wet etching, or the like, and may be formed by a laser, machining, or the like.

The blocking plate 2002 can be formed using a combination of resist patterning and a light absorbing film. For example, a negative photoresist (for example, such as SU-8) is formed at a high aspect ratio, a light absorbing film is formed thereon, and thus the blocking plate 2002 is formed.

In addition, the blocking plate 2002 may be formed using a combination of a printing method such as screen printing or inkjet printing, and a light absorbing film.

When a forming method using resist patterning or a printing method is used, the blocking plate 2002 is formed in a substrate state (wafer state) before division is performed.

On the other hand, the blocking plate 2002 is obtained by a method in which formation is performed after division. For example, when a metal plate with a predetermined thickness is processed into a shape matching a position at which the blocking plate 2002 shown in FIG. 82 is disposed, a light absorbing film is formed on a surface, and is then adhered to the upper surface of the divided protective substrate 335 using an adhesive, the blocking plate 2002 can be formed.

19. Example of Application to Electronic Device

The above-described camera module 1 that is incorporated into an electronic device that uses a solid state imaging device for an image capturing unit (photoelectric converting unit), for example, an imaging device such as a digital still camera and a video camera, a mobile terminal device having an imaging function, and a copying machine that uses a solid state imaging device for an image reading unit, can be used.

Figure 84:
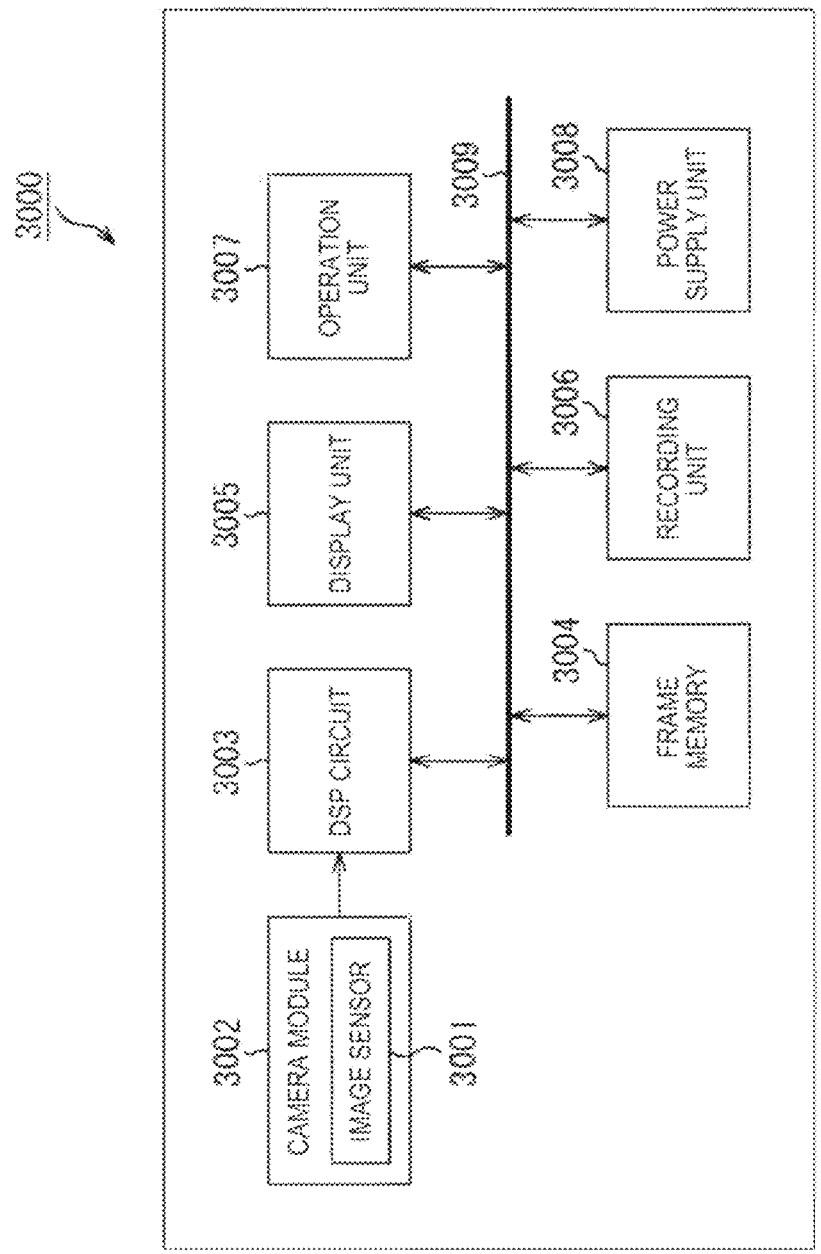
FIG. 84 is a block diagram showing a configuration example of an imaging device that is an electronic device to which the present technology is applied.

FIG. 84 is a block diagram showing a configuration example of an imaging device that is an electronic device to which the present technology is applied.

An imaging device 3000 in FIG. 84 includes a camera module 3002 and a digital signal processor (DSP) circuit 3003 which is a camera signal processing circuit. In addition, the imaging device 3000 includes a frame memory 3004, a display unit 3005, a recording unit 3006, an operation unit 3007, and a power supply unit 3008. The DSP circuit 3003, the frame memory 3004, the display unit 3005, the recording unit 3006, the operation unit 3007, and the power supply unit 3008 are connected to one another through a bus line 3009.

An image sensor 3001 in the camera module 3002 captures incident light (image light) from a subject, converts a light intensity of incident light that forms an image on the imaging surface into electrical signals in units of pixels, and outputs the converted signals as pixel signals. The above-described camera module 1 is used as the camera module 3002, and the image sensor 3001 corresponds to the above-described light receiving element 12. The image sensor 3001 receives light that has passed through the lenses 21 of the optical units 13 of the laminated lens structure 11 of the camera module 3002 and outputs pixel signals.

The display unit 3005 includes a panel type display device, for example, a liquid crystal panel and an organic electro luminescence (EL), and displays a moving image or a still image captured by the image sensor 3001. The recording unit 3006 records the moving image or the still image captured by the image sensor 3001 in a recording medium such as a hard disk or a semiconductor memory.

The operation unit 3007 issues an operation command regarding various functions of the imaging device 3000 according to an operation performed by a user. The power supply unit 3008 appropriately supplies various power supplies which are operation power supplies for the DSP circuit 3003, the frame memory 3004, the display unit 3005, the recording unit 3006, and the operation unit 3007 to these supply targets.

As described above, when the camera module 1 in which the laminated lens structure 11 that is positioned and bonded (laminated) with high accuracy is mounted is used as the camera module 3002, it is possible to obtain high image quality and reduce the size. Therefore, in the imaging device 3000 such as a video camera, a digital still camera, and additionally a camera module for a mobile device such as a mobile phone, it is possible to reduce the size a semiconductor package and obtain a captured image with high image quality.

20. Application Example to In-Vivo Information Acquisition System

A technology (present technology) according to an embodiment of the present disclosure can be applied to various products. For example, the technology according to an embodiment of the present disclosure may be applied to a patient in-vivo information acquisition system using a capsular endoscope.

Figure 85:
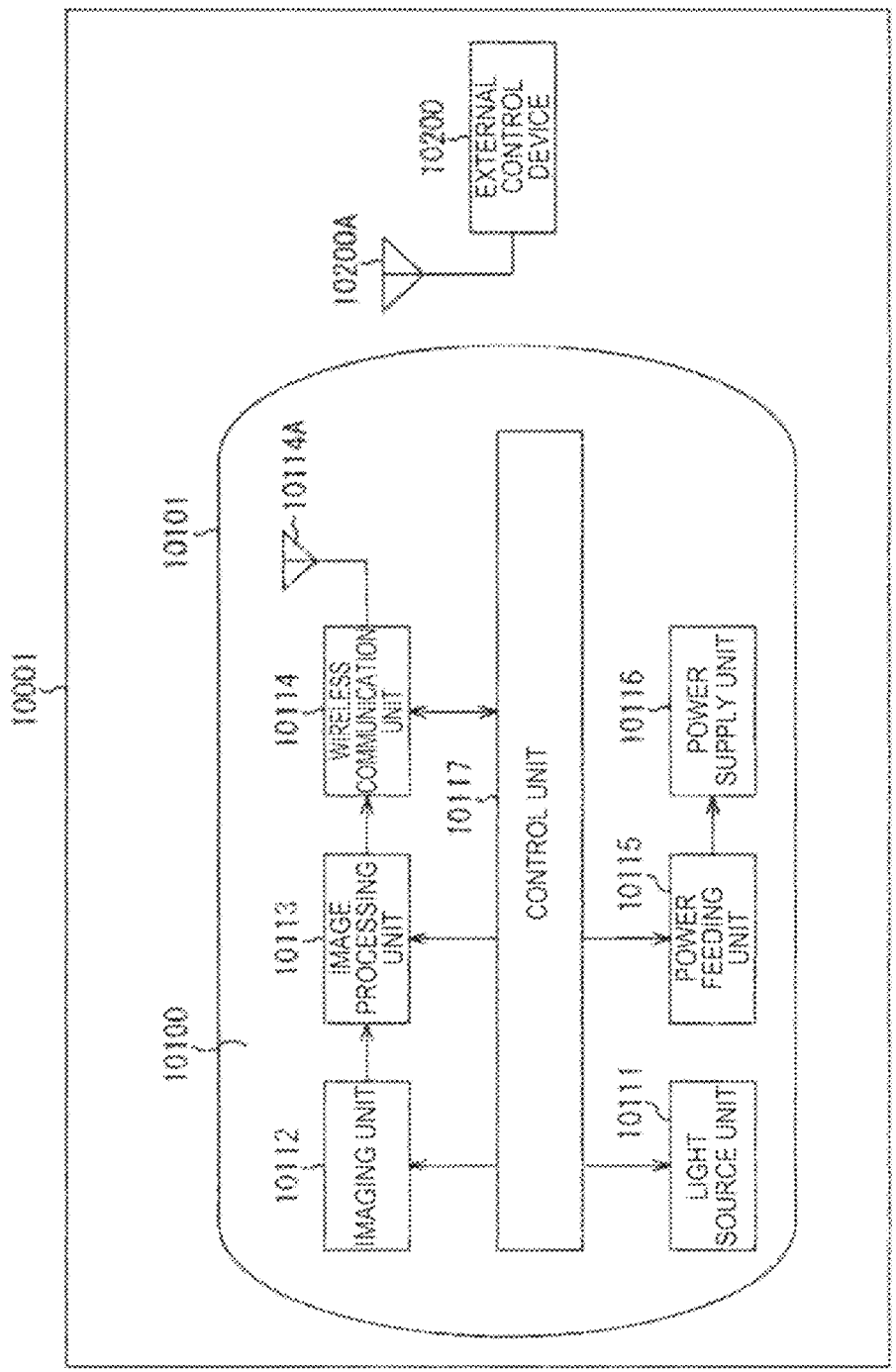
FIG. 85 is a block diagram illustrating an example of a schematic configuration of an in-vivo information acquisition system.

FIG. 85 is a block diagram illustrating an example of a schematic configuration of an in-vivo information acquisition system of a patient for which a capsular endoscope to which the technology (the present technology) according to an embodiment of the present technology is applicable.

An in-vivo information acquisition system 10001 includes a capsular endoscope 10100 and an external control device 10200.

The capsular endoscope 10100 is swallowed by a patient at the time of examination. The capsular endoscope 10100 has an imaging function and a wireless communication function. The capsular endoscope 10100 sequentially captures internal images (hereinafter also referred to as in-vivo images) of an organ such as a stomach or bowels at a predetermined interval and wirelessly transmit information regarding the in-vivo images in sequence to the external control device 10200 outside of the patient while moving inside the organ by peristaltic movement or the like until spontaneously excreted.

The external control device 10200 generally controls an operation of the in-vivo information acquisition system 10001. In addition, the external control device 10200 receives the information regarding the in-vivo images transmitted from the capsular endoscope 10100 and generates image data for displaying the in-vivo images on a display device (not illustrated) on the basis of the received information regarding the in-vivo image.

In the in-vivo information acquisition system 10001, an in-vivo image obtained by imaging an in-vivo form of a patient can be obtained at any time in this way until the capsular endoscope 10100 is swallowed and excreted.

Configurations and functions of the capsular endoscope 10100 and the external control device 10200 will be described in more detail.

The capsular endoscope 10100 includes a capsular casing 10101. The capsular casing 10101 accommodates a light source unit 10111, an imaging unit 10112, an image processing unit 10113, a wireless communication unit 10114, a power feeding unit 10115, a power unit 10116, and a control unit 10117.

The light source unit 10111 is configured of, for example, a light source such as light-emitting diode (LED) and radiates light for an imaging visual field of the imaging unit 10112.

The imaging unit 10112 includes an image sensor and an optical system that includes a plurality of lens installed on the front stage of the image sensor. Reflected light (hereinafter referred to observation light) of light emitted to a body tissue which is an observation target is condensed by the optical system to be incident on the image sensor. In the imaging unit 10112, the image sensor photoelectrically converts the observation light incident on the image sensor to generate an image signal corresponding to the observation light. The image signal generated by the imaging unit 10112 is supplied to the image processing unit 10113.

The image processing unit 10113 is configured of a processor such as a central processing unit (CPU) or a graphics processing unit (GPU) and performs various kinds of signal processing on the image signal generated by the imaging unit 10112. The image processing unit 10113 supplies the image signal subjected to the signal processing as raw data to the wireless communication unit 10114.

The wireless communication unit 10114 performs a predetermined process such as a modulation process on the image signal subjected to the signal processing by the image processing unit 10113 and transmits the image signal to the external control device 10200 via an antenna 10114A. In addition, the wireless communication unit 10114 receives a control signal for driving control of the capsular endoscope 10100 from the external control device 10200 via the antenna 10114A. The wireless communication unit 10114 supplies the control signal received from the external control device 10200 to the control unit 10117.

The power feeding unit 10115 includes a power reception antenna coil, a power generation circuit that reproduces power from a current generated in the antenna coil, and a voltage boosting circuit. The power feeding unit 10115 generates power using a so-called contactless charging principle.

The power unit 10116 is configured of a secondary cell and stores the power generated by the power feeding unit 10115. In FIG. 85, an arrow or the like indicating a supply source of power from the power unit 10116 is not illustrated to avoid complexity of the drawing. However, the power stored in the power unit 10116 is supplied to the light source unit 10111, the imaging unit 10112, the image processing unit 10113, the wireless communication unit 10114, and the control unit 10117, and thus can be used to drive these units.

The control unit 10117 is configured of a processor such as a CPU and appropriately controls driving of the light source unit 10111, the imaging unit 10112, the image processing unit 10113, the wireless communication unit 10114, and the power feeding unit 10115 in accordance with control signals transmitted from the external control device 10200.

The external control device 10200 is configured of a processor such as a CPU or a GPU, a microcomputer in which a processor and a storage element such as a memory are mixed, a control substrate, or the like. The external control device 10200 controls an operation of the capsular endoscope 10100 by transmitting a control signal to the control unit 10117 of the capsular endoscope 10100 via an antenna 10200A. In the capsular endoscope 10100, for example, a radiation condition of light for an observation target in the light source unit 10111 can be changed in accordance with a control signal from the external control device 10200. In addition, an imaging condition (for example, a frame rate or an exposure value in the imaging unit 10112) can be changed in accordance with a control signal from the external control device 10200. In addition, content of a process in the image processing unit 10113 or a condition (for example, a transmission interval or the number of transmitted images) in which an image signal is transmitted by the wireless communication unit 10114 may be changed in accordance with the control signal from the external control device 10200.

In addition, the external control device 10200 performs various kinds of image processing on the image signals transmitted from the capsular endoscope 10100 to generate image data for displaying the captured in-vivo images on the display device. As the image processing, for example, various kinds of signal processing such as a development process (demosaic processing), high-quality processing (a band enhancement process, superresolution processing, a nose reduction (NR) process, and/or a camera-shake correction process), and/or an expansion process (electronic zoom processing) can be performed. The external control device 10200 controls driving of the display device to display the captured in-vivo image on the basis of the generated image data. Alternatively, the external control device 10200 may cause a recording device (not illustrated) to record the generated image data or may cause a printing device (not illustrated) to print and output the generated image data.

An example of the in-vivo information acquisition system to which the technology according to the present disclosure can be applied has been described above. The technology according to the present disclosure can be applied to the imaging unit 10112 within the above-described configuration. Specifically, as the imaging unit 10112, the camera module 1 according to the first to 12th embodiments can be applied. When the technology according to the present disclosure is applied to the imaging unit 10112, since it is possible to further reduce the size of the capsular endoscope 10100, it is possible to further reduce a burden on a patient. In addition, since a vivider operation part image can be obtained while reducing the size of the capsular endoscope 10100, it is possible to improve accuracy of examination.

21. Example of Application to Endoscopic Surgical System

The technology (the present technology) according to the present disclosure can be applied to various products. For example, the technology according to the present disclosure may be applied to an endoscopic surgical system.

Figure 86:
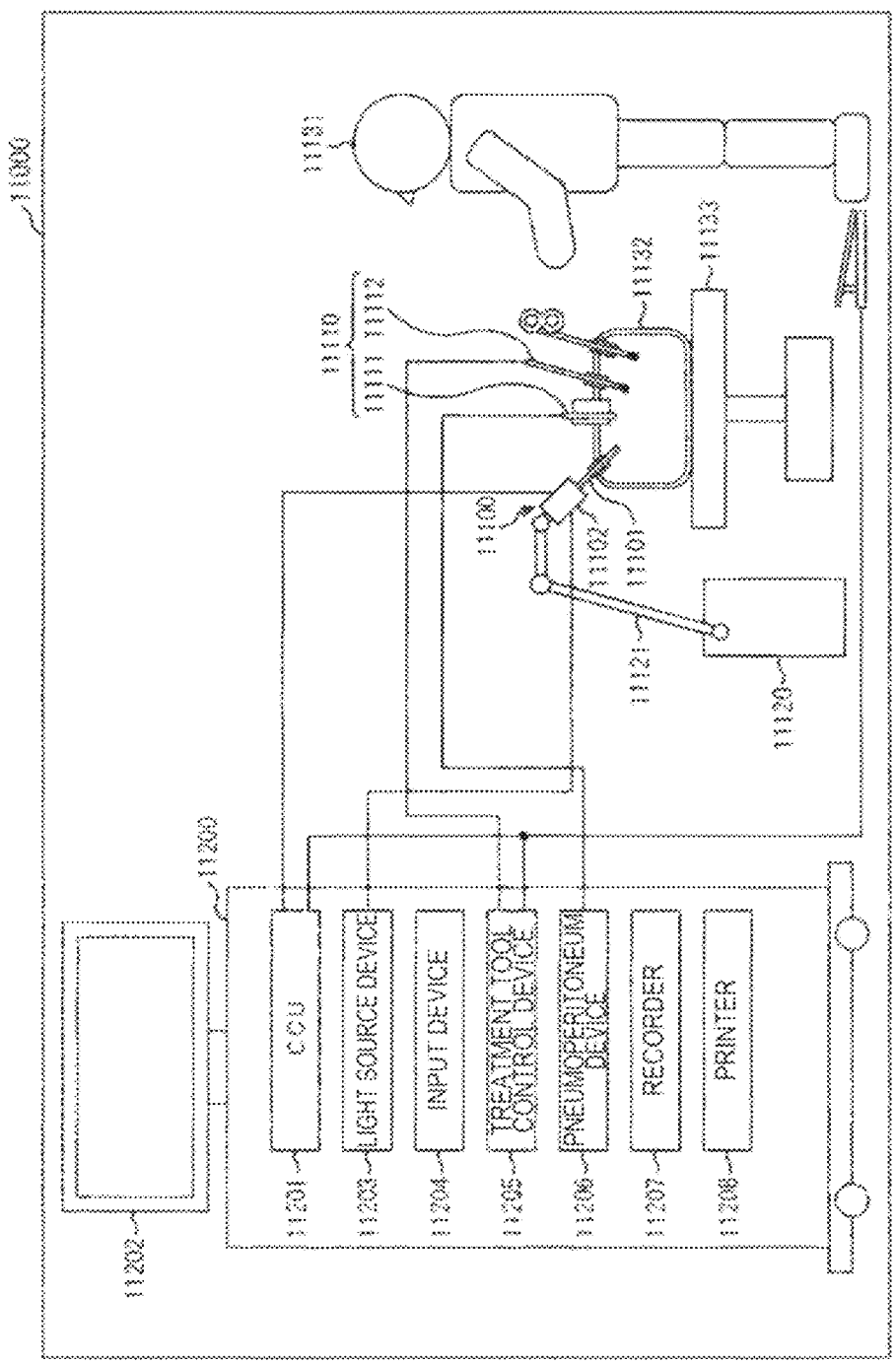
FIG. 86 is a diagram illustrating an example of a schematic configuration of an endoscopic surgical operation system.

FIG. 86 is a diagram showing an example of a schematic configuration of an endoscopic surgical system to which the technology (the present technology) according to the present disclosure can be applied.

FIG. 86 illustrates a situation in which a surgeon (doctor) 11131 is using an endoscopic surgery system 11000 to perform surgery on a patient 11132 lying on a patient bed 11133. As illustrated in the diagram, the endoscopic surgery system 11000 is made up of an endoscope 11100, other surgical instruments 11110 such as a pneumoperitoneum tube 11111, an energy treatment tool 11112 or the like, a support arm apparatus 11120 that supports the endoscope 11100, and a cart 11200 on which are provided various apparatuses for endoscopic surgery.

The endoscope 11100 is made up of a lens tube 11101 having a region of certain length from the front end that is inserted into the body cavity of the patient 11132, and a camera head 11102 connected to the base end of the lens tube 11101. In the example illustrated in the diagram, an endoscope 11100 configured as a so-called rigid scope having a rigid lens tube 11101 is illustrated, but the endoscope 11100 may also be configured as a so-called flexible scope having a flexible lens tube 11101.

On the front end of the lens tube 11101, there is provided an opening into which an objective lens is fitted. A light source device 11203 is connected to the endoscope 11100. Light generated by the light source device 11203 is guided up to the front end of the lens tube 11101 by a light guide extending inside the lens tube 11101, and is radiated through the objective lens towards an observation target inside the body cavity of the patient 11132. Note that the endoscope 11100 may be a forward-viewing scope, an oblique-viewing scope, or a side-viewing scope.

An optical system and an image sensor are provided inside the camera head 11102, and reflected light from the observation target (observation light) is condensed onto the image sensor by the optical system. Observation light is photoelectrically converted by the image sensor, and an electrical signal corresponding to the observation light, or in other words, an image signal corresponding to the observed image, is generated. The image signal is transmitted as RAW data to a camera control unit (CCU) 11201.

The CCU 11201 is made up of components such as a central processing unit (CPU) and a graphics processing unit (GPU), and centrally controls the operation of the endoscope 11100 and the display device 11202. Further, the CCU 11201 receives an image signal from the camera head 11102 and subjects the image signal to various types of image processing for displaying an image based on the image signal, such as development process (demosaicing process), for example.

The display device 11202 displays an image based on the image signal on which image processing is performed by the CCU 11201 under control of the CCU 11201.

The light source device 11203 is made up of a light source such as a light-emitting diode (LED), for example, and supplies the endoscope 11100 with irradiating light when imaging the operating site or the like.

An input device 11204 is an input interface with respect to the endoscopic surgery system 11000. Through the input device 11204, the user is able to input various information and instructions into the endoscopic surgery system 11000. For example, the user inputs instructions to change the imaging parameters of imaging by the endoscope 11100 (such as the type of irradiating light, the magnification, and the focus distance), and the like.

A treatment tool control device 11205 controls the driving of the energy treatment tool 11112 to cauterize or make incisions into tissue, seal blood vessels, or the like. The pneumoperitoneum device 11206 delivers gas into the body cavity through the pneumoperitoneum tube 11111 to inflate the body cavity of the patient 11132 for the purpose of securing a field of view for the endoscope 11100 and securing a workspace for the surgeon. The recorder 11207 is a device capable of recording various types of information related to surgery. The printer 11208 is a device capable of printing out various types of information related to surgery in various formats, such as text, images, or graphs.

Note that the light source device 11203 which supplies the endoscope 11100 with irradiating light when imaging the operating site may be made up of a white light source configured by an LED, a laser light source, or a combination of the two, for example. At this point, in the case in which the white light source is configured by a combination of RGB laser light sources, the output intensity and output timing of each color (each wavelength) can be controlled with high precision, and thus the white balance of the captured image can be adjusted with the light source device 11203. Also, in this case, by irradiating the observation target with laser light from each of the RGB laser light sources in a time-division manner, and controlling the driving of the image sensor of the camera head 11102 in synchronization with the irradiation timings, it is also possible to capture images corresponding to R, G, and B, respectively, in a time-division manner. According to such a method, color images can be obtained without providing the image sensor with a color filter.

Also, the driving of the light source device 11203 may also be controlled so as to change the intensity of the light to output every time a certain amount of time elapses. By controlling the driving of the image sensor of the camera head 11102 in synchronization with the timings of changing the light intensity to acquire images in a time-division manner, and compositing the images together, it is possible to generate a high dynamic range image without what are called crushed blacks and blown-out whites.

Additionally, the light source device 11203 may also be configured to be able to supply light in a certain wavelength band corresponding to special imaging. With special imaging, for example, the wavelength dependency of light absorption by tissues of the body is utilized, and light is radiated in a narrow band compared to the irradiating light during normal observation (that is, white light) to thereby image certain tissues, such as blood vessels in the superficial portion of the mucous membrane, at a high contrast, also known as narrow band imaging (NBI). Alternatively, with special imaging, fluorescent observation that obtains an image with fluorescent light by radiating excitation light may also be conducted. With fluorescent observation, it is possible to irradiate a body tissue with excitation light and observe fluorescent light from the body tissue (autofluorescence observation), or locally inject a reagent such as indocyanine green (ICG) into a body tissue while also irradiating that body tissue with excitation light corresponding to the fluorescence wavelength of the reagent to obtain a fluorescent image, or the like. The light source device 11203 may be configured to be able to supply narrow-band light and/or excitation light corresponding to such special imaging.

Figure 87:
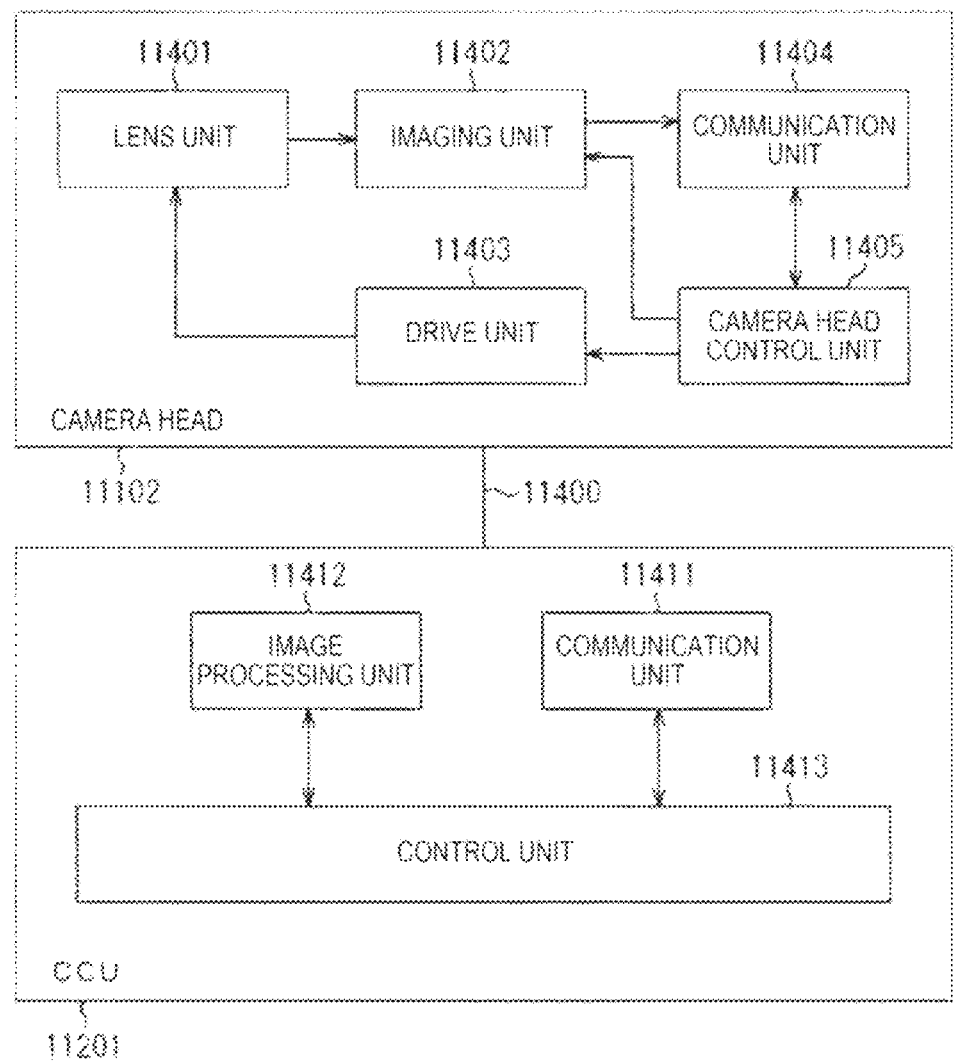
FIG. 87 is a block diagram illustrating an example of a functional configuration of a camera head and a CCU.

FIG. 87 is a block diagram illustrating an example of a functional configuration of the camera head 11102 and the CCU 11201 illustrated in FIG. 86.

The camera head 11102 includes a lens unit 11401, an imaging unit 11402, a driving unit 11403, a communication unit 11404, and a camera head control unit 11405. The CCU 11204 includes a communication unit 11411, an image processing unit 11412, and a control unit 11413. The camera head 11102 and the CCU 11201 are mutually communicably connected by a transmission cable 11400.

The lens unit 11401 is an optical system provided in the part that connects to the lens tube 11101. Observation light taken in from the front end of the lens tube 11101 is guided up to the camera head 11102, and is incident on the lens unit 11401. The lens unit 11401 is made up of a combination of multiple lenses, including a zoom lens and a focus lens.

The imaging unit 11402 is configured with an image sensor. The image sensor that configures the imaging unit 11402 may be one (what is called single plate), and may be a plurality (what is called multiplate). When the imaging unit 11402 is configured with the multiplate, the image signals corresponding to RGB are generated by the respective image sensors, and those image signals are combined into a color image, for example. Or, the imaging unit 11402 may include a pair of image sensors for respectively acquiring image signals for the right eye and the left eye corresponding to 3D display. By presenting a 3D display, the surgeon 11131 becomes able to grasp the depth of biological tissue at the operating site more accurately. Note that if the imaging unit 11402 has a multi-chip configuration, the lens unit 11401 likewise is provided with multiple subsystems corresponding to each of the image sensors.

Also, the imaging unit 11402 is not necessarily provided in the camera head 11102. For example, the imaging unit 11402 may also be provided inside the lens tube 11101, directly behind the objective lens.

The driving unit 11403 is made up of actuators, and under control from the camera head control unit 11405, moves the zoom lens and the focus lens of the lens unit 11401 by a certain distance along the optical axis. With this arrangement, the magnification and the focus of the image captured by the imaging unit 11402 may be adjusted appropriately.

The communication unit 11404 is configured with a communication device for transmitting and receiving various types of information with the CCU 11201. The communication unit 11404 transmits the image signal obtained from the imaging section 11402 to the CCU 11201 via the transmission cable 11400 as raw data.

Also, the communication unit 11404 receives from the CCU 11201 a control signal for controlling the driving of the camera head 11102 to supply the control signal to the camera head control unit 11405. The control signal includes information related to imaging parameters, such as information specifying the frame rate of the captured image, information specifying the exposure value during imaging, and/or information specifying the magnification and focus of the captured image, for example.

Note that the above imaging parameters such as the frame rate, the exposure value, the magnification, and the focus may be set by a user appropriately, or may be set automatically by the control unit 11413 of the CCU 11201 on the basis of the acquired image signal. In other words, what are called an auto exposure (AE) function, an auto focus (AF) function, and an auto white balance (AWB) function are provided in the endoscope 11100.

The camera head control unit 11405 controls driving of the camera head 11102, on the basis of the control signal from the CCU 11201 which is received via the communication unit 11404.

The communication unit 11411 is made up of a communication device for transmitting and receiving various information to and from the camera head 11102. The communication unit 11411 receives an image signal transmitted from the camera head 11102 through the transmission cable 11400.

Also, the communication unit 11411 transmits a control signal for controlling the driving of the camera head 11102 to the camera head 11102. The image signal and the control signal are transmitted by electrical communication, optical communication, and the like.

The image processing unit 11412 performs various types of image processing to the image signal which is the raw data transmitted from the camera head 11102.

The control unit 11413 performs various types of control relevant to image capturing of a surgical site or the like by the endoscope 11100, and display of the captured image obtained by the image capturing of the surgical site or the like. For example, the control unit 11413 generates a control signal for controlling driving of the camera head 11102.

In addition, the control unit 11413 causes the display device 11202 to display a captured image on which the operating site or the like is reflected on the basis of the image signal subjected to image processing by the image processing unit 11412. At this point, the control unit 11413 may use any of various types of image recognition technology to recognize various objects in the captured image. For example, by detecting features such as the edge shapes and colors of objects included in the captured image, the control unit 11413 is able to recognize surgical instruments such as forceps, a specific site of the body, hemorrhaging, mist during usage of the energy treatment tool 11112, and the like. When causing the display device 11202 to display a captured image, the control unit 11413 may use the recognition results to overlay various surgical assistance information onto the image of the operating site. By overlaying and providing the surgeon 11131 with surgical assistance information, it becomes possible to ease the burden of the surgeon 11131 and to let the surgeon 11131 proceed with surgery reliably.

The transmission cable 11400 that connects the camera head 11102 and the CCU 11201 is an electrical signal cable supporting the communication of electrical signals, optical fiber supporting optical communication, or a composite cable of the above.

At this point, in the illustrated example, communication is conducted in a wired manner using the transmission cable 11400, but communication between the camera head 11102 and the CCU 11201 may also be conducted wirelessly.

An example of the endoscopic surgical system to which the technology according to the present disclosure can be applied has been described above. The technology according to the present disclosure can be applied to the lens unit 11401 and the imaging unit 11402 of the camera head 11102 within the above-described configuration. Specifically, as the lens unit 11401 and the imaging unit 11402, the camera module 1 according to the first to 12th embodiments can be applied. When the technology according to the present disclosure is applied to the lens unit 11401 and the imaging unit 11402, it is possible to reduce the size of the camera head 11102 and it is possible to obtain a vivider operation part image.

Although the endoscopic surgical operation system has been described here as an example, the technology according to an embodiment of the present disclosure may be applied to other systems, such as a microscope surgical operation system or the like.

22. Application Example to Mobile Object

The technology (present technology) according to an embodiment of the present disclosure is applicable to a variety of products. For example, the technology according to an embodiment of the present disclosure is implemented as devices mounted on any type of mobile objects such as automobiles, electric vehicles, hybrid electric vehicles, motorcycles, bicycles, personal mobilities, airplanes, drones, ships, and robots.

Figure 88:
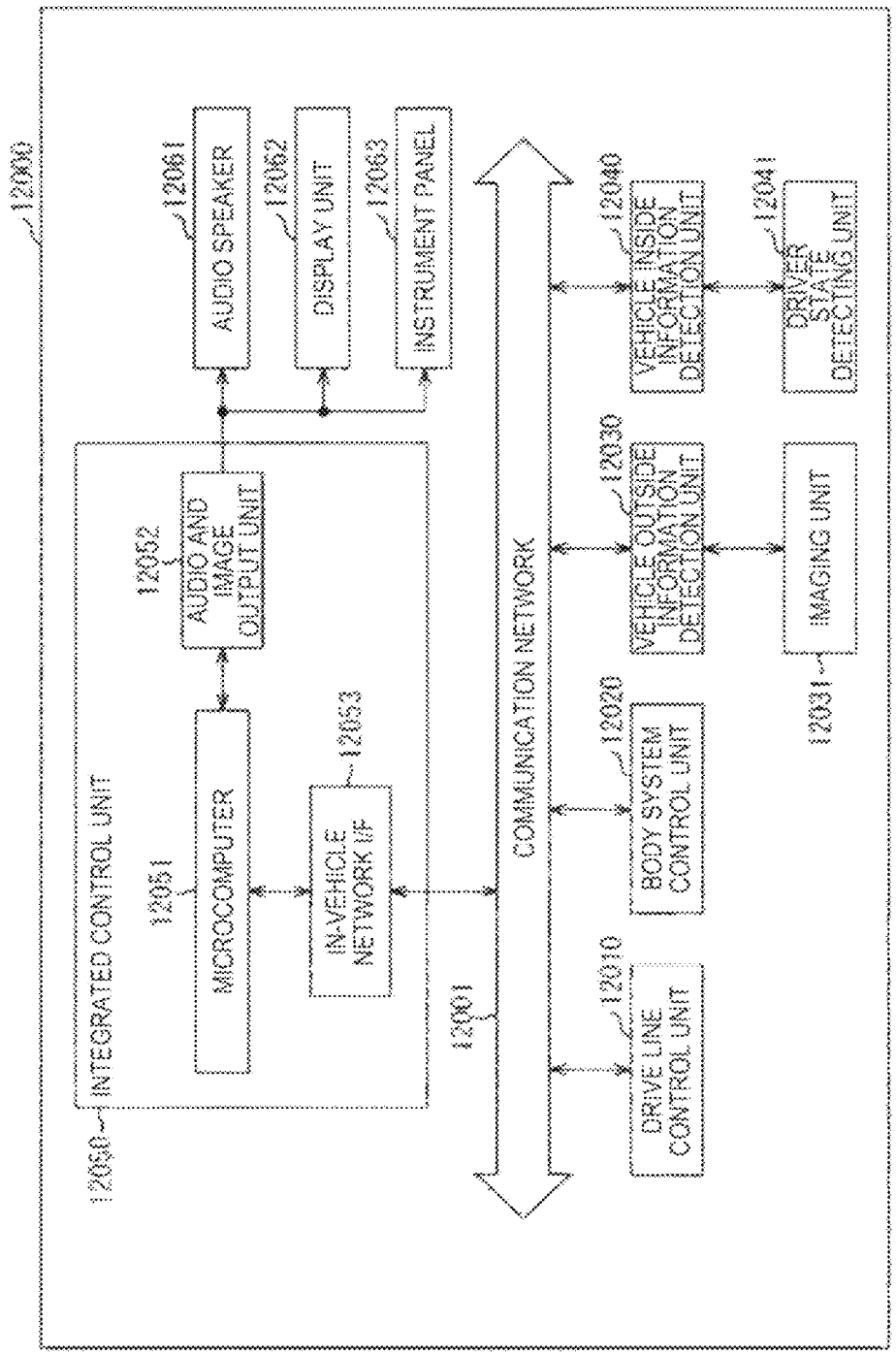
FIG. 88 is a block diagram illustrating an example of a schematic configuration of a vehicle control system.

FIG. 88 is a block diagram illustrating a schematic configuration example of a vehicle control system which is an example of a mobile object control system to which a technology according to an embodiment of the present technology is applicable.

A vehicle control system 12000 includes a plurality of electronic control units connected via a communication network 12001. In the example illustrated in FIG. 88, the vehicle control system 12000 includes a drive line control unit 12010, a body system control unit 12020, a vehicle outside information detection unit 12030, a vehicle inside information detection unit 12040, and an integrated control unit 12050. In addition, as functional configurations of the integrated control unit 12050, a microcomputer 12051, an audio and image output unit 12052, an in-vehicle network interface (I/F) 12053.

The drive line control unit 12010 controls the operation of devices related to the drive line of the vehicle in accordance with a variety of programs. For example, the drive line control unit 12010 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like.

The body system control unit 12020 controls the operations of a variety of devices attached to the vehicle body in accordance with a variety of programs. For example, the body system control unit 12020 functions as a control device for a keyless entry system, a smart key system, a power window device, or a variety of lights such as a headlight, a backup light, a brake light, a blinker, or a fog lamp. In this case, the body system control unit 12020 can receive radio waves transmitted from a portable device that serves instead of the key or signals of a variety of switches. The body system control unit 12020 receives these radio waves or signals, and controls the vehicle door lock device, the power window device, the lights, or the like.

The vehicle outside information detection unit 12030 detects information regarding the outside of a vehicle on which the vehicle control system 12000 is mounted. For example, an imaging unit 12031 is connected to the vehicle outside information detection unit 12030. The vehicle outside information detection unit 12030 causes the imaging unit 12031 to capture an image outside of the vehicle and receives the captured image. The vehicle outside information detection unit 12030 may perform an object detection process or a distance detection process for a person, a vehicle, an obstacle, a sign, letters on a road, or the like on the basis of the received image.

The imaging unit 12031 is a light sensor that receives light and outputs an electric signal in accordance with the amount of received light. The imaging unit 12031 can output the electric signal as an image or distance measurement information. In addition, the light received by the imaging unit 12031 may be the visible light or may be non-visible light such as infrared light.

The vehicle inside information detecting unit 12040 detects information on the inside of the vehicle. The vehicle inside information detecting unit 12040 is connected, for example, to a driver state detecting unit 12041 that detects the state of the driver. The driver state detecting unit 12041 may include, for example, a camera that images the driver. The vehicle inside information detecting unit 12040 may compute the degree of the driver's tiredness or the degree of the driver's concentration or determine whether the driver have a doze, on the basis of detection information input from the driver state detecting unit 12041.

For example, the microcomputer 12051 can calculate a control target value of the driving force generating device, the steering mechanism, or the braking device on the basis of information acquired by the vehicle outside information detecting unit 12030 or the vehicle inside information detecting unit 12040 on the inside and outside of the vehicle, and output a control instruction to the drive line control unit 12010. For example, the microcomputer 12051 may perform cooperative control for the purpose of executing the functions of an advanced driver assistance system (ADAS)

including vehicle collision avoidance or impact reduction, follow-up driving based on the inter-vehicle distance, constant vehicle speed driving, vehicle collision warning, vehicle lane departure warning, or the like.

Further, the microcomputer 12051 can control the driving force generating device, the steering mechanism, the braking device, or the like on the basis of information acquired by the vehicle outside information detecting unit 12030 or the vehicle inside information detecting unit 12040 on the areas around the vehicle, thereby performing cooperative control for the purpose of automatic driving or the like that allows the vehicle to autonomously travel irrespective of any operation of a driver.

In addition, the microcomputer 12051 can output a control instruction to the body system control unit 12020 on the basis of the information regarding the outside of the vehicle acquired by the vehicle outside information detection unit 12030. For example, the microcomputer 12051 can control a head lamp in accordance with the position of a preceding vehicle or an oncoming vehicle detected by the vehicle outside information detection unit 12030 and can perform cooperative control for the purpose of anti-glaring such as switching a high beam to a low beam.

The audio and image output unit 12052 transmits an output signal of at least one of a sound and an image to an output device capable of visually or aurally notifying a passenger of the vehicle or the outside of the vehicle of information. In the example of FIG. 88, an audio speaker 12061, a display unit 12062, and an instrument panel 12063 are exemplified as the output device. For example, the display unit 12062 may include at least one of an onboard display and a head-up display.

Figure 89:
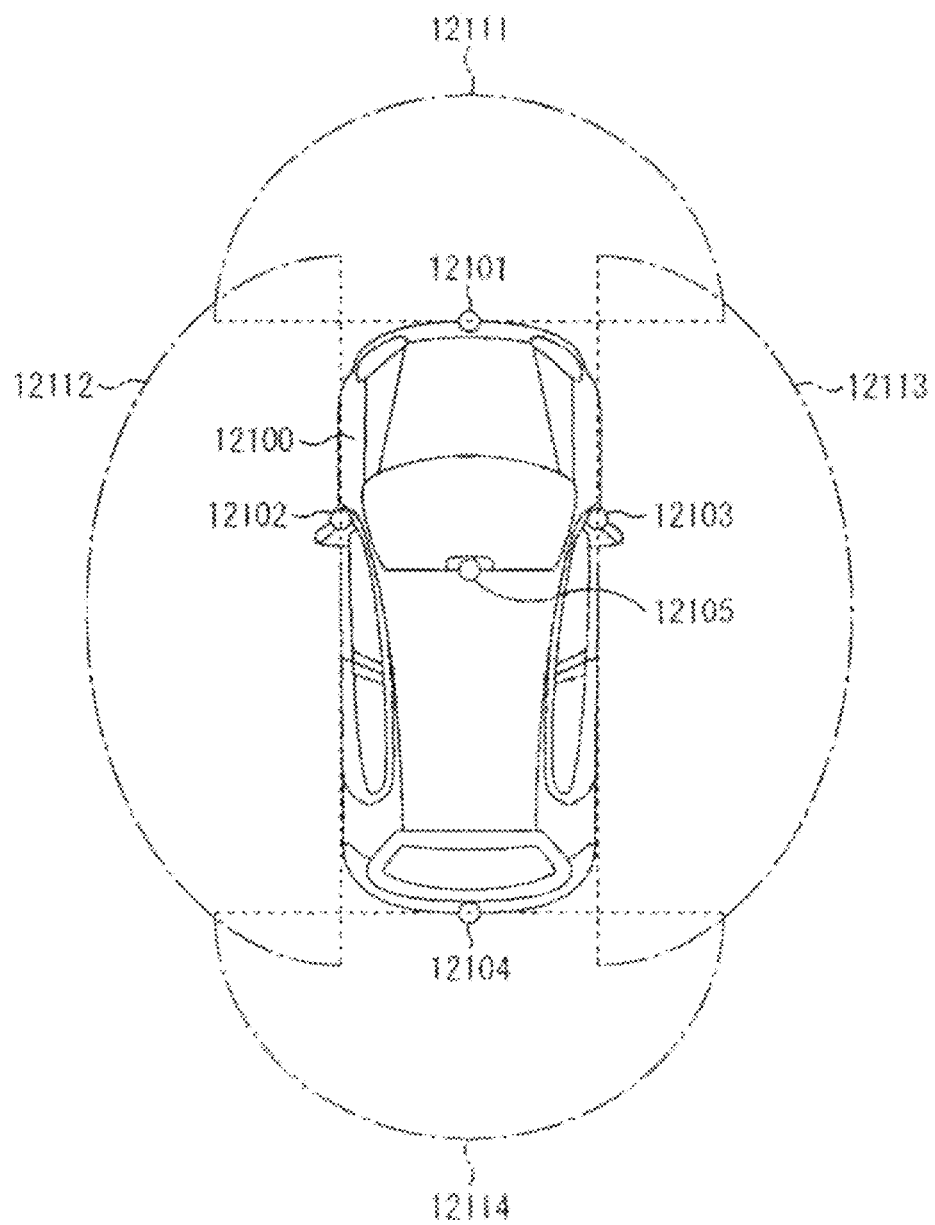
FIG. 89 is an explanatory diagram illustrating an example of installation positions of a vehicle outside information detecting unit and the imaging unit.

FIG. 89 is a diagram illustrating an example of an installation position of the imaging unit 12031.

In FIG. 89, the vehicle 12100 includes imaging units 12101, 12102, 12103, 12104, and 12105 as the imaging unit 12031.

Imaging units 12101, 12102, 12103, 12104, and 12105 are positioned, for example, at the front nose, a side mirror, the rear bumper, the back door, and the upper part of the windshield in the vehicle compartment of a vehicle 12100. The imaging unit 12101 attached to the front nose and the imaging unit 12105 attached to the upper part of the windshield in the vehicle compartment chiefly acquire images of the area ahead of the vehicle 12100. The imaging units 12102 and 12103 attached to the side mirrors chiefly acquire images of the areas on the sides of the vehicle 12100. The imaging unit 12104 attached to the rear bumper or the back door chiefly acquires images of the area behind the vehicle 12100. The images of the area ahead acquired by the imaging units 12101 and 12105 are used chiefly to detect a preceding vehicle, a pedestrian, an obstacle, a traffic light, a traffic sign, a lane, or the like.

Additionally, FIG. 89 illustrates an example of the imaging ranges of the imaging units 12101 to 12104. An imaging range 12111 represents the imaging range of the imaging unit 12101 attached to the front nose. Imaging ranges 12112 and 12113 respectively represent the imaging ranges of the imaging units 12102 and 12103 attached to the side mirrors. An imaging range 12114 represents the imaging range of the imaging unit 12104 attached to the rear bumper or the back door. For example, overlaying image data captured by the imaging units 12101 to 12104 offers an overhead image that looks down on the vehicle 12100.

At least one of the imaging units 12101 to 12104 may have a function of acquiring distance information. For example, at least one of the imaging units 12101 to 12104 may be a stereo camera including a plurality of image sensors or may be an image sensor that includes pixels for phase difference detection.

For example, the microcomputer 12051 can extract a 3-dimensional object traveling at a predetermined speed (for example, 0 or more km/h) in substantially the same direction as the vehicle 12100 as a preceding vehicle by particularly using a closest 3-dimensional object on a travel road of the vehicle 12100 by obtaining a distance to each 3-dimensional object within the imaging ranges 12111 to 12114 and a temporal change in the distance (a relative speed to the vehicle 12100) on the basis of distance information obtained from the imaging units 12101 to 12104. Further, the microcomputer 12051 can set an inter-vehicle distance to be ensured in advance before a preceding vehicle and perform automatic brake control (also including follow-up stop control) or automatic acceleration control (also including follow-up oscillation control). In this way, it is possible to perform cooperative control for the purpose of automatic driving or the like that allows the vehicle to autonomously travel irrespective of any operation of a driver.

For example, the microcomputer 12051 can classify and extract 3-dimensional object data regarding 3-dimensional objects as other 3-dimensional objects such as motorcycles, normal vehicles, large vehicles, pedestrians, and electric poles on the basis of the distance information obtained from the imaging units 12101 to 12104 and can use the other 3-dimensional objects to automatically avoid obstacles. For example, the microcomputer 12051 identifies obstacles around the vehicle 12100 as obstacles which can be viewed by a driver of the vehicle 12100 and obstacles which are difficult to view. Then, the microcomputer 12051 can determine a collision risk indicating a danger of collision with each obstacle and output a warning to the driver via the audio speaker 12061 or the display unit 12062 in a situation in which there is a collision possibility since the collision risk is set to be equal to or greater than a set value or can perform driving assistance for collision avoidance by performing forced deceleration or avoidance steering via the drive line control unit 12010.

At least one of the imaging units 12101 to 12104 may be an infrared camera that detects infrared light. For example, the microcomputer 12051 can recognize a pedestrian by determining whether there is the pedestrian in captured images of the imaging units 12101 to 12104. The pedestrian can be recognized, for example, in a procedure in which feature points are extracted in the captured images of the imaging units 12101 to 12104 serving as infrared cameras and a procedure in which a series of feature points indicating a contour of an object are subjected to a pattern matching process to determine whether there is the pedestrian. The microcomputer 12051 determines that there is the pedestrian in the captured images of the imaging units 12101 to 12104. When the pedestrian is recognized, the audio and image output unit 12052 controls the display unit 12062 such that a rectangular contour line for emphasis is superimposed to be displayed on the recognized pedestrian. In addition, the audio and image output unit 12052 controls the display unit 12062 such that an icon or the like indicating the pedestrian is displayed at a desired position.

An example of the vehicle control system to which the technology according to the present disclosure can be applied has been described above. The technology according to the present disclosure can be applied to the imaging unit 12031 within the above-described configuration. Specifically, as the imaging unit 12031, the camera module 1 according to the first to 12th embodiments can be applied.

When the technology according to the present disclosure is applied to the imaging unit 12031, it is possible to reduce the size and it is possible to obtain a clearer captured image. In addition, using the obtained captured image, it is possible to reduce fatigue of a driver and increase the safety of a driver or a vehicle.

In addition, the present technology is not limited to an application of the camera module configured to detect a distribution of an incident light intensity of visible light and capture the detected result as an image, but can be applied to a camera module configured to capture a distribution of infrared light, X-rays, or an amount of particles incident as an image, and in a broad meaning, a general camera module (physical quantity distribution detection device) such as a fingerprint detection sensor configured to detect a distribution of other physical quantities such as a pressure and an electrostatic capacity as an image.

The embodiments of the present technology are not limited to the above-described embodiments, and various changes can be made within a scope not deviating from the gist of the present technology.

For example, it is possible to employ an embodiment in which all or part of the above-described plurality of embodiments are combined.

Note that effects described in the present specification are merely examples, and the effects are not limited to the effects described in the present specification. There may be effects other than those described in the present specification.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

A camera module including:

a laminated lens structure in which substrates with lenses, each of which has a lens disposed inside a through-hole formed in the substrate, are bonded by direct bonding and laminated, the laminated lens structure including a plurality of optical units each of which has a plurality of the lenses laminated in an optical axis direction; and at least one of a light absorbing film and a blocking plate provided between the adjacent optical units.

(2)

The camera module according to (1), including the blocking plate among the light absorbing film and the blocking plate, in which the blocking plate is formed at a position on a light receiving element side relative to the laminated lens structure.

(3)

The camera module according to (2), further including a groove obtained by engraving the substrate at a position of the substrate of the lowermost layer corresponding to the blocking plate.

(4)

The camera module according to (3), in which the groove is a through-groove that penetrates the substrate.

(5)

The camera module according to any of (1) to (4), in which the light absorbing film is formed on a surface of the blocking plate.

(6)

The camera module according to any of (1) to (5), including the light absorbing film among the light absorbing film and the blocking plate, in which the light absorbing film is formed on a lower surface of the substrate of the lowermost layer.

(7)

The camera module according to any of (1) to (6), including both the light absorbing film and the blocking plate.

(8)

A method of producing a camera module, the method including forming at least one of a light absorbing film and a blocking plate between adjacent optical units of a laminated lens structure in which substrates with lenses, each of which has a lens disposed inside a through-hole formed in the substrate, are bonded by direct bonding and laminated, the laminated lens structure including a plurality of optical units each of which has a plurality of the lenses laminated in an optical axis direction.

(9)

An electronic device including a camera module that includes a laminated lens structure in which substrates with lenses, each of which has a lens disposed inside a through-hole formed in the substrate are bonded by direct bonding and laminated, the laminated lens structure includes a plurality of optical units each of which has a plurality of the lenses laminated in an optical axis direction, and at least one of a light absorbing film and a blocking plate provided between the adjacent optical units.

(10)

A camera module including:

a stacked lens substrate having a first through-hole and a second through-hole adjacent to the first through-hole, a first optical unit including one or more lenses located in the first through-hole, a second optical unit including one or more lenses located in the second through-hole, a first light-receiving unit located at a side of and corresponding to the first optical unit, a second light-receiving unit located at a side of and corresponding to the second optical unit, a groove portion disposed between at least a portion of the first optical unit and at least a portion of the second optical unit in the stacked lens substrates, and at least one of a light-absorbing film or a blocking plate provided between the first light-receiving unit and the second light-receiving unit.

(11)

The camera module according to (10) above, where the stacked lens substrate includes a first lens substrate and a second lens substrate and the first lens substrate is directly bonded to the second lens substrate.

(12)

The camera module according to (11) above, where a first layer is formed on the first lens substrate and a second layer is formed on the second lens substrate, and each of the first and second layers include one or more of an oxide, nitride material, or carbon.

(13)

The camera module according to (12) above, where the first lens substrate is directly bonded to the second lens substrate via the first layer and the second layer.

(14)

The camera module according to (13) above, where the first layer and the second layer include a plasma bonded portion.

(15)

The camera module according to any one of (10) to (14) above, where an anti-reflection film is located in the plurality of through-holes.

(16)

The camera module according to any one of (10) to (15) above, where the blocking plate is formed at a light-receiving-element side of the stacked lens substrate.

(17)

The camera module according to (16) above, where the groove portion is within the stacked lens substrate and disposed at a lowermost lens substrate of the stacked substrate and corresponding to the blocking plate.

(18)

The camera module according to (17) above, where the groove portion at least partially penetrates the stacked lens substrate and is configured to receive the light blocking plate.

(19)

The camera module according to any one of (10) to (18) above, where the light-absorbing film is formed on a surface of the blocking plate.

(20)

The camera module according to any one of (10) to (19) above, where the light-absorbing film is formed on a lower surface of a lowermost lens substrate of the stacked substrate.

(21)

The camera module according to any one of (10) to (20) above, further including both the light-absorbing film and the blocking plate.

(22)

A method of producing a camera module, the method including:
forming a stacked lens structure having a first through-hole and a second through-hole adjacent to the first through-hole,
forming a first optical unit including one or more lenses within the first through-hole,
forming a second optical unit including one or more lenses within the second through-hole,
providing a first light-receiving unit at a first side of and corresponding to the first optical unit,
providing a second light-receiving unit at the first side of and corresponding to the second optical unit,
forming a groove portion between at least a portion of the first optical unit and at least a portion of the second optical unit in the stacked lens structure, and
providing at least one of a light-absorbing film or a blocking plate between the first light-receiving unit and the second light-receiving unit.

(23)

An electronic device including:
a camera module including:
a stacked lens substrate having a first through-hole and a second through-hole adjacent to the first through-hole,
a first optical unit including one or more lenses located in the first through-hole,
a second optical unit including one or more lenses located in the second through-hole,
a first light-receiving unit located at a side of and corresponding to the first optical unit,
a second light-receiving unit located at a side of and corresponding to the second optical unit,
a groove portion disposed between at least a portion of the first optical unit and at least a portion of the second optical unit in the stacked lens substrates, and
at least one of a light-absorbing film or a blocking plate provided between the first light-receiving unit and the second light-receiving unit, and
an actuator configured to move the stacked lens substrate in an optical axis direction.

(24)

The electronic device according to (23) above, where the stacked lens substrate includes a first lens substrate and a second lens substrate and the first lens substrate is directly bonded to the second lens substrate.

(25)

The electronic device according to (24) above, where a first layer is formed on the first lens substrate and a second layer is formed on the second lens substrate, and each of the first and second layers include one or more of an oxide, nitride material, or carbon.

(26)

The electronic device according to (25) above, where the first lens substrate is directly bonded to the second lens substrate via the first layer and the second layer.

(27)

The electronic device according to (26) above, where the first layer and the second layer include a plasma bonded portion.

(28)

The electronic device according to any one of (23) to (27) above, where an antireflection film is located in the plurality of through-holes.

(29)

The electronic device according to any one of (23) to (27) above, where the groove portion at least partially penetrates the stacked lens substrate and is configured to receive the light blocking plate.

REFERENCE SIGNS LIST 1 camera module
11 laminated lens structure
12 light receiving element
13 optical unit
21 lens
41(41a to 41g) substrate with lens
43 sensor substrate
51 diaphragm plate
52 opening
81 carrier substrate
82 lens resin part
83 through-hole
2001 through-groove
2002 blocking plate
2003 groove
2011 light absorbing film
3000 imaging device
3001 image sensor
3002 camera module

What is claimed is:
1. A camera module comprising:
a stacked lens substrate having a first through-hole formed in the stacked lens substrate and a second through-hole formed in the stacked lens substrate adjacent to the first through-hole;

a first optical unit including one or more lenses located in the first through-hole;

a second optical unit including one or more lenses located in the second through-hole;

a first light-receiving unit located at a first side of and corresponding to the first optical unit;

a second light-receiving unit located at a second side of and corresponding to the second optical unit;

a groove portion disposed between at least a portion of the first optical unit and at least a portion of the second optical unit in the stacked lens substrate; and at least one of a light-absorbing film or a blocking plate provided between the first light-receiving unit and the second light-receiving unit disposed below a lowermost lens substrate of the stacked lens substrate at a position corresponding to the groove portion.

2. The camera module according to claim 1, wherein the stacked lens substrate includes a first lens substrate and a second lens substrate and the first lens substrate is directly bonded to the second lens substrate.

3. The camera module according to claim 2, wherein a first layer is formed on the first lens substrate and a second layer is formed on the second lens substrate, and each of the first and second layers include one or more of an oxide, nitride material, or carbon.

4. The camera module according to claim 3, wherein the first lens substrate is directly bonded to the second lens substrate via the first layer and the second layer.

5. The camera module according to claim 4, wherein the first layer and the second layer include a plasma bonded portion.

6. The camera module according to claim 1, wherein an anti-reflection film is located in the first and second through-holes.

7. The camera module according to claim 1, wherein the blocking plate is formed at a light-receiving-element side of the stacked lens substrate.

8. The camera module according to claim 1, wherein the groove portion at least partially penetrates the stacked lens substrate, and wherein the light blocking plate is provided at a position corresponding to the groove portion.

9. The camera module according to claim 1, wherein the light-absorbing film is formed on a surface of the blocking plate.

10. The camera module according to claim 1, wherein the light-absorbing film is formed on a lower surface of the lowermost lens substrate of the stacked lens substrate.

11. The camera module according to claim 1, further comprising both the light-absorbing film and the blocking plate.

12. A method of producing a camera module, the method comprising:

forming a stacked lens structure having a first through-hole formed in the stacked lens substrate and a second through-hole formed in the stacked lens substrate adjacent to the first through-hole;

forming a first optical unit including one or more lenses within the first through-hole;

forming a second optical unit including one or more lenses within the second through-hole;

providing a first light-receiving unit at a first side of and corresponding to the first optical unit;

providing a second light-receiving unit at a second side of and corresponding to the second optical unit;

forming a groove portion between at least a portion of the first optical unit and at least a portion of the second optical unit in the stacked lens structure; and providing at least one of a light-absorbing film or a blocking plate between the first light-receiving unit and the second light-receiving unit disposed below a lowermost lens substrate of the stacked lens substrate at a position corresponding to the groove portion.

13. An electronic device comprising:

a camera module including:

a stacked lens substrate having a first through-hole formed in the stacked lens substrate and a second through-hole formed in the stacked lens substrate adjacent to the first through-hole, a first optical unit including one or more lenses located in the first through-hole, a second optical unit including one or more lenses located in the second through-hole, a first light-receiving unit located at a first side of and corresponding to the first optical unit, a second light-receiving unit located at a second side of and corresponding to the second optical unit, a groove portion disposed between at least a portion of the first optical unit and at least a portion of the second optical unit in the stacked lens substrate; and at least one of a light-absorbing film or a blocking plate provided between the first light-receiving unit and the second light-receiving unit disposed below a lowermost lens substrate of the stacked lens substrate at a position corresponding to the groove portion; and an actuator configured to move the stacked lens substrate in an optical axis direction.

14. The electronic device according to claim 13, wherein the stacked lens substrate includes a first lens substrate and a second lens substrate and the first lens substrate is directly bonded to the second lens substrate.

15. The electronic device according to claim 14, wherein a first layer is formed on the first lens substrate and a second layer is formed on the second lens substrate, and each of the first and second layers include one or more of an oxide, nitride material, or carbon.

16. The electronic device according to claim 15, wherein the first lens substrate is directly bonded to the second lens substrate via the first layer and the second layer.

17. The electronic device according to claim 16, wherein the first layer and the second layer include a plasma bonded portion.

18. The electronic device according to claim 13, wherein an anti-reflection film is located in the first and second through-holes.

19. The electronic device according to claim 13, wherein the groove portion at least partially penetrates the stacked lens substrate.

* * * * *